US012440128B2

(12) United States Patent
Al-Ali et al.

(10) Patent No.: US 12,440,128 B2
(45) Date of Patent: Oct. 14, 2025

(54) WRIST AND FINGER WORN PULSE OXIMETRY SYSTEM

(71) Applicant: MASIMO CORPORATION, Irvine, CA (US)

(72) Inventors: Ammar Al-Ali, San Juan Capistrano, CA (US); Chad A. DeJong, Los Angeles, CA (US); Stephen Scruggs, Newport Beach, CA (US); James Ford Schramm, Huntington Beach, CA (US); Richard Priddell, Irvine, CA (US); Sujin Hwang, Irvine, CA (US); Mitchell Lloyd Ambrosini, Laguna Niguel, CA (US)

(73) Assignee: Masimo Corporation, Irvine, CA (US)

( * ) Notice: Subject to any disclaimer, the term of this patent is extended or adjusted under 35 U.S.C. 154(b) by 437 days.

(21) Appl. No.: 18/146,310

(22) Filed: Dec. 23, 2022

(65) Prior Publication Data

US 2023/0210417 A1 Jul. 6, 2023

Related U.S. Application Data

(60) Provisional application No. 63/375,191, filed on Sep. 9, 2022, provisional application No. 63/316,625, filed on (Continued)

(51) Int. Cl.
*A61B 5/1455* (2006.01)
*A61B 5/00* (2006.01)

(52) U.S. Cl.
CPC ........ *A61B 5/14552* (2013.01); *A61B 5/6826* (2013.01); *A61B 2560/0456* (2013.01)

(58) Field of Classification Search
CPC .............. A61B 5/1455; A61B 5/14551; A61B 5/14552; A61B 5/0205; A61B 5/024;
(Continued)

(56) References Cited

U.S. PATENT DOCUMENTS 3,646,606 A 2/1972 Buxton et al.
3,690,313 A 9/1972 Weber et al.
(Continued)

FOREIGN PATENT DOCUMENTS

CN 301342850 9/2010
CN 302423595 5/2013
(Continued)

OTHER PUBLICATIONS

US 2024/0016391 A1, 01/2024, Lapotko et al. (withdrawn)
(Continued)

*Primary Examiner* — Chu Chuan Liu
(74) *Attorney, Agent, or Firm* — Knobbe, Martens, Olson & Bear, LLP

(57) ABSTRACT

A pulse oximetry system includes a wrist portion configured for placement on a wrist of a subject, the wrist portion having a first component and a second component configured to removably secure to one another. The wrist portion can include emitter(s) and detector(s) operably positioned by the wrist portion. In some implementations, the pulse oximetry system further includes a ring member configured to secure around the subject's finger and operably position emitter(s) and detector(s) and a cable connected to the wrist portion in electrical communication with the emitter(s) and the detector(s) of the ring member and configured to transmit the signal(s) from the detector(s) to the wrist portion. The system includes a battery and hardware processor(s) configured to receive and process signal(s) outputted by the detector(s) to determine physiological parameter(s) of the subject.

20 Claims, 67 Drawing Sheets

Related U.S. Application Data on Mar. 4, 2022, provisional application No. 63/296,725, filed on Jan. 5, 2022.

(58) Field of Classification Search
CPC ............ A61B 5/02416; A61B 5/02427; A61B 5/02433; A61B 5/6826; A61B 5/6824; A61B 5/6831; A61B 2560/0456; A61B 2560/045

See application file for complete search history.

(56) References Cited

U.S. PATENT DOCUMENTS

| | | | |
|---|---|---|---|
| 3,810,102 A | 5/1974 | Parks, III et al. |
| 3,815,583 A | 6/1974 | Scheidt |
| 3,972,320 A | 8/1976 | Kalman |
| 3,978,849 A | 9/1976 | Geneen |
| 4,108,166 A | 8/1978 | Schmid |
| 4,129,125 A | 12/1978 | Lester et al. |
| 4,226,006 A | 10/1980 | Toyama |
| 4,231,354 A | 11/1980 | Kurtz et al. |
| D265,508 S | 7/1982 | Rusteberg |
| D268,300 S | 3/1983 | Richards |
| 4,589,415 A | 5/1986 | Haaga |
| 4,662,378 A | 5/1987 | Thomis |
| 4,815,172 A | 3/1989 | Ward et al. |
| 4,838,275 A | 6/1989 | Lee |
| 4,852,570 A | 8/1989 | Levine |
| 4,960,128 A | 10/1990 | Gordon et al. |
| 4,964,408 A | 10/1990 | Hink et al. |
| 4,966,154 A | 10/1990 | Cooper et al. |
| 5,092,340 A | 3/1992 | Yamaguchi et al. |
| 5,140,519 A | 8/1992 | Friesdorf et al. |
| 5,159,932 A | 11/1992 | Zanetti et al. |
| 5,161,539 A | 11/1992 | Evans et al. |
| 5,262,944 A | 11/1993 | Weisner et al. |
| 5,277,189 A | 1/1994 | Jacobs |
| 5,278,627 A | 1/1994 | Aoyagi et al. |
| 5,282,474 A | 2/1994 | Valdes Sosa et al. |
| 5,296,688 A | 3/1994 | Hamilton et al. |
| 5,318,037 A | 6/1994 | Evans et al. |
| 5,319,355 A | 6/1994 | Russek |
| 5,331,549 A | 7/1994 | Crawford, Jr. |
| 5,333,106 A | 7/1994 | Lanpher et al. |
| 5,337,744 A | 8/1994 | Branigan |
| 5,341,805 A | 8/1994 | Stavridi et al. |
| 5,348,008 A | 9/1994 | Bornn et al. |
| 5,358,519 A | 10/1994 | Grandjean |
| D353,195 S | 12/1994 | Savage et al. |
| D353,196 S | 12/1994 | Savage et al. |
| 5,375,599 A | 12/1994 | Schimizu |
| 5,375,604 A | 12/1994 | Kelly |
| 5,377,676 A | 1/1995 | Vari et al. |
| D356,441 S | 3/1995 | Scheller |
| 5,400,794 A | 3/1995 | Gorman |
| D357,982 S | 5/1995 | Dahl et al. |
| 5,416,695 A | 5/1995 | Stutman et al. |
| D359,546 S | 6/1995 | Savage et al. |
| 5,431,170 A | 7/1995 | Mathews |
| 5,434,611 A | 7/1995 | Tamura |
| 5,436,499 A | 7/1995 | Namavar et al. |
| D361,840 S | 8/1995 | Savage et al. |
| D362,063 S | 9/1995 | Savage et al. |
| D363,120 S | 10/1995 | Savage et al. |
| 5,456,252 A | 10/1995 | Vari et al. |
| 5,479,934 A | 1/1996 | Imran |
| 5,482,036 A | 1/1996 | Diab et al. |
| 5,483,968 A | 1/1996 | Adam et al. |
| 5,494,041 A | 2/1996 | Wilk |
| 5,494,043 A | 2/1996 | O'Sullivan et al. |
| 5,503,149 A | 4/1996 | Beavin |
| 5,505,202 A | 4/1996 | Mogi et al. |
| 5,533,511 A | 7/1996 | Kaspari et al. |
| 5,537,289 A | 7/1996 | Dahl |
| 5,544,649 A | 8/1996 | David et al. |
| 5,553,609 A | 9/1996 | Chen et al. |
| 5,558,638 A | 9/1996 | Evers et al. |
| 5,561,275 A | 10/1996 | Savage et al. |
| 5,566,676 A | 10/1996 | Rosenfeldt et al. |
| 5,566,678 A | 10/1996 | Rosenfeldt et al. |
| 5,576,952 A | 11/1996 | Stutman et al. |
| 5,579,001 A | 11/1996 | Dempsey et al. |
| 5,590,649 A | 1/1997 | Caro et al. |
| 5,602,924 A | 2/1997 | Durand et al. |
| 5,619,991 A | 4/1997 | Sloane |
| 5,638,816 A | 6/1997 | Klani-Azarbayjany et al. |
| 5,638,818 A | 6/1997 | Diab et al. |
| 5,640,967 A | 6/1997 | Fine et al. |
| 5,645,440 A | 7/1997 | Tobler et al. |
| 5,671,914 A | 9/1997 | Kalkhoran et al. |
| 5,685,314 A | 11/1997 | Geheb et al. |
| 5,687,717 A | 11/1997 | Halpern et al. |
| 5,694,020 A | 12/1997 | Lang |
| 5,724,580 A | 3/1998 | Levin et al. |
| 5,724,983 A | 3/1998 | Selker et al. |
| 5,725,308 A | 3/1998 | Smith et al. |
| 5,726,440 A | 3/1998 | Kalkhoran et al. |
| 5,734,739 A | 3/1998 | Sheehan et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,079 A | 5/1998 | Ludwig et al. |
| 5,758,644 A | 6/1998 | Diab et al. |
| 5,760,910 A | 6/1998 | Lepper, Jr. et al. |
| 5,772,585 A | 6/1998 | Lavin et al. |
| 5,782,805 A | 7/1998 | Meinzer |
| 5,801,637 A | 9/1998 | Lomholt |
| 5,813,403 A | 9/1998 | Soller et al. |
| 5,822,544 A | 10/1998 | Chaco et al. |
| 5,822,546 A | 10/1998 | George |
| 5,829,723 A | 11/1998 | Brunner |
| 5,855,550 A | 1/1999 | Lai et al. |
| D406,001 S | 2/1999 | Nemeth |
| 5,876,351 A | 3/1999 | Rohde |
| 5,890,929 A | 4/1999 | Mills et al. |
| 5,910,139 A | 6/1999 | Cochran et al. |
| 5,919,134 A | 7/1999 | Diab |
| 5,921,920 A | 7/1999 | Marshall et al. |
| 5,924,074 A | 7/1999 | Evans |
| 5,931,160 A | 8/1999 | Gilmore et al. |
| 5,931,791 A | 8/1999 | Saltzstein et al. |
| 5,941,836 A | 8/1999 | Friedman |
| 5,942,986 A | 8/1999 | Shabot et al. |
| D415,892 S | 11/1999 | Angus et al. |
| 5,987,343 A | 11/1999 | Kinast |
| 5,987,519 A | 11/1999 | Peifer et al. |
| 5,997,343 A | 12/1999 | Mills et al. |
| 6,002,952 A | 12/1999 | Diab et al. |
| 6,006,119 A | 12/1999 | Soller et al. |
| 6,010,937 A | 1/2000 | Karam et al. |
| 6,014,346 A | 1/2000 | Malone |
| 6,018,673 A | 1/2000 | Chin et al. |
| 6,024,699 A | 2/2000 | Surwit et al. |
| 6,027,452 A | 2/2000 | Flaherty et al. |
| 6,032,678 A | 3/2000 | Rottem |
| 6,035,230 A | 3/2000 | Kang et al. |
| 6,036,718 A | 3/2000 | Ledford et al. |
| 6,040,578 A | 3/2000 | Malin et al. |
| 6,045,527 A | 4/2000 | Appelbaum et al. |
| 6,057,758 A | 5/2000 | Dempsey et al. |
| 6,066,204 A | 5/2000 | Haven |
| 6,093,146 A | 7/2000 | Filangeri |
| 6,101,478 A | 8/2000 | Brown |
| 6,106,463 A | 8/2000 | Wilk |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,129,686 A | 10/2000 | Friedman |
| 6,132,218 A | 10/2000 | Benja-Athon |
| 6,139,494 A | 10/2000 | Cairnes |
| 6,144,868 A | 11/2000 | Parker |
| 6,152,754 A | 11/2000 | Gerhardt et al. |
| 6,167,258 A | 12/2000 | Schmidt et al. |

(56) References Cited

U.S. PATENT DOCUMENTS

| | | |
|---|---|---|
| D437,058 S | 1/2001 | Gozani |
| 6,168,563 B1 | 1/2001 | Brown |
| 6,171,237 B1 | 1/2001 | Avitall et al. |
| 6,175,752 B1 | 1/2001 | Say et al. |
| 6,183,417 B1 | 2/2001 | Gehab et al. |
| 6,184,521 B1 | 2/2001 | Coffin, IV et al. |
| 6,185,448 B1 | 2/2001 | Borovsky |
| 6,195,576 B1 | 2/2001 | John |
| 6,221,012 B1 | 4/2001 | Maschke et al. |
| 6,224,553 B1 | 5/2001 | Nevo |
| 6,230,142 B1 | 5/2001 | Benigno et al. |
| 6,232,609 B1 | 5/2001 | Snyder et al. |
| 6,241,683 B1 | 6/2001 | Macklem et al. |
| 6,251,113 B1 | 6/2001 | Appelbaum |
| 6,253,097 B1 | 6/2001 | Aronow et al. |
| 6,255,708 B1 | 7/2001 | Sudharsanan et al. |
| 6,267,723 B1 | 7/2001 | Matsumura et al. |
| 6,269,262 B1 | 7/2001 | Kandori et al. |
| 6,280,381 B1 | 8/2001 | Malin et al. |
| 6,285,896 B1 | 9/2001 | Tobler et al. |
| D449,304 S | 10/2001 | Herath |
| D449,617 S | 10/2001 | Herath |
| 6,304,767 B1 | 10/2001 | Soller et al. |
| 6,308,089 B1 | 10/2001 | von der Ruhr et al. |
| 6,312,378 B1 | 11/2001 | Bardy |
| 6,317,627 B1 | 11/2001 | Ennen et al. |
| 6,319,205 B1 | 11/2001 | Goor et al. |
| 6,321,100 B1 | 11/2001 | Parker |
| 6,322,502 B1 | 11/2001 | Schoenberg et al. |
| 6,322,515 B1 | 11/2001 | Goor et al. |
| D452,495 S | 12/2001 | Murnaghan et al. |
| D452,496 S | 12/2001 | Murnaghan et al. |
| 6,329,139 B1 | 12/2001 | Nova et al. |
| 6,334,065 B1 | 12/2001 | Al-Ali et al. |
| 6,338,039 B1 | 1/2002 | Lonski et al. |
| 6,352,504 B1 | 3/2002 | Ise |
| 6,354,235 B1 | 3/2002 | Davies |
| 6,360,114 B1 | 3/2002 | Diab et al. |
| 6,363,269 B1 | 3/2002 | Hanna et al. |
| D456,074 S | 4/2002 | McCurry |
| 6,364,834 B1 | 4/2002 | Reuss et al. |
| 6,364,839 B1 | 4/2002 | Little et al. |
| 6,368,283 B1 | 4/2002 | Xu et al. |
| 6,385,476 B1 | 5/2002 | Osadchy et al. |
| 6,385,589 B1 | 5/2002 | Trusheim et al. |
| 6,407,335 B1 | 6/2002 | Franklin-Lees |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,461,305 B1 | 10/2002 | Schnall |
| 6,463,311 B1 | 10/2002 | Diab |
| 6,470,199 B1 | 10/2002 | Kopotic et al. |
| 6,470,893 B1 | 10/2002 | Boesen |
| 6,487,429 B2 | 11/2002 | Hockersmith et al. |
| 6,488,633 B1 | 12/2002 | Schnall |
| 6,505,059 B1 | 1/2003 | Kollias et al. |
| 6,517,967 B1 | 2/2003 | Shrim et al. |
| 6,524,240 B1 | 2/2003 | Thede |
| 6,525,386 B1 | 2/2003 | Mills et al. |
| 6,526,300 B1 | 2/2003 | Kiani et al. |
| D471,354 S | 3/2003 | Daniels |
| 6,534,012 B1 | 3/2003 | Hazen et al. |
| 6,542,764 B1 | 4/2003 | Al-Ali et al. |
| 6,544,173 B2 | 4/2003 | West et al. |
| 6,544,174 B2 | 4/2003 | West et al. |
| 6,551,243 B2 | 4/2003 | Bocionek et al. |
| 6,578,428 B1 | 6/2003 | Dromms et al. |
| 6,580,086 B1 | 6/2003 | Schulz et al. |
| 6,582,393 B2 | 6/2003 | Sage, Jr. |
| 6,584,336 B1 | 6/2003 | All et al. |
| 6,587,196 B1 | 7/2003 | Stippick et al. |
| 6,587,199 B1 | 7/2003 | Lou |
| 6,595,316 B2 | 7/2003 | Cybulski et al. |
| 6,597,932 B2 | 7/2003 | Tian et al. |
| 6,606,511 B1 | 8/2003 | Ali et al. |
| 6,616,606 B1 | 9/2003 | Peterson et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| D481,537 S | 11/2003 | Vaughn |
| 6,641,533 B2 | 11/2003 | Causey et al. |
| 6,646,556 B1 | 11/2003 | Smith et al. |
| 6,650,939 B2 | 11/2003 | Taepke, II et al. |
| D483,872 S | 12/2003 | Cruz et al. |
| D483,939 S | 12/2003 | Kountz et al. |
| 6,658,276 B2 | 12/2003 | Kiani et al. |
| 6,661,161 B1 | 12/2003 | Lanzo et al. |
| 6,663,570 B2 | 12/2003 | Mott et al. |
| 6,694,180 B1 | 2/2004 | Boesen |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,719,694 B2 | 4/2004 | Weng et al. |
| 6,725,086 B2 | 4/2004 | Marinello |
| 6,738,652 B2 | 5/2004 | Mattu et al. |
| 6,746,406 B2 | 6/2004 | Lia et al. |
| 6,750,463 B1 | 6/2004 | Riley |
| 6,751,492 B2 | 6/2004 | Ben-haim |
| 6,760,607 B2 | 7/2004 | Ai-All |
| 6,766,188 B2 | 7/2004 | Soller |
| 6,783,492 B2 | 8/2004 | Dominguez |
| 6,788,965 B2 | 9/2004 | Ruchti et al. |
| 6,790,178 B1 | 9/2004 | Mault et al. |
| 6,795,724 B2 | 9/2004 | Hogan |
| 6,796,186 B2 | 9/2004 | Lia et al. |
| 6,804,656 B1 | 10/2004 | Rosenfeld |
| 6,807,050 B1 | 10/2004 | Whitehorn et al. |
| 6,816,241 B2 | 11/2004 | Grubisic |
| 6,817,979 B2 | 11/2004 | Nihtila et al. |
| 6,822,564 B2 | 11/2004 | Al-Ali |
| 6,837,848 B2 | 1/2005 | Bonner et al. |
| 6,840,904 B2 | 1/2005 | Goldberg |
| 6,841,535 B2 | 1/2005 | Divita et al. |
| 6,850,787 B2 | 2/2005 | Weber et al. |
| 6,850,788 B2 | 2/2005 | Al-Ali |
| 6,855,112 B2 | 2/2005 | Kao et al. |
| 6,860,266 B2 | 3/2005 | Blike |
| 6,876,931 B2 | 4/2005 | Lorenz et al. |
| 6,897,788 B2 | 5/2005 | Khair et al. |
| 6,907,237 B1 | 6/2005 | Dorenbosch et al. |
| 6,915,149 B2 | 7/2005 | Ben-haim |
| 6,916,289 B2 | 7/2005 | Schnall |
| 6,920,345 B2 | 7/2005 | Al-Ali et al. |
| 6,934,570 B2 | 8/2005 | Kiani et al. |
| 6,939,304 B2 | 9/2005 | Schnall et al. |
| 6,943,348 B1 | 9/2005 | Coffin IV |
| D510,186 S | 10/2005 | Bell |
| 6,952,340 B2 | 10/2005 | Son |
| 6,956,649 B2 | 10/2005 | Acosta et al. |
| 6,961,598 B2 | 11/2005 | Diab |
| 6,970,792 B1 | 11/2005 | Diab |
| 6,980,419 B2 | 12/2005 | Smith et al. |
| 6,983,179 B2 | 1/2006 | Ben-haim |
| 6,985,764 B2 | 1/2006 | Mason et al. |
| 6,988,989 B2 | 1/2006 | Weiner et al. |
| 6,990,364 B2 | 1/2006 | Ruchti et al. |
| 6,997,884 B2 | 2/2006 | Ulmsten |
| 6,998,247 B2 | 2/2006 | Monfre et al. |
| 7,003,338 B2 | 2/2006 | Weber et al. |
| 7,004,907 B2 | 2/2006 | Banet et al. |
| 7,015,451 B2 | 3/2006 | Dalke et al. |
| 7,025,729 B2 | 4/2006 | De Chazal et al. |
| 7,027,849 B2 | 4/2006 | Ai-Ali |
| 7,033,761 B2 | 4/2006 | Shafer |
| 7,035,686 B2 | 4/2006 | Hogan |
| 7,044,930 B2 | 5/2006 | Stromberg |
| 7,063,666 B2 | 6/2006 | Weng et al. |
| 7,079,035 B2 | 7/2006 | Bock et al. |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |

(56) References Cited

U.S. PATENT DOCUMENTS

| | | |
|---|---|---|
| D529,029 S | 9/2006 | Sekine |
| D529,283 S | 10/2006 | Vivar et al. |
| D529,616 S | 10/2006 | Deros et al. |
| 7,133,710 B2 | 11/2006 | Acosta et al. |
| 7,142,901 B2 | 11/2006 | Kiani et al. |
| 7,179,228 B2 | 2/2007 | Banet |
| 7,188,621 B2 | 3/2007 | DeVries et al. |
| 7,208,119 B1 | 4/2007 | Kurtock et al. |
| 7,225,006 B2 | 5/2007 | Al-Ali et al. |
| RE39,672 E | 6/2007 | Shehada et al. |
| 7,229,415 B2 | 6/2007 | Schwartz |
| 7,238,159 B2 | 7/2007 | Banet et al. |
| 7,241,287 B2 | 7/2007 | Shehada et al. |
| 7,244,251 B2 | 7/2007 | Shehada et al. |
| 7,245,373 B2 | 7/2007 | Soller et al. |
| 7,252,659 B2 | 8/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,256,708 B2 | 8/2007 | Rosenfeld |
| 7,261,697 B2 | 8/2007 | Berstein |
| 7,264,616 B2 | 9/2007 | Shehada et al. |
| 7,267,671 B2 | 9/2007 | Shehada et al. |
| 7,268,859 B2 | 9/2007 | Sage, Jr. et al. |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,285,090 B2 | 10/2007 | Stivoric |
| 7,289,835 B2 | 10/2007 | Mansfield et al. |
| 7,292,883 B2 | 11/2007 | De Felice et al. |
| 7,298,938 B2 | 11/2007 | Johnston |
| 7,307,543 B2 | 12/2007 | Rosenfeld |
| 7,313,423 B2 | 12/2007 | Griffin et al. |
| 7,314,446 B2 | 1/2008 | Byrd et al. |
| 7,315,825 B2 | 1/2008 | Rosenfeld |
| 7,321,862 B2 | 1/2008 | Rosenfeld |
| 7,322,971 B2 | 1/2008 | Shehada et al. |
| 7,336,187 B2 | 2/2008 | Hubbard, Jr. et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,178 B2 | 4/2008 | Ziel et al. |
| 7,356,365 B2 | 4/2008 | Schurman |
| 7,361,155 B2 | 4/2008 | Sage, Jr. et al. |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |
| 7,378,975 B1 | 5/2008 | Smith et al. |
| 7,382,247 B2 | 6/2008 | Welch et al. |
| 7,390,299 B2 | 6/2008 | Weiner et al. |
| 7,395,158 B2 | 7/2008 | Monfre et al. |
| 7,395,216 B2 | 7/2008 | Rosenfeld |
| 7,396,330 B2 | 7/2008 | Banet et al. |
| 7,411,509 B2 | 8/2008 | Rosenfeld |
| 7,413,546 B2 | 8/2008 | Agutter et al. |
| 7,415,297 B2 | 8/2008 | Al-Ali et al. |
| 7,419,483 B2 | 9/2008 | Shehada |
| 7,433,827 B2 | 10/2008 | Rosenfeld |
| 7,438,683 B2 | 10/2008 | Al-Ali et al. |
| 7,439,856 B2 | 10/2008 | Weiner et al. |
| 7,454,359 B2 | 11/2008 | Rosenfeld |
| 7,454,360 B2 | 11/2008 | Rosenfeld |
| D582,043 S | 12/2008 | Koike et al. |
| 7,462,151 B2 | 12/2008 | Childre et al. |
| 7,467,094 B2 | 12/2008 | Rosenfeld |
| 7,475,019 B2 | 1/2009 | Rosenfeld |
| 7,481,772 B2 | 1/2009 | Banet |
| 7,483,729 B2 | 1/2009 | Al-Ali et al. |
| 7,489,250 B2 | 2/2009 | Bock et al. |
| D587,657 S | 3/2009 | Al-Ali et al. |
| 7,497,828 B1 | 3/2009 | Wilk et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,515,043 B2 | 4/2009 | Welch et al. |
| 7,515,044 B2 | 4/2009 | Welch et al. |
| 7,519,406 B2 | 4/2009 | Blank et al. |
| D592,507 S | 5/2009 | Wachman et al. |
| 7,530,942 B1 | 5/2009 | Diab |
| 7,532,919 B2 | 5/2009 | Soyemi et al. |
| 7,549,961 B1 | 6/2009 | Hwang |
| 7,551,717 B2 | 6/2009 | Tome et al. |
| D596,635 S | 7/2009 | Owens et al. |
| D597,093 S | 7/2009 | Neu et al. |
| 7,559,520 B2 | 7/2009 | Quijano et al. |
| 7,577,475 B2 | 8/2009 | Consentino et al. |
| 7,588,558 B2 | 9/2009 | Sage, Jr. et al. |
| 7,590,950 B2 | 9/2009 | Collins et al. |
| 7,593,230 B2 | 9/2009 | Abul-Haj et al. |
| 7,596,398 B2 | 9/2009 | Al-Ali et al. |
| 7,597,665 B2 | 10/2009 | Wilk et al. |
| 7,606,608 B2 | 10/2009 | Blank et al. |
| 7,612,999 B2 | 11/2009 | Clark et al. |
| 7,616,303 B2 | 11/2009 | Yang et al. |
| 7,620,674 B2 | 11/2009 | Ruchti et al. |
| D606,659 S | 12/2009 | Klani et al. |
| 7,629,039 B2 | 12/2009 | Eckerbom et al. |
| 7,639,145 B2 | 12/2009 | Lawson et al. |
| 7,640,140 B2 | 12/2009 | Ruchti et al. |
| 7,647,083 B2 | 1/2010 | Al-Ali et al. |
| 7,650,291 B2 | 1/2010 | Rosenfeld |
| D609,193 S | 2/2010 | Al-Ali et al. |
| 7,654,966 B2 | 2/2010 | Westinskow et al. |
| 7,658,716 B2 | 2/2010 | Banet et al. |
| 7,661,976 B2 | 2/2010 | Ma |
| 7,684,845 B2 | 3/2010 | Juan |
| 7,689,437 B1 | 3/2010 | Teller et al. |
| RE41,236 E | 4/2010 | Seely |
| D614,305 S | 4/2010 | Al-Ali et al. |
| 7,693,697 B2 | 4/2010 | Westinskow et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,722,542 B2 | 5/2010 | Lia et al. |
| 7,729,733 B2 | 6/2010 | Al-Ali et al. |
| 7,736,318 B2 | 6/2010 | Consentino et al. |
| 7,740,590 B2 | 6/2010 | Bernstein |
| 7,761,127 B2 | 7/2010 | Al-Ali et al. |
| 7,763,420 B2 | 7/2010 | Strizker et al. |
| 7,764,982 B2 | 7/2010 | Dalke et al. |
| D621,515 S | 8/2010 | Chua et al. |
| D621,516 S | 8/2010 | Kiani et al. |
| 7,766,818 B2 | 8/2010 | Iketani et al. |
| 7,774,060 B2 | 8/2010 | Westenskow et al. |
| 7,778,851 B2 | 8/2010 | Schoenberg et al. |
| 7,791,155 B2 | 9/2010 | Diab |
| 7,794,407 B2 | 9/2010 | Rothenberg |
| 7,803,120 B2 | 9/2010 | Banet et al. |
| 7,806,830 B2 | 10/2010 | Bernstein |
| 7,820,184 B2 | 10/2010 | Strizker et al. |
| RE41,912 E | 11/2010 | Parker |
| 7,831,450 B2 | 11/2010 | Schoenberg |
| 7,841,986 B2 | 11/2010 | He et al. |
| D628,795 S | 12/2010 | Sanders |
| D628,797 S | 12/2010 | Kalbach |
| 7,848,935 B2 | 12/2010 | Gotlib |
| 7,858,322 B2 | 12/2010 | Tymianski et al. |
| 7,865,232 B1 | 1/2011 | Krishnaswamy et al. |
| 7,880,626 B2 | 2/2011 | Al-Ali et al. |
| 7,881,892 B2 | 2/2011 | Soyemi et al. |
| 7,884,314 B2 | 2/2011 | Hamada |
| 7,890,156 B2 | 2/2011 | Ooi et al. |
| 7,909,772 B2 | 3/2011 | Popov et al. |
| 7,914,514 B2 | 3/2011 | Calderon |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,942,691 B1 | 5/2011 | McSweyn |
| 7,957,780 B2 | 6/2011 | Lamego et al. |
| 7,962,188 B2 | 6/2011 | Kiani et al. |
| 7,963,927 B2 | 6/2011 | Kelleher et al. |

(56) References Cited

U.S. PATENT DOCUMENTS

| | | |
|---|---|---|
| 7,967,749 B2 | 6/2011 | Hutchinson et al. |
| 7,976,472 B2 | 7/2011 | Kiani |
| 7,988,639 B2 | 8/2011 | Starks |
| 7,990,382 B2 | 8/2011 | Kiani |
| 7,991,463 B2 | 8/2011 | Kelleher et al. |
| 7,991,625 B2 | 8/2011 | Rosenfeld |
| 7,993,275 B2 | 8/2011 | Banet et al. |
| 8,008,088 B2 | 8/2011 | Bellott et al. |
| RE42,753 E | 9/2011 | Kiani-Azarbayjany et al. |
| 8,027,846 B2 | 9/2011 | Schoenberg |
| 8,028,701 B2 | 10/2011 | Al-Ali et al. |
| 8,033,996 B2 | 10/2011 | Behar |
| 8,036,736 B2 | 10/2011 | Snyder et al. |
| 8,038,625 B2 | 10/2011 | Afonso et al. |
| 8,048,040 B2 | 11/2011 | Kiani |
| 8,050,728 B2 | 11/2011 | Al-Ali et al. |
| 8,068,104 B2 | 11/2011 | Rampersad |
| 8,073,707 B2 | 12/2011 | Teller et al. |
| D652,379 S | 1/2012 | Vandiver |
| 8,094,013 B1 | 1/2012 | Lee et al. |
| RE43,169 E | 2/2012 | Parker |
| 8,118,620 B2 | 2/2012 | Al-Ali et al. |
| 8,130,105 B2 | 3/2012 | Al-Ali et al. |
| D659,836 S | 5/2012 | Bensch et al. |
| 8,170,887 B2 | 5/2012 | Rosenfeld |
| 8,175,895 B2 | 5/2012 | Rosenfeld |
| 8,180,440 B2 | 5/2012 | McCombie et al. |
| 8,182,443 B1 | 5/2012 | Kiani |
| 8,190,223 B2 | 5/2012 | Al-Ali et al. |
| 8,200,308 B2 | 6/2012 | Zhang et al. |
| 8,200,321 B2 | 6/2012 | McCombie et al. |
| 8,203,438 B2 | 6/2012 | Klani et al. |
| 8,203,704 B2 | 6/2012 | Merritt et al. |
| 8,206,312 B2 | 6/2012 | Farquhar |
| 8,214,007 B2 | 7/2012 | Baker et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,235,907 B2 | 8/2012 | Wilk et al. |
| 8,239,010 B2 | 8/2012 | Banet et al. |
| 8,239,780 B2 | 8/2012 | Manetta et al. |
| 8,241,213 B2 | 8/2012 | Lynn et al. |
| 8,249,815 B2 | 8/2012 | Taylor |
| 8,255,026 B1 | 8/2012 | Al-Ali |
| 8,265,723 B1 | 9/2012 | McHale et al. |
| 8,274,360 B2 | 9/2012 | Sampath et al. |
| D669,375 S | 10/2012 | Kao et al. |
| 8,280,473 B2 | 10/2012 | Al-Ali |
| 8,294,588 B2 | 10/2012 | Fisher et al. |
| 8,294,716 B2 | 10/2012 | Lord et al. |
| 8,295,521 B2 | 10/2012 | Chan et al. |
| 8,311,747 B2 | 11/2012 | Taylor |
| 8,311,748 B2 | 11/2012 | Taylor et al. |
| 8,315,683 B2 | 11/2012 | Al-Ali et al. |
| 8,315,812 B2 | 11/2012 | Taylor |
| 8,315,813 B2 | 11/2012 | Taylor et al. |
| 8,315,814 B2 | 11/2012 | Taylor et al. |
| 8,321,004 B2 | 11/2012 | Moon et al. |
| 8,321,150 B2 | 11/2012 | Taylor |
| RE43,860 E | 12/2012 | Parker |
| 8,326,649 B2 | 12/2012 | Rosenfeld |
| 8,328,793 B2 | 12/2012 | Birkenbach |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,360,936 B2 | 1/2013 | Dibenedetto et al. |
| 8,364,250 B2 | 1/2013 | Moon et al. |
| 8,374,665 B2 | 2/2013 | Lamego |
| D677,792 S | 3/2013 | Vandiver |
| D679,018 S | 3/2013 | Fullerton et al. |
| 8,388,353 B2 | 3/2013 | Kiani et al. |
| 8,401,602 B2 | 3/2013 | Kiani |
| 8,401,874 B2 | 3/2013 | Rosenfeld |
| 8,414,499 B2 | 4/2013 | Al-Ali et al. |
| 8,418,524 B2 | 4/2013 | Al-Ali |
| 8,419,649 B2 | 4/2013 | Banet et al. |
| 8,428,967 B2 | 4/2013 | Olsen et al. |
| 8,430,817 B1 | 4/2013 | Al-Ali et al. |
| D682,835 S | 5/2013 | Daniel |
| 8,437,824 B2 | 5/2013 | Moon et al. |
| 8,437,825 B2 | 5/2013 | Dalvi et al. |
| 8,442,607 B2 | 5/2013 | Banet et al. |
| 8,449,469 B2 | 5/2013 | Banet et al. |
| D683,960 S | 6/2013 | Robbins et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| D685,189 S | 7/2013 | Adelman et al. |
| 8,475,370 B2 | 7/2013 | McCombie et al. |
| 8,485,448 B2 | 7/2013 | Maizlin et al. |
| 8,489,167 B2 | 7/2013 | Buxton |
| 8,506,480 B2 | 8/2013 | Banet et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| 8,527,038 B2 | 9/2013 | Moon et al. |
| D692,145 S | 10/2013 | Al-Ali et al. |
| 8,545,417 B2 | 10/2013 | Banet et al. |
| 8,554,297 B2 | 10/2013 | Moon et al. |
| 8,565,847 B2 | 10/2013 | Buxton et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,574,161 B2 | 11/2013 | Banet et al. |
| 8,577,431 B2 | 11/2013 | Lamego et al. |
| 8,578,082 B2 | 11/2013 | Medina et al. |
| 8,579,813 B2 | 11/2013 | Causey |
| 8,584,345 B2 | 11/2013 | Al-Ali et al. |
| 8,588,880 B2 | 11/2013 | Abdul-Hafiz et al. |
| 8,588,924 B2 | 11/2013 | Dion |
| 8,591,411 B2 | 11/2013 | Banet et al. |
| 8,594,776 B2 | 11/2013 | McCombie et al. |
| 8,597,287 B2 | 12/2013 | Benamou et al. |
| 8,600,777 B2 | 12/2013 | Schoenberg |
| 8,602,997 B2 | 12/2013 | Banet et al. |
| 8,620,678 B2 | 12/2013 | Gotlib |
| D697,626 S | 1/2014 | Laplante et al. |
| 8,622,922 B2 | 1/2014 | Banet et al. |
| 8,630,691 B2 | 1/2014 | Lamego et al. |
| 8,641,631 B2 | 2/2014 | Sierra et al. |
| 8,652,060 B2 | 2/2014 | Al-Ali |
| 8,666,468 B1 | 3/2014 | Al-Ali |
| 8,670,811 B2 | 3/2014 | O'Reilly |
| 8,672,854 B2 | 3/2014 | McCombie et al. |
| RE44,823 E | 4/2014 | Parker |
| RE44,875 E | 4/2014 | Kiani et al. |
| D703,671 S | 4/2014 | Hackett et al. |
| 8,688,183 B2 | 4/2014 | Bruinsma et al. |
| 8,690,771 B2 | 4/2014 | Wekell et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,727,977 B2 | 5/2014 | Banet et al. |
| 8,738,118 B2 | 5/2014 | Moon et al. |
| D706,752 S | 6/2014 | Myung et al. |
| 8,740,792 B1 | 6/2014 | Kiani et al. |
| 8,740,802 B2 | 6/2014 | Banet et al. |
| 8,740,807 B2 | 6/2014 | Banet et al. |
| 8,747,330 B2 | 6/2014 | Banet et al. |
| 8,755,535 B2 | 6/2014 | Telfort et al. |
| 8,755,872 B1 | 6/2014 | Marinow |
| 8,758,045 B2 | 6/2014 | McSweyn |
| D709,846 S | 7/2014 | Oswaks |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,808,188 B2 | 8/2014 | Banet et al. |

(56) References Cited

U.S. PATENT DOCUMENTS

| | | |
|---|---|---|
| 8,818,477 B2 | 8/2014 | Soller |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| D715,667 S | 10/2014 | Shigeno et al. |
| 8,852,094 B2 | 10/2014 | Al-Ali et al. |
| 8,852,994 B2 | 10/2014 | Wojtczuk et al. |
| 8,866,620 B2 | 10/2014 | Amir |
| 8,873,035 B2 | 10/2014 | Yang et al. |
| D717,309 S | 11/2014 | Govindarajan |
| 8,878,888 B2 | 11/2014 | Rosenfeld |
| 8,888,700 B2 | 11/2014 | Banet et al. |
| 8,897,847 B2 | 11/2014 | Al-Ali |
| D719,668 S | 12/2014 | Cien et al. |
| D719,860 S | 12/2014 | Just et al. |
| 8,907,287 B2 | 12/2014 | Vanderpohl |
| 8,909,330 B2 | 12/2014 | McCombie et al. |
| 8,911,377 B2 | 12/2014 | Al-Ali |
| 8,951,248 B2 | 2/2015 | Messerly et al. |
| 8,956,292 B2 | 2/2015 | Wekell et al. |
| 8,956,293 B2 | 2/2015 | McCombie et al. |
| 8,956,294 B2 | 2/2015 | McCombie et al. |
| 8,979,765 B2 | 3/2015 | Banet et al. |
| 8,989,831 B2 | 3/2015 | Al-Ali et al. |
| 8,998,809 B2 | 4/2015 | Kiani |
| D728,230 S | 5/2015 | Oas |
| 9,055,928 B2 | 6/2015 | McCombie et al. |
| 9,057,689 B2 | 6/2015 | Soller |
| 9,066,666 B2 | 6/2015 | Kiani |
| 9,066,680 B1 | 6/2015 | Al-Ali et al. |
| D733,598 S | 7/2015 | Just et al. |
| 9,095,291 B2 | 8/2015 | Soller |
| 9,095,316 B2 | 8/2015 | Welch et al. |
| 9,104,789 B2 | 8/2015 | Gross et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| D741,865 S | 10/2015 | Sundermeyer et al. |
| 9,149,192 B2 | 10/2015 | Banet et al. |
| 9,149,228 B2 | 10/2015 | Kinast |
| 9,153,112 B1 | 10/2015 | Kiani et al. |
| 9,161,700 B2 | 10/2015 | Banet et al. |
| D744,109 S | 11/2015 | Yoneta et al. |
| 9,173,593 B2 | 11/2015 | Banet et al. |
| 9,173,594 B2 | 11/2015 | Banet et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| D745,167 S | 12/2015 | Canas et al. |
| 9,211,095 B1 | 12/2015 | Al-Ali |
| 9,215,986 B2 | 12/2015 | Banet et al. |
| 9,218,454 B2 | 12/2015 | Kiani et al. |
| 9,245,668 B1 | 1/2016 | Vo et al. |
| 9,248,299 B2 | 2/2016 | Toy et al. |
| 9,262,586 B2 | 2/2016 | Steiger et al. |
| 9,267,572 B2 | 2/2016 | Barker et al. |
| 9,277,880 B2 | 3/2016 | Poeze et al. |
| 9,307,915 B2 | 4/2016 | McCombie et al. |
| 9,307,928 B1 | 4/2016 | Al-Ali et al. |
| 9,318,840 B2 | 4/2016 | Siev et al. |
| 9,323,894 B2 | 4/2016 | Kiani |
| D755,183 S | 5/2016 | Patel et al. |
| D755,392 S | 5/2016 | Hwang et al. |
| 9,326,712 B1 | 5/2016 | Klani |
| 9,339,209 B2 | 5/2016 | Banet et al. |
| 9,339,211 B2 | 5/2016 | Banet et al. |
| 9,364,158 B2 | 6/2016 | Banet et al. |
| 9,380,952 B2 | 7/2016 | Banet et al. |
| 9,392,945 B2 | 7/2016 | Al-Ali et al. |
| D765,083 S | 8/2016 | Breitweiser et al. |
| 9,408,542 B1 | 8/2016 | Kinast et al. |
| 9,408,573 B2 | 8/2016 | Welch et al. |
| 9,436,645 B2 | 9/2016 | Al-Ali et al. |
| 9,439,574 B2 | 9/2016 | McCombie et al. |
| 9,443,059 B2 | 9/2016 | Grubis |
| 9,445,759 B1 | 9/2016 | Lamego et al. |
| D769,973 S | 10/2016 | Benoni |
| 9,474,474 B2 | 10/2016 | Lamego et al. |
| D771,057 S | 11/2016 | Wurts et al. |
| 9,480,435 B2 | 11/2016 | Olsen |
| 9,480,846 B2 | 11/2016 | Strother et al. |
| 9,510,779 B2 | 12/2016 | Poeze et al. |
| 9,517,024 B2 | 12/2016 | Kiani et al. |
| 9,529,762 B2 | 12/2016 | Gisler et al. |
| D776,664 S | 1/2017 | Hendrick |
| D776,916 S | 1/2017 | Yeruva et al. |
| 9,532,722 B2 | 1/2017 | Lamego et al. |
| 9,560,996 B2 | 2/2017 | Kiani |
| 9,579,039 B2 | 2/2017 | Jansen et al. |
| D782,483 S | 3/2017 | Patel et al. |
| D783,170 S | 4/2017 | Carreon et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,697,928 B2 | 7/2017 | Al-Ali et al. |
| 9,706,964 B2 | 7/2017 | Ferber et al. |
| D794,807 S | 8/2017 | Kranz et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| D803,841 S | 11/2017 | Kim et al. |
| D803,842 S | 11/2017 | Daniel |
| 9,808,188 B1 | 11/2017 | Perea et al. |
| D804,413 S | 12/2017 | McSweyn et al. |
| 9,833,199 B2 | 12/2017 | Johnson |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| D808,641 S | 1/2018 | Clover et al. |
| D809,147 S | 1/2018 | Coonahan et al. |
| 9,861,298 B2 | 1/2018 | Eckerbom et al. |
| 9,861,305 B1 | 1/2018 | Weber et al. |
| 9,866,255 B1 | 1/2018 | Ketter-Muldrow |
| 9,872,481 B2 | 1/2018 | Goldfain |
| 9,877,650 B2 | 1/2018 | Muhsin et al. |
| 9,883,800 B2 | 2/2018 | Pekander |
| 9,891,079 B2 | 2/2018 | Dalvi |
| D812,229 S | 3/2018 | Al-Siddiq |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| 9,973,534 B2 | 5/2018 | Mahaffey et al. |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| D829,574 S | 10/2018 | Mane et al. |
| D831,462 S | 10/2018 | McSweyn et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| 10,130,306 B2 | 11/2018 | Katra et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |

(56) References Cited

U.S. PATENT DOCUMENTS

| | | |
|---|---|---|
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,226,215 B2 | 3/2019 | Cohrs et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Al-Ali |
| 10,299,720 B2 | 5/2019 | Brown et al. |
| D850,628 S | 6/2019 | De Hoog et al. |
| 10,327,337 B2 | 6/2019 | Schmidt et al. |
| 10,327,713 B2 | 6/2019 | Barker et al. |
| 10,332,630 B2 | 6/2019 | Ai-Ali |
| 10,374,350 B2 | 8/2019 | Nakazono et al. |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| D874,657 S | 2/2020 | Bailey et al. |
| 10,555,678 B2 | 2/2020 | Dalvi et al. |
| 10,560,532 B2 | 2/2020 | Yang et al. |
| 10,568,553 B2 | 2/2020 | O'Neil et al. |
| 10,608,817 B2 | 3/2020 | Haider et al. |
| D880,477 S | 4/2020 | Forrest et al. |
| D881,889 S | 4/2020 | Wang et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| 10,638,982 B2 | 5/2020 | Ferber et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,736,552 B2 | 8/2020 | Ferber et al. |
| 10,750,984 B2 | 8/2020 | Pauley et al. |
| D897,098 S | 9/2020 | Al-Ali |
| 10,779,098 B2 | 9/2020 | Swanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,842,395 B2 | 11/2020 | Schnall et al. |
| 10,849,554 B2 | 12/2020 | Shreim et al. |
| 10,856,750 B2 | 12/2020 | Indorf et al. |
| D906,970 S | 1/2021 | Forrest et al. |
| D908,213 S | 1/2021 | Abdul-Hafiz et al. |
| D910,623 S | 2/2021 | Cueto et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D916,705 S | 4/2021 | Liao |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,690 B2 | 5/2021 | Gledwoyn |
| 11,006,867 B2 | 5/2021 | Ai-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| D933,951 S | 10/2021 | Cardentey |
| 11,145,408 B2 | 10/2021 | Sampath et al. |
| 11,147,518 B1 | 10/2021 | Al-Ali et al. |
| 11,179,107 B2 | 11/2021 | Chae et al. |
| 11,185,262 B2 | 11/2021 | Al-Ali et al. |
| 11,191,484 B2 | 12/2021 | Kiani et al. |
| 11,201,500 B2 | 12/2021 | Partovi et al. |
| D944,520 S | 3/2022 | Akana et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,259,753 B2 | 3/2022 | Ferber et al. |
| 11,260,238 B2 | 3/2022 | Finch et al. |
| 11,272,839 B2 | 3/2022 | Al-Ali et al. |
| 11,289,199 B2 | 3/2022 | Al-Ali |
| RE49,034 E | 4/2022 | Ai-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| 11,331,463 B2 | 5/2022 | Damiano |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| D967,625 S | 10/2022 | Akana et al. |
| 11,457,703 B2 | 10/2022 | Calder |
| 11,457,733 B2 | 10/2022 | Gallup et al. |
| 11,464,410 B2 | 10/2022 | Muhsin |
| D968,410 S | 11/2022 | Zhang et al. |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |

(56) References Cited

U.S. PATENT DOCUMENTS

| | | |
|---|---|---|
| D999,244 S | 9/2023 | Indorf et al. |
| D999,245 S | 9/2023 | Indorf et al. |
| D999,246 S | 9/2023 | Indorf et al. |
| 11,755,879 B2 | 9/2023 | Pascanu et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |
| 11,883,129 B2 | 1/2024 | Olsen |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| D1,031,729 S | 6/2024 | Forrest et al. |
| 12,004,869 B2 | 6/2024 | Kiani et al. |
| 12,014,328 B2 | 6/2024 | Wachman et al. |
| D1,036,293 S | 7/2024 | Al-Ali |
| D1,037,462 S | 7/2024 | Al-Ali et al. |
| 12,029,844 B2 | 7/2024 | Pauley et al. |
| 12,048,534 B2 | 7/2024 | Vo et al. |
| 12,064,217 B2 | 8/2024 | Ahmed et al. |
| 12,066,426 B1 | 8/2024 | Lapotko et al. |
| D1,041,511 S | 9/2024 | Indorf et al. |
| D1,042,596 S | 9/2024 | DeJong et al. |
| D1,042,852 S | 9/2024 | Hwang |
| 12,076,159 B2 | 9/2024 | Belur Nagaraj et al. |
| 12,082,926 B2 | 9/2024 | Sharma et al. |
| D1,044,828 S | 10/2024 | Chandran et al. |
| D1,048,571 S | 10/2024 | Yu et al. |
| D1,048,908 S | 10/2024 | Al-Ali et al. |
| 12,106,752 B2 | 10/2024 | Campbell et al. |
| 12,114,974 B2 | 10/2024 | Al-Ali et al. |
| 12,126,683 B2 | 10/2024 | Koo et al. |
| 12,127,838 B2 | 10/2024 | Olsen et al. |
| 12,128,213 B2 | 10/2024 | Kiani et al. |
| 12,131,661 B2 | 10/2024 | Pauley et al. |
| D1,050,910 S | 11/2024 | Al-Ali et al. |
| 12,178,572 B1 | 12/2024 | Pauley et al. |
| 12,178,581 B2 | 12/2024 | Telfort et al. |
| 12,178,852 B2 | 12/2024 | Kiani et al. |
| D1,057,159 S | 1/2025 | DeJong et al. |
| D1,057,160 S | 1/2025 | DeJong et al. |
| 12,198,790 B1 | 1/2025 | Al-Ali |
| 12,200,421 B2 | 1/2025 | Campbell et al. |
| 12,207,901 B1 | 1/2025 | Lapotko et al. |
| D1,060,680 S | 2/2025 | Al-Ali et al. |
| D1,061,585 S | 2/2025 | Indorf |
| D1,063,893 S | 2/2025 | DeJong et al. |
| 12,220,207 B2 | 2/2025 | Telfort et al. |
| 12,235,941 B2 | 2/2025 | Kiani et al. |
| 12,236,767 B2 | 2/2025 | Muhsin |
| D1,066,244 S | 3/2025 | Lim et al. |
| D1,066,672 S | 3/2025 | Al-Ali et al. |
| 12,257,022 B2 | 3/2025 | Al-Ali et al. |
| 2001/0011355 A1 | 8/2001 | Kawai |
| 2001/0031922 A1 | 10/2001 | Weng et al. |
| 2001/0034477 A1 | 10/2001 | Mansfield et al. |
| 2001/0039483 A1 | 11/2001 | Brand et al. |
| 2001/0046366 A1 | 11/2001 | Susskind |
| 2002/0010401 A1 | 1/2002 | Bushmakin et al. |
| 2002/0045836 A1 | 4/2002 | Alkawwas |
| 2002/0052311 A1 | 5/2002 | Solomon et al. |
| 2002/0058864 A1 | 5/2002 | Mansfield et al. |
| 2002/0063690 A1 | 5/2002 | Chung et al. |
| 2002/0072681 A1 | 6/2002 | Schnall |
| 2002/0099277 A1 | 7/2002 | Harry et al. |
| 2002/0133080 A1 | 9/2002 | Apruzzese et al. |
| 2002/0169439 A1 | 11/2002 | Flaherty |
| 2002/0177758 A1 | 11/2002 | Schoenberg |
| 2002/0198445 A1 | 12/2002 | Dominguez et al. |
| 2003/0004423 A1 | 1/2003 | Levie et al. |
| 2003/0013975 A1 | 1/2003 | Kiani |
| 2003/0018243 A1 | 1/2003 | Gerhardt et al. |
| 2003/0027326 A1 | 2/2003 | Ulmsten et al. |
| 2003/0052787 A1 | 3/2003 | Zerhusen et al. |
| 2003/0058838 A1 | 3/2003 | Wengrovitz |
| 2003/0144582 A1 | 7/2003 | Cohen et al. |
| 2003/0156288 A1 | 8/2003 | Barnum et al. |
| 2003/0158466 A1 | 8/2003 | Lynn et al. |
| 2003/0181798 A1* | 9/2003 | Al-Ali ............... A61B 5/14552 600/324 |
| 2003/0212312 A1 | 11/2003 | Coffin, IV et al. |
| 2003/0216670 A1 | 11/2003 | Beggs |
| 2004/0013647 A1 | 1/2004 | Solomon et al. |
| 2004/0073095 A1 | 4/2004 | Causey et al. |
| 2004/0090742 A1 | 5/2004 | Son et al. |
| 2004/0106163 A1 | 6/2004 | Workman, Jr. et al. |
| 2004/0116787 A1 | 6/2004 | Schnall |
| 2004/0122787 A1 | 6/2004 | Avinash et al. |
| 2004/0126007 A1 | 7/2004 | Ziel et al. |
| 2004/0139571 A1 | 7/2004 | Chang et al. |
| 2004/0147818 A1 | 7/2004 | Levy et al. |
| 2004/0152957 A1 | 8/2004 | Stivoric et al. |
| 2004/0179332 A1 | 9/2004 | Smith et al. |
| 2004/0186357 A1 | 9/2004 | Soderberg et al. |
| 2004/0215085 A1 | 10/2004 | Schnall |
| 2004/0230118 A1 | 11/2004 | Shehada et al. |
| 2004/0230132 A1 | 11/2004 | Shehada et al. |
| 2004/0230179 A1 | 11/2004 | Shehada et al. |
| 2004/0243017 A1 | 12/2004 | Causevic |
| 2004/0249670 A1 | 12/2004 | Noguchi et al. |
| 2004/0254431 A1 | 12/2004 | Shehada et al. |
| 2004/0254432 A1 | 12/2004 | Shehada et al. |
| 2004/0267103 A1 | 12/2004 | Li et al. |
| 2005/0005710 A1 | 1/2005 | Sage |
| 2005/0009926 A1 | 1/2005 | Kreye et al. |
| 2005/0020918 A1 | 1/2005 | Wilk et al. |
| 2005/0038332 A1 | 2/2005 | Saidara et al. |
| 2005/0038680 A1 | 2/2005 | McMahon |
| 2005/0055276 A1 | 3/2005 | Kiani et al. |
| 2005/0080336 A1 | 4/2005 | Byrd et al. |
| 2005/0096542 A1 | 5/2005 | Weng et al. |
| 2005/0113653 A1 | 5/2005 | Fox et al. |
| 2005/0124864 A1 | 6/2005 | Mack et al. |
| 2005/0125256 A1 | 6/2005 | Schoenberg |
| 2005/0148882 A1 | 7/2005 | Banet et al. |
| 2005/0164933 A1 | 7/2005 | Tymianski et al. |
| 2005/0191294 A1 | 9/2005 | Arap et al. |
| 2005/0208648 A1 | 9/2005 | Sage, Jr. et al. |
| 2005/0209518 A1 | 9/2005 | Sage, Jr. et al. |
| 2005/0228244 A1 | 10/2005 | Banet |
| 2005/0228299 A1 | 10/2005 | Banet |
| 2005/0234317 A1 | 10/2005 | Kiani |
| 2005/0242946 A1 | 11/2005 | Hubbard et al. |
| 2005/0245831 A1 | 11/2005 | Banet |
| 2005/0245839 A1 | 11/2005 | Stivoric et al. |
| 2005/0261594 A1 | 11/2005 | Banet |
| 2005/0261598 A1 | 11/2005 | Banet et al. |
| 2005/0268401 A1 | 12/2005 | Dixon et al. |
| 2005/0277872 A1 | 12/2005 | Colby et al. |
| 2006/0009697 A1 | 1/2006 | Banet et al. |
| 2006/0009698 A1 | 1/2006 | Banet et al. |
| 2006/0049936 A1 | 3/2006 | Collins, Jr. et al. |
| 2006/0058647 A1 | 3/2006 | Strommer et al. |
| 2006/0073719 A1 | 4/2006 | Kiani |
| 2006/0084878 A1 | 4/2006 | Banet et al. |
| 2006/0085952 A1 | 4/2006 | Kaneko et al. |
| 2006/0089543 A1 | 4/2006 | Kim et al. |
| 2006/0094936 A1 | 5/2006 | Russ |
| 2006/0104824 A1 | 5/2006 | Schnall |
| 2006/0149393 A1 | 7/2006 | Calderon |
| 2006/0155175 A1 | 7/2006 | Ogino et al. |
| 2006/0189871 A1 | 8/2006 | Al-Ali et al. |
| 2006/0200009 A1 | 9/2006 | Wekell et al. |
| 2006/0217684 A1 | 9/2006 | Shehada et al. |
| 2006/0217685 A1 | 9/2006 | Shehada et al. |
| 2006/0224413 A1 | 10/2006 | Kim et al. |
| 2006/0235300 A1 | 10/2006 | Weng et al. |
| 2006/0253042 A1 | 11/2006 | Stahmann et al. |

(56) References Cited

U.S. PATENT DOCUMENTS

| | | |
|---|---|---|
| 2007/0000490 A1 | 1/2007 | DeVries et al. |
| 2007/0002533 A1 | 1/2007 | Kogan et al. |
| 2007/0021675 A1 | 1/2007 | Childre et al. |
| 2007/0027368 A1 | 2/2007 | Collins et al. |
| 2007/0032733 A1 | 2/2007 | Burton et al. |
| 2007/0038050 A1 | 2/2007 | Sarussi |
| 2007/0055116 A1 | 3/2007 | Clark et al. |
| 2007/0055544 A1 | 3/2007 | Jung et al. |
| 2007/0060798 A1 | 3/2007 | Krupnik et al. |
| 2007/0073116 A1 | 3/2007 | Kiani et al. |
| 2007/0088406 A1 | 4/2007 | Bennett et al. |
| 2007/0096897 A1 | 5/2007 | Weiner |
| 2007/0100222 A1 | 5/2007 | Mastrototaro et al. |
| 2007/0118028 A1* | 5/2007 | Kitajima ............ A61B 5/14551 600/310 |
| 2007/0118399 A1 | 5/2007 | Avinash et al. |
| 2007/0140475 A1 | 6/2007 | Kurtock et al. |
| 2007/0142715 A1 | 6/2007 | Banet et al. |
| 2007/0156033 A1 | 7/2007 | Causey et al. |
| 2007/0157285 A1 | 7/2007 | Frank et al. |
| 2007/0159332 A1 | 7/2007 | Koblasz |
| 2007/0163589 A1 | 7/2007 | DeVries et al. |
| 2007/0180140 A1 | 8/2007 | Welch et al. |
| 2007/0185390 A1 | 8/2007 | Perkins et al. |
| 2007/0185393 A1 | 8/2007 | Zhou et al. |
| 2007/0232941 A1 | 10/2007 | Rabinovich |
| 2007/0244377 A1 | 10/2007 | Cozad et al. |
| 2007/0244724 A1 | 10/2007 | Pendergast et al. |
| 2007/0250286 A1 | 10/2007 | Duncan et al. |
| 2007/0255114 A1 | 11/2007 | Ackermann et al. |
| 2007/0255116 A1 | 11/2007 | Mehta et al. |
| 2007/0255250 A1 | 11/2007 | Moberg |
| 2007/0276261 A1 | 11/2007 | Banet et al. |
| 2007/0276262 A1 | 11/2007 | Banet et al. |
| 2007/0276632 A1 | 11/2007 | Banet et al. |
| 2007/0287898 A1 | 12/2007 | Lee et al. |
| 2008/0000479 A1 | 1/2008 | Elaz et al. |
| 2008/0003200 A1 | 1/2008 | Arap et al. |
| 2008/0021854 A1 | 1/2008 | Jung et al. |
| 2008/0033661 A1 | 2/2008 | Syroid et al. |
| 2008/0051670 A1 | 2/2008 | Banet et al. |
| 2008/0053438 A1 | 3/2008 | DeVries et al. |
| 2008/0058614 A1 | 3/2008 | Banet et al. |
| 2008/0058657 A1 | 3/2008 | Schwartz et al. |
| 2008/0064965 A1 | 3/2008 | Jay et al. |
| 2008/0077024 A1 | 3/2008 | Schnall |
| 2008/0077026 A1 | 3/2008 | Banet et al. |
| 2008/0082004 A1 | 4/2008 | Banet et al. |
| 2008/0090626 A1 | 4/2008 | Griffin et al. |
| 2008/0091089 A1 | 4/2008 | Guillory et al. |
| 2008/0091090 A1 | 4/2008 | Guillory et al. |
| 2008/0091471 A1 | 4/2008 | Michon et al. |
| 2008/0094228 A1 | 4/2008 | Welch et al. |
| 2008/0097167 A1 | 4/2008 | Yudkovitch et al. |
| 2008/0099366 A1 | 5/2008 | Niemiec et al. |
| 2008/0103375 A1 | 5/2008 | Kiani |
| 2008/0114220 A1 | 5/2008 | Banet et al. |
| 2008/0119412 A1 | 5/2008 | Tymianski et al. |
| 2008/0138278 A1 | 6/2008 | Scherz et al. |
| 2008/0139354 A1 | 6/2008 | Bell et al. |
| 2008/0169922 A1 | 7/2008 | Issokson |
| 2008/0171919 A1 | 7/2008 | Stivoric et al. |
| 2008/0188795 A1 | 8/2008 | Katz et al. |
| 2008/0194918 A1 | 8/2008 | Kulik et al. |
| 2008/0208912 A1 | 8/2008 | Garibaldi |
| 2008/0221396 A1 | 9/2008 | Garces et al. |
| 2008/0221399 A1 | 9/2008 | Zhou et al. |
| 2008/0221418 A1 | 9/2008 | Al-Ali et al. |
| 2008/0221461 A1 | 9/2008 | Zhou et al. |
| 2008/0228077 A1 | 9/2008 | Wilk et al. |
| 2008/0275309 A1 | 11/2008 | Stivoric et al. |
| 2008/0281167 A1 | 11/2008 | Soderberg et al. |
| 2008/0281168 A1 | 11/2008 | Gibson et al. |
| 2008/0281181 A1 | 11/2008 | Manzione et al. |
| 2008/0287751 A1 | 11/2008 | Stivoric et al. |
| 2008/0292172 A1 | 11/2008 | Assmann et al. |
| 2008/0300020 A1 | 12/2008 | Nishizawa et al. |
| 2008/0312518 A1 | 12/2008 | Jina et al. |
| 2008/0312542 A1 | 12/2008 | Banet et al. |
| 2008/0319275 A1 | 12/2008 | Chiu et al. |
| 2008/0319327 A1 | 12/2008 | Banet et al. |
| 2008/0319354 A1 | 12/2008 | Bell et al. |
| 2009/0005651 A1 | 1/2009 | Ward et al. |
| 2009/0018409 A1 | 1/2009 | Banet et al. |
| 2009/0018422 A1 | 1/2009 | Banet et al. |
| 2009/0018453 A1 | 1/2009 | Banet et al. |
| 2009/0018808 A1 | 1/2009 | Bronstein et al. |
| 2009/0024008 A1 | 1/2009 | Brunner et al. |
| 2009/0036759 A1 | 2/2009 | Ault et al. |
| 2009/0043172 A1 | 2/2009 | Zagorchev et al. |
| 2009/0052623 A1 | 2/2009 | Tome et al. |
| 2009/0054735 A1 | 2/2009 | Higgins et al. |
| 2009/0054743 A1 | 2/2009 | Stewart |
| 2009/0062682 A1 | 3/2009 | Bland et al. |
| 2009/0069642 A1 | 3/2009 | Gao et al. |
| 2009/0069868 A1 | 3/2009 | Bengtsson et al. |
| 2009/0093687 A1 | 4/2009 | Telfort et al. |
| 2009/0095926 A1 | 4/2009 | MacNeish, III |
| 2009/0099480 A1 | 4/2009 | Salgo et al. |
| 2009/0112072 A1 | 4/2009 | Banet et al. |
| 2009/0118628 A1 | 5/2009 | Zhou et al. |
| 2009/0119843 A1 | 5/2009 | Rodgers et al. |
| 2009/0124867 A1 | 5/2009 | Hirsch et al. |
| 2009/0131759 A1 | 5/2009 | Sims et al. |
| 2009/0143832 A1 | 6/2009 | Saba |
| 2009/0157058 A1 | 6/2009 | Ferren et al. |
| 2009/0171170 A1 | 7/2009 | Li et al. |
| 2009/0171225 A1 | 7/2009 | Gadodia et al. |
| 2009/0177090 A1 | 7/2009 | Grunwald et al. |
| 2009/0182287 A1 | 7/2009 | Kassab |
| 2009/0226372 A1 | 9/2009 | Ruoslahti et al. |
| 2009/0247924 A1 | 10/2009 | Lamego et al. |
| 2009/0247984 A1 | 10/2009 | Lamego et al. |
| 2009/0264778 A1 | 10/2009 | Markowitz et al. |
| 2009/0275844 A1 | 11/2009 | Al-Ali |
| 2009/0281462 A1 | 11/2009 | Heliot et al. |
| 2009/0309755 A1 | 12/2009 | Williamson |
| 2009/0322540 A1 | 12/2009 | Richardson et al. |
| 2010/0004518 A1 | 1/2010 | Vo et al. |
| 2010/0030040 A1 | 2/2010 | Poeze et al. |
| 2010/0030094 A1 | 2/2010 | Lundback |
| 2010/0036209 A1 | 2/2010 | Ferren et al. |
| 2010/0056886 A1 | 3/2010 | Hurtubise et al. |
| 2010/0099964 A1 | 4/2010 | O'Reilly et al. |
| 2010/0125217 A1 | 5/2010 | Kuo et al. |
| 2010/0130875 A1 | 5/2010 | Banet et al. |
| 2010/0144627 A1 | 6/2010 | Vitek et al. |
| 2010/0160794 A1 | 6/2010 | Banet et al. |
| 2010/0160795 A1 | 6/2010 | Banet et al. |
| 2010/0160796 A1 | 6/2010 | Banet et al. |
| 2010/0160797 A1 | 6/2010 | Banet et al. |
| 2010/0160798 A1 | 6/2010 | Banet et al. |
| 2010/0168536 A1 | 7/2010 | Banet et al. |
| 2010/0168589 A1 | 7/2010 | Banet et al. |
| 2010/0185101 A1 | 7/2010 | Sakai et al. |
| 2010/0198622 A1 | 8/2010 | Gajic et al. |
| 2010/0210958 A1 | 8/2010 | Manwaring et al. |
| 2010/0234718 A1 | 9/2010 | Sampath et al. |
| 2010/0261982 A1 | 10/2010 | Noury et al. |
| 2010/0270257 A1 | 10/2010 | Wachman et al. |
| 2010/0298650 A1 | 11/2010 | Moon et al. |
| 2010/0298651 A1 | 11/2010 | Moon et al. |
| 2010/0298652 A1 | 11/2010 | McCombie et al. |
| 2010/0298653 A1 | 11/2010 | McCombie et al. |
| 2010/0298654 A1 | 11/2010 | McCombie et al. |
| 2010/0298655 A1 | 11/2010 | McCombie et al. |
| 2010/0298656 A1 | 11/2010 | McCombie et al. |
| 2010/0298657 A1 | 11/2010 | McCombie et al. |
| 2010/0298658 A1 | 11/2010 | McCombie et al. |
| 2010/0298659 A1 | 11/2010 | Mccombie et al. |
| 2010/0298660 A1 | 11/2010 | McCombie et al. |
| 2010/0298661 A1 | 11/2010 | Mccombie et al. |
| 2010/0298742 A1 | 11/2010 | Perlman et al. |
| 2010/0305412 A1 | 12/2010 | Darrah et al. |

(56) References Cited

U.S. PATENT DOCUMENTS

| | | |
|---|---|---|
| 2010/0312103 A1 | 12/2010 | Gorek et al. |
| 2010/0317951 A1 | 12/2010 | Rutkowski et al. |
| 2010/0324384 A1 | 12/2010 | Moon et al. |
| 2010/0324385 A1 | 12/2010 | Moon et al. |
| 2010/0324386 A1 | 12/2010 | Moon et al. |
| 2010/0324387 A1 | 12/2010 | Moon et al. |
| 2010/0324388 A1 | 12/2010 | Moon et al. |
| 2010/0324389 A1 | 12/2010 | Moon et al. |
| 2011/0021930 A1 | 1/2011 | Mazzeo et al. |
| 2011/0023130 A1 | 1/2011 | Gudgel et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0046495 A1 | 2/2011 | Osypka |
| 2011/0066051 A1 | 3/2011 | Moon et al. |
| 2011/0077473 A1 | 3/2011 | Lisogurski |
| 2011/0077488 A1 | 3/2011 | Buxton et al. |
| 2011/0078596 A1 | 3/2011 | Rawlins et al. |
| 2011/0080294 A1 | 4/2011 | Tanishima et al. |
| 2011/0082711 A1 | 4/2011 | Poeze et al. |
| 2011/0087081 A1 | 4/2011 | Kiani et al. |
| 2011/0087084 A1 | 4/2011 | Jeong et al. |
| 2011/0087117 A1 | 4/2011 | Tremper et al. |
| 2011/0087756 A1 | 4/2011 | Biondi |
| 2011/0092831 A1 | 4/2011 | Herscovivi-Cohen et al. |
| 2011/0092857 A1 | 4/2011 | Herscovivi-Cohen et al. |
| 2011/0098583 A1 | 4/2011 | Pandia et al. |
| 2011/0105956 A1 | 5/2011 | Hirth |
| 2011/0118561 A1 | 5/2011 | Tari et al. |
| 2011/0118573 A1 | 5/2011 | Mckenna |
| 2011/0137297 A1 | 6/2011 | Kiani et al. |
| 2011/0152629 A1 | 6/2011 | Eaton et al. |
| 2011/0172498 A1 | 7/2011 | Olsen et al. |
| 2011/0172967 A1 | 7/2011 | Al-Ali et al. |
| 2011/0184252 A1 | 7/2011 | Archer et al. |
| 2011/0184253 A1 | 7/2011 | Archer et al. |
| 2011/0208073 A1 | 8/2011 | Matsukawa et al. |
| 2011/0212090 A1 | 9/2011 | Pedersen et al. |
| 2011/0224498 A1 | 9/2011 | Banet et al. |
| 2011/0224499 A1 | 9/2011 | Banet et al. |
| 2011/0224500 A1 | 9/2011 | Banet et al. |
| 2011/0224506 A1 | 9/2011 | Moon et al. |
| 2011/0224507 A1 | 9/2011 | Banet et al. |
| 2011/0224508 A1 | 9/2011 | Moon et al. |
| 2011/0224556 A1 | 9/2011 | Moon et al. |
| 2011/0224557 A1 | 9/2011 | Banet et al. |
| 2011/0224564 A1 | 9/2011 | Moon et al. |
| 2011/0257489 A1 | 10/2011 | Banet et al. |
| 2011/0257544 A1 | 10/2011 | Kaasinen et al. |
| 2011/0257551 A1 | 10/2011 | Banet et al. |
| 2011/0257552 A1 | 10/2011 | Banet et al. |
| 2011/0257553 A1 | 10/2011 | Banet et al. |
| 2011/0257554 A1 | 10/2011 | Banet et al. |
| 2011/0257555 A1 | 10/2011 | Banet et al. |
| 2011/0263950 A1 | 10/2011 | Larson et al. |
| 2011/0288421 A1 | 11/2011 | Banet et al. |
| 2011/0295094 A1 | 12/2011 | Doyle et al. |
| 2012/0004579 A1 | 1/2012 | Luo et al. |
| 2012/0029300 A1 | 2/2012 | Paquet |
| 2012/0029304 A1 | 2/2012 | Medina et al. |
| 2012/0029879 A1 | 2/2012 | Sing et al. |
| 2012/0059230 A1 | 3/2012 | Teller et al. |
| 2012/0071771 A1 | 3/2012 | Behar |
| 2012/0075464 A1 | 3/2012 | Derenne et al. |
| 2012/0095778 A1 | 4/2012 | Gross et al. |
| 2012/0101353 A1 | 4/2012 | Reggiardo et al. |
| 2012/0108983 A1 | 5/2012 | Banet et al. |
| 2012/0123231 A1 | 5/2012 | O'Reilly |
| 2012/0123799 A1 | 5/2012 | Nolen et al. |
| 2012/0132717 A1 | 5/2012 | Maizlin et al. |
| 2012/0136221 A1 | 5/2012 | Killen et al. |
| 2012/0157806 A1 | 6/2012 | Stelger |
| 2012/0165629 A1 | 6/2012 | Merritt et al. |
| 2012/0165630 A1 | 6/2012 | Knight et al. |
| 2012/0165688 A1* | 6/2012 | Liu .................. A61B 5/02416 600/500 |
| 2012/0179011 A1 | 7/2012 | Moon et al. |
| 2012/0184120 A1 | 7/2012 | Basta et al. |
| 2012/0190949 A1 | 7/2012 | McCombie et al. |
| 2012/0197619 A1 | 8/2012 | Namer Yelin et al. |
| 2012/0203078 A1 | 8/2012 | Sze et al. |
| 2012/0209084 A1 | 8/2012 | Olsen et al. |
| 2012/0226117 A1 | 9/2012 | Lamego et al. |
| 2012/0226160 A1 | 9/2012 | Kudoh |
| 2012/0239434 A1 | 9/2012 | Breslow et al. |
| 2012/0242501 A1 | 9/2012 | Tran et al. |
| 2012/0282583 A1 | 11/2012 | Thaler et al. |
| 2012/0283524 A1 | 11/2012 | Kiani et al. |
| 2012/0284053 A1 | 11/2012 | Rosenfeld |
| 2012/0294801 A1 | 11/2012 | Scherz et al. |
| 2012/0296174 A1 | 11/2012 | McCombie |
| 2012/0303476 A1 | 11/2012 | Krzyzanowski et al. |
| 2013/0006131 A1 | 1/2013 | Narayan et al. |
| 2013/0006151 A1 | 1/2013 | Main et al. |
| 2013/0023775 A1 | 1/2013 | Lamego et al. |
| 2013/0035603 A1 | 2/2013 | Jarausch et al. |
| 2013/0046197 A1 | 2/2013 | Dlugos et al. |
| 2013/0060147 A1 | 3/2013 | Welch et al. |
| 2013/0092805 A1 | 4/2013 | Funk et al. |
| 2013/0096405 A1 | 4/2013 | Garfio |
| 2013/0109929 A1 | 5/2013 | Menzel |
| 2013/0109937 A1 | 5/2013 | Banet et al. |
| 2013/0116515 A1 | 5/2013 | Banet et al. |
| 2013/0123616 A1 | 5/2013 | Merritt et al. |
| 2013/0197364 A1 | 8/2013 | Han |
| 2013/0261494 A1 | 10/2013 | Bloom et al. |
| 2013/0279109 A1 | 10/2013 | Lindblad et al. |
| 2013/0296672 A1 | 11/2013 | O'Neil et al. |
| 2013/0297330 A1 | 11/2013 | Kamen et al. |
| 2013/0317393 A1 | 11/2013 | Weiss et al. |
| 2013/0324804 A1 | 12/2013 | McKeown et al. |
| 2013/0331036 A1 | 12/2013 | Baker et al. |
| 2013/0340176 A1 | 12/2013 | Stevens et al. |
| 2013/0345921 A1 | 12/2013 | Al-Ali et al. |
| 2014/0005502 A1 | 1/2014 | Klap et al. |
| 2014/0022081 A1 | 1/2014 | Ribble et al. |
| 2014/0025010 A1 | 1/2014 | Stroup et al. |
| 2014/0046674 A1 | 2/2014 | Rosenfeld |
| 2014/0081099 A1 | 3/2014 | Banet et al. |
| 2014/0088385 A1 | 3/2014 | Moon et al. |
| 2014/0142445 A1 | 5/2014 | Banet et al. |
| 2014/0152673 A1 | 6/2014 | Lynn et al. |
| 2014/0163393 A1 | 6/2014 | McCombie et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0188516 A1 | 7/2014 | Kamen |
| 2014/0200415 A1 | 7/2014 | McCombie et al. |
| 2014/0221797 A1* | 8/2014 | Bailey .................. A61B 5/14551 600/324 |
| 2014/0235964 A1 | 8/2014 | Banet et al. |
| 2014/0249431 A1 | 9/2014 | Banet et al. |
| 2014/0249432 A1 | 9/2014 | Banet et al. |
| 2014/0249433 A1 | 9/2014 | Banet et al. |
| 2014/0249434 A1 | 9/2014 | Banet et al. |
| 2014/0249435 A1 | 9/2014 | Banet et al. |
| 2014/0249440 A1 | 9/2014 | Banet et al. |
| 2014/0249441 A1 | 9/2014 | Banet et al. |
| 2014/0249442 A1 | 9/2014 | Banet et al. |
| 2014/0257056 A1 | 9/2014 | Moon et al. |
| 2014/0257057 A1 | 9/2014 | Reis Cunha et al. |
| 2014/0266787 A1 | 9/2014 | Tran |
| 2014/0275816 A1 | 9/2014 | Sandmore |
| 2014/0275871 A1 | 9/2014 | Lamego et al. |
| 2014/0275872 A1 | 9/2014 | Merritt et al. |
| 2014/0276145 A1 | 9/2014 | Banet et al. |
| 2014/0276175 A1 | 9/2014 | Banet et al. |
| 2014/0301893 A1 | 10/2014 | Stroup et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2014/0336517 A1 | 11/2014 | Schnall et al. |

(56) References Cited

U.S. PATENT DOCUMENTS

| | | |
|---|---|---|
| 2014/0343889 A1 | 11/2014 | Ben Shalom et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0094618 A1 | 4/2015 | Russell et al. |
| 2015/0099950 A1 | 4/2015 | Al-Ali et al. |
| 2015/0164437 A1 | 6/2015 | McCombie et al. |
| 2015/0282708 A1 | 10/2015 | Schlottau et al. |
| 2015/0282717 A1 | 10/2015 | McCombie et al. |
| 2016/0022224 A1 | 1/2016 | Banet et al. |
| 2016/0045163 A1 | 2/2016 | Weisner et al. |
| 2016/0106366 A1 | 4/2016 | Banet et al. |
| 2016/0143546 A1 | 5/2016 | McCombie et al. |
| 2016/0183836 A1 | 6/2016 | Muuranto et al. |
| 2016/0321420 A1 | 11/2016 | Klee et al. |
| 2017/0024748 A1 | 1/2017 | Haider |
| 2017/0055905 A1 | 3/2017 | Cohrs et al. |
| 2017/0119252 A1 | 5/2017 | Kim et al. |
| 2017/0173632 A1 | 6/2017 | Ai-Ali |
| 2017/0251974 A1 | 9/2017 | Shreim et al. |
| 2017/0332980 A1 | 11/2017 | Fifield et al. |
| 2018/0097373 A1 | 4/2018 | McSweyn et al. |
| 2018/0242926 A1 | 8/2018 | Muhsin et al. |
| 2018/0247712 A1 | 8/2018 | Muhsin et al. |
| 2019/0239787 A1 | 8/2019 | Pauley et al. |
| 2019/0320906 A1 | 10/2019 | Olsen |
| 2020/0060869 A1 | 2/2020 | Telfort et al. |
| 2020/0085321 A1 | 3/2020 | Hatch |
| 2020/0111552 A1 | 4/2020 | Ahmed |
| 2020/0113520 A1 | 4/2020 | Abdul-Hafiz et al. |
| 2020/0138288 A1 | 5/2020 | Al-Ali et al. |
| 2020/0138368 A1 | 5/2020 | Klani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0315457 A1 | 10/2020 | Al-Ali et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2020/0330037 A1 | 10/2020 | Al-Ali et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0251501 A1 | 8/2021 | Moon et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0026355 A1 | 1/2022 | Normand et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0125377 A1 | 4/2022 | Mendes-Roter et al. |
| 2022/0148724 A1 | 5/2022 | Pasternak et al. |
| 2022/0151521 A1 | 5/2022 | Krishnamani et al. |
| 2022/0211323 A1 | 7/2022 | Schnall |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0331065 A1 | 10/2022 | Shah et al. |
| 2022/0346724 A1 | 11/2022 | Ferber et al. |
| 2022/0361819 A1 | 11/2022 | Al-Ali et al. |
| 2022/0379059 A1 | 12/2022 | Yu et al. |
| 2022/0392610 A1 | 12/2022 | Kiani |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147605 A1* | 5/2023 | Nazari ............... A61B 5/14542 604/323 |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0252046 A1 | 8/2024 | Jansen et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Al-Ali |
| 2024/0298920 A1 | 9/2024 | Fernkbist et al. |
| 2024/0306985 A1 | 9/2024 | Vo et al. |
| 2024/0324953 A1 | 10/2024 | Telfort |
| 2024/0380246 A1 | 11/2024 | Moran |
| 2024/0380247 A1 | 11/2024 | Moran |
| 2024/0404549 A1 | 12/2024 | Campbell et al. |
| 2025/0000458 A1 | 1/2025 | Abdul-Hafiz et al. |
| 2025/0037836 A1 | 1/2025 | Kiani |

FOREIGN PATENT DOCUMENTS

| | | |
|---|---|---|
| CN | 108370502 | 8/2018 |
| EM | 001198584-0059 | 6/2010 |
| EP | 0 735 499 | 10/1996 |
| EP | 0 880 936 | 12/1998 |
| EP | 2 335 569 | 6/2011 |
| EP | 2 766 834 | 8/2014 |
| EP | 2 811 894 | 12/2014 |
| EP | 2 901 921 | 8/2015 |
| JP | H08-080288 | 3/1996 |
| JP | H10-336064 | 12/1998 |
| JP | 2002-513602 | 5/2002 |
| JP | 2002-165764 | 6/2002 |
| JP | 2002-172096 | 6/2002 |
| JP | 2002-542493 | 12/2002 |
| JP | 2004-337605 | 12/2004 |
| JP | 2005-218036 | 8/2005 |
| JP | 2005-295375 | 10/2005 |

(56) References Cited

FOREIGN PATENT DOCUMENTS

| | | |
|---|---|---|
| JP | 2005-532863 | 11/2005 |
| JP | 2007-021213 | 2/2007 |
| JP | 2007-095365 | 4/2007 |
| JP | 2007-174051 | 7/2007 |
| JP | 2008-126017 | 6/2008 |
| JP | 2008-519635 | 6/2008 |
| JP | 2008-541045 | 11/2008 |
| JP | 2009-017959 | 1/2009 |
| JP | 2009-207836 | 9/2009 |
| JP | 2010-503134 | 1/2010 |
| JP | 2010-524510 | 7/2010 |
| JP | 2011-519607 | 7/2011 |
| JP | 2011-152261 | 8/2011 |
| JP | 2014-533997 | 12/2014 |
| JP | 2015-511840 | 4/2015 |
| JP | 2016-538015 | 12/2016 |
| JP | 2017-506121 | 3/2017 |
| JP | 2018-005338 | 1/2018 |
| JP | D1605226 | 5/2018 |
| JP | 2018-527996 | 9/2018 |
| JP | D1614787 | 10/2018 |
| JP | D1665851 | 4/2019 |
| TW | D126452 | 12/2008 |
| TW | D169966 | 8/2015 |
| TW | D182804 | 5/2017 |
| TW | D207721 | 10/2020 |
| WO | WO 98/004182 | 2/1998 |
| WO | WO 98/029790 | 7/1998 |
| WO | WO 99/013766 | 3/1999 |
| WO | WO 99/056613 | 11/1999 |
| WO | WO 00/063713 | 10/2000 |
| WO | WO 00/074551 | 12/2000 |
| WO | WO 01/064101 | 9/2001 |
| WO | WO 2004/056266 | 7/2004 |
| WO | WO 2004/059551 | 7/2004 |
| WO | WO 2006/051461 | 5/2006 |
| WO | WO 2011/001302 | 1/2011 |
| WO | WO 2011/002904 | 1/2011 |
| WO | WO 2011/025549 | 3/2011 |
| WO | WO 2012/112891 | 8/2012 |
| WO | WO 2013/056160 | 4/2013 |
| WO | WO 2013/119982 | 8/2013 |
| WO | WO 2013/184283 | 12/2013 |
| WO | WO 2015/054665 | 4/2015 |
| WO | WO 2017/040700 | 3/2017 |
| WO | WO 2018/102142 | 6/2018 |
| WO | WO 2020/077149 | 4/2020 |
| WO | WO 2023/132952 | 7/2023 |

OTHER PUBLICATIONS

U.S. Appl. No. 12/973,392, filed Dec. 20, 2010, Kiani et al.
U.S. Appl. No. 29/537,221, filed Filed Aug. 24, 2015, Al-Ali et al.
Aminian et al., "Spatio-Temporal Parameters of Gait Measured by an Ambulatory System Using Miniature Gyroscopes", Journal of Biomechanics, 2002, vol. 35, pp. 689-699.
Anliker et al., "AMON: A Wearable Multiparameter Medical Monitoring and Alert System", IEEE Transactions on Information Technology in Biomedicine, vol. 8, No. 4, Dec. 2004, pp. 415-427.
Asada et al., "Mobile Monitoring with Wearable Photoplethysmographic Biosensors", IEEE Engineering in Medicine and Biology Magazine, May/Jun. 2003, pp. 28-40.
Ayello et al., "How and Why to Do Pressure Ulcer Risk Assessment", Advances in Skin & Wound Care, May/Jun. 2002, vol. 15, No. 3., pp. 125-133.
Bergstrom et al., "A Prospective Study of Pressure Sore Risk Among Institutionalized Elderly", Journal of the American Geriatrics Society, Aug. 1992, vol. 40, No. 8, pp. 747-758.
Bourke et al., "Evaluation of a Threshold-Based Tri-Axial Accelerometer Fall Detection Algoithm", Gait & Posture, vol. 26, 2007, pp. 194-199.
Campo et al., "Wireless Fall Sensor with GPS Location for Monitoring the Elderly", 30th Annual International IEEE EMBS Conference Vancouver, British Columbia, Canada, Aug. 20-24, 2008, pp. 498-501.
Caporusso et al., "A Pervasive Solution for Risk Awareness in the Context of Fall Prevention", Pervasive Health, 2009, pp. 8.
Capuano et at. "Remote Telemetry—New Twists for Old Technology." Nursing Management. vol. 26, No. 7. Jul. 1995.
Chen et al., "In-Bed Fibre Optic Breathing and Movement Sensor for Non-Intrusive Monitoring", Proceedings of SPIE vol. 7173, 2009, pp. 6.
Chen et al., "Wearable Sensors for Reliable Fall Detection", Proceedings of the 2005 IEEE Engineering in Medicine and Biology 27th Annual Conference, Shanghai, China, Sep. 1-4, 2005, pp. 3551-3554.
Degen et al., "Speedy: A Fall Detector in a Wrist Watch", Proceedings of the Seventh IEEE International Symposium on Wearable Computers (ISWC'03), 2003, pp. 184-187.
Dhillon et al., "Towards the Prevention of Pressure Ulcers with a Wearable Patient Posture MonitorBased on Adaptive Accelerometer Alignment", 34th Annual International Conference of the IEEE EMBS, San Diego, CA, Aug. 28-Sep. 1, 2012, pp. 4513-4516.
Di Rienzo et al., "MagIC System: a New Textile-BasedWearable Device for Biological Signal Monitoring. Applicability in Daily Life and Clinical Setting", Proceedings of the 2005 IEEE Engineering in Medicine and Biology 27th Annual Conference Shanghai, China, Sep. 1-4, 2005, pp. 7167-7169.
Dinh et al., "A Fall and Near-Fall Assessment and Evaluation System", The Open Biomedical Engineering Journal, 2009, vol. 3, pp. 1-7.
Elmer-Dewitt, Philip, Apple's iWatch: The killer apps may be in hospitals, not health clubs, Fortune.com, Feb. 3, 2014, http://fortune.com/2014/02/03/apples-iwatch-the-killer-apps-may-be-in-hospitals-not-health-clubs/, in 4 pages.
Giansanti et al., "Assessment of Fall-Risk by Means of a Neural Network Based on Parameters Assessed by a Wearable Device During Posturography", Medical Engineering & Physics, vol. 30, 2008, pp. 367-372.
Giansanti, Daniele, "Investigation of Fall-Risk Using a Wearable Device with Accelerometers and Rate Gyroscopes", Institute of Physics Publishing, Physiological Measurement, vol. 27, 2006, pp. 1081-1090.
Grundy et al. "Telemedicine in Critical Care: An Experiment in Health Care Delivery." Oct. 1977.
Grundy et al. "Telemedicine in Critical Care: Problems in design, implementation and assessment." vol. 10, No. 7. Jul. 1982.
Gunningberg et al., "Improved Quality and Comprehensiveness in Nursing Documentation of Pressure Ulcers after Implementing an Electronic Health Record in Hospital Care", Journal of Clinical Nursing, 2009, vol. 18, pp. 1557-1564.
Harada et al., "Portable Orientation Estimation Device Based on Accelerometers, Magnetometers and Gyroscope Sensors for Sensor Network", IEEE Conference on Multisensor Fusion and Integration for Intelligent Systems 2003, 2003, pp. 191-196.
Hwang et al., "Development of Novel Algorithm and Real-time Monitoring Ambulatory System Using Bluetooth Module for Fall Detection in the Elderly", Proceedings of the 26th Annual International Conference of the IEEE EMBS, Sep. 1-5, 2004, pp. 2204-2207.
Kärki et al., "Pressure Mapping System for Physiological Measurements", XVIII IMEKO World Congress, Metrology for a Sustainable Development, Sep. 17-22, 2006, Rio de Janeiro, Brazil, pp. 5.
Li et al., "Accurate, Fast Fall Detection Using Gyroscopes and Accelerometer-Derived Posture Information", Conference Paper, Sixth International Workshop on Wearable and Implantable Body Sensor Networks, BSN 2009, Berkeley, CA, USA, Jun. 3-5, 2009, pp. 6.
Lindemann et al., "Evaluation of a Fall Detector Based on Accelerometers: A Pilot Study", Medical & Biological Engineering & Computing, vol. 43, 2005, pp. 548-551.
Linder-Ganz et al., "Real-Time Continuous Monitoring of Sub-Dermal Tissue Stresses Under the Ischial Tuberosities in Individuals with Spinal Cord Injury", Proceedings of the ASME 2008 Summer

(56) References Cited

OTHER PUBLICATIONS

Bioengineering Conference (SBC2008), Jun. 25-29, 2008, Marriott Resort, Marco Island, Florida, pp. 2.
Luo et al., "A Dynamic Motion Pattern Analysis Approach to Fall Detection", 2004 IEEE International Workshop on Biomedical Circuits & Systems, Dec. 1-3, 2004, pp. S2.1-5-S2.1-8.
Masimo Sleep™, posted at masimopersonalhealth.com, No. posting date, retrieved Nov. 17, 2021, online, https://www.masimopersonalhealth.com/pages/masimo-sleep (Year: 2021).
Masimo, "Radius-7—The Power of Masimo's Breakthrough Measurements in a Patient-worn Monitor," 2015, in 2 pages.
Mathie et al., "A System for Monitoring Posture and Physical Activity Using Accelerometers", Engineering in Medicine and Biology Society, 2001. Proceedings of the 23rd Annual International Conference of the IEEE, Oct. 25-28, 2001, pp. 3654-3657.
McInerney, Joan A., "Reducing Hospital-Acquired Pressure Ulcer Prevalence Through a Focused Prevention Program", Advances in Skin & Wound Care, vol. 21, No. 2, Feb. 2008, pp. 75-78.
Merbitz et al., "Wheelchair Push-ups: Measuring Pressure Relief Frequency", Archives of Physical Medicine and Rehabilitation, vol. 66, No. 7, Jul. 1985, pp. 433-438.
Narayanan et al., "Falls Management: Detection and Prevention, Using a Waist-Mounted Triaxial Accelerometer", Proceedings of the 29th Annual International Conference of the IEEE Embs Cité Internationale, Lyon, France, Aug. 23-26, 2007, pp. 4037-4040.
Notice of Allowance received in Taiwan Patent Office Application No. 108302030, dated Aug. 14, 2020 in 6 pages.
Notice of Allowance received in Taiwan Patent Office Application No. 108302035, dated Mar. 13, 2020 in 6 pages.
Notice of Allowance received in Taiwan Patent Office Application No. 108302046, dated Mar. 18, 2020 in 6 pages.
Notice of Allowance received in Taiwan Patent Office Application No. 109301079, dated Jul. 8, 2020 in 6 pages.
Notice of Allowance received in Taiwan Patent Office Application No. 109301080, dated Jul. 7, 2020 in 6 pages.
Notice of Allowance received in Taiwan Patent Office Application No. 109301129, dated Jul. 8, 2020 in 6 pages.
Notice of Allowance received in Taiwan Patent Office Application No. 109301130, dated Jul. 8, 2020 in 6 pages.
Notice of Allowance received in Taiwan Patent Office Application No. 109303055, dated Jan. 21, 2021 in 6 pages.
Notice of Allowance received in Taiwan Patent Office Application No. 109303056, dated Jan. 21, 2021 in 6 pages.
Notice of Allowance received in Taiwan Patent Office Application No. 109303057, dated Jan. 21, 2021 in 6 pages.
Noury, Norbert, "A Smart Sensor for the Remote Follow Up of Activity and Fall Detection of the Elderly", 2nd Annual International IEEE-EMBS Special Topic Conference on Microtechnologies in Medicine & Biology, May 2-4, 2002, pp. 314-317.
Nyan et al., "A Wearable System for Pre-Impact Fall Detection", Journal of Biomechanics, vol. 41, 2008, pp. 3475-3481.
Nyan et al., "Garment-Based Detection of Falls and Activities of Daily Living Using 3-Axis MEMS Accelerometer", Institute of Physics Publishing, International MEMS Conference 2006, Journal of Physics: Conference Series 34, 2006, pp. 1059-1067.
O'Donovan et al., "A Context Aware Wireless Body Area Network", Pervasive Health, 2009, pp. 8.
Patil et al., "Telemonitoring Physiological Parameters of a Patient from a Distance by Near Field|Communication Mobile", 2014 Fourth International Conference on Advanced Computing & Communication Technologies, pp. 345-348.
Perolle et al., "Automatic Fall Detection and Activity Monitoring for Elderly", Jan. 2007, pp. 6.
Philips, "Small, lightweight, and cableless—Philips Mobile CL cuffs, sensors, and accessories" brochure, 2013, in 2 pages.
Po et al., "Overview of MEMSWear II—Incorporating MEMS Technology Into Smart Shirt for GeriatricCare", Institute of Physics Publishing, International MEMS Conference 2006, Journal of Physics: Conference Series 34, 2006, pp. 1079-1085.
Prado et al., "Distributed Intelligent Architecture for Falling Detection and Physical Activity Analysis in the Elderly", Proceedings of the Second Joint EMBS/BMES Conference, Oct. 23-26, 2002, pp. 1910-1911.
"Radius PPG™ Tetherless Pulse Oximetry", masimo.com, site visited Mar. 18, 2022: https://www.masimo.com/products/sensors/radius-ppg/, pp. 2.
Rithalia et al., "Quantification of Pressure Relief Using Interface Pressure and Tissue Perfusion in Alternating Pressure Air Mattresses", Archives of Physical Medicine and Rehabilitation, vol. 81, Oct. 2000, pp. 1364-1369.
Rysavy, "Making the Call with Two-Way Paging", Network Computing, Published Jan. 15, 1997, www.rysavy.com/Articles/twoway.htm.
Sakai et al., "Continuous Monitoring of Interface Pressure Distribution in Intensive Care Patients for Pressure Ulcer Prevention", Journal of Advanced Nursing, vol. 65, No. 4, 2009, pp. 809-817.
Spillman Jr., et al., "A 'Smart' Bed for Non-Intrusive Monitoring of Patient Physiological Factors", Measurement Science and Technology, Aug. 2004, vol. 15, No. 8, pp. 1614-1620.
Wachter, S. Blake; Journal of the American Medical Informatics Association; The Employment of an Iterative Design Process to Develop a Pulmonary Graphical Display; vol. 10, No. 4, Jul./Aug. 2003; pp. 363-372.
Wayback Machine search for "Masimo Sleep™", first found Sep. 24, 2020, retrieved Nov. 17, 2021, online,https://web.archive.org/web/20200924015943/https://www.masimopersonalhealth.com/pages/masimo-sleep (Year: 2020), pp. 8.
Webster, John G., "A Pressure Mat for Preventing Pressure Sores", IEEE Engineering in Medicine & Bioloogy Society 11th Annual International Conference, 1989, pp. 2.
Williams et al., "A Remote Electronic Monitoring System for the Prevention of Pressure Sores",Proceedings of the 19th International Conference, IEEE/EMBS Oct. 30-Nov. 2, 1997, Chicago, IL, pp. 1076-1079.
Wu et al., "Portable Preimpact Fall Detector With Inertial Sensors", IEEE Transactions on Neural Systems and Rehabilitation Engineering, vol. 16, No. 2, Apr. 2008, pp. 178-183.
Yongwu, Shi, "Research progress of wearable medical devices", Medical Equipment, Mar. 2018, vol. 31, No. 5, pp. 3.
ADInstruments: "Human NIBP Controller Owner's Guide Human NIBP Owner's Guide", Jan. 1, 2014, XP055673095, retrieved from the Internet: http://cdn.adinstruments.com/adi-web/manuals/human-nibp-OG.pdf [retrieved on Mar. 3, 2020], p. 16; figures 2-4, pp. 90.
International Search Report and Written Opinion received in PCT Application No. PCT/US2019/055722, dated Mar. 23, 2020.
International Search Report and Written Opinion received in PCT Application No. PCT/US2021/031625, dated Aug. 25, 2021.
International Search Report and Written Opinion received in PCT Application No. PCT/US2022/053988 on Jun. 26, 2023.

\* cited by examiner

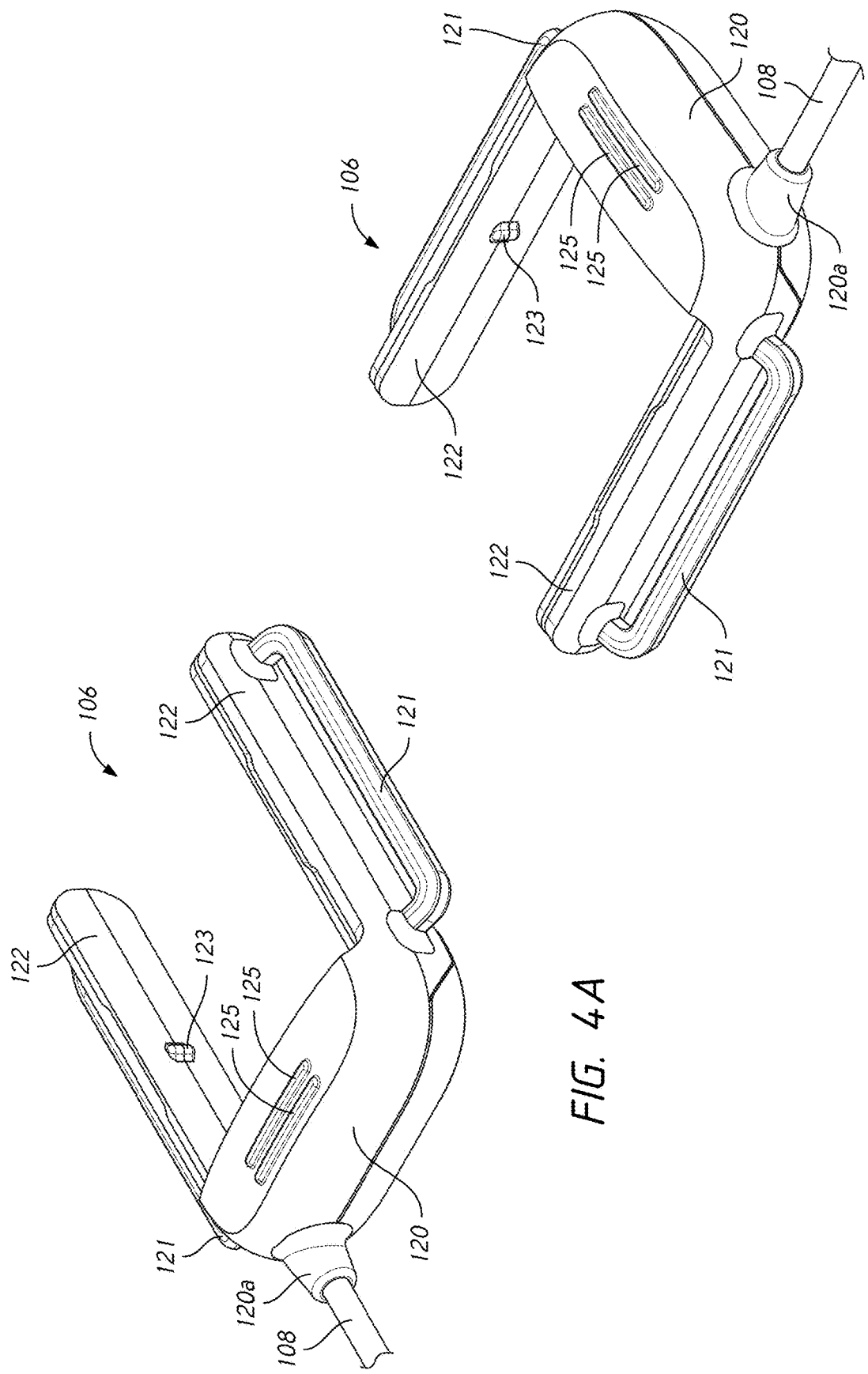

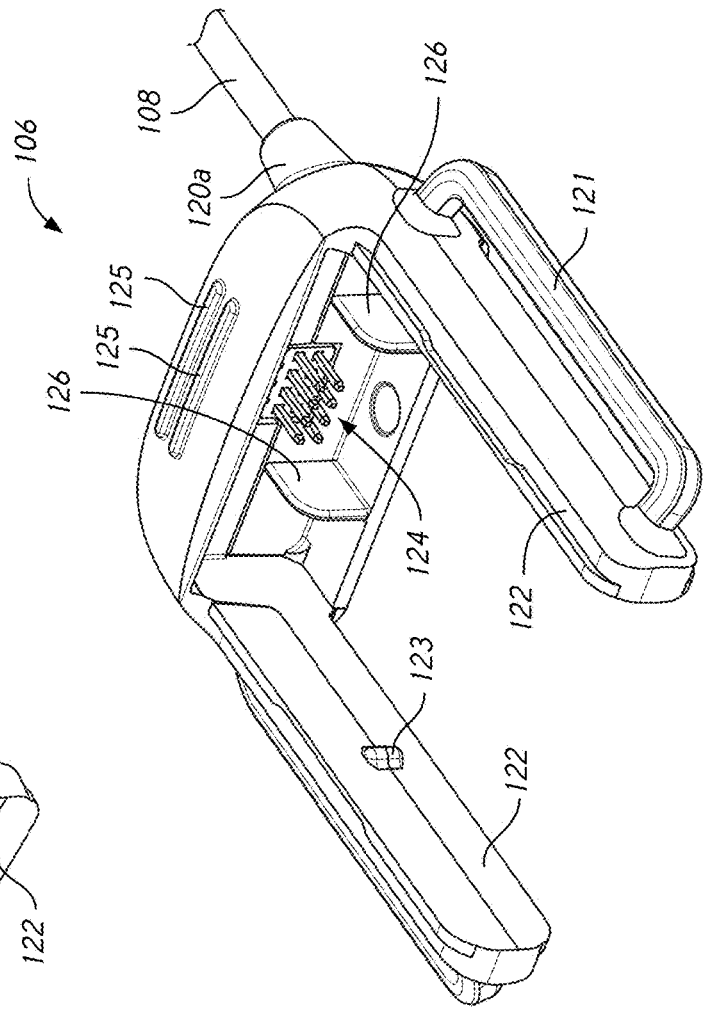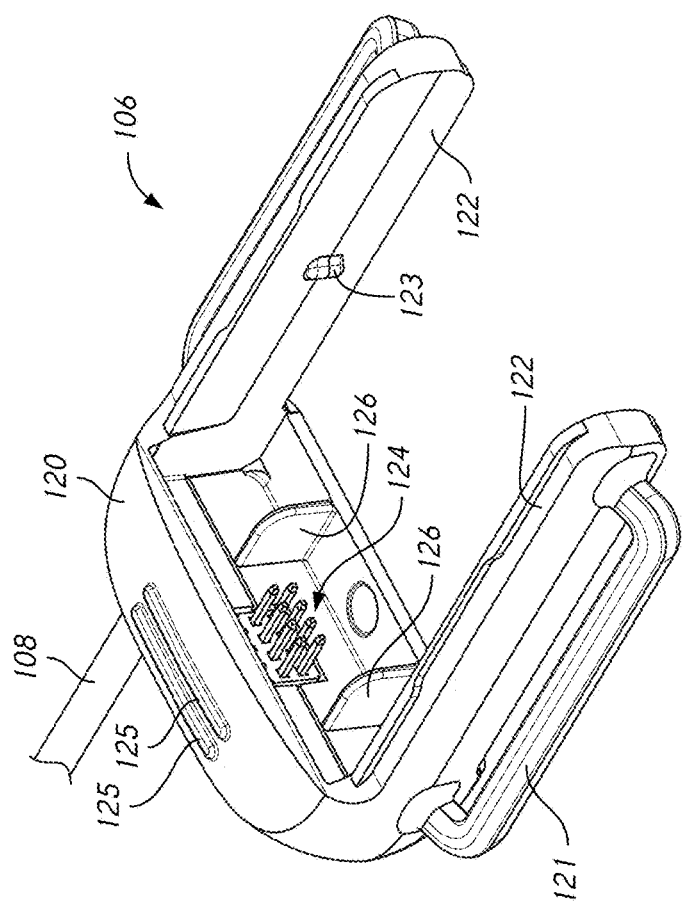
FIG. 4C
FIG. 4D

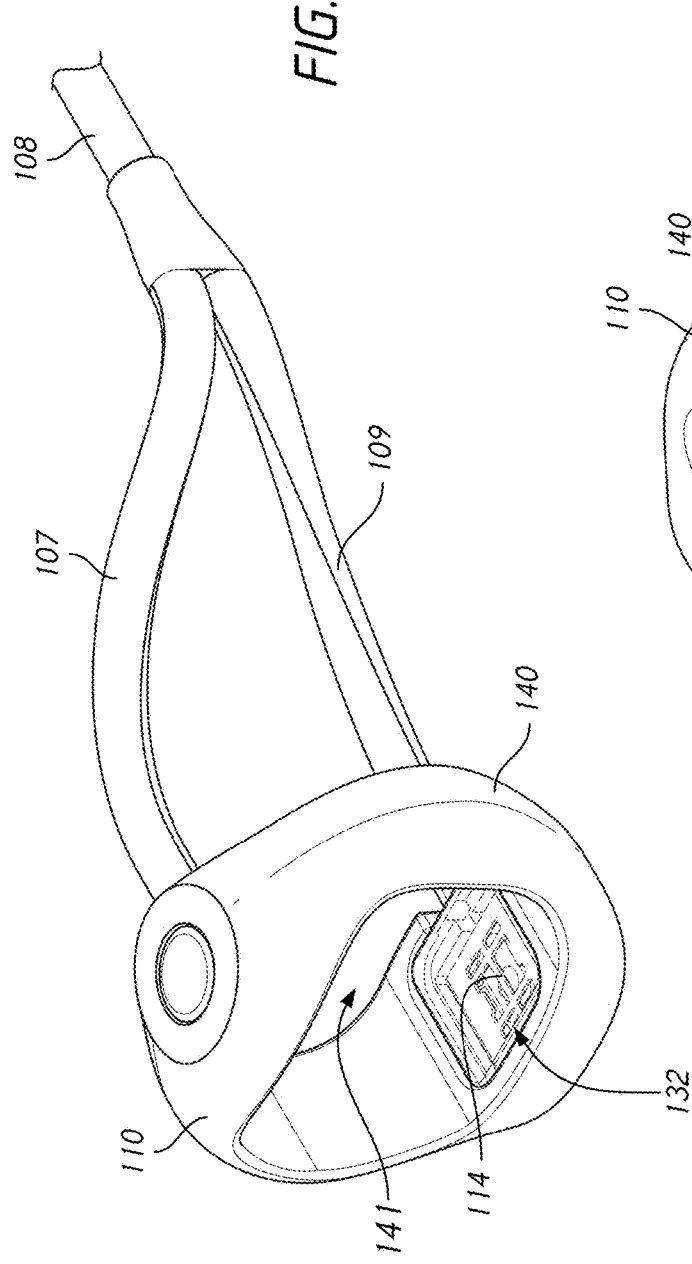
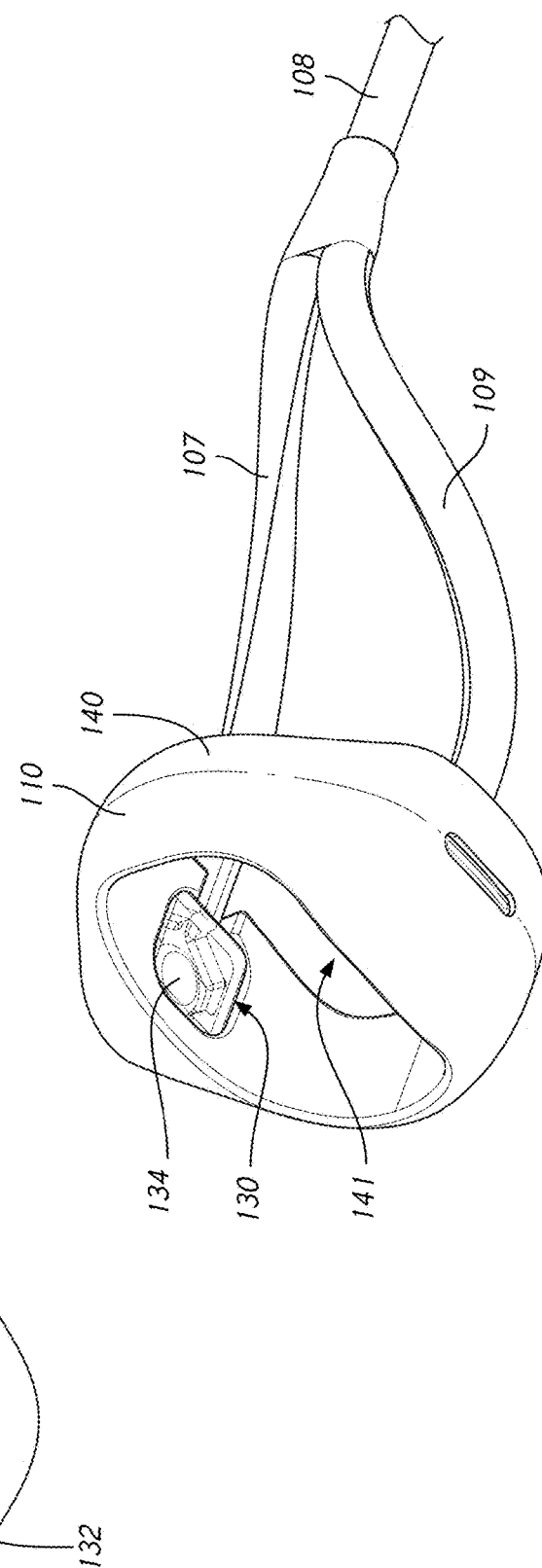

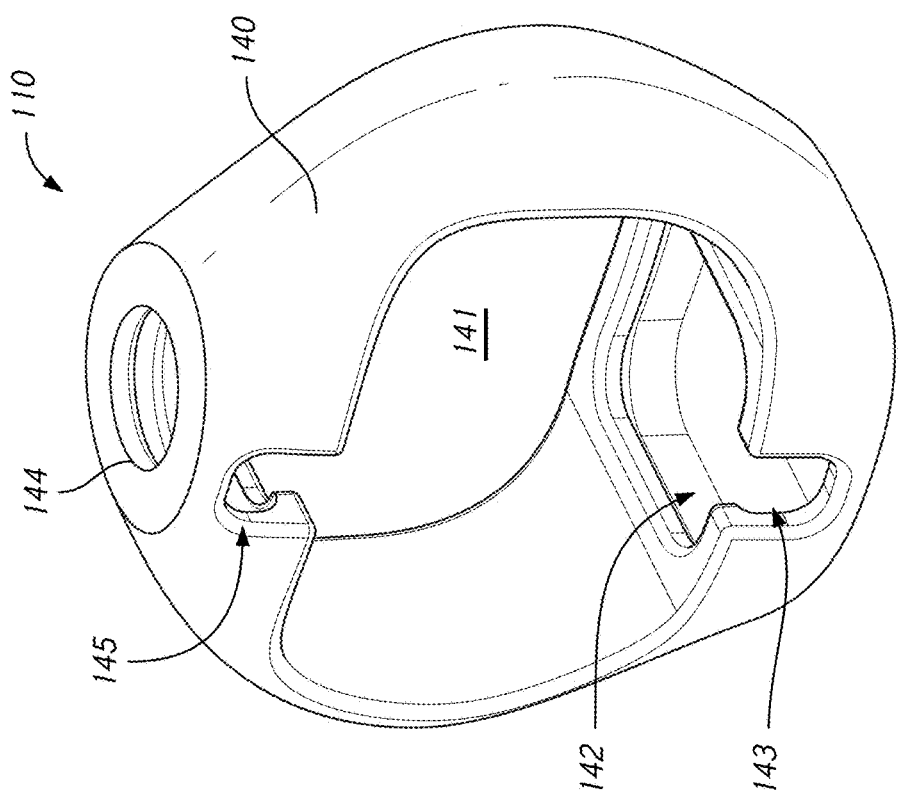
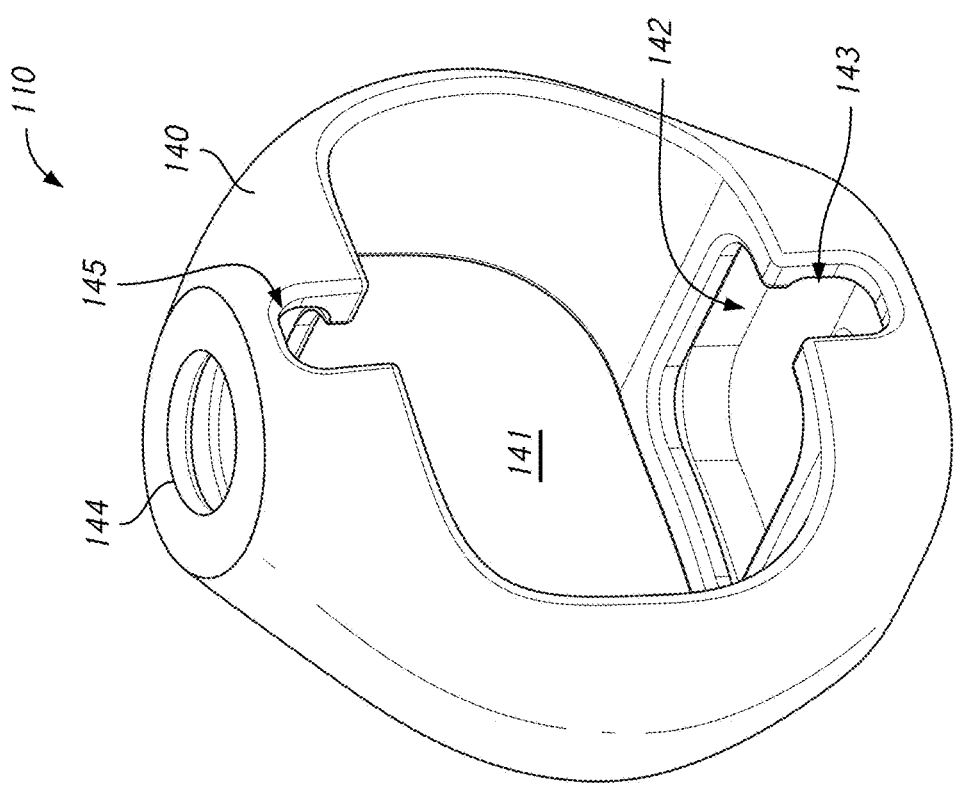
FIG. 6B
FIG. 6A

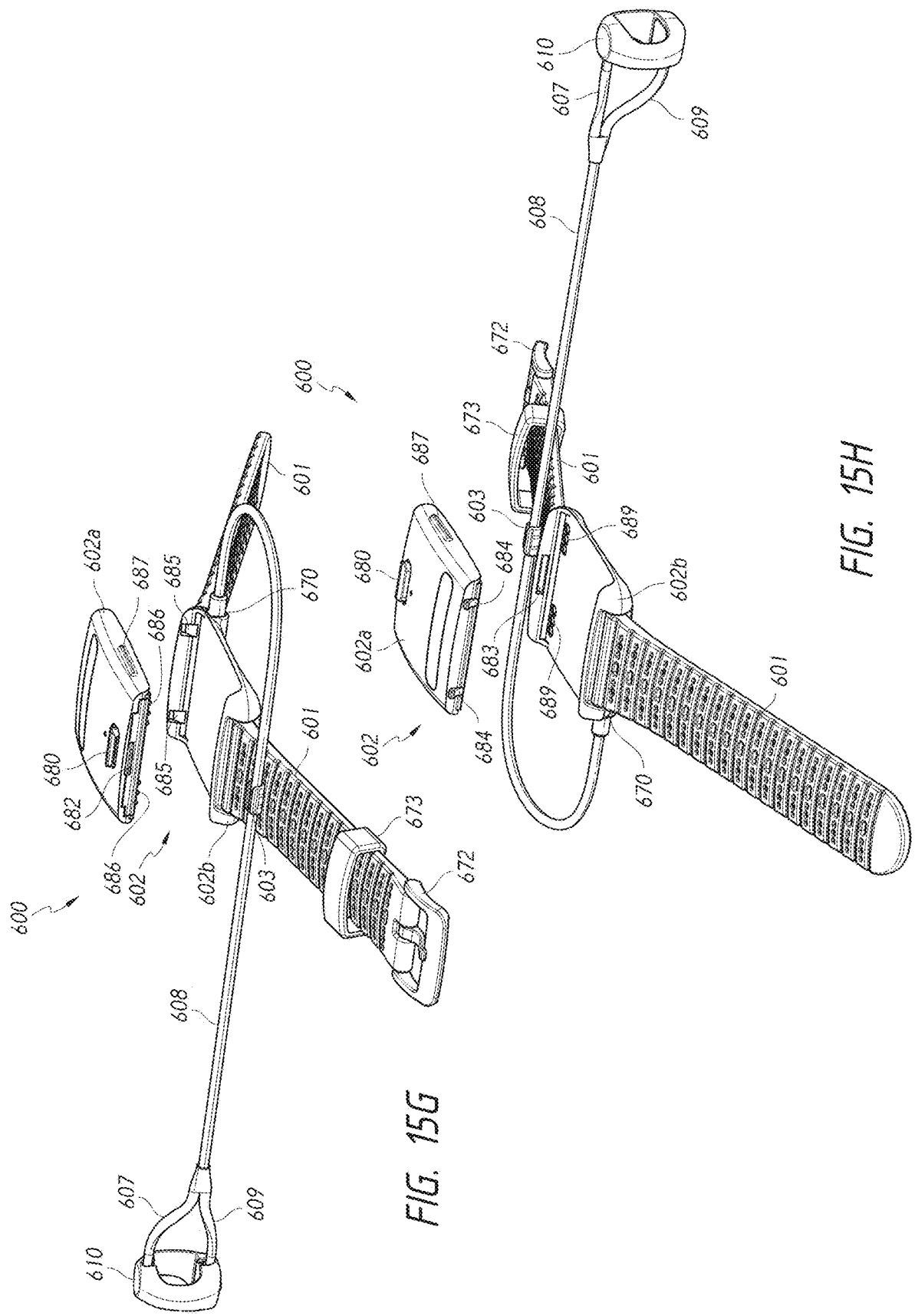

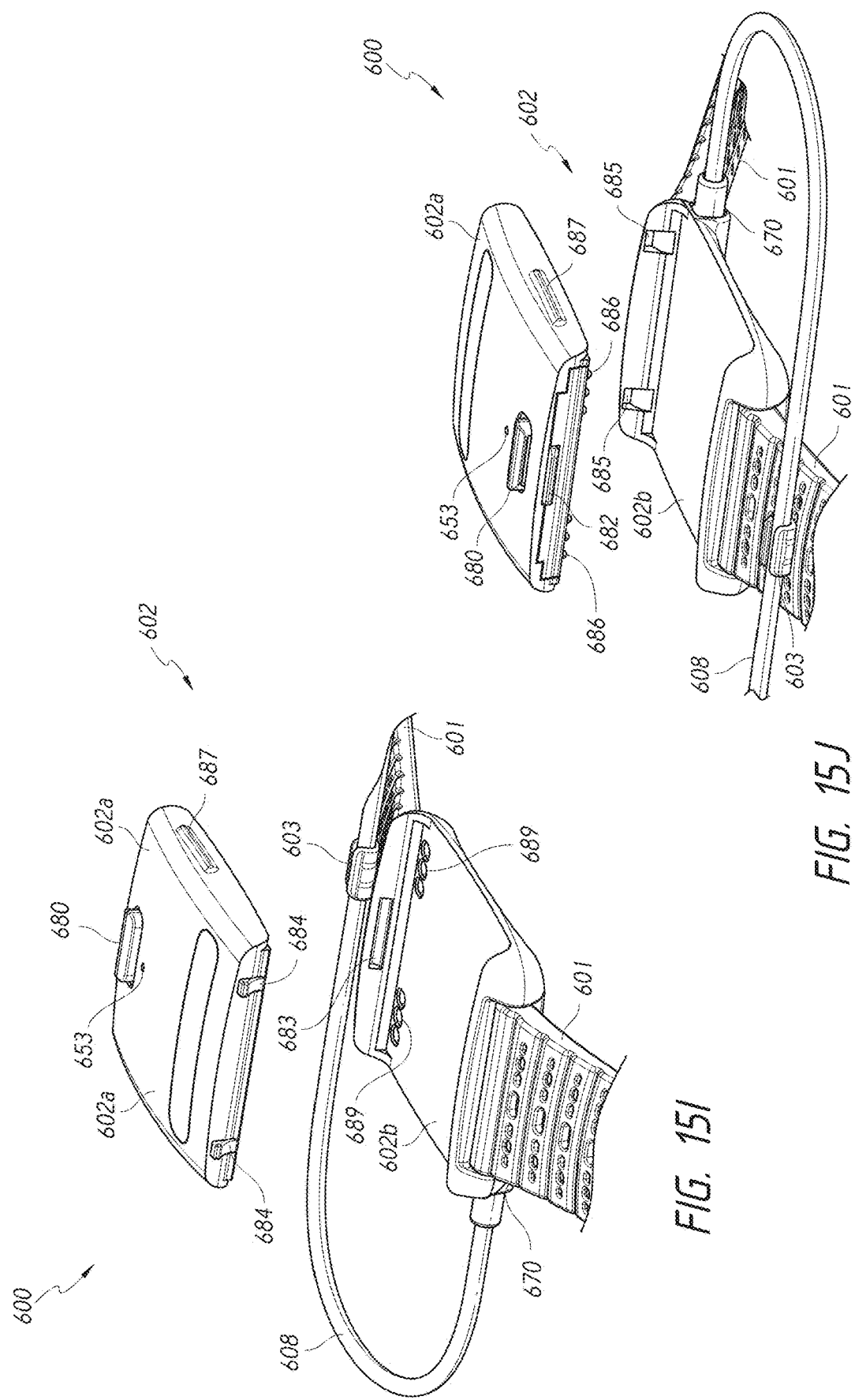

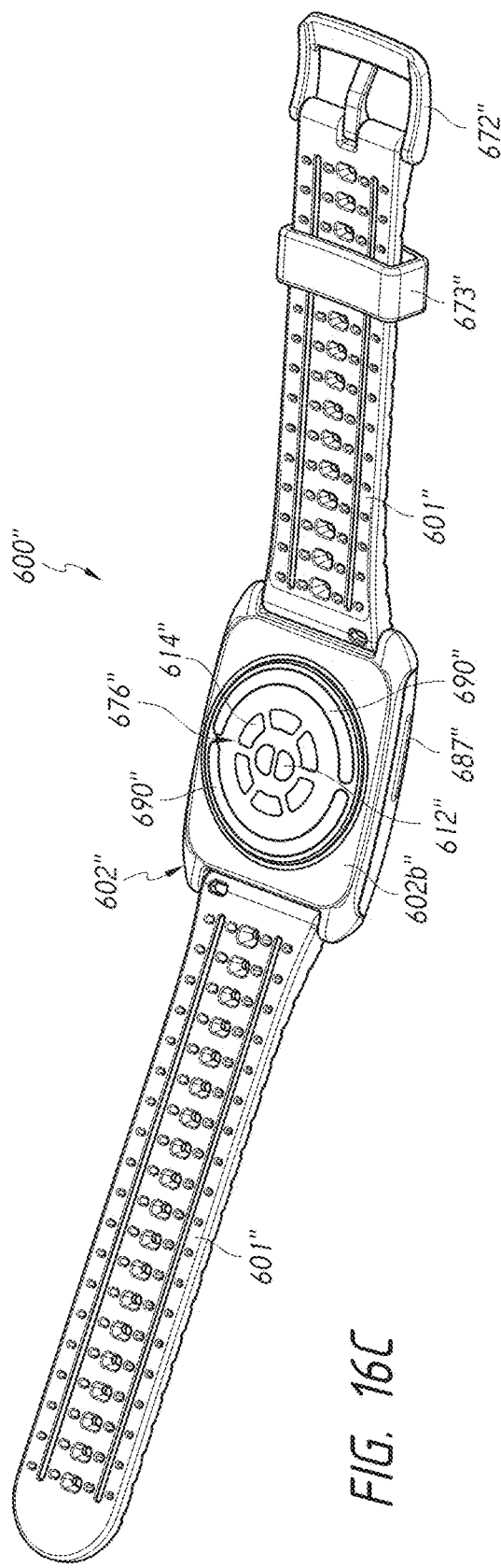
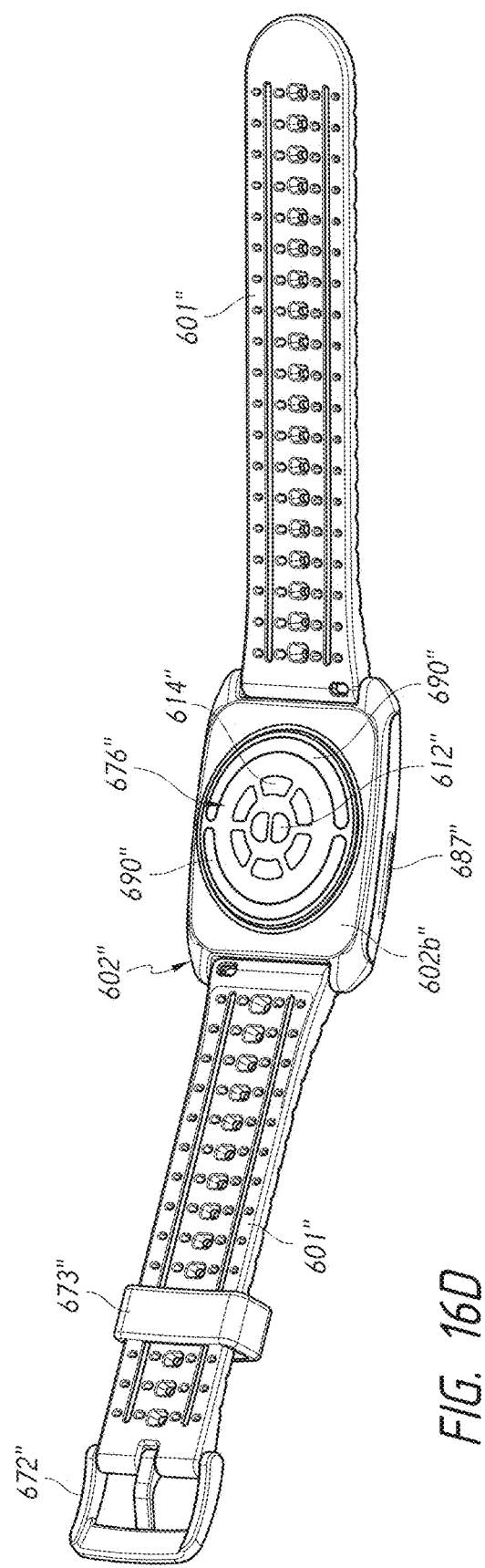
FIG. 16C
FIG. 16D

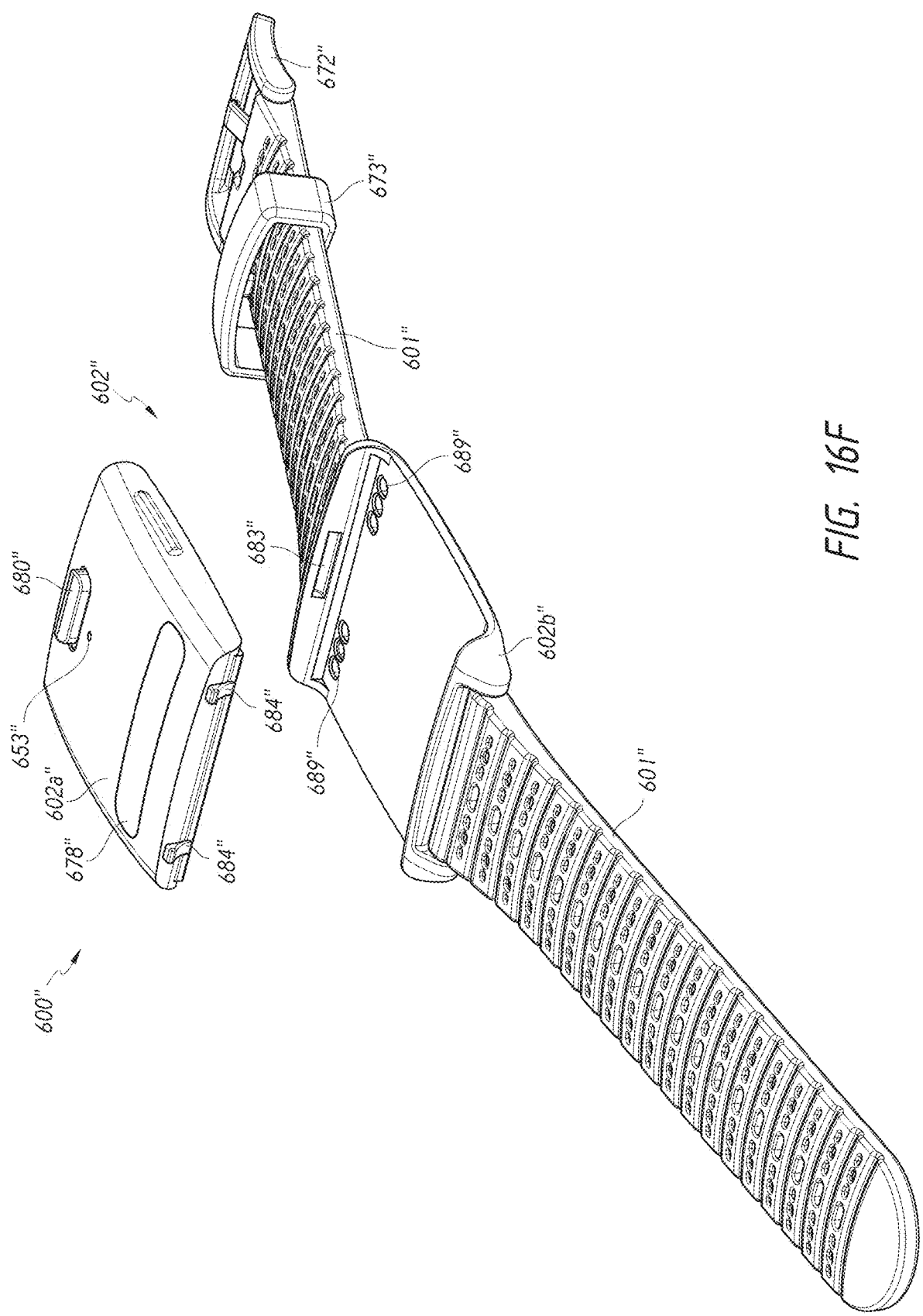

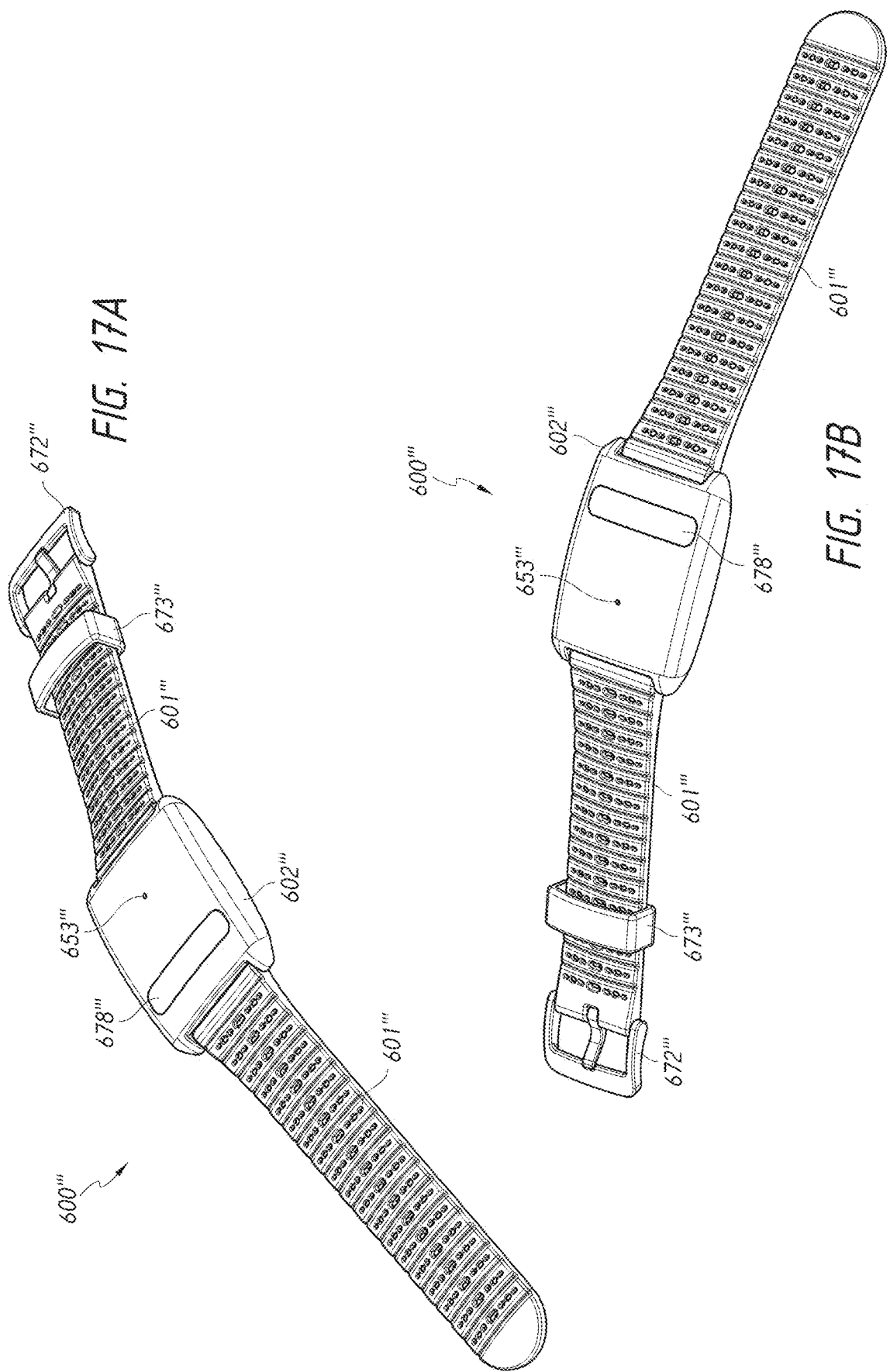

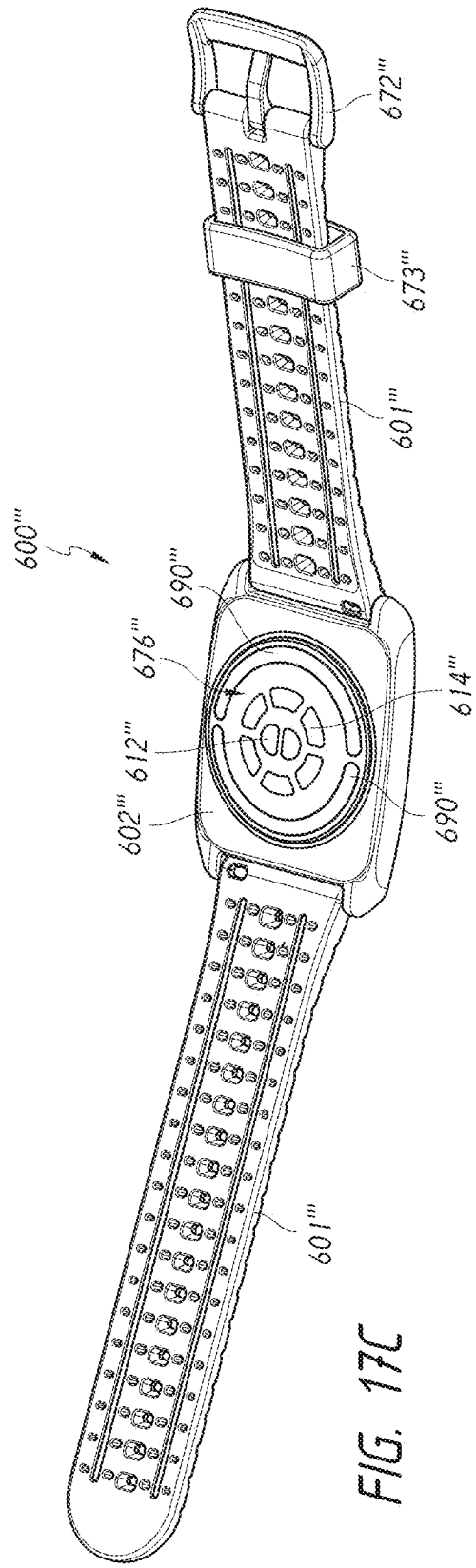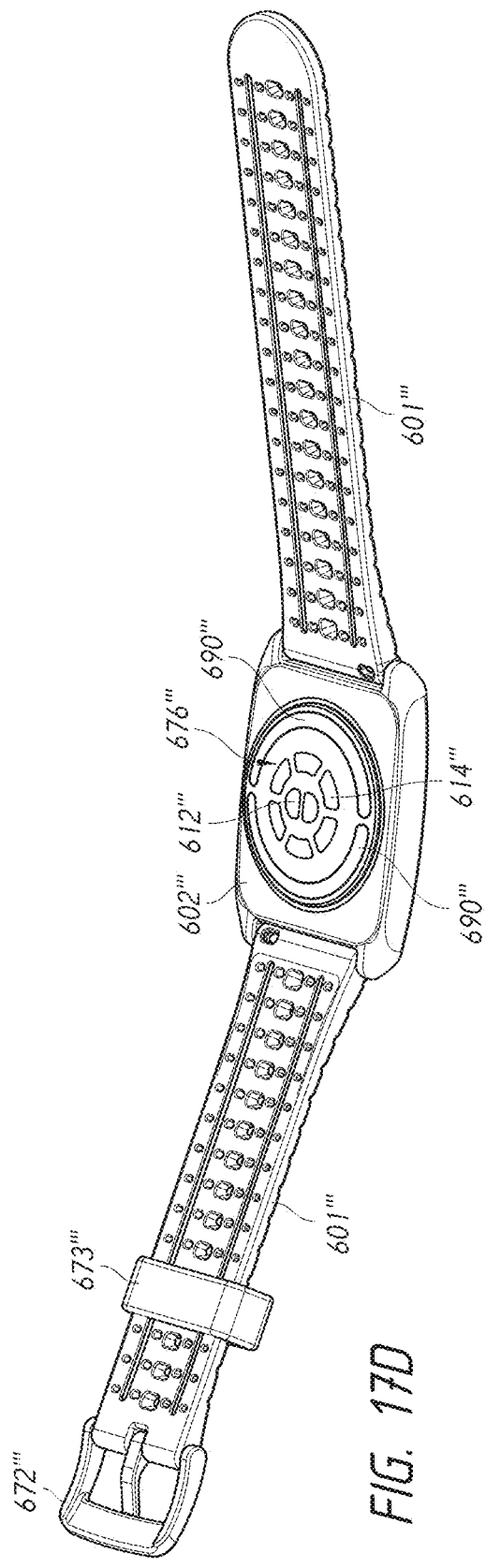

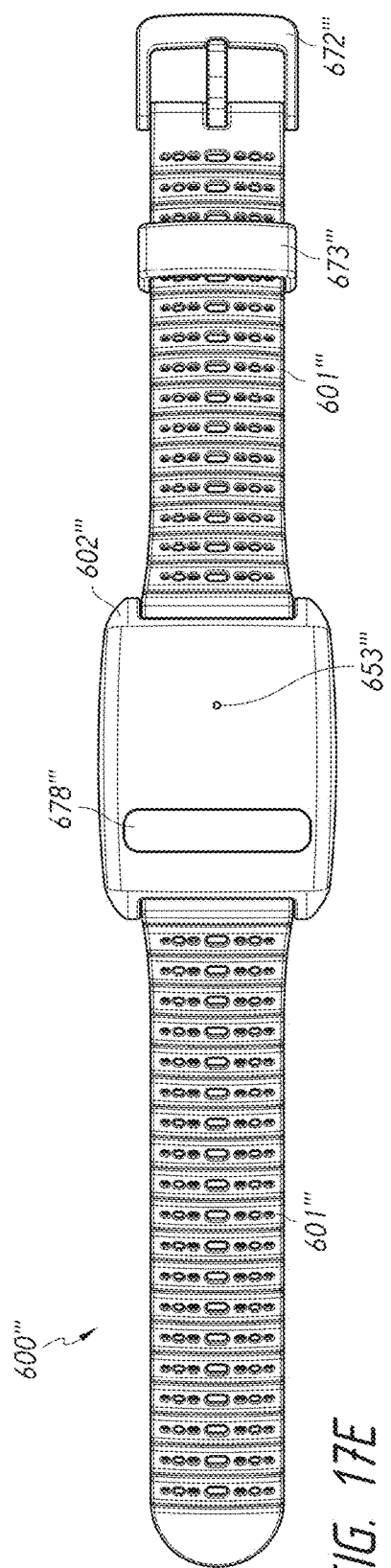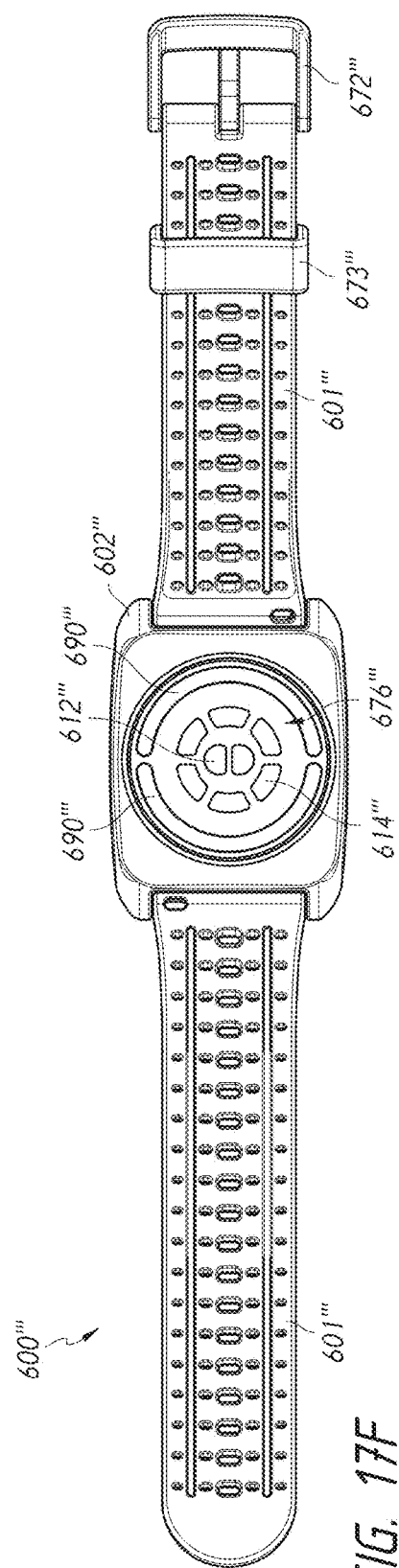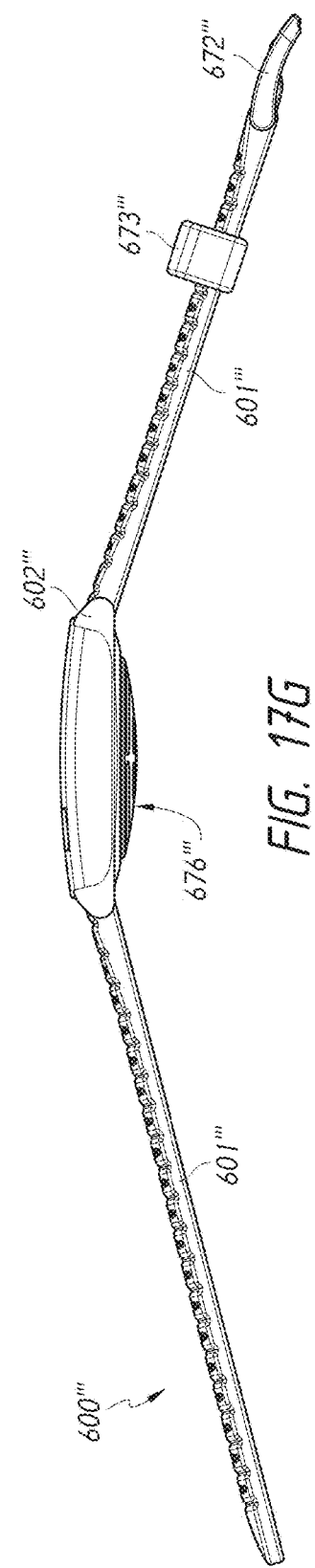

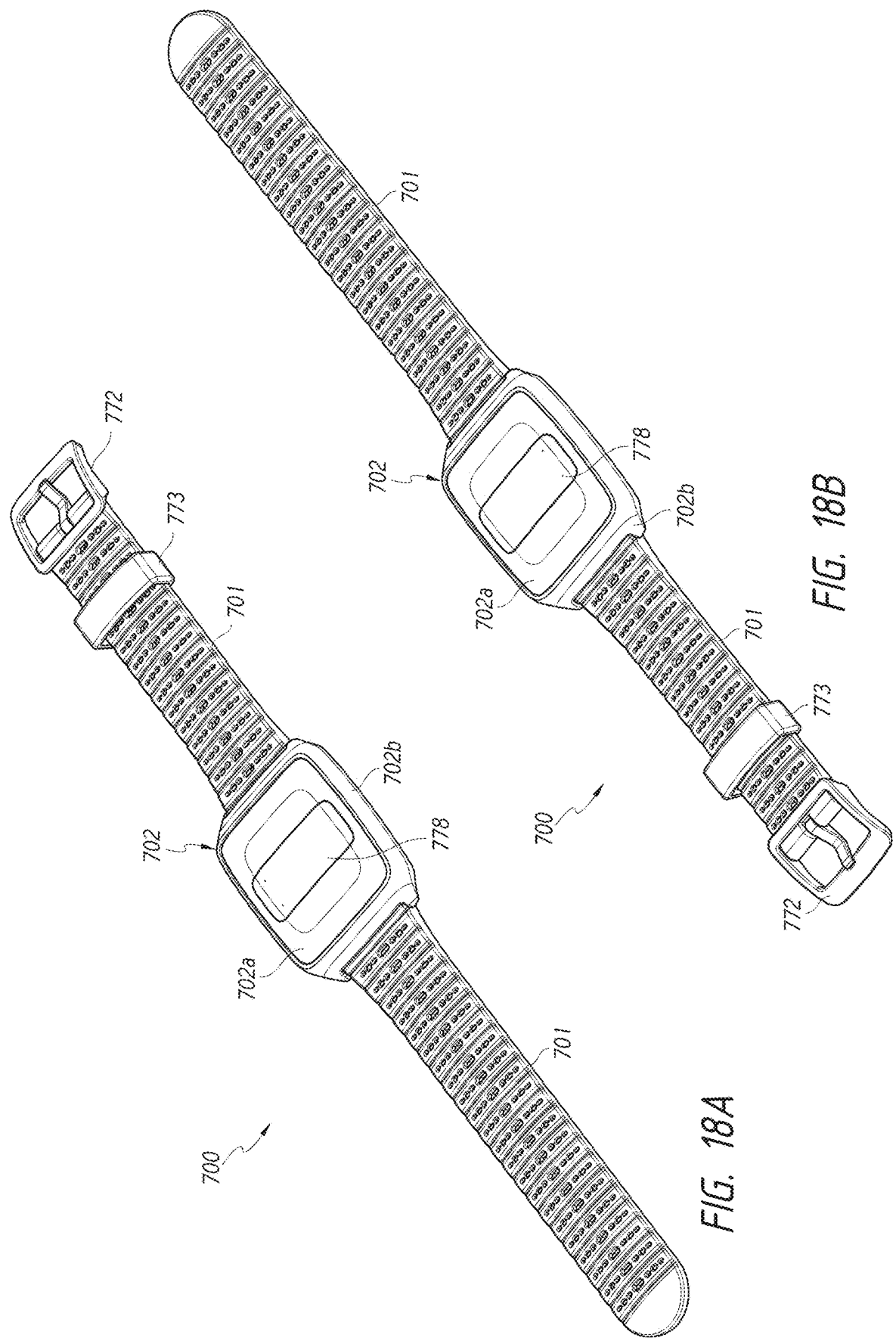

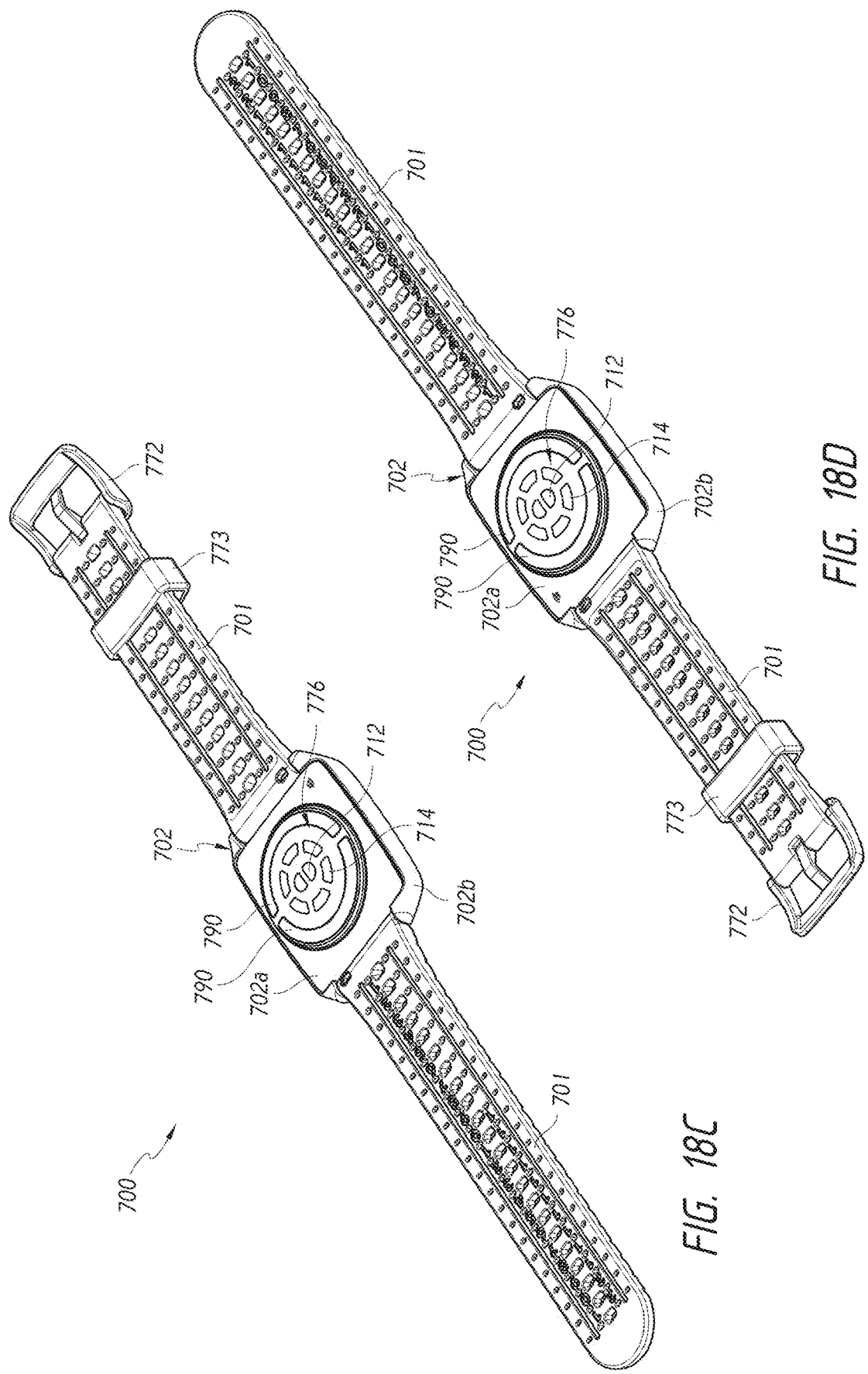

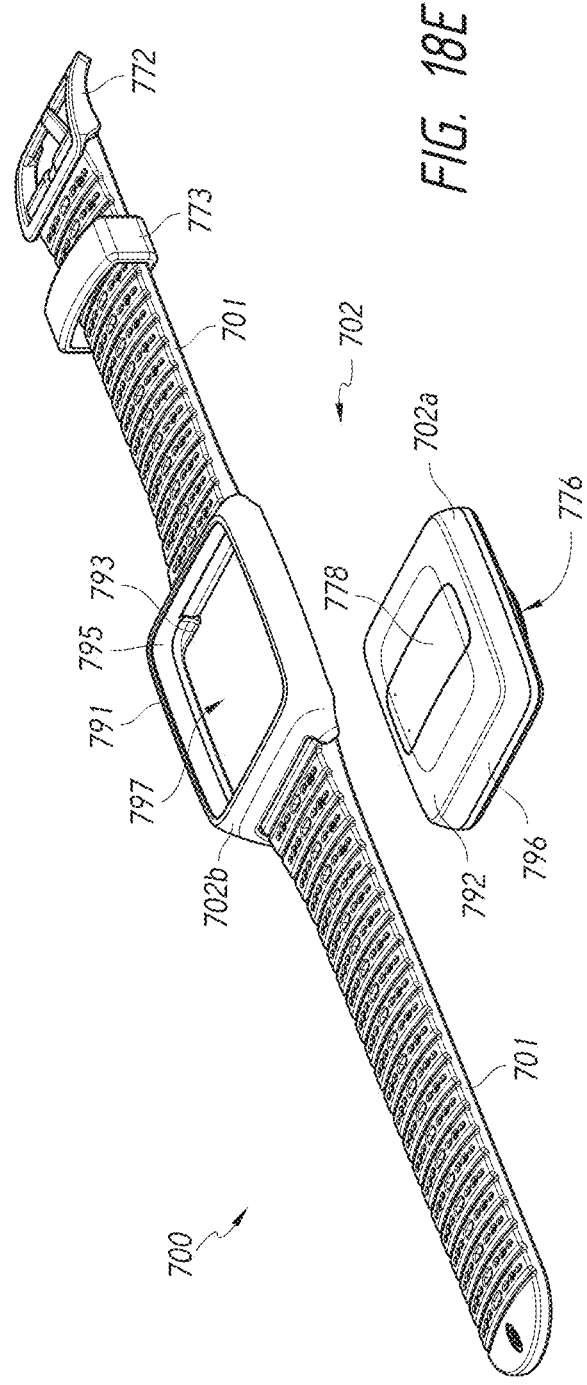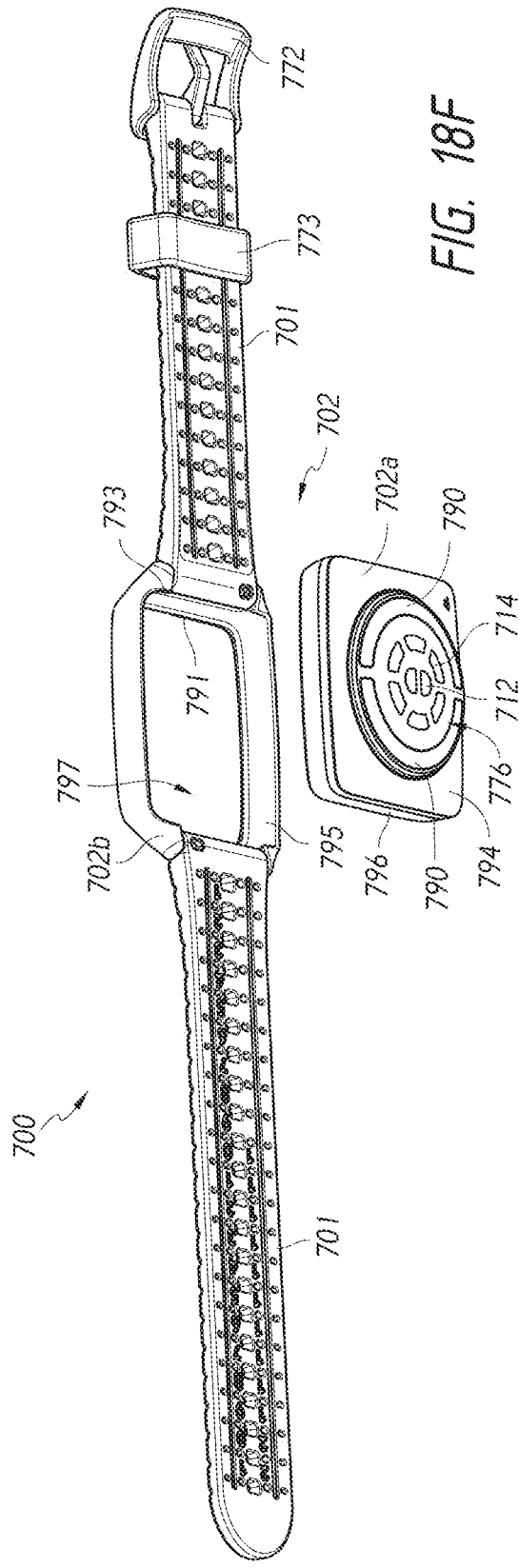

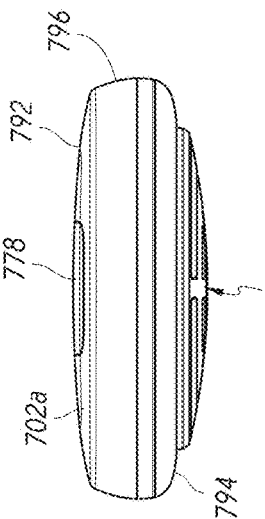
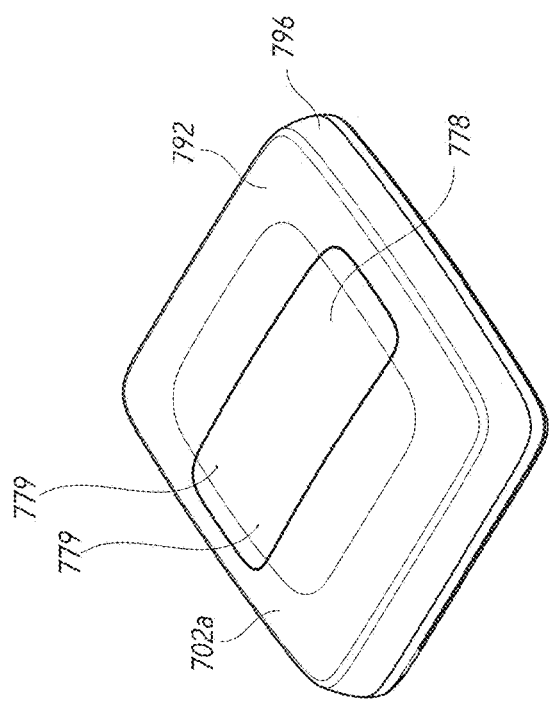
FIG. 18J
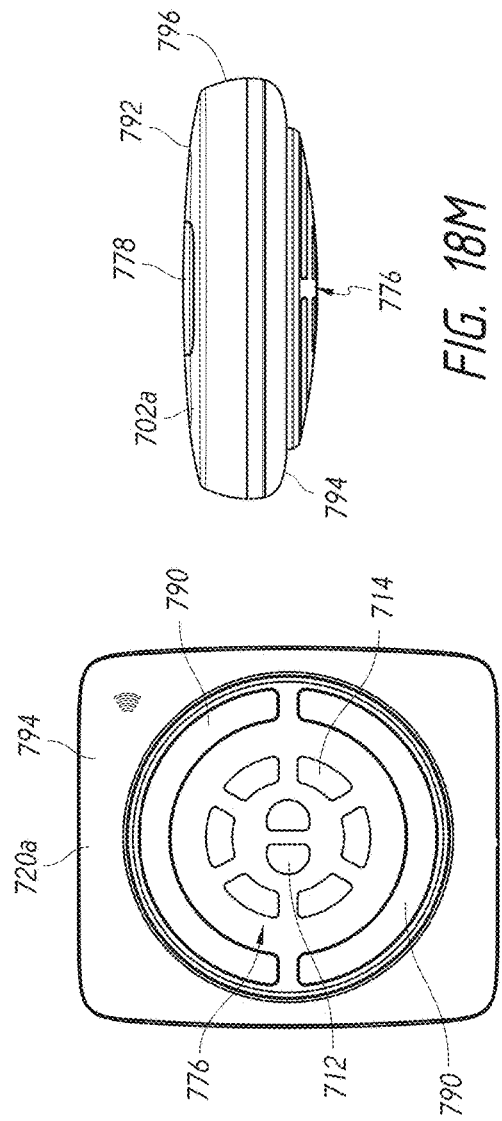
FIG. 18M
FIG. 18L
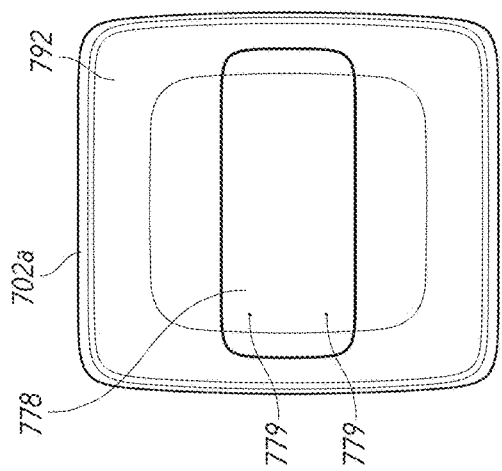
FIG. 18K

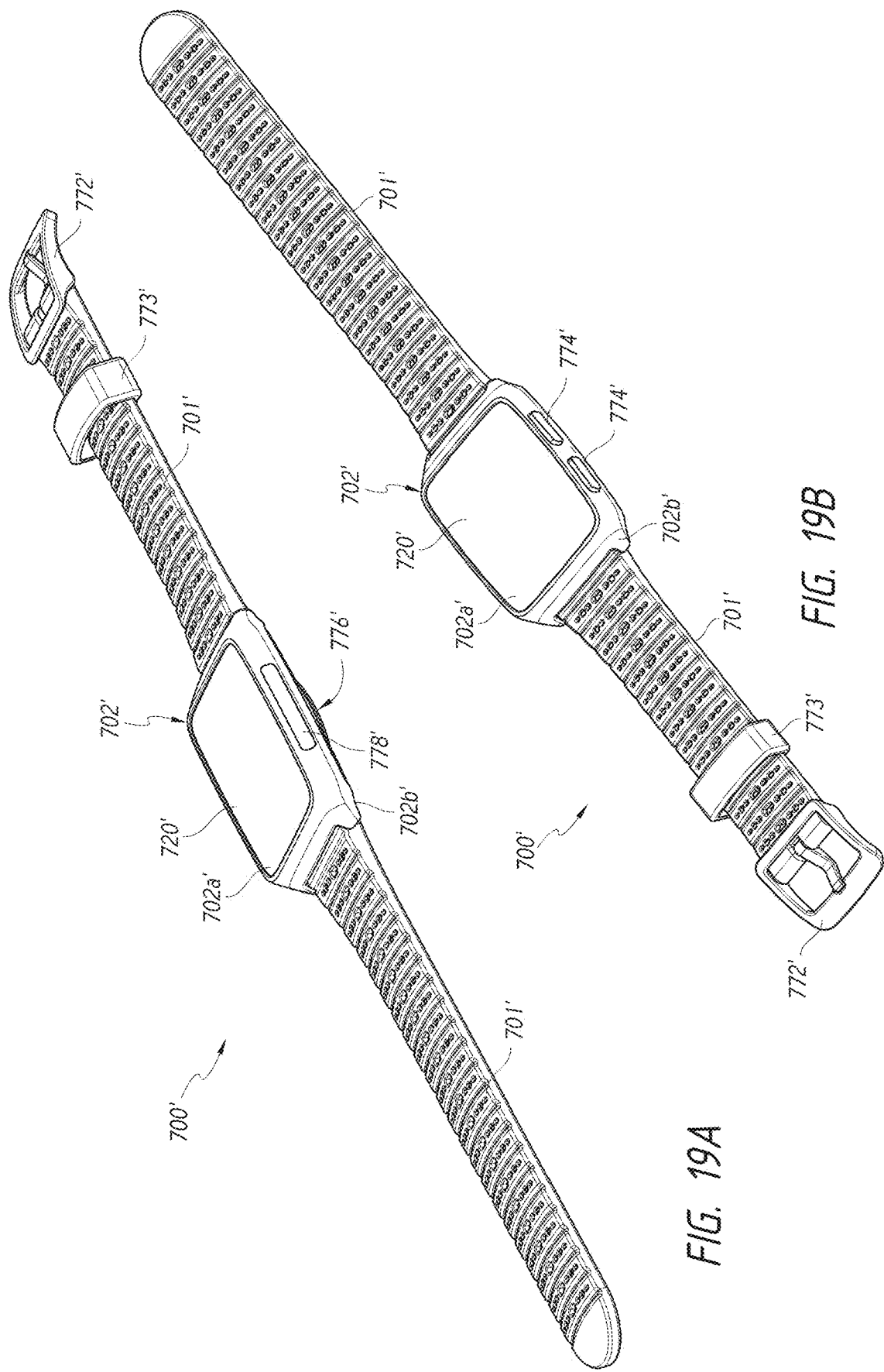

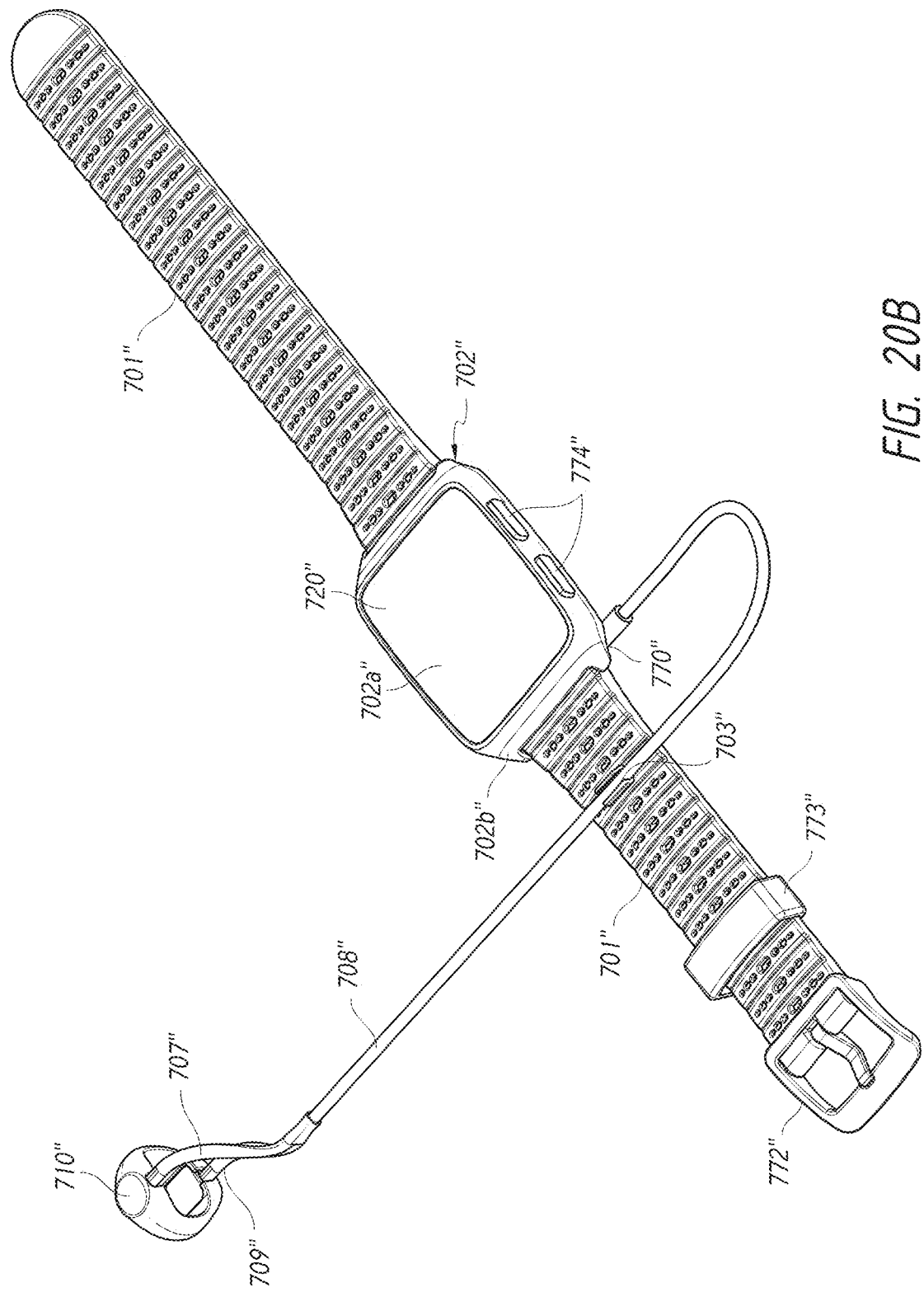

WRIST AND FINGER WORN PULSE OXIMETRY SYSTEM

INCORPORATION BY REFERENCE TO ANY PRIORITY APPLICATIONS

The present application claims priority to U.S. Provisional Application No. 63/296,725, filed Jan. 5, 2022, U.S. Provisional Application No. 63/316,625, filed Mar. 4, 2022, and U.S. Provisional Application No. 63/375,191, filed Sep. 9, 2022. All of the above-listed applications and any and all other applications for which a foreign or domestic priority claim is identified in the Application Data Sheet as filed with the present application, are hereby incorporated by reference under 37 CFR 1.57.

TECHNICAL FIELD

The present disclosure relates to wearable pulse oximetry systems for measuring and/or monitoring a subject's physiological information.

BACKGROUND

Hospitals, nursing homes, and other patient care facilities typically include patient monitoring devices at one or more bedsides in the facility. Patient monitoring devices generally include sensors, processing equipment, and displays for obtaining and analyzing a medical subject's physiological parameters such as blood oxygen saturation level, respiratory rate, pulse, and other parameters, such as those monitored on commercially available patient monitors from Masimo Corporation of Irvine, California. Clinicians, including doctors, nurses, and other medical personnel, use the physiological parameters and trends of those parameters obtained from patient monitors to diagnose illnesses and to prescribe treatments. Clinicians also use the physiological parameters to monitor patients during various clinical situations to determine whether to increase the level of medical care given to patients.

SUMMARY

Pulse oximetry is a widely accepted noninvasive procedure for measuring the oxygen saturation level of arterial blood, an indicator of a person's oxygen supply. Pulse oximetry sensors generally include one or more light sources transmitting optical radiation into or reflecting off through a portion of the body. After attenuation by tissue and fluids of the portion of the body, one or more photodetection devices detect the attenuated light and output one or more detector signals responsive to the detected attenuated light. The pulse oximetry sensor can be utilized for determination of a variety of physiological parameters and/or characteristics, including but not limited to oxygen saturation ($SpO_2$), pulse rate, a plethysmograph waveform, perfusion index (PI), pleth variability index (PVI), methemoglobin (MetHb), carboxyhemoglobin (CoHb), total hemoglobin (tHb), glucose, and/or otherwise, and the pulse oximetry sensor can be utilized for display on one or more monitors the foregoing parameters individually, in groups, in trends, as combinations, or as an overall wellness or other index.

In some circumstances, it can be advantageous to select a finger, such as a pinky finger, as a site for pulse oximetry. In some circumstances, it can be advantageous to select a wrist as a site for pulse oximetry alone or in combination with utilization of a finger site for pulse oximetry. The present disclosure describes various implementations for physiological sensor systems which secure to a subject (for example, to a wrist and/or finger of the subject) and employ pulse oximetry at a finger and/or wrist of the subject. Various implementations disclosed herein provide increased user comfort, increased user ergonomics, facilitate better sensor-skin contact and engagement in order to provide more accurate physiological parameter determination, and provide better stability in securement. Some implementations of the sensor systems disclosed herein: include a finger portion that secures to a subject's pinky finger and operably positions emitter(s) and detector(s); a wrist portion configured to be secured to the subject's wrist; and a cable that provides electrical communication between such finger portion and wrist portion. Some implementations of the sensor systems disclosed herein include a wrist portion configured to be secured to the subject's wrist and operably position emitter(s) and detector(s). Some implementations of the sensor systems disclosed herein include one or more cable retainers configured to facilitate positioning and/or securement of such cable along an outer side/edge of a subject's hand/palm and pinky finger, which can advantageously provide increased mobility to the subject's wrist, hand, and pinky finger without any or with little pulling and/or binding of the cable during movement as would occur if the cable were routed/positioned along a top or bottom side of the subject's hand/palm and/or pinky finger (e.g., due to a change in overall cable path length between bending the pinky finger closed and/or bending the hand at the wrist and the non-bent/non-closed position(s)). Additionally, such positioning and/or securement of the cable along the outer side/edge of the subject's hand/palm and pinky finger can advantageously increase comfort and tolerability to the subject. Some implementations of the sensor systems disclosed herein provide for a sensor system that can easily be adapted and/or customized to fit subjects with body parts (e.g., wrists, hands, and fingers) of various sizes and/or shapes. For example, the cable can be routed and/or positioned such that it is directed generally away from the hand/palm of the subject as it extends from the wrist portion of the sensor system and then bent back towards the hand/palm of the subject to connect to the finger portion of the sensor system, which can allow for a subject to customize the length of the cable that extends along their hand/palm and finger by adjusting the size of the loop that is created by such bend and such positioning/routing (e.g., so that the sensor system can be customized to the subject's hand/palm and finger length). Further, in some implementations, the finger portion and/or the wrist portion of the sensor systems described herein can be resilient and flexible such that it can adapt to pinky fingers and/or wrist sizes of various sizes/shapes. Additionally, the finger portion and/or wrist portion of the sensor systems described herein can be provided in various sizes/shapes (e.g., small, medium, large) to further enable a customized fit for the subject. For example, a plurality of ring members (each having different sizes) can be utilized to provide accommodation for different finger sizes of different subjects. Some implementations of the sensor systems disclosed herein can advantageously provide for a sensor system that is reusable and/or durable (e.g., lasting weeks and/or months).

Disclosed herein is a pulse oximetry system configured to secure to a wrist and measure a blood oxygen saturation at a tissue site on a pinky finger of a subject, the pulse oximetry system comprising: a sensor dock assembly; a first cable retainer; a second cable retainer; and a sensor hub. The sensor dock assembly comprises: a dock and a strap configured to secure the dock to the subject's wrist; a ring member configured to secure around a first portion of the subject's pinky finger; one or more emitters operably positioned by a first portion of the ring member, the one or more emitters configured to emit optical radiation into tissue of the subject's pinky finger; one or more detectors operably positioned by a second portion of the ring member that is opposite the first portion of the ring member, the one or more detectors configured to detect at least a portion of the optical radiation emitted from the one or more emitters after passing through said tissue and output at least one signal responsive to the detected optical radiation; and a cable connected to and extending from the dock and in electrical communication with the one or more emitters and the one or more detectors, the cable configured to transmit said at least one signal outputted by the one or more detectors to the dock. The first cable retainer is disposed on the strap or the dock and comprises a prong configured to secure a first portion of the cable. The second cable retainer is configured to secure around a second portion of the subject's pinky finger between the ring member and the subject's palm and comprises a prong configured to secure a second portion of the cable. The first and second cable retainers are configured to allow the cable to be positioned along an outside edge of a palm of the subject and along at least a portion of an outside edge of the subject's pinky finger when the ring member is secured to the first portion of the subject's pinky finger and the dock is secured to the subject's wrist. The sensor hub is configured to releasably connect to the dock and comprises one or more hardware processors and a battery. When the sensor hub is connected to the dock of the sensor dock assembly: the sensor dock assembly is configured to receive power from the battery of the sensor hub; and the one or more hardware processors of the sensor hub are configured to receive and process said at least one signal outputted by the one or more detectors of the sensor dock assembly to determine at least one physiological parameter of the subject.

In the above pulse oximetry system or in other implementations as described herein, one or more of the following features can also be provided. In some implementations, the ring member is configured to secure around a nail bed of the subject's pinky finger. In some implementations, the ring member comprises a resilient and flexible material. In some implementations, the dock comprises a base and two arms extending from the base and separated from one another by a gap sized to receive the sensor hub, said arms configured to releasably connect to sides of the sensor hub, and wherein said cable is connected to and extends from said base. In some implementations, the arms of the dock comprise one or more retaining features that are configured to engage one or more corresponding retaining features on the sides of the sensor hub. In some implementations, the one or more retaining features of the arms of the dock comprise one or more protrusions extending from inward facing surfaces of said arms; and the one or more corresponding retaining features on the sides of the sensor hub comprise one or more recesses configured to receive said one or more protrusions. In some implementations, the dock comprises an electrical connector in electrical communication with the cable that engages an electrical connector of the sensor hub when the sensor hub is connected to the dock. In some implementations, the arms of the dock each comprise one or more strap loops configured to be coupled with the strap. In some implementations, when the sensor dock assembly is secured to the subject's wrist and the ring member is secured to said pinky finger, the cable extends from the dock in a direction away from a hand of the subject and is bent towards the subject's pinky finger to connect to the one or more emitters and the one or more detectors. In some implementations, the cable comprises a first end connected to the dock and a second end opposite the first end; and the cable is split into a first portion and a second portion at the second end, said first portion connected to the one or more emitters and said second portion connected to the one or more detectors. In some implementations, when the ring member is secured to the subject's pinky finger: the first portion of the cable extends around said outside edge and/or extends along a portion of a top of the subject's pinky finger; and the second portion of the cable extends around said outside edge and/or extends along a portion of a bottom of the subject's pinky finger. In some implementations, the one or more emitters are disposed within an emitter housing and the one or more detectors are disposed within a detector housing. In some implementations, the ring member comprises a body comprising: an opening configured to receive a portion of the subject's pinky finger therethrough; a first cavity sized and shaped to receive the emitter housing; and a second cavity sized and shaped to receive the detector housing. In some implementations, the body of the ring member comprises a first notch configured to receive the first portion of the cable at the second end and a second notch configured to receive the second portion of the cable at the second end, wherein said first notch is positioned adjacent the first cavity and said second notch is positioned adjacent the second cavity. In some implementations, the ring member further comprises: a first cavity opening extending through a portion of the body into the first cavity, said first cavity opening sized and shaped to correspond with a size and a shape of a first protrusion that extends from the emitter housing; and a second cavity opening extending through a portion of the body into the second cavity, said second cavity opening sized and shaped to correspond with a size and a shape of a second protrusion that extends from the detector housing. In some implementations, when the emitter housing is disposed within the first cavity of the ring member, the first protrusion of the emitter housing is positioned within the first cavity opening; and when the detector housing is disposed within the second cavity of the ring member, the second protrusion of the detector housing is positioned within the second cavity opening. In some implementations, said first protrusion is at least one of shaped and sized different than said second protrusion. In some implementations, the pulse oximetry system further comprises an optical transmission material configured to be positioned between the one or more emitters and said tissue when the ring member is secured to the subject's pinky finger. In some implementations, the optical transmission material is configured to focus or diffuse optical radiation emitted from said one or more emitters. In some implementations, the optical transmission material comprises a lens or a diffuser. In some implementations, the pulse oximetry system further comprises an optical transmission material configured to be positioned between the one or more detectors and said tissue when the ring member is secured to the subject's pinky finger. In some implementations, the optical transmission material is configured to direct optical radiation toward the one or more detectors after passing through said tissue. In some implementations, the optical transmission material comprises a lens. In some implementations, the sensor dock assembly does not comprise a battery. In some implementations, the sensor dock assembly does not comprise a processor. In some implementations, the sensor dock assembly does not comprise a communication module. In some implementations, the sensor dock assembly is configured to transition from a non-operational mode when the sensor hub is disconnected from the dock to an operational mode when sensor hub is connected to the dock. In some implementations, in the operational mode, the pulse oximetry system is configured to determine at least one physiological parameter of the subject. In some implementations, the dock comprises an RFID tag configured to communicate with an RFID reader of the sensor hub. In some implementations, the sensor hub comprises a communication module configured to wirelessly communicate with separate devices. In some implementations, the sensor hub comprises a vibration motor in electrical communication with said one or more hardware processors, and said one or more hardware processors are configured to instruct said vibration motor to cause the sensor hub to vibrate. In some implementations, said one or more hardware processors are configured to: compare said determined at least one physiological parameter to one or more thresholds; and instruct said vibration motor to cause the sensor hub to vibrate based on said comparison of said determined at least one physiological parameter to said one or more thresholds. In some implementations, said second cable retainer comprises a ring configured to secure around the second portion of the subject's pinky finger between the ring member and the subject's palm.

Disclosed herein is a pulse oximetry system configured to secure to a wrist and measure a blood oxygen saturation at a finger of a subject, the pulse oximetry system comprising: a sensor dock assembly and a sensor hub. The sensor dock assembly comprises: a dock configured to be secured to the subject's wrist; a ring member configured to secure around the subject's finger; one or more emitters operably positioned by a first portion of the ring member, the one or more emitters configured to emit optical radiation into tissue of the subject's finger; one or more detectors operably positioned by a second portion of the ring member, the one or more detectors configured to detect at least a portion of the optical radiation emitted from the one or more emitters after passing through said tissue and output at least one signal responsive to the detected optical radiation; and a cable connected to and extending from the dock and in electrical communication with the one or more emitters and the one or more detectors, the cable configured to transmit said at least one signal outputted by the one or more detectors to the dock. The sensor hub is configured to releasably connect to the dock and comprises one or more hardware processors and a battery. When the sensor hub is connected to the dock of the sensor dock assembly: the sensor dock assembly is configured to receive power from the battery of the sensor hub; and the one or more hardware processors of the sensor hub are configured to receive and process said at least one signal outputted by the one or more detectors of the sensor dock assembly to determine at least one physiological parameter of the subject.

In the above pulse oximetry system or in other implementations as described herein, one or more of the following features can also be provided. In some implementations, the subject's finger comprises a pinky finger. In some implementations, the ring member is configured to secure around a nail bed of the subject's finger. In some implementations, the ring member comprises a resilient and flexible material. In some implementations, the second portion of the ring member is opposite the first portion of the ring member. In some implementations, the dock comprises a base and two arms extending from the base and separated from one another by a gap sized to receive the sensor hub, said arms configured to releasably connect to sides of the sensor hub, and wherein said cable is connected to and extends from said base. In some implementations, the arms of the dock comprise one or more retaining features that are configured to engage one or more corresponding retaining features on the sides of the sensor hub. In some implementations, the one or more retaining features of the arms of the dock comprise one or more protrusions extending from inward facing surfaces of said arms; and the one or more corresponding retaining features on the sides of the sensor hub comprise one or more recesses configured to receive said one or more protrusions. In some implementations, the dock comprises an electrical connector in electrical communication with the cable that engages an electrical connector of the sensor hub when the sensor hub is connected to the dock. In some implementations, the arms of the dock each comprise one or more strap loops configured to be coupled with a strap for securing the dock to the subject's wrist. In some implementations, the pulse oximetry system further comprises a strap configured to secure the dock to the subject's wrist. In some implementations, when the sensor dock assembly is secured to the subject's wrist and the ring member is secured to said pinky finger, the cable extends from the dock in a direction away from a hand of the subject and is bent towards the subject's pinky finger to connect to the one or more emitters and the one or more detectors. In some implementations, the cable is positioned along an outside edge of a palm of the subject and along at least a portion of an outside edge of the subject's pinky finger. In some implementations, the cable is retained in said position by one or more cable retainers configured to secure one or more portions of the cable. In some implementations, disclosed is a system including the pulse oximetry system and one or more cable retainers configured to secure one or more portions of the cable and retain the cable in said position. In some implementations, at least one of said cable retainers is disposed on the dock or on a strap configured to secure the dock to the subject's wrist and comprises a prong configured to secure said one or more portions of the cable. In some implementations, at least one of said cable retainers comprises: a ring configured to secure around the subject's pinky finger between the ring member and the subject's palm; and a prong configured to secure said one or more portions of the cable. In some implementations, the cable comprises a first end connected to the dock and a second end opposite the first end; and the cable is split into a first portion and a second portion at the second end, said first portion connected to the one or more emitters and said second portion connected to the one or more detectors. In some implementations, when the ring member is secured to the subject's pinky finger: the first portion of the cable extends around said outside edge and/or extends along a portion of a top of the subject's pinky finger; and the second portion of the cable extends around said outside edge and/or extends along a portion of a bottom of the subject's pinky finger. In some implementations, the one or more emitters are disposed within an emitter housing and the one or more detectors are disposed within a detector housing. In some implementations, the ring member comprises a body comprising: an opening configured to receive a portion of the subject's finger therethrough; a first cavity sized and shaped to receive the emitter housing; and a second cavity sized and shaped to receive the detector housing. In some implementations, the body of the ring member comprises a first notch configured to receive a portion of the cable in electrical communication with the one or more emitters and a second notch configured to receive a portion of the cable in electrical communication with the one or more detectors, wherein said first notch is positioned adjacent the first cavity and said second notch is positioned adjacent the second cavity. In some implementations, the body of the ring member comprises: a first cavity opening extending through a portion of the body into the first cavity, said first cavity opening sized and shaped to correspond with a size and a shape of a first protrusion that extends from the emitter housing; and a second cavity opening extending through a portion of the body into the second cavity, said second cavity opening sized and shaped to correspond with a size and a shape of a second protrusion that extends from the detector housing. In some implementations, when the emitter housing is disposed within the first cavity of the ring member, the first protrusion of the emitter housing is positioned within the first cavity opening; and when the detector housing is disposed within the second cavity of the ring member, the second protrusion of the detector housing is positioned within the second cavity opening. In some implementations, said first protrusion is shaped and sized different than said second protrusion. In some implementations, the one or more detectors are at least partially enclosed by a detector shield configured to prevent optical radiation that has not passed through said tissue from reaching the one or more detectors. In some implementations, the pulse oximetry system further comprises an optical transmission material configured to be positioned between the one or more emitters and said tissue when the ring member is secured to the subject's finger. In some implementations, the optical transmission material is configured to focus or diffuse optical radiation emitted from said one or more emitters. In some implementations, the optical transmission material comprises a lens or a diffuser. In some implementations, the pulse oximetry system further comprises an optical transmission material configured to be positioned between the one or more detectors and said tissue when the ring member is secured to the subject's finger. In some implementations, the optical transmission material is configured to direct optical radiation towards the one or more detectors after passing through said tissue. In some implementations, the optical transmission material comprises a lens. In some implementations, the sensor dock assembly does not comprise a battery. In some implementations, the sensor dock assembly does not comprise a processor. In some implementations, the sensor dock assembly does not comprise a communication module. In some implementations, the sensor dock assembly is configured to transition from a non-operational mode when the sensor hub is disconnected from the dock to an operational mode when sensor hub is connected to the dock. In some implementations, in the operational mode, the pulse oximetry system is configured to determine at least one physiological parameter of the subject. In some implementations, the sensor dock assembly comprises an RFID tag configured to communicate with an RFID reader of the sensor hub. In some implementations, the sensor hub comprises a communication module configured to wirelessly communicate with separate devices. In some implementations, the sensor hub comprises a vibration motor in electrical communication with said one or more hardware processors, and said one or more hardware processors are configured to instruct said vibration motor to cause the sensor hub to vibrate. In some implementations, said one or more hardware processors are configured to: compare said determined at least one physiological parameter to one or more thresholds; and instruct said vibration motor to cause the sensor hub to vibrate based on said comparison of said determined at least one physiological parameter to said one or more thresholds.

Disclosed herein is a pulse oximetry system comprising: a finger portion, a wrist portion, a cable, a strap, and a cable retainer. The finger portion is configured to secure to a finger of a subject, the finger portion comprising at least one emitter configured to emit optical radiation into tissue of the subject's finger and at least one detector configured to detect at least a portion of the optical radiation after passing through said tissue, the at least one detector further configured to output at least one signal responsive to the detected optical radiation. The wrist portion is configured for placement on a wrist of the subject, the wrist portion comprising one or more hardware processors. The cable electrically connects the finger portion and the wrist portion together, the cable configured to transmit said at least one signal outputted by the at least one detector to the wrist portion, the one or more hardware processors configured to receive and process said at least one signal to determine at least one physiological parameter of the subject. The strap is configured to be coupled to the wrist portion and secure the wrist portion to the subject's wrist when in use. The cable retainer is connected to the strap and configured to be positioned on a side of the subject's wrist when the strap is in use, the cable retainer configured to secure a portion of the cable and allow the cable to extend along a side of the subject's palm and along at least a portion of the subject's finger.

In the above pulse oximetry system or in other implementations as described herein, one or more of the following features can also be provided. In some implementations, the finger portion comprises a ring member configured to secure around a portion of the subject's finger, an emitter housing that at least partially encloses said at least one emitter, and a detector housing that at least partially encloses said at least one detector, and wherein the ring member is configured to operably position the emitter and detector housings. In some implementations, the cable retainer is integrally formed with the strap. In some implementations, the wrist portion comprises a sensor hub and a dock, the sensor hub comprising said one or more hardware processors, and the dock comprising a base and two arms extending from the base and separated from one another by a gap sized to receive the sensor hub, said arms configured to releasably slidably connect to sides of the sensor hub. In some implementations, the cable comprises a first end connected to the wrist portion and a second end opposite the first end, and the cable is split into a first portion and a second portion at the second end, said first portion connected to the at least one emitter and said second portion connected to the at least one detector.

Disclosed herein is a pulse oximetry system comprising: a finger portion, a wrist portion, a cable, a strap, and a cable retainer. The finger portion is configured to secure to a finger of a subject, the finger portion comprising at least one emitter configured to emit optical radiation into tissue of the subject's finger and at least one detector configured to detect at least a portion of the optical radiation after passing through said tissue, the at least one detector further configured to output at least one signal responsive to the detected optical radiation. The wrist portion is configured for placement on a wrist of the subject, the wrist portion comprising one or more hardware processors. The cable electrically connects the finger portion and the wrist portion together, the cable configured to transmit said at least one signal outputted by the at least one detector to the wrist portion, the one or more hardware processors configured to receive and process said at least one signal to determine at least one physiological parameter of the subject. The strap is configured to be coupled to the wrist portion and secure the wrist portion to the subject's wrist when in use. The cable retainer is connected to the strap and configured to secure a portion of the cable. The wrist portion does not include any cable retainers for securing the cable.

In the above pulse oximetry system or in other implementations as described herein, one or more of the following features can also be provided. In some implementations, the finger portion comprises a ring member configured to secure around a portion of the subject's finger, an emitter housing that at least partially encloses said at least one emitter, and a detector housing that at least partially encloses said at least one detector, and the ring member is configured to operably position the emitter and detector housings. In some implementations, the wrist portion comprises a sensor hub and a dock, the sensor hub comprising said one or more hardware processors, and the dock comprises a base and two arms extending from the base and separated from one another by a gap sized to receive the sensor hub, said arms configured to releasably slidably connect to sides of the sensor hub.

Disclosed herein is a pulse oximetry system configured to secure to a wrist and a finger of a subject, the pulse oximetry system comprising: a dock, an emitter housing, a detector housing, a cable, a ring member, and a sensor hub. The dock is configured to be secured to the subject's wrist. The emitter housing comprises at least one emitter configured to emit optical radiation into tissue of the subject's finger. The detector housing comprises at least one detector configured to detect at least a portion of the optical radiation after passing through said tissue, the at least one detector further configured to output at least one signal responsive to the detected optical radiation. The cable is connected to and extends between the dock and the emitter and detector housings, the cable configured to transmit said at least one signal outputted by the at least one detector to the dock. The ring member is configured to secure around the subject's finger and operably position the emitter and detector housings adjacent the finger, wherein the ring member is configured to removably connect to the emitter and detector housings. The sensor hub is configured to releasably connect to the dock, the sensor hub comprising one or more hardware processors configured to receive and process said at least one signal to determine at least one physiological parameter of the subject.

In the above pulse oximetry system or in other implementations as described herein, one or more of the following features can also be provided. In some implementations, the pulse oximetry system further comprises one or more cable retainers configured to secure portions of the cable when the pulse oximetry system is in use. In some implementations, the cable comprises a first end connected to the dock and a second end opposite the first end, and the cable is split into a first portion and a second portion at the second end, said first portion connected to the at least one emitter and said second portion connected to the at least one detector.

Disclosed herein is pulse oximetry system comprising: a finger portion, a wrist portion, and a cable. The finger portion is configured to secure to a finger of a subject, the finger portion comprising at least one emitter configured to emit optical radiation into tissue of the subject's finger and at least one detector configured to detect at least a portion of the optical radiation after passing through said tissue, the at least one detector further configured to output at least one signal responsive to the detected optical radiation. The wrist portion is configured for placement on a wrist of the subject, the wrist portion comprising one or more hardware processors. The cable electrically connects the finger portion and the wrist portion together, the cable configured to transmit said at least one signal outputted by the at least one detector to the wrist portion, the one or more hardware processors configured to receive and process said at least one signal to determine at least one physiological parameter of the subject, the cable comprising a first end connected to the wrist portion and a second end opposite the first end, the cable comprising a split into a first portion and a second portion at said second end, said first portion connecting to the at least one emitter and said second portion connecting to the at least one detector.

In the above pulse oximetry system or in other implementations as described herein, one or more of the following features can also be provided. In some implementations, when the finger portion is secured to the subject's pinky finger, said first portion and said second portion of the cable straddle a top and a bottom, respectively, of the subject's finger. In some implementations, the pulse oximetry system further comprises at least one strap configured to secure the wrist portion to the subject's wrist, wherein the wrist portion comprises a first component and a second component configured to removably secure to one another, the second component coupled with the at least one strap, and wherein the first component comprises said one or more hardware processors and a battery. In some implementations, the pulse oximetry system further comprises one or more cable retainers configured to secure portions of the cable when the pulse oximetry system is in use. In some implementations, at least one of said one or more cable retainers is configured to permanently or removably attached to a portion of the at least one strap.

Disclosed herein is a pulse oximetry system comprising: a finger portion, a wrist portion, and a cable. The finger portion is configured to secure to a finger of a subject, the finger portion comprising at least one emitter configured to emit optical radiation into tissue of the subject's finger and at least one detector configured to detect at least a portion of the optical radiation after passing through said tissue, the at least one detector further configured to output at least one signal responsive to the detected optical radiation. The wrist portion is configured for placement on a wrist of the subject, the wrist portion comprising one or more hardware processors. The cable electrically connects the finger portion and the wrist portion together, the cable configured to transmit said at least one signal outputted by the at least one detector to the wrist portion, the one or more hardware processors configured to receive and process said at least one signal to determine at least one physiological parameter of the subject.

In the above pulse oximetry system or in other implementations as described herein, one or more of the following features can also be provided. In some implementations, said cable extends from a corner of the wrist portion. In some implementations, the finger portion comprises a ring member configured to secure around a finger of the user, and wherein the ring member is configured to operably position the at least one emitter and the at least one detector relative to the finger when secured thereto. In some implementations, said cable is configured to removably connect to the wrist portion. In some implementations, said cable is configured to permanently connect to the wrist portion. In some implementations, the wrist portion comprises a watch. In some implementations, the pulse oximetry system further comprises at least one strap configured to secure the wrist portion to the subject's wrist, wherein the wrist portion comprises a first component and a second component configured to removably secure to one another, the second component coupled with the at least one strap, and wherein the first component comprises said one or more hardware processors and a battery. In some implementations, said cable extends from a corner of the second component. In some implementations, the second component does not comprise a battery. In some implementations, the first component does not include a display. In some implementations, the first component is configured to receive one or more signals outputted by the at least one detector via the cable and determine one or more physiological parameters based on said one or more signals. In some implementations, the first component is further configured to wirelessly transmit said one or more physiological parameters to a separate device.

Disclosed herein is a pulse oximetry system comprising: a ring member configured to secure around a finger of a subject; an emitter housing configured to be operably positioned by a first portion of the ring member, the emitter housing comprising at least one emitter configured to emit optical radiation into tissue of the subject's finger; a detector housing configured to be operably positioned by a second portion of the ring member, the detector housing comprising at least one detector configured to detect at least a portion of the optical radiation after passing through said tissue, the at least one detector further configured to output at least one signal responsive to the detected optical radiation; and a cable having a first end and a second end opposite the first end, wherein the cable is connected to the emitter and detector housings at the second end.

In the above pulse oximetry system or in other implementations as described herein, one or more of the following features can also be provided. In some implementations, said first and second portions of the ring member are opposite one another such that, when the emitter and detector housings are respectively positioned by the first and second portions of the ring member and the ring member is secured around the finger, the at least one emitter and the at least one detector are substantially aligned with one another. In some implementations, the ring member includes a first cavity sized and shaped to retain the emitter housing and a second cavity sized and shaped to retain the detector housing. In some implementations, the first end of the cable is configured to removably connect a wearable device (for example, an electronic device such as a hub and/or a wrist portion as described herein), said wearable device configured to be secured to a wrist of the subject. In some implementations, the first end of the cable is configured to transmit said at least one signal outputted by the at least one detector to the wearable device, and wherein one or more hardware processors of the wearable device are configured to receive and process said at least one signal to determine at least one physiological parameter of the subject. In some implementations, the wearable device comprises a watch. In some implementations, the wearable device comprises at least one strap, a first component comprises a battery and said one or more hardware processors, and a second component coupled to the at least one strap and configure to removably connect to the first component. In some implementations, the first end of the cable is permanently secured to the wearable device. In some implementations, the first end of the cable is removably connectable to the wearable device. In some implementations, the cable splits into a first portion and a second portion at the second end, and wherein the first portion connects to the emitter housing and wherein the second portion connects to the detector housing.

Disclosed herein is a pulse oximetry system comprising: a wrist portion configured for placement on a wrist of a subject, the wrist portion comprising a first component and a second component configured to removably secure to one another, the first component comprising one or more hardware processors and a battery, the second component comprising at least one emitter configured to emit optical radiation into tissue of the subject's wrist and at least one detector configured to detect at least a portion of the optical radiation reflected from said tissue, the at least one detector further configured to output at least one signal responsive to the detected optical radiation; and at least one strap configured to secure the wrist portion to the subject's wrist; wherein the one or more hardware processors of the first component are configured to receive and process said at least one signal to determine at least one physiological parameter of the subject when the first component and the second component are secured to one another.

In the above pulse oximetry system or in other implementations as described herein, one or more of the following features can also be provided. In some implementations, the first component is further configured to wirelessly transmit said one or more physiological parameters to a separate device. In some implementations, the first component does not comprise a display. In some implementations, said at least one strap is coupled to the second component. In some implementations, the pulse oximetry system further comprises: a finger portion configured to secure to a finger of the subject, the finger portion comprising at least one emitter configured to emit optical radiation into tissue of the subject's finger and at least one detector configured to detect at least a portion of the optical radiation after passing through the tissue of the subject's finger, the at least one detector of the finger portion further configured to output at least one signal responsive to the detected optical radiation; and a cable electrically connecting the finger portion and the wrist portion together, the cable configured to transmit said at least one signal outputted by the at least one detector of the finger portion to the wrist portion; wherein the one or more hardware processors of the first component are configured to receive and process said at least one signal from the at least one detector of the finger portion to determine at least one physiological parameter of the subject when the first component and the second component are secured to one another.

Disclosed herein is a pulse oximetry system comprising: a wrist portion configured for placement on a wrist of a subject, the wrist portion comprising a first component and a second component configured to removably secure to one another, the first component comprising one or more hardware processors, a battery, a communication module, at least one ECG electrode configured to measure an ECG of the subject and output at least one signal responsive to the measured ECG, at least one emitter configured to emit optical radiation into tissue of the subject's wrist, and at least one detector configured to detect at least a portion of the optical radiation reflected from said tissue, the at least one detector further configured to output at least one signal responsive to the detected optical radiation; and at least one strap coupled to the second component and configured to secure the wrist portion to the subject's wrist; wherein the one or more hardware processors of the first component are configured to receive and process said at least one signal from the at least one ECG electrode and said at least one signal from the at least one detector to determine at least one physiological parameter of the subject when the first component and the second component are secured to one another; and wherein the communication module of the first component is configured to wirelessly transmit said at least one physiological parameter to a separate device.

In the above pulse oximetry system or in other implementations as described herein, one or more of the following features can also be provided. In some implementations, the first component does not comprise a display. In some implementations, the second component does not comprise a hardware processor, a battery, a memory, or a sensor. In some implementations, the first component secures to the second component by a snap fit by being pressed into the second component from below. In some implementations, the first component is released from the second component by being pressed down from above relative to the second component. In some implementations, the first component does not electrically communicate with the second component. In some implementations, the pulse oximetry system further comprises: a finger portion configured to secure to a finger of the subject, the finger portion comprising at least one emitter configured to emit optical radiation into tissue of the subject's finger and at least one detector configured to detect at least a portion of the optical radiation after passing through the tissue of the subject's finger, the at least one detector of the finger portion further configured to output at least one signal responsive to the detected optical radiation; and a cable electrically connecting the finger portion and the first component of the wrist portion together, the cable configured to transmit said at least one signal outputted by the at least one detector of the finger portion to the first component of the wrist portion; wherein the one or more hardware processors of the first component are configured to receive and process said at least one signal from the at least one detector of the finger portion to determine at least one physiological parameter of the subject when the first component and the second component are secured to one another.

Disclosed herein is a pulse oximetry system comprising: a wrist portion configured for placement on a wrist of a subject, the wrist portion comprising one or more hardware processors; an emitter housing comprising at least one emitter configured to emit optical radiation into tissue of a finger of the subject; a detector housing comprising at least one detector configured to detect at least a portion of the optical radiation after passing through said tissue, the at least one detector further configured to output at least one signal responsive to the detected optical radiation; a finger portion comprising a first cavity configured to removably receive the emitter housing and a second cavity configured to removably receive the detector housing, said first and second cavities being spaced from one another, wherein the finger portion is configured to secure to the subject's finger and operably position the emitter and detector housings adjacent portions of the subject's finger; and a cable connecting the wrist portion to the emitter and detector housings, the cable configured to transmit said at least one signal outputted by the at least one detector to the wrist portion, the one or more hardware processors configured to receive and process said at least one signal to determine at least one physiological parameter of the subject.

In the above pulse oximetry system or in other implementations as described herein, one or more of the following features can also be provided. In some implementations, the cable comprises a first end connected to the wrist portion and a second end opposite the first end, wherein the cable splits into a first portion and a second portion at said second end, said first portion of the cable connecting to the at least one emitter and said second portion of the cable connecting to the at least one detector. In some implementations, said finger is a pinky finger of the subject, and wherein when the finger portion is secured to said pinky finger, said first portion and said second portion of the cable straddle a top and a bottom, respectively, of the subject's pinky finger. In some implementations, the pulse oximetry system further comprises a cable retainer configured to secure around a portion of the subject's finger between the finger portion and a palm of the subject, the cable retainer comprising a prong configured to secure a portion of the cable. In some implementations, the first and second cavities of the finger portion are at generally opposite portions of the finger portion such that, when the emitter and detector housings are respectively positioned by the first and second cavities, the at least one emitter and the at least one detector are substantially aligned with one another. In some implementations, the finger portion comprises a resilient and flexible material. In some implementations, said cable does not extend from a side of the wrist portion that faces towards a hand of the subject when the wrist portion is placed on the wrist of the subject. In some implementations, said cable extends from a corner of the wrist portion that faces away from a hand of the subject when the wrist portion is placed on the wrist of the subject.

Disclosed herein is a pulse oximetry system comprising: a wrist portion configured for placement on a wrist of a subject, the wrist portion comprising one or more hardware processors; an emitter housing comprising at least one emitter configured to emit optical radiation into tissue of a finger of the subject; a detector housing comprising at least one detector configured to detect at least a portion of the optical radiation after passing through said tissue, the at least one detector further configured to output at least one signal responsive to the detected optical radiation; a cable connecting the wrist portion to the emitter and detector housings, the cable configured to transmit said at least one signal outputted by the at least one detector to the wrist portion, the one or more hardware processors configured to receive and process said at least one signal to determine at least one physiological parameter of the subject; a first ring member configured to secure to the subject's finger, the first ring member further configured to removably receive the emitter and detector housings and operably position the emitter and detector housings adjacent portions of the subject's finger; and a second ring member configured to secure to the subject's finger, the second ring member further configured to removably receive the emitter and detector housings and operably position the emitter and detector housings adjacent portions of the subject's finger; wherein the second ring member has a different size than the first ring member.

In the above pulse oximetry system or in other implementations as described herein, one or more of the following features can also be provided. In some implementations, each of the first and second ring members comprises a resilient and flexible material. In some implementations, the first and second ring members comprise the same material. In some implementations, each of the first and second ring members comprises an opening configured to receive the subject's finger, and wherein the opening of the second ring member is smaller than the opening of the first ring member. In some implementations, the first ring member comprises a first cavity configured to removably receive the emitter housing and a second cavity configured to removably receive the detector housing; and the second ring member comprises a first cavity configured to removably receive the emitter housing and a second cavity configured to removably receive the detector housing. In some implementations, at least one of: the first cavity of the first ring member comprises a same size as the first cavity of the second ring member; and the second cavity of the first ring member comprises a same size as the second cavity of the second ring member. In some implementations, at least one of: said first and second cavities of the first ring member are spaced from one another; and said first and second cavities of the second ring member are spaced from one another. In some implementations, at least one of: said first and second cavities of the first ring member are substantially aligned with one another along a first axis that is perpendicular to a second axis that extends through a center of the first ring member; and said first and second cavities of the second ring member are substantially aligned with one another along a third axis that is perpendicular to a fourth axis that extends through a center of the second ring member.

For purposes of summarizing the disclosure, certain aspects, advantages and novel features of several implementations have been described herein. It is to be understood that not necessarily all such advantages are achieved in accordance with any particular implementation of the technology disclosed herein. Thus, the implementations disclosed herein can be implemented or carried out in a manner that achieves or optimizes one advantage or group of advantages as taught herein without necessarily achieving other advantages that can be taught or suggested herein.

BRIEF DESCRIPTION OF THE DRAWINGS

Certain features of this disclosure are described below with reference to the drawings. The illustrated implementations are intended to illustrate, but not to limit, the implementations. Various features of the different disclosed implementations can be combined to form further implementations, which are part of this disclosure.

FIGS. 4A-4D illustrate perspective views of the dock of the sensor dock assembly of FIG. 3 in accordance with aspects of this disclosure.

FIGS. 5A-5B illustrate perspective views of portions of a cable of the sensor dock assembly, the ring member of the sensor dock assembly, and one or more emitters and one or more detectors of the sensor dock assembly of FIG. 3 in accordance with aspects of this disclosure.

FIGS. 6A-6D illustrate perspective views of the ring member of the sensor dock assembly of FIG. 3 in accordance with aspects of this disclosure.

FIGS. 8I-8J illustrate exploded perspective views of the sensor hub of the pulse oximetry system of FIGS. 8A-8B in accordance with aspects of this disclosure.

FIGS. 15A-15J illustrate another implementation of a pulse oximetry system in accordance with aspects of this disclosure.

FIGS. 16A-16F illustrate a pulse oximetry system that is a variant of the pulse oximetry system of FIGS. 15A-15J in accordance with aspects of this disclosure.

FIGS. 17A-17G illustrate a pulse oximetry system that is a variant of the pulse oximetry systems of FIG. 15K and FIGS. 16A-16F in accordance with aspects of this disclosure.

FIGS. 18A-18M illustrate another implementation of a pulse oximetry system in accordance with aspects of this disclosure.

FIGS. 19A-19B illustrate a pulse oximetry system that is a variant of the pulse oximetry system of FIGS. 18A-18M in accordance with aspects of this disclosure.

FIGS. 20A-20B illustrate a pulse oximetry system that is a variant of the pulse oximetry system of FIGS. 19A-19B in accordance with aspects of this disclosure.

DETAILED DESCRIPTION

Figure 1A:
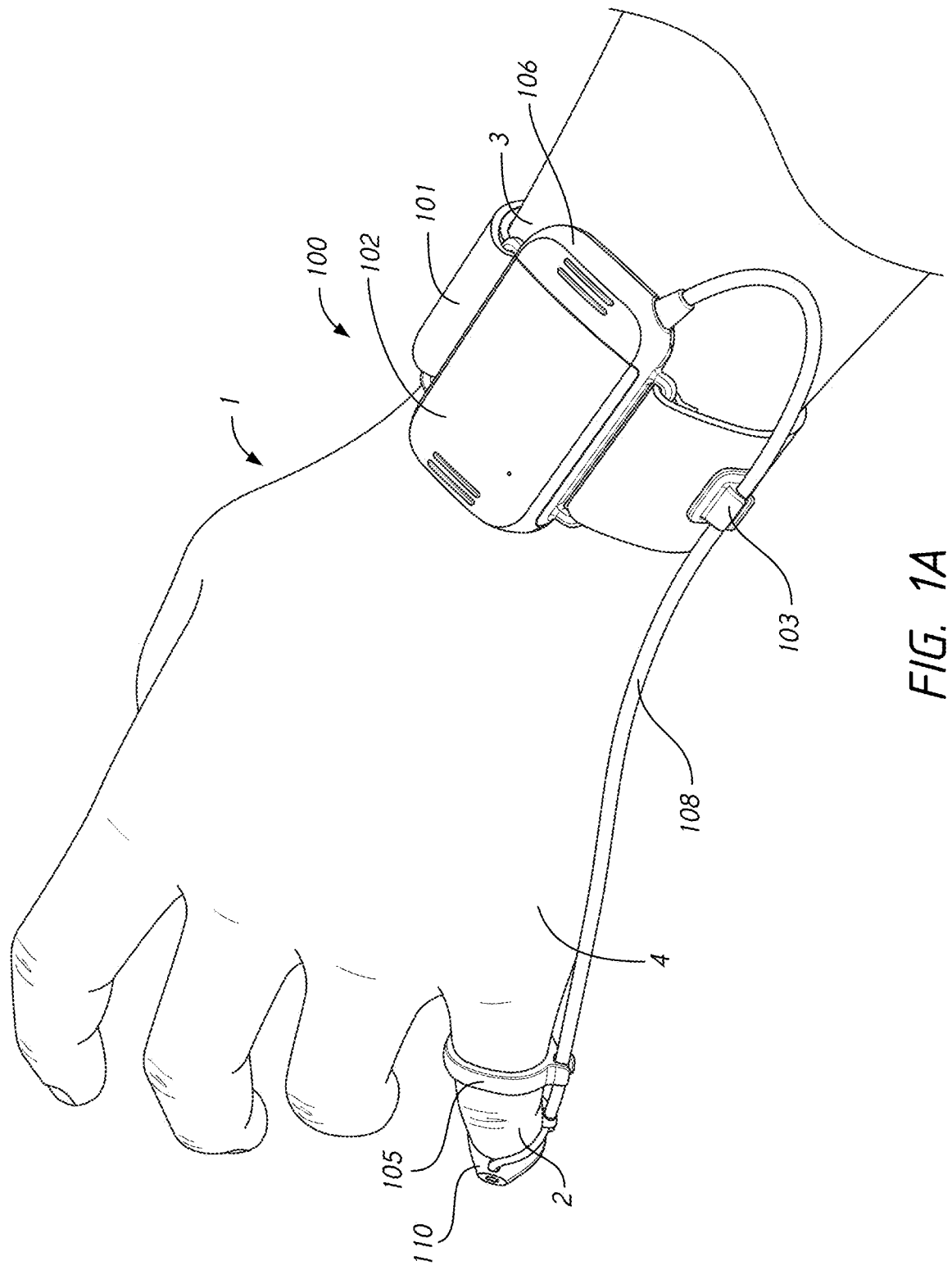
FIGS. 1A-1B illustrate perspective views of a pulse oximetry system secured to a subject's wrist and finger in accordance with aspects of this disclosure.

Various features and advantages of this disclosure will now be described with reference to the accompanying figures. The following description is merely illustrative in nature and is in no way intended to limit the disclosure, its application, or uses. This disclosure extends beyond the specifically disclosed implementations and/or uses and obvious modifications and equivalents thereof. Thus, it is intended that the scope of this disclosure should not be limited by any particular implementations described below. The features of the illustrated implementations can be modified, combined, removed, and/or substituted as will be apparent to those of ordinary skill in the art upon consideration of the principles disclosed herein. Furthermore, implementations disclosed herein can include several novel features, no single one of which is solely responsible for its desirable attributes or which is essential to practicing the systems, devices, and/or methods disclosed herein.

Disclosed herein are pulse oximetry systems that can be used to measure, monitor, transmit (for example, wirelessly or via wired connection), process, and/or determine one or more physiological parameters of a subject (which can also be referred to herein as a "user", "patient", or "wearer"). The disclosed pulse oximetry systems can generate one or more signals associated with and/or indicative of one or more physiological parameters of a subject and process such one or more signals to determine such physiological parameters. In some implementations, the disclosed pulse oximetry systems can generate and transmit one or more signals associated with and/or indicative of one or more physiological parameters of a subject to a separate monitoring, computing, and/or electrical device (for example, wirelessly or via wired connection), for example, a patient monitor, which is capable of processing and/or determining such physiological parameters based on the transmitted signals. Any of the disclosed pulse oximetry systems and/or devices in communication with the pulse oximetry systems can include hardware and/or software capable of determining and/or monitoring a variety of physiological parameters, including but not limited to blood oxygenation levels in veins and/or arteries, heart rate, blood flow, respiratory rates, and/or other physiological parameters or characteristics such as those discussed herein. Any of the pulse oximetry systems described herein can include and/or employ pulse oximetry (for example, via an optical sensor) to measure physiological parameters of the subject and/or to generate, transmit, and/or process one or more signals associated with and/or indicative of such physiological parameters and/or to determine such physiological parameters. As discussed below, such optical sensor can include one or more emitters configured to emit optical radiation (e.g., light) of one or more wavelengths (e.g., wavelength(s) in the visible spectrum, near infrared wavelength(s), infrared wavelength(s), far infrared wavelength(s), etc.) and one or more detectors configured to detect at least a portion of the emitted optical radiation after attenuation and/or after passing through tissue of the subject.

Figure 1B:
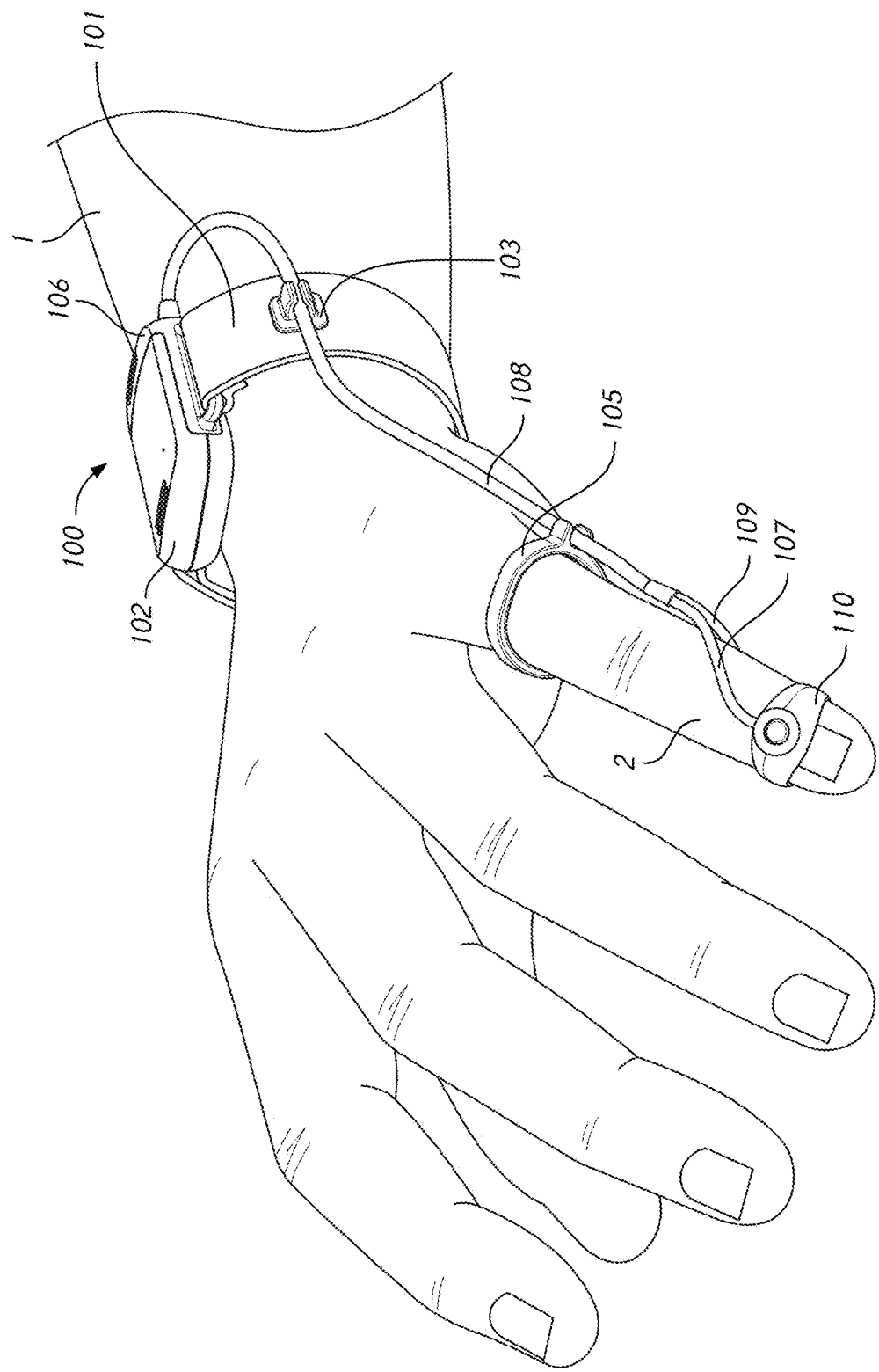

FIG. 1A illustrates a perspective view of a pulse oximetry system 100 (which can also be referred to herein as a "wearable sensor system" or "wearable physiological sensor system") secured to a wrist 3 and a finger 2 of a subject 1. FIG. 1B illustrates another perspective view of the pulse oximetry system 100 of FIG. 1A secured to the subject's wrist 3 and finger 2. System 100 can include a finger portion that can be secured to a finger of a subject (such as a pinky finger) and a wrist portion that can be secured to a subject's wrist. System 100 can further include a cable that connects the finger and wrist portions of system 100. Such finger portion can comprise ring member 110 (and/or one or more emitters and one or more detectors and/or an emitter housing and detector housing such as any of those disclosed herein) described further below. Such wrist portion can comprise sensor hub 102 and/or dock 106 described further below. In some implementations, pulse oximetry system 100 includes a strap 101 and/or a cable 108, which are discussed further below. In some implementations, a cable retainer 103 and/or a cable retainer 105 can be utilized to secure the cable 108 to the subject 1 as shown and discussed further below.

Figure 1C:
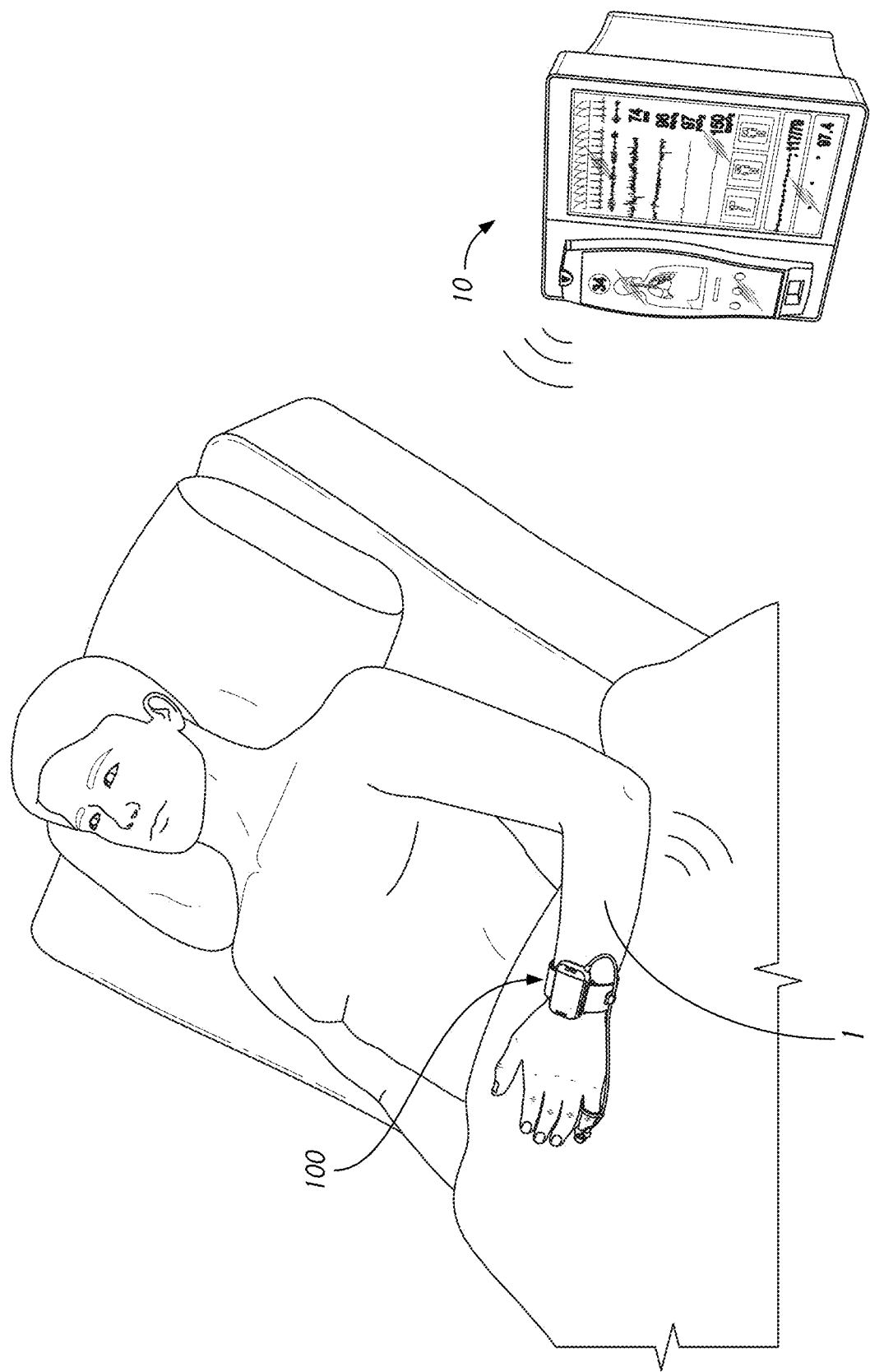
FIG. 1C illustrates the pulse oximetry system of FIG. 1A collecting and wirelessly transmitting physiological data to a computing device in accordance with aspects of this disclosure.

Although FIGS. 1A-1B show the pulse oximetry system 100 secured to the wrist 3 and finger 2 of the subject 1 in a particular manner which can provide certain advantages as described herein, such illustrated manner and/or location of securement is not intended to be limiting. Pulse oximetry system 100 can be secured to various portions of the subject's wrist, hand, and/or finger(s) in a variety of manners and/or using a variety of methods. Alternatively, or in addition, in some implementations the pulse oximetry system 100 can be secured and/or placed adjacent to and/or around portions of a body of the subject 1 other than the wrist 3 and finger 2, such as adjacent to and/or around an ankle and a toe of the subject 1 among other regions of the subject's body. Accordingly, while pulse oximetry system 100 is described herein primarily with reference to a wrist, finger, and/or other portions of a hand of the subject 1, such description is not intended to be limiting, and the pulse oximetry system 100 can be utilized in connection with other portions of the subject's body. Furthermore, even though the pulse oximetry system 100 is shown secured to a left wrist and hand of the subject 1, such positioning is not intended to be limiting and the pulse oximetry system 100 can be secured to a right wrist and hand of the subject 1 in a similar way. FIG. 1C illustrates the pulse oximetry sensor of FIG. 1A secured to the subject 1 and wirelessly communicating with a separate computing device 10, which can be for example, a patient monitor (which can also be referred to herein as an "external patient monitor"), via any of a variety of wireless communication protocols (such as any of those discussed herein). The pulse oximetry system 100 can wirelessly transmit subject physiological data and/or physiological parameters to the separate computing device 10 as described further herein.

In some implementations, the pulse oximetry sensor(s) described herein (for example, pulse oximetry sensors 100 and 400) can be similar or identical to and/or incorporate any of the features described with respect to any of the devices, assemblies, and/or systems described and/or illustrated in U.S. Pat. Pub. No. US2020/0138288, filed Oct. 10, 2019, titled "SYSTEM FOR TRANSMISSION OF SENSOR DATA USING DUAL COMMUNICATION PROTOCOL," which is hereby incorporated by reference in its entirety and for all purposes.

Figure 2A:
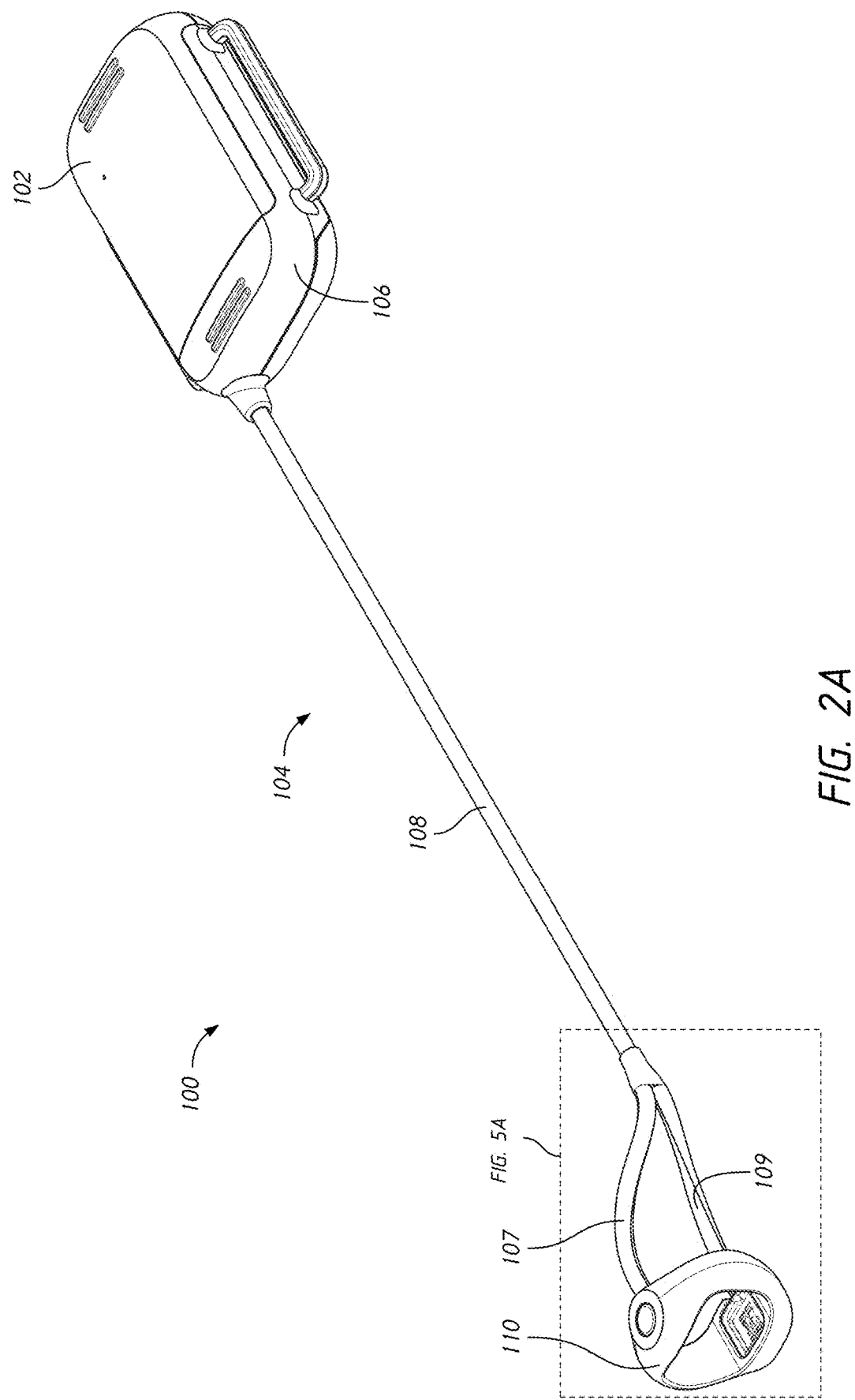
FIG. 2A illustrates a perspective view of the pulse oximetry system of FIG. 1A in accordance with aspects of this disclosure.
Figure 2B:
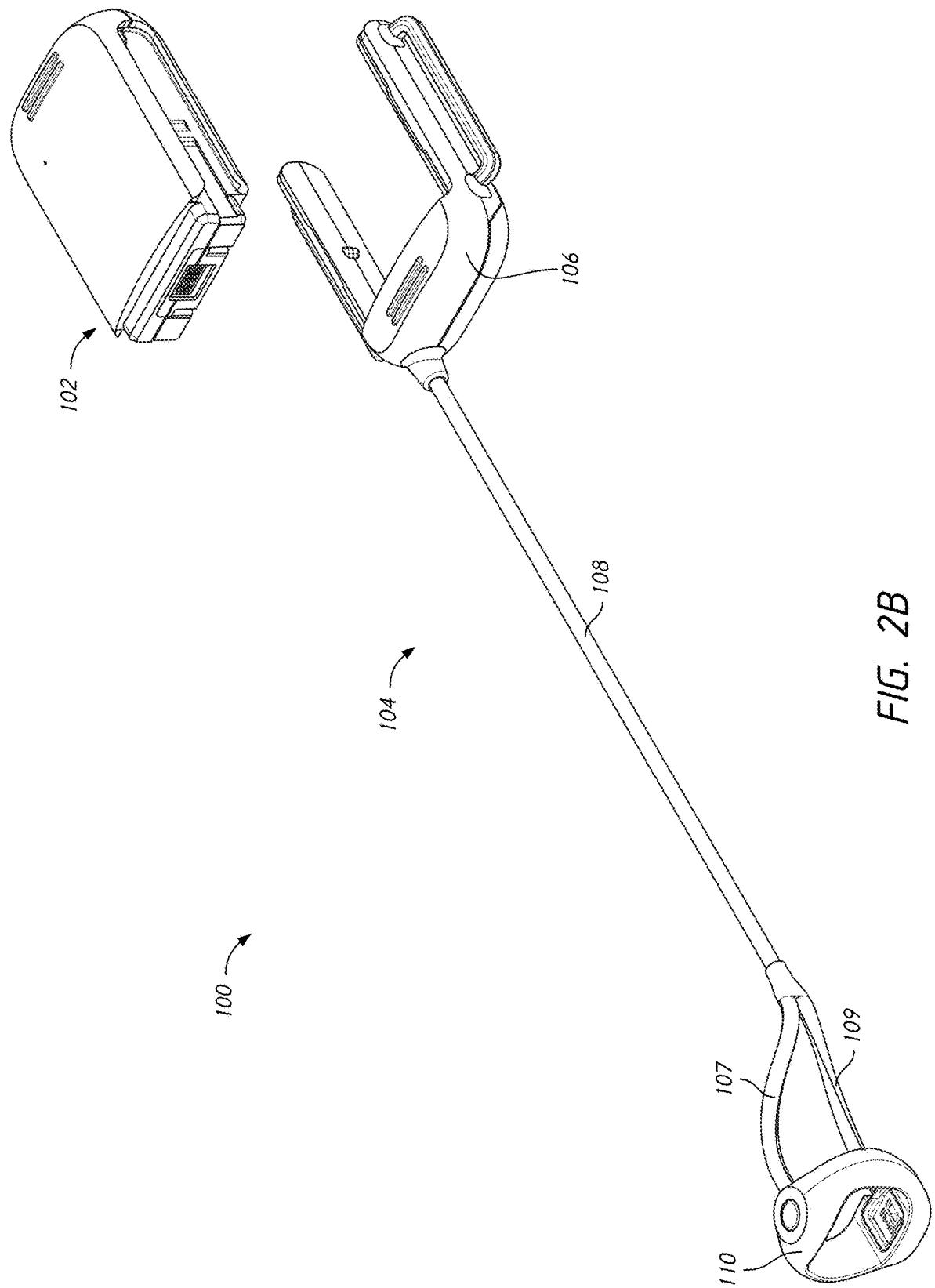
FIG. 2B illustrates a perspective view of the pulse oximetry system of FIG. 1A with a sensor hub detached from a dock of a sensor dock assembly in accordance with aspects of this disclosure.

FIGS. 2A-2B illustrate perspective views of the pulse oximetry system 100 of FIG. 1A. As shown, the pulse oximetry system 100 can include a sensor dock assembly 104 and a sensor hub 102. As discussed in more detail below and as shown in FIGS. 2A-2B, the sensor hub 102 can be removably connectable to the sensor dock assembly 104. The sensor dock assembly 104 can include a dock 106, a cable 108, and a ring member 110. The sensor dock assembly 104 can additionally include one or more emitters (for example, emitter(s) 112 discussed with reference to FIG. 2C) and one or more detectors (for example, detector(s) 114 discussed with reference to FIG. 2C) to allow for pulse oximetry as further described herein. In some implementations, the pulse oximetry system 100 can include the dock 106, the cable 108, the ring member 110, one or more emitters, one or more detectors, and the sensor hub 102. As described in more detail below, the ring member 110 can secure to a finger 2 of a subject 1 and can operably position one or more emitters and one or more detectors relative to the finger 2. The cable 108 can extend between the ring member 110 and the dock 106. The cable 108 can be mechanically and electrically connected to and extend from the dock 106 and be in electrical communication with the one or more emitters 112 and the one or more detectors 114 of the sensor dock assembly 104. In some implementations and as shown in FIGS. 2A-2B, the cable 108 can have a first end connected to the dock 106 and a second end opposite such first end which can be positioned adjacent and/or can engage the ring member 110. In some implementations, such second end of the cable 108 splits into a first portion 107 and a second portion 109, with the first portion 107 connecting to the one or more emitters 112 and the second portion 109 connecting to the one or more detectors 114. In some implementations, the pulse oximetry system 100 includes an emitter package 134 (shown in FIG. 3) comprising the one or more emitters 112. Similarly, in some implementations the pulse oximetry system 100 includes a detector package 136 (shown in FIG. 3) comprising the one or more detectors 114. Further, in some implementations the pulse oximetry system 100 includes an emitter housing 130 (shown in FIG. 5B) configured to contain the emitter package 134 comprising the one or more emitters 112. The ring member 110 can be configured to receive the emitter housing 130 to operably position the one or more emitters 112. Similarly, in some implementations the pulse oximetry system 100 includes a detector housing 132 (shown in FIG. 5A) configured to contain the detector package 136 comprising the one or more detectors 114. The ring member 110 can be configured to receive the detector housing 132 to operably position the one or more detectors 114.

Figure 2C:
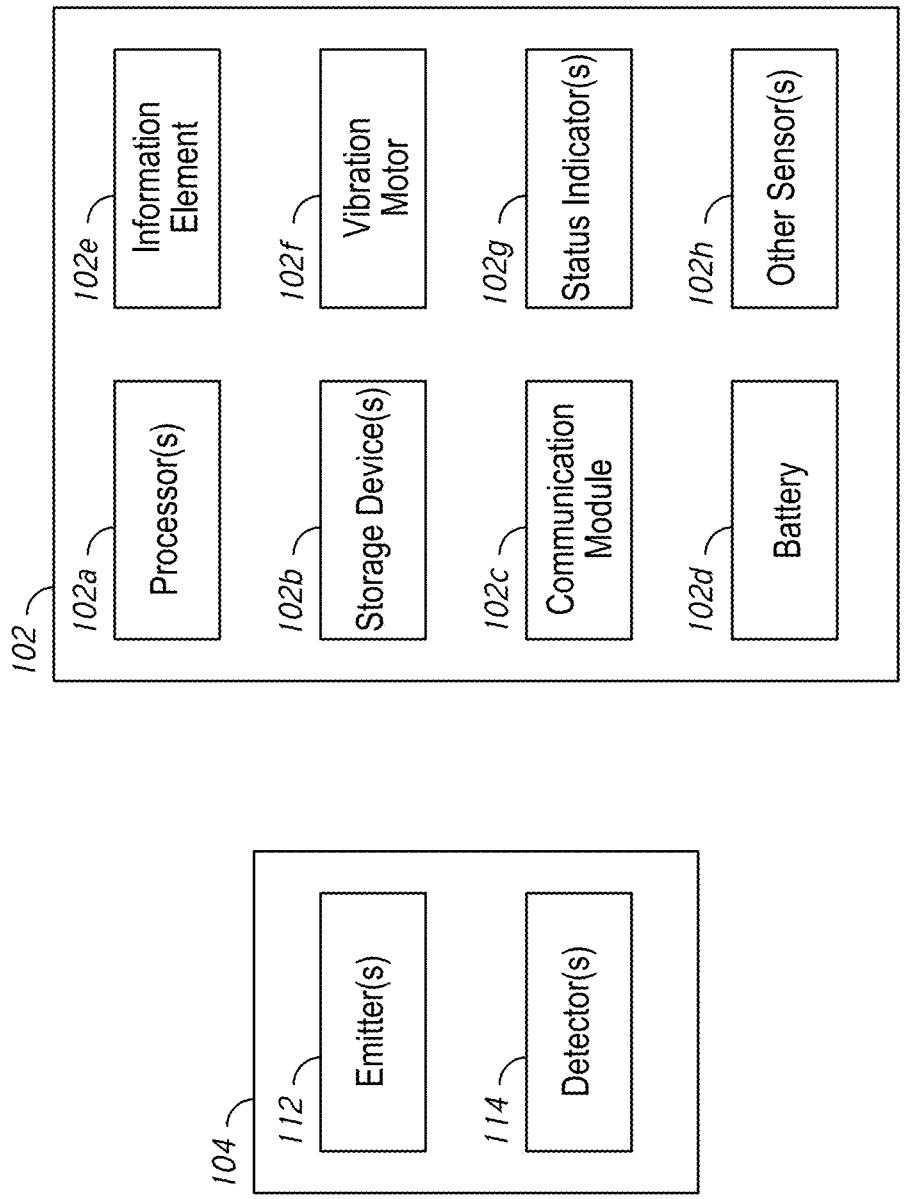
FIG. 2C illustrates a schematic diagram of certain features of the pulse oximetry system of FIG. 1A in accordance with aspects of this disclosure.

FIG. 2C illustrates a schematic diagram of certain features which can be incorporated in pulse oximetry system 100 as well as any other implementations of pulse oximetry sensor(s) described herein. As shown, the sensor dock assembly 104 can include one or more emitters 112 and one or more detectors 114. Also shown, the sensor hub 102 can include one or more processors 102a, one or more storage devices 102b, a communication module 102c, a battery 102d, an information element 102e, a vibration motor 102f, one or more status indicators 102g, and/or one or more other sensors 102h.

The one or more emitters 112 and the one or more detectors 114 of the pulse oximetry system 100 can be utilized to obtain physiological information indicative of one or more physiological parameters of the subject. These parameters can include various blood analytes such as oxygen, carbon monoxide, methemoglobin, total hemoglobin, glucose, proteins, glucose, lipids, a percentage thereof (for example, concentration or saturation), and the like. The one or more emitters 112 and the one or more detectors 114 of the pulse oximetry system 100 can also be used to obtain a photoplethysmograph, a measure of plethysmograph variability, pulse rate, a measure of blood perfusion, and the like. Information such as oxygen saturation ($SpO_2$), pulse rate, a plethysmograph waveform, respiratory effort index (REI), acoustic respiration rate (RRa), EEG, ECG, pulse arrival time (PAT), perfusion index (PI), pleth variability index (PVI), methemoglobin (MetHb), carboxyhemoglobin (CoHb), total hemoglobin (tHb), and/or glucose, can be obtained from pulse oximetry system 100 and data related to such information can be processed and/or transmitted by the pulse oximetry system 100 (for example, via communication module 102c) to a separate computing device 10 (such as a computing device at a caregiver's workstation, a patient monitor, and/or a mobile phone). The one or more emitters 112 and the one or more detectors 114 can be optically based and, for example, utilize optical radiation. Further, the one or more emitters 112 can serve as a source of optical radiation that can be directed towards tissue of the subject 1 when the pulse oximetry system 100 is in use. The pulse oximetry system 100 can include one, two, three, four, five, six, seven, or eight or more emitters 112 and/or one, two, three, four, five, six, seven, or eight or more detectors 114. The one or more emitters 112 can be one or more light-emitting diodes (LEDs) (for example, such as low-power, high-brightness LEDs), laser diodes, incandescent bulbs with appropriate frequency-selective filters, and/or any other source(s) of optical radiation and/or any combinations of the same, or the like. The one or more emitters 112 can emit optical radiation of one or more wavelengths and can emit visible and near-infrared optical radiation. The one or more emitters 112 can be similar or identical to any of the emitters discussed in U.S. Pat. No. 9,277,880, filed Jul. 1, 2010, titled "MULTI-STREAM DATA COLLECTION SYSTEM FOR NONINVASIVE MEASUREMENT OF BLOOD CONSTITUENTS," which is hereby incorporated by reference in its entirety and for all purposes. The one or more detectors 114 can be configured to detect optical radiation generated by the one or more emitters 112. The one or more detectors 114 can detect optical radiation that attenuates through and/or is reflected by tissue of the subject 1, for example, tissue of the subject's finger 2. The one or more detectors 114 can output one or more signals responsive to the detected optical radiation. In some implementations, the one or more detectors 114 can be one or more photodiodes, phototransistors, or the like. The one or more detectors 114 can be similar or identical to any of the detectors discussed in U.S. Pat. No. 9,277,880 incorporated by reference herein.

The one or more processors 102a can be configured, among other things, to process data, execute instructions to perform one or more functions, and/or control the operation of the pulse oximetry system 100. For example, the one or more processors 102a can control operation of the one or more emitters 112, the one or more detectors 114, and/or the one or more other sensors 102h of the pulse oximetry system 100. As another example, the one or more processors 102a can process signals and/or physiological data received and/or obtained from the one or more detectors 114 and/or the one or more other sensors 102h of the pulse oximetry system 100. Further, the one or more processors 102a can execute instructions to perform functions related to storing and/or transmitting such signals and/or physiological data received and/or obtained from the one or more detectors 114 and/or the one or more other sensors 102h of the pulse oximetry system 100. The processor 102a can execute instructions to perform functions related to storing and/or transmitting any or all of such received data.

The one or more storage devices 102b can include one or more memory devices that store data, including without limitation, dynamic and/or static random access memory (RAM), programmable read-only memory (PROM), erasable programmable read-only memory (EPROM), electrically erasable programmable read-only memory (EEPROM), and the like. Such stored data can be processed and/or unprocessed physiological data obtained from the pulse oximetry system 100, for example.

The communication module 102c can facilitate communication (via wires and/or wireless connection) between the pulse oximetry system 100 (and/or components thereof) and separate devices, such as separate monitoring, computing, electrical, and/or mobile devices. For example, the communication module 102c can be configured to allow the pulse oximetry system 100 to wirelessly communicate with other devices, systems, and/or networks over any of a variety of communication protocols. The communication module 102c can be configured to use any of a variety of wireless communication protocols, such as Wi-Fi (802.11x), Bluetooth®, ZigBee®, Z-wave®, cellular telephony, infrared, near-field communications (NFC), RFID, satellite transmission, proprietary protocols, combinations of the same, and the like. The communication module 102c can allow data and/or instructions to be transmitted and/or received to and/or from the pulse oximetry system 100 and separate computing devices. The communication module 102c can be configured to transmit (for example, wirelessly) processed and/or unprocessed physiological parameters, data and/or other information to one or more separate computing devices, which can include, among others, a patient monitor, a mobile device (for example, an iOS or Android enabled smartphone, tablet, laptop), a desktop computer, a server or other computing or processing device for display and/or further processing, among other things. Such separate computing devices can be configured to store and/or further process the received physiological parameters, data, and/or other information, to display information indicative of or derived from the received parameters, data, and/or information, and/or to transmit information—including displays, alarms, alerts, and notifications—to various other types of computing devices and/or systems that can be associated with a hospital, a caregiver (for example, a primary care provider), and/or a user (for example, an employer, a school, friends, family) that have permission to access the subject's data. As another example, the communication module 102c of the pulse oximetry system 100 can be configured to wirelessly transmit processed and/or unprocessed obtained physiological parameters, data, information and/or other information (for example, motion and/or location data) to a mobile phone which can include one or more hardware processors configured to execute an application that generates a graphical user interface displaying information representative of the processed or unprocessed physiological parameters, data, information and/or other information obtained from the pulse oximetry system 100. The communication module 102c can be and/or include a wireless transceiver.

The battery 102d can provide power for hardware components of the pulse oximetry system 100 described herein. The battery 102d can be rechargeable. For example, the battery 102d can be a lithium, a lithium polymer, a lithium-ion, a lithium-ion polymer, a lead-acid, a nickel-cadmium, or a nickel-metal hydride battery. In some implementations, the battery 102d can be non-rechargeable. Additionally or alternatively, the pulse oximetry system 100 can be configured to obtain power from a power source that is external to the pulse oximetry system 100. For example, the pulse oximetry system 100 can include or can be configured to connect to a cable which can itself connect to an external power source to provide power to the pulse oximetry system 100.

The information element 102e can be a memory storage element that stores, in non-volatile memory, information used to help maintain a standard of quality associated with the pulse oximetry system 100. Illustratively, the information element 102e can store information regarding whether the pulse oximetry system 100 has been previously activated and whether the pulse oximetry system 100 has been previously operational for a prolonged period of time, such as, for example, four hours, one day, two days, five days, ten days, twenty days, a month, multiple months, or any period of time. The information stored in the information element 102e can be used to help detect improper re-use of the pulse oximetry system 100, for example.

The vibration motor 102f can be configured to vibrate one or more portions of the pulse oximetry system 100 (for example, the sensor hub 102 and/or the dock 106 when sensor hub 102 and dock 106 are coupled together), which in turn can vibrate one or more portions of a subject's body when the pulse oximetry system 100 is secured to the subject. For example, vibration motor 102f can be configured to vibrate the sensor hub 102 or portions thereof. The one or more processors 102a can be in communication with vibration motor 102f and can be configured to instruct vibration motor 102f to cause any of such above-described vibration. In some cases, the vibration motor 102f can be utilized to provide haptic feedback to the subject when the pulse oximetry system 100 is secured to the subject. In some implementations, the pulse oximetry system 100 can be configured to cause vibration of and/or provide haptic feedback to one or more portions of the subject's body (when the pulse oximetry system 100 is secured to the subject) via the vibration motor 102f responsive to one or more physiological parameters determined by pulse oximetry system 100 and/or by any devices (such as separate computing, electrical, and/or mobile devices, for example, a patient monitor 10) in communication with the pulse oximetry system 100. The one or more processors 102a can instruct the vibration motor 102f to cause vibration, cease vibrating, and/or instruct the vibration motor 102f to alter a characteristic of vibration (for example, increase/reduce vibration rate, increase/reduce vibration strength, change vibration pattern, etc.) responsive to the one or more determined physiological parameters. Such action by the one or more processors 102a can dynamically track with physiological parameter determination over time, for example. As an example, in some implementations, the one or more processors 102a can provide instructions to vibration motor 102f (such as those discussed above) responsive to a condition of the subject using the pulse oximetry system 100. For example, if one or more physiological parameters determined by the pulse oximetry system 100 and/or any devices in communication with the pulse oximetry system 100 are indicative of hypoxemia (low blood oxygen) when the subject is using the pulse oximetry system 100, the one or more processors 102a can instruct the vibration motor 102f to vibrate to cause the subject to wake up in an attempt to restore proper breathing and/or safe blood oxygen levels. As another example, if one or more physiological parameters determined by the pulse oximetry system 100 and/or any devices in communication with the pulse oximetry system 100 are indicative of edema (swelling caused by excess fluid trapped in body tissue) when the subject is using the pulse oximetry system 100, the one or more processors 102a can instruct the vibration motor 102a to cause vibration of a portion of the subject's body, such as their wrist, forearm, hand, ankle, lower leg, and/or any other portion of the subject's body. In some implementations, the one or more processors 102a and/or any devices in communication with the pulse oximetry system 100 can instruct the vibration motor 102f to cause a vibration if a determined subject physiological parameter of interest meets and/or exceeds a set threshold, meets and/or falls below a set threshold, and/or meets, exceeds, and/or falls below a set range. In some cases, a vibration of the vibration motor 102f can correspond to an alert, an alarm, a notification, and/or any other situation wherein the subject and/or a care provider can need to intervene in the subject's care. In some implementations, the one or more processors 102a can instruct the vibration motor 102f to vibrate responsive to a status of battery 102d (for example, when a charge of the battery 102d drops below a certain threshold). In some implementations, pulse oximetry system 100 can include more than one vibration motor 102f, for example, two, or three or more vibration motors 102f. Vibration motor(s) 102f can be positioned within various portions of the pulse oximetry system 100, for example, within sensor hub 102.

The one or more status indicators 102g can be configured to provide and/or indicate a status of the pulse oximetry system 100 and/or a status of one or more physiological parameters of the subject 1 determined by the pulse oximetry system 100 and/or any devices in communication with the pulse oximetry system 100. In some implementations, the one or more status indicators 102g can be configured to indicate a status of the pulse oximetry system 100, such as whether the pulse oximetry system 100 is in an operational ("on") mode, whether the pulse oximetry system 100 is pairing or has paired with a separate device, whether an error has been detected, and/or a power level of the pulse oximetry system 100 (for example, a charge of battery 102d of sensor hub 102). For example, the one or more status indicators 102g can be configured to light up and/or cast optical radiation of one or more wavelengths from one or more portions of the pulse oximetry system 100. As another example, the one or more status indicators 102g can be configured to light up and/or emit optical radiation from one or more portions of the sensor hub 102 of the pulse oximetry system 100. The one or more processors 102a can be in communication with the one or more status indicators 102g and can be configured to instruct the one or more status indicators 102g to cause any of such above-described status indications and/or lighting. In some cases, the one or more status indicators 102g can be configured to provide optical radiation (e.g., light) feedback to the subject when the pulse oximetry system 100 is secured to the subject and/or when sensor hub 102 and dock 106 are connected together. In some implementations, pulse oximetry system 100 can be configured to cause optical radiation feedback to the subject 1 (when the pulse oximetry system 100 is secured to the subject) responsive to one or more physiological parameters determined by pulse oximetry system 100 and/or by any devices (such as separate computing and/or mobile devices, for example, a patient monitor) in communication with the pulse oximetry system 100. The one or more processors 102a can instruct the one or more status indicators 102g to emit or stop emitting optical radiation and/or instruct the one or more status indicators 102g to alter a characteristic of optical radiation (for example, increase/reduce optical radiation brightness, change optical radiation wavelength and/or color, change a rate of blinking of optical radiation, etc.) responsive to the one or more determined physiological parameters. Such action by the one or more processors 102a can dynamically track with physiological parameter determination over time, for example. As an example, in some implementations, the one or more processors 102a can provide instructions to the one or more status indicators 102g (such as those discussed above) responsive to a condition of the subject using the pulse oximetry system 100. For example, if one or more physiological parameters determined by the pulse oximetry system 100 and/or any devices in communication with the pulse oximetry system 100 are indicative of hypoxemia (low blood oxygen) when the subject is using the pulse oximetry system 100, the one or more processors 102a can instruct the one or more status indicators 102g to produce optical radiation to notify the subject and/or their care providers to restore proper breathing and/or safe blood oxygen levels. As another example, if one or more physiological parameters determined by the pulse oximetry system 100 and/or any devices in communication with the pulse oximetry system 100 are indicative of edema (swelling caused by excess fluid trapped in body tissue) when the subject is using the pulse oximetry system 100, the one or more processors 102a can instruct the one or more status indicators 102g to cause optical radiation to be emitted from the pulse oximetry system 100 as described above. In some implementations, the one or more processors 102a and/or any devices in communication with the pulse oximetry system 100 can instruct the one or more status indicators 102g to cause optical radiation to be emitted if a determined subject physiological parameter of interest meets and/or exceeds a set threshold, meets and/or falls below a set threshold, and/or meets, exceeds, and/or falls below a set range. In some cases, optical radiation emitted from the one or more status indicators 102g can correspond to an alert, an alarm, a notification, and/or any other situation wherein the subject and/or a care provider can need to intervene in the subject's care. The one or more status indicators 102g can be positioned within various portions of the pulse oximetry system 100, for example, within sensor hub 102, such that optical radiation emitted from the one or more status indicators emit out of and/or through a hole and/or opening in the sensor hub 102, such as by status indicator 167 shown in and described with respect to FIGS. 8I and 8J through hole 153 of the sensor hub 102 shown and described with respect to FIGS. 8A, 8B, and 8C.

In some implementations, the pulse oximetry system 100 can include one or more other sensor(s) 102h. The other sensor(s) 102h can include one or more of a temperature sensor, an electrocardiogram (ECG) sensor, a blood pressure monitor, an acoustic sensor, and/or any sensor configured to obtain physiological information indicative of one or more physiological parameters of the subject. Additionally, or alternatively, such other sensor(s) 102h can comprise a motion sensor, for example, including one or more accelerometers and/or gyroscopes, that can be utilized to determine motion and/or position of the subject and/or a portion of the subject's body (for example, wrist 3 and/or finger 2). In some implementations where the pulse oximetry system 100 (for example, sensor hub 102) includes a motion sensor, the processor(s) 102a can determine whether the subject's wrist, hand, and/or finger(s) are moving and, responsive to such determination, not receive, not process, and/or not determine one or more physiological parameters (since such determinations can include inaccuracies because of such movement). The other sensor(s) 102h can be disposed on, within, and/or be operably positioned by any one or more of the aspects of the pulse oximetry system 100. For example, the other sensor(s) can be disposed on, within, and/or be operably positioned by any one or more of the dock 106, the cable 108, and/or the ring member 110 of the sensor dock assembly 104, and/or by the sensor hub 102. As another example, the other sensor(s) can be disposed on, within, and/or be operably positioned by any one or more of the cable retainers of the pulse oximetry system 100 (such as cable retainers 103, 105 described later herein) if included. The other sensor(s) 102*h* can be operably connected to the one or more processors 102*a*, which can control operation of the other sensor(s) 102*h* and/or process data received from the other sensor(s) 102*h*.

Figure 3:
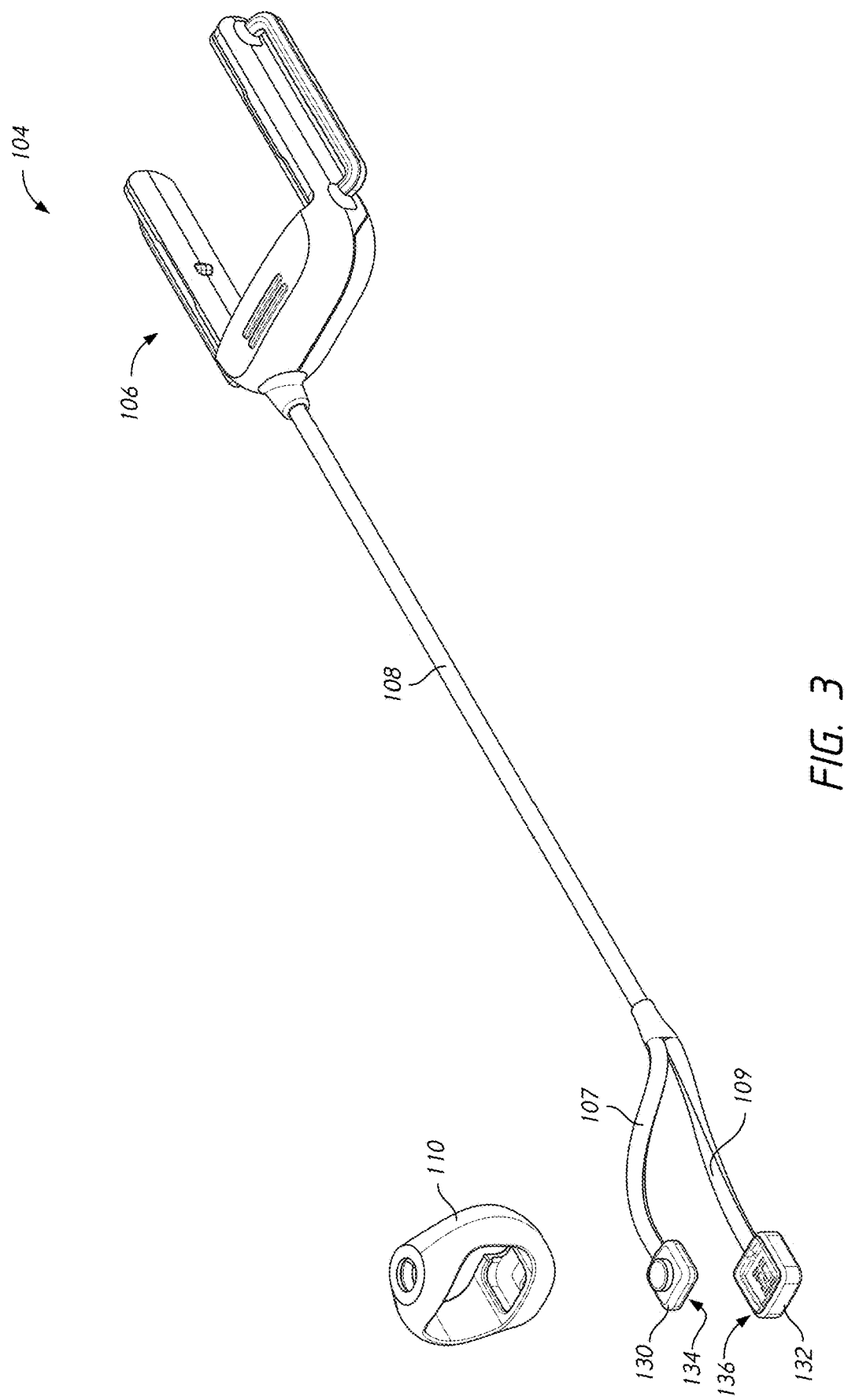
FIG. 3 illustrates a perspective view of the sensor dock assembly of the pulse oximetry system of FIG. 1A with a ring member removed in accordance with aspects of this disclosure.

FIG. 3 illustrates a perspective view of the sensor dock assembly 104 of the pulse oximetry system 100 shown in FIGS. 1A-1C and FIGS. 2A-2B with the ring member 110 removed from the cable 108 and the sensor hub 102 removed from the dock 106. Also shown, and as described above relative to FIGS. 2A-2B, the cable 108, at an end opposite of an end where it connects to the dock 106, can split into a first portion 107 and a second portion 109, with the first portion 107 connecting to the one or more emitters 112 of emitter package 134 and the second portion 109 connecting to the one or more detectors 114 of detector package 136. As mentioned above, an emitter housing 130 can house the emitter package 134 (see FIGS. 7A-7B) that can include the one or more emitters 112, and as such the emitter housing 130 can be connected with the first portion 107 of cable 108 as shown. Similarly and as mentioned above, a detector housing 132 can house the detector package 136 (see FIGS. 7A-7B) that can include the one or more detectors 114, and as such the detector housing 132 can be connected with the second portion 109 of cable 108 as shown. Exemplary implementations of the sensor dock assembly 104 and its components will be described below through FIGS. 4A-4D, 5A-5D, 6A-6J, and 7A-7B.

FIGS. 4A-4D illustrate perspective views of the dock 106 of the sensor dock assembly 104. As shown, the dock 106 can include a base 120 (which can also be referred to herein as a "housing") and arm(s) 122 extending outward from the base 120. The dock 106 can be mechanically and electrically connected to the cable 108 as discussed above through a bend relief 120*a* disposed on a portion of and/or extending outward from the base 120. The dock 106 can be electrically coupled to the one or more emitters 112 in emitter package 134 and the one or more detectors 114 in detector package 136 of the pulse oximetry system 100 via the connection to cable 108 through bend relief 120*a*. The base 120 can include an electrical connector 124 configured to releasably electrically connect the dock 106 (and therefore the cable 108 along with the one or more emitters 112 and the one or more detectors 114) to the sensor hub 102 (not shown). The dock 106 can also include features for mechanically engaging/connecting with the sensor hub 102. For example and as shown, the dock 106 can include arm(s) 122 extending from the base 120. The arm(s) 122 can be configured to releasably mechanically engage/connect with the sensor hub 102 (not shown). In some implementations, when the sensor hub 102 (not shown) is mechanically engaged/connected with the arm(s) 122 of the dock 106, an electrical connector of the sensor hub 102 (for example, electrical connector 151 shown in FIGS. 8A-8B) can releasably mechanically and electrically engage/connect with the electrical connector 124 of the dock 106. The dock 106 can include one or more features configured to secure the dock 106 to the subject 1. For example, as shown in FIGS. 4A-4D, the dock 106 can include one or more strap loop(s) 121 configured to be coupled to a strap (such as strap 101 shown in FIGS. 1A-1B). Such strap loop(s) 121 can be connected to arm(s) 122 as shown and strap 101 can be inserted through and/or around strap loop(s) 121 and around a portion of the subject's body (for example, wrist 3) such that the strap 121 secures the dock 106 to the subject's wrist 3. The dock 106 can include two strap loop(s) 121. The two strap loop(s) 121 can each be disposed along an outer surface of the arm(s) 122 (e.g., disposed on a side opposite of where the sensor hub 102 can engage/connect with the arm(s) 122), such that each arm 122 has a strap loop 121 connected to it and such that each strap loop 121 runs in a direction generally parallel to the arm 122 that it is connected to. As shown, the strap loop(s) 121 can be configured to create a generally elongated opening configured to couple to one or more straps 101 for securing the pulse oximetry system 100 to the subject 1. In some cases, the dock 106 can include one strap loop 121 and a strap configured to secure at one end to such strap loop 121 and at its other end directly to the dock 106. In some implementations, the dock 106 does not include strap loop(s) 121. In some variants, the dock 106 can be secured to the wrist 3 in an alternative manner. For example, in some variants, the dock 106 can be configured to secure to the subject 1 without strap 101, for example, via an adhesive material disposed on a portion of the dock 106 that can secure to the subject's skin, via tape, via a wrap-around strap, or via any other type or form of securement. In some implementations, a strap 101 can be integrated with the dock 106 such that strap loop(s) 121 are not necessary. In some implementations, the dock 106 can include one or more features for aiding in gripping and/or holding the dock 106, such as for gripping and/or holding the dock 106 when connecting and/or disconnecting sensor hub 102 to the dock 106. For example, the dock 106 can include one or more ribs 125 disposed on a portion of the base 120 of the dock 106, the ribs 125 configured to aid in gripping and/or holding the dock 106. The ribs 125 can include generally linear protrusions that protrude out from the surface of the dock 106 and extend along a portion of the dock opposite of where the dock would contact the subject 1 when secured to the subject 1 (e.g., the ribs can be disposed along an "upper" portion of the dock 106). Alternatively, or in addition, in some implementations the dock 106 can include other features configured to aid in gripping and/or holding the dock 106, such as bumps, a roughened surface texture, etc. Further details of exemplary features of the dock 106 are described below.

As shown in FIGS. 4A-4D, in some implementations, the dock 106 has a length and/or a width that are greater than a height of the dock 106. In some implementations, the dock 106 includes two arm(s) 122. The arm(s) 122 of the dock 106 can extend from the base 120 in the same direction such that the dock 106 has a generally U-shaped structure. The arm(s) 122 can be generally parallel to each other, such that a gap is formed between the arm(s) 122. Such a gap can be, for example, sized to accommodate the sensor hub 102 and/or at least a portion of the sensor hub 102. In some implementations, the arm(s) 122 are the same length. Furthermore, the arm(s) 122 can mirror each other in size, shape, and other features. In some implementations, the dock 106 can include one or more retaining features configured to engage the sensor hub 102. For example, each of the arm(s) 122 of the dock 106 can include a protrusion 123 configured to engage with the sensor hub 102 to allow the dock 106 to connect to the sensor hub 102. The protrusion(s) 123 can be disposed along an inner surface of each of the arm(s) 122, such that they face towards the sensor hub 102 when the sensor hub 102 is connected to the dock 106. The protrusion(s) 123 can smoothly transition from the inner surface(s) of the arm(s) 122 such that the sensor hub 102 can slidably engage with the protrusion(s) 123. For example, the protrusion(s) 123 can include ramp-like structures that define a smooth transition between the inner surface of the arm(s) 122 and the maximum "height" of the protrusion(s) 123. As another example, the protrusion(s) 123 can be rounded, have a rounded tip, and/or have a parabolic cross-section that allow for a smooth transition with the inner surface of the arm(s) 122. The protrusion(s) 123 can interact with corresponding recess(es) in the sensor hub 102, which can serve to releasably lock the sensor hub 102 in place with the dock 106. In some implementations, interaction between the protrusion(s) 123 of the dock 106 and recess(es) of the sensor hub 102 can provide tactile feedback to the subject that indicates complete engagement/connection of the sensor hub 102 with the dock 106. Details of such recess(es) of the sensor hub 102 are described later relative to FIGS. 8A-8B and 8E-8F. Any number of retaining features can be provided on the dock 106 to aid in releasably connecting the sensor hub 102 to the dock 106. In some cases, other types of retaining features can be utilized. For example, edges of the arm(s) 122, which can be defined as the transition between the inner surface of the arm(s) 122 and outer surfaces of the arm(s) 122, can be configured to aid in the connection between the dock 106 and the sensor hub 102. In some implementations, the arm(s) 122 are sized and shaped to releasably connect to the sensor hub 102. In some cases, the sensor hub 102 slidably connects to the dock 106.

As discussed above and as shown in FIGS. 4A-4D, the dock 106 can include a bend relief 120*a* configured to mechanically and electrically couple/connect the cable 108 of the pulse oximetry system 100 to the dock 106. In some implementations, the bend relief 120*a* can be disposed on a portion of the base 120 and extend away from the base 120 in a direction generally opposite of the arm(s) 122. The bend relief 120*a* can extend from any portion of the dock 106 and in any direction from the dock 106. The bend relief 120*a* can be disposed on a portion of the dock 106 such that it does not interfere with the sensor hub 102 releasably coupling with the dock 106. In some implementations, the bend relief 120*a* can be disposed on a portion of the dock 106 such that it extends out from the dock in a direction substantially parallel to the arm(s) 122. In some cases, the bend relief 120*a* can be disposed adjacent a corner of the dock 106 and extend from the dock 106 in any direction. In some implementations, for example, as shown in FIGS. 4A-4B, the bend relief 120*a* can be disposed adjacent a corner of the dock 106 and extend from the corner in a direction generally opposite the direction the arm(s) 122 extend from the dock. The bend relief 120*a* can advantageously extend from the dock 106 and position the cable 108 substantially parallel to a portion of the subject's body when the dock 106 is secured to the subject 1 (e.g., such that the cable 108 is substantially parallel to the subject's forearm, allowing for a low-profile).

As discussed above and as shown in FIGS. 4C-4D, the dock 106 can include an electrical connector 124. The electrical connector 124 can be configured to releasably electrically and mechanically connect to a corresponding electrical connector of the sensor hub 102, such that when connected to each other, the sensor hub 102 is placed in electrical communication with the one or more emitters 112 and the one or more detectors 114 of the pulse oximetry system 100. The electrical connector 124 can include any number of pins. For example, with reference to FIGS. 4C-4D, the electrical connector 124 can include 8 pins. In some implementations, the electrical connector 124 includes an alternative number of pins. In some implementations, the electrical connector 124 can include a number of openings that correspond to a number of pins of a corresponding electrical connector of the sensor hub 102. As shown in FIGS. 4C-4D, the electrical connector 124 can be disposed at an inner portion of the base 120 of the dock 106, such that it faces the sensor hub 102 when the sensor hub 102 is connected to the dock 106. In some implementations, the dock 106 can include one or more features to aid in aligning the electrical connector 124 to the corresponding electrical connector of the sensor hub 102. For example, the dock 106 can include walls 126 positioned adjacent the electrical connector 124, and the walls 126 can be configured to aid in releasably connecting the electrical connector 124 with the corresponding electrical connector of the sensor hub 102.

FIGS. 5A-5B illustrate perspective views of the cable 108 splitting into the first portion 107 and the second portion 109, with the first portion 107 connected to the emitter package 134 within emitter housing 130 operably positioned by the ring member 110 and the second portion 109 connected to the detector package 136 within detector housing 132 operably positioned by the ring member 110. The ring member 110 (which is described further below with respect to FIGS. 6A-6J) can comprise a body 140 with an opening 141 configured to receive a portion of the subject's finger 2 therethrough. For example, the opening 141 can be configured to receive a portion of a subject's pinky finger therethrough, such as shown in FIGS. 1A-1C. The ring member 110 can operably position the one or more emitters 112 of the emitter package 134 by positioning the emitter housing 130 such that the one or more emitters 112 are directed to and/or face the opening 141 of the ring member 110. In such a position, the emitter housing 130 can be positioned against and/or adjacent to tissue of the subject's finger, such as a nail bed of the subject's finger. Similarly, the ring member 110 can operably position the one or more detectors 114 of the detector package 136 by positioning the detector housing 132 such that the one or more detector 114 are directed to and/or face the opening 141 of the ring member 110. In such a position, the detector housing 132 can be positioned against and/or adjacent to tissue of the subject's finger. As shown in FIGS. 5A-5B, the detector housing 132 can be positioned by a portion of the ring member 110 opposite a portion that positions the emitter housing 130. Furthermore, in some implementations the detector housing 132 can be positioned on a side of the opening 141 of the ring member 110 that is opposite a side of the opening 141 where the emitter housing 130 is positioned. Thus, detector package 136 can be operably positioned by the ring member 110 such that optical radiation emitted from the emitter package 134 can pass through and/or be attenuated by the tissue and/or the nail of the subject's finger 2 before being detected by the detector package 136. In some implementations, the ring member 110 operably positions the emitter housing 130 and the detector housing 132 such that the one or more emitters 112 and the one or more detectors 114 are generally aimed at one another. In some implementations, the ring member 110 operably positions the emitter housing 130 and the detector housing 132 such that the one or more emitters 112 and the one or more detectors 114 are substantially aligned with one another. As discussed herein, in some implementations, one or more ring members 110 can be provided, each having an opening 141 configured to receive a portion of the subject's finger 2 therethrough. The size of the opening 141 of such one or more ring members 110 can each be different so as to accommodate different sized fingers and/or different portions of a finger. In some implementations, a kit can include one or more of any of the components of the pulse oximetry system 100. For example, a kit can include one or more ring members 110 sized to accommodate fingers and/or portions of fingers of different sizes and any of the features described with respect to pulse oximetry system 100 (and/or any of the other pulse oximetry systems described herein).

Also shown in FIGS. 5A-5B, the first portion 107 and second portion 109 of the cable 108 can extend away from each other after splitting off from the cable 108. Such extension away from each other can advantageously allow a finger 2 of the subject 1 to pass through a gap made between the first portion 107 and the second portion 109. Further shown and in some implementations, the first portion 107 and/or the second portion 109 of the cable 108 can include one or more bends that can allow the first portion 107 and/or the second portion 109 to operably connect to the emitter package 134 within the emitter housing 130 and to the detector package 136 within the detector housing 132, respectively, when the ring member 110 is secured around at least a portion of the subject's finger 2. Further exemplary implementations of how the cable 108, the first portion 107, and the second portion 109 can be routed and/or positioned along the subject 1 are discussed further below. In some implementations (not shown), the cable 108 does not split into first and second portions but can instead connect as a singular cable to the ring member 110 (for example, to a side and/or end of the ring member 110, such a side and/or end of the ring member 110 that faces towards the dock 106 when the pulse oximetry system 100 is worn by/secured to the subject 1).

Figure 5C:
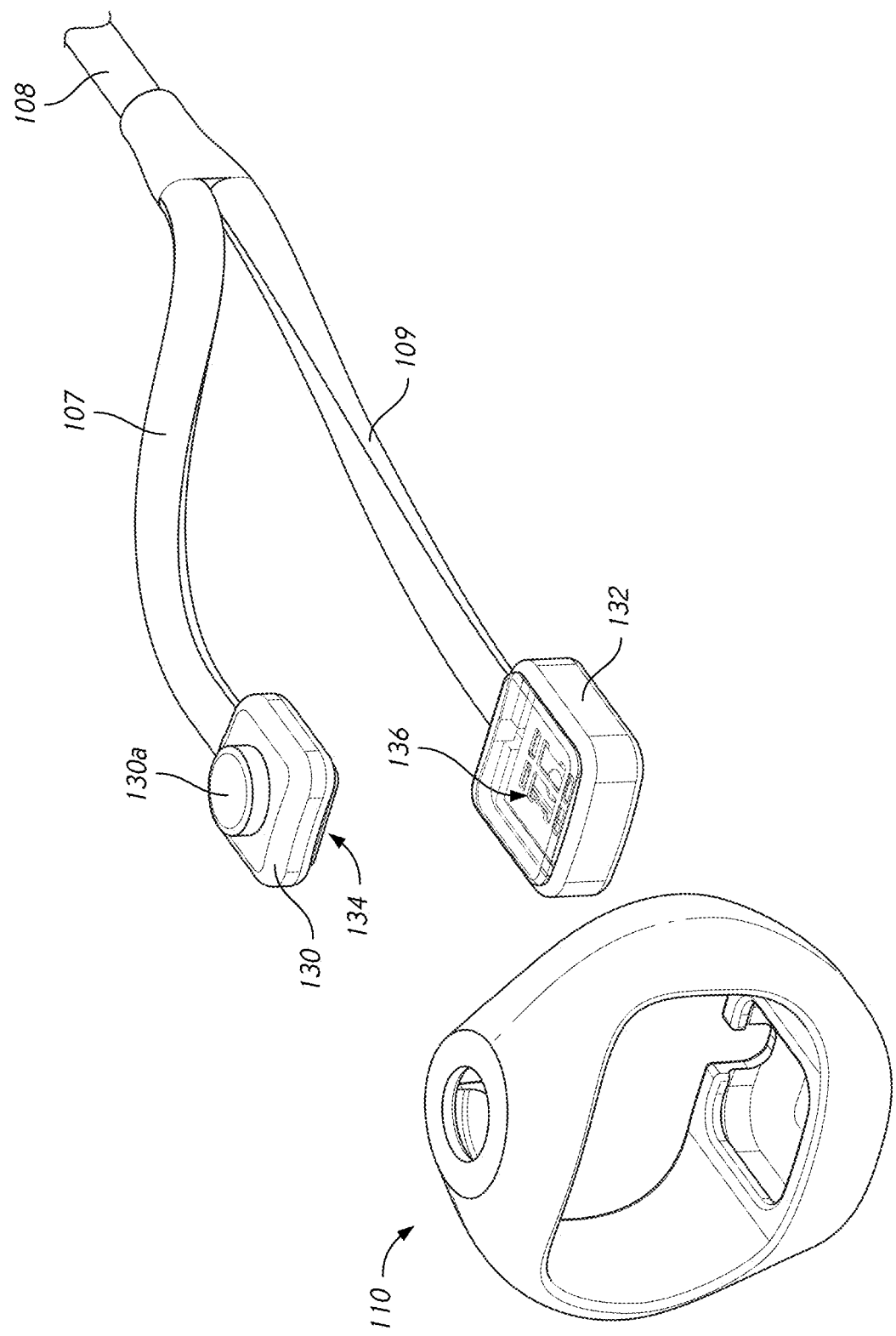
FIGS. 5C-5D illustrate perspective views of portions of a cable of the sensor dock assembly and the ring member removed from one or more emitters and one or more detectors of the sensor dock assembly of FIG. 3 in accordance with aspects of this disclosure.
Figure 5D:
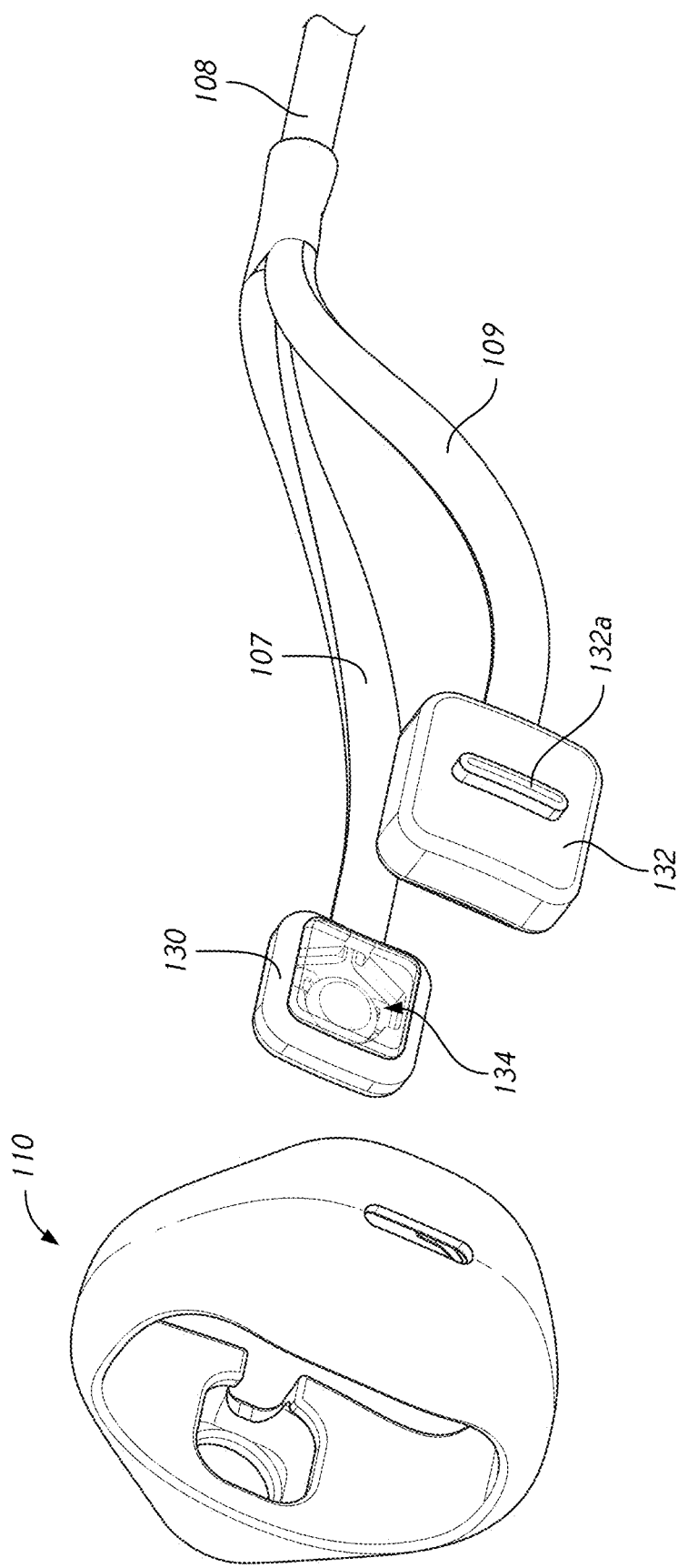

FIGS. 5C-5D illustrate perspective views of the emitter housing 130, the first portion 107 of cable 108, the detector housing 132, and the second portion 109 of cable 108 removed from the ring member 110. The ring member 110 can advantageously be configured to removably receive the emitter housing 130 and the detector housing 132. For example, and as will be discussed further below with respect to FIGS. 6A-6J, the ring member 110 can comprise a resilient and flexible material that can allow for the removable securement of the emitter housing 130 and the detector housing 132. Such configuration can allow for a ring member 110 of various sizes and/or shapes to be utilized with the pulse oximetry system 100, for example, so as to accommodate various sizes and/or shapes of a subject's finger 2. In this way, the pulse oximetry system 100 can be customized to a subject 1 by selecting an appropriately configured ring member 110 while allowing for all other aspects of the pulse oximetry system 100 to remain the same and/or be universal across subjects.

With continued reference to FIGS. 5C-5D and as discussed above, the emitter housing 130 can be configured to contain the emitter package 134 comprising the one or more emitters 112. Similarly, the detector housing 132 can be configured to contain the detector package 136 comprising the one or more detectors 114. In some implementations, the emitter housing 130 can be of a different shape and/or size than the detector housing 132. Such different shape and/or size between the emitter housing 130 and the detector housing 132 can help and/or aid in distinguishing how to place the housings into the ring member 110. For example, a different shape and/or size between the emitter housing 130 and the detector housing 132 can index the housings to the ring member 110. In some implementations, the emitter housing 130 and/or the detector housing 132 can include additional features for positioning and/or securing the housings within the ring member 110. For example and as shown in FIG. 5C, the emitter housing 130 can include a protrusion 130a extending from the emitter housing 130. The protrusion 130a can be of any shape and/or size, and can be configured to fit into a corresponding feature and/or opening of the ring member 110 when the emitter housing 130 is positioned by the ring member 110. For example and as shown, the protrusion 130a can be a cylindrically shaped protrusion extending from a portion of the emitter housing 130 opposite of where the emitter package 134 emits optical radiation. In some implementations and as shown in FIG. 5D, the detector housing 132 can include a protrusion 132a extending from the detector housing 132. The protrusion 132a can be of any shape and/or size, and can be configured to fit into a corresponding feature and/or opening of the ring member 110 when the detector housing 132 is positioned by the ring member 110. For example and as shown, the protrusion 132a can be an elongate protrusion extending from a portion of the detector housing 132 opposite of where the detector package 136 detects optical radiation emitted from the emitter package 134.

Figure 6D:
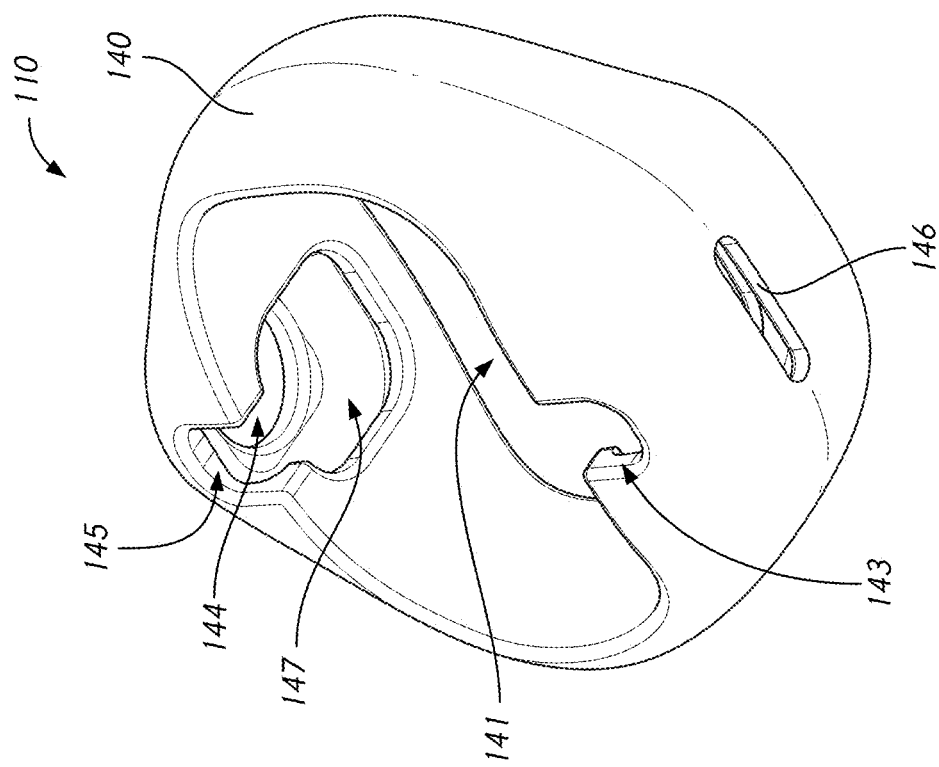
Figure 6C:
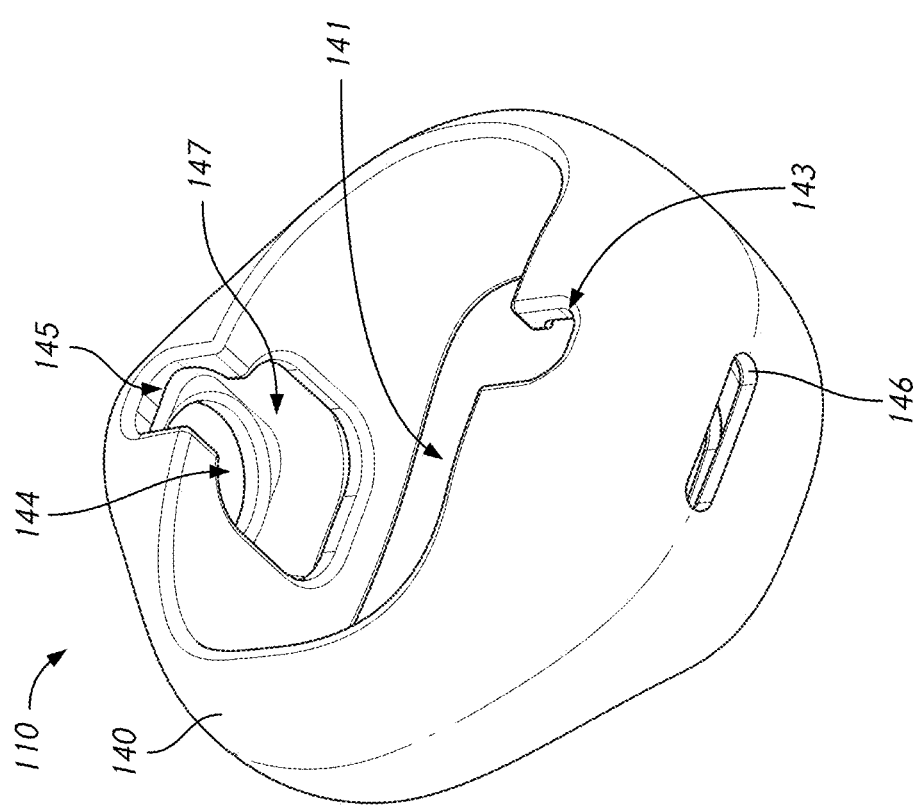
Figure 6E:
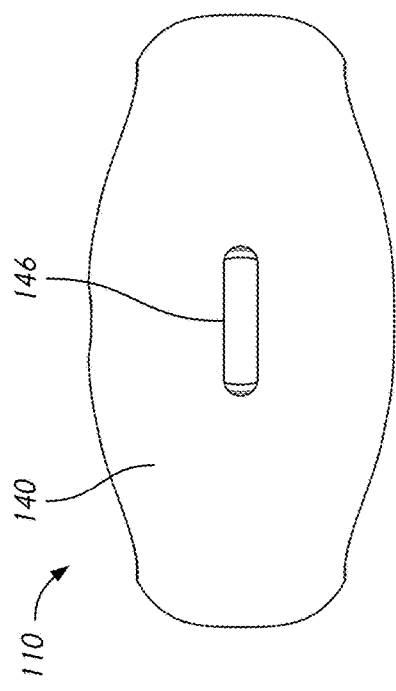
FIGS. 6E-6J illustrate a top, bottom, front, back, and side views, respectively, of the ring member of the sensor dock assembly of FIG. 3 in accordance with aspects of this disclosure.
Figure 6F:
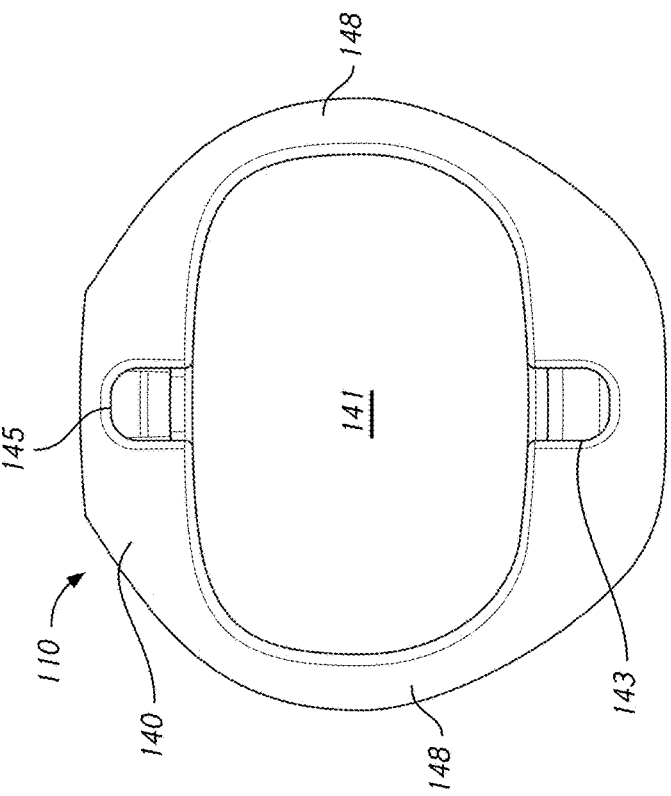
Figure 6G:
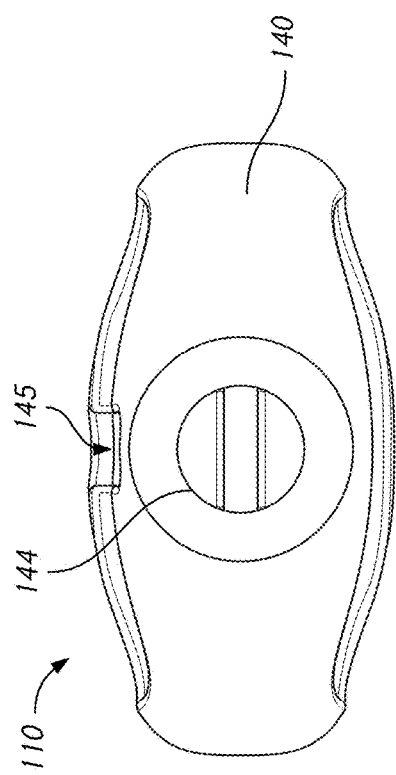
Figure 6H:
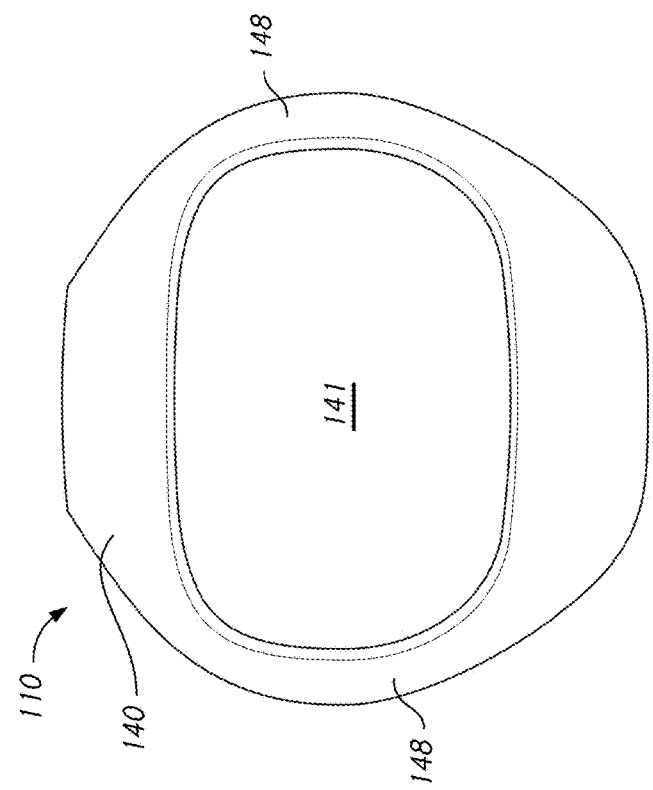
Figure 6I:
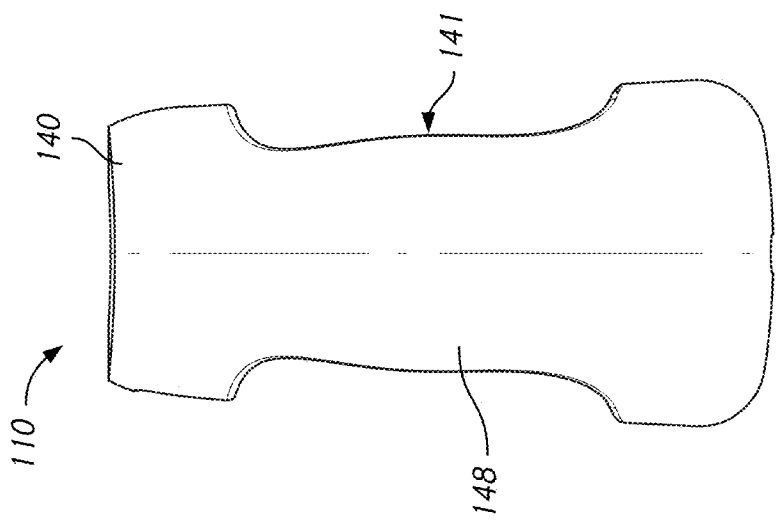
Figure 6J:
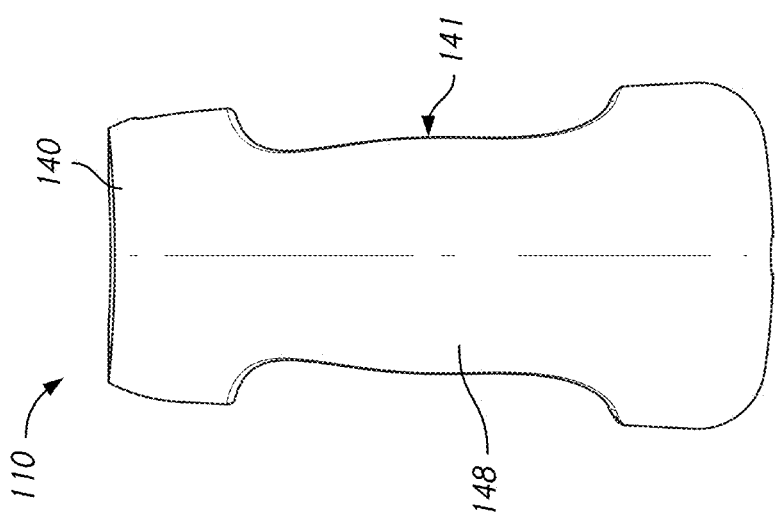

FIGS. 6A-6D illustrate perspective views of the ring member 110, FIG. 6E illustrates a top view of the ring member 110, FIG. 6F illustrates a bottom view of the ring member 110, FIGS. 6G-6H illustrate front and back views, respectively, of the ring member 110, and FIGS. 6I-6J illustrate side views of the ring member 110. As discussed previously and as shown, the ring member 110 can include a body 140 with an opening 141 configured to receive a portion of the subject's finger therethrough. Thus, in some implementations, the ring member 110 can be shaped in the form of a ring configured to secure around at least a portion of the subject's finger 2.

As described herein, the ring member 110 can operably position the emitter package 134 and the detector package 136 of the pulse oximetry system 100. As such, the ring member 100 can include one or more features, openings, cavities, and/or the like configured to operably position the emitter package 134 and the detector package 136. For example, in some implementations and as shown, the ring member 110 can include a cavity 147 sized and shaped to receive the emitter housing 130 described previously. The ring member 110 can also include a cavity 142 sized and shaped to receive the detector housing 132 described previously. The cavity 147 can have a different size and/or shape than the cavity 142, which can aid in positioning the emitter housing 130 and the detector housing 132 into the respective cavity 147 and cavity 142. The cavity 147 can open into and/or join with the opening 141 of the ring member 110. Similarly, the cavity 142 can open into and/or join with the opening 141 of the ring member 110. The cavity 147 can be disposed opposite the cavity 142 so as to operably position the emitter package 134 and the detector package 136 when the cavity 147 receives the emitter housing 130 and the cavity 142 receives the detector housing 132.

In some implementations, the ring member 110 can include one or more additional features, openings, cavities, and/or the like configured to position the emitter housing 130, the detector housing 132, and/or portions thereof. For example, the ring member 110 can include a cavity opening 144 sized and shaped to receive the protrusion 130a of the emitter housing 130. The cavity opening 144 can open into and/or join with the cavity 147. Similarly, the ring member 110 can include a cavity opening 146 sized and shaped to receive the protrusion 132a of the detector housing 132. The cavity opening 146 can open into and/or join with the cavity 142. As shown and in some implementations, the cavity opening 144 can be a generally cylindrical opening corresponding to the cylindrically shaped protrusion 130a. Further as shown and in some implementations, the cavity opening 146 can be a generally elongate opening corresponding to the elongate protrusion 132a. The cavity openings 144 and 146 can extend completely through or partially through the body 140 of the ring member 110 (as shown, both cavity openings extend completely through). When the emitter housing 130 is disposed within the cavity 147 of the ring member 110, the protrusion 130a of the emitter housing 130 can be positioned within the cavity opening 144. Similarly, when the detector housing 132 is disposed within the cavity 142 of the ring member 110, the protrusion 132a of the detector housing 132 can be positioned within the cavity opening 146.

With continued reference to FIGS. 6A-6J, the ring member 110 can include one or more notches configured to receive one or more portions of the cable 108 of the pulse oximetry system 100. For example, the ring member 110 can include a notch 145 configured to receive the first portion 107 of cable 108. As another example, the ring member 110 can include a notch 143 configured to receive the second portion 109 of cable 108. Notches 145 and 143 can be disposed on an end of the ring member 110 that faces towards the dock 106 when the ring member 110 is secured to the subject's finger 2 and the dock 106 is secured to the subject's wrist 3 (e.g, the back of the ring member 110). The notch 145 can extend through an end of the ring member 110 and open into the cavity 147 so as to allow the first portion 107 of the cable 108 to operably connect with the emitter package 134 within emitter housing 130 when the emitter housing 130 is positioned by the ring member 110. Similarly, the notch 143 can extend through an end of the ring member 110 and open into the cavity 142 so as to allow the second portion 109 of the cable 108 to operably connect with the detector package 136 within detector housing 132 when the detector housing 132 is positioned by the ring member 110. In some implementations, notches 143 and 145 can open into and/or join with opening 141 of the ring member 110, which can facilitate removal and/or insertion of the emitter housing 130 and the detector housing 132 from and/or into ring member 110.

Advantageously, the ring member 110 can be made of a resilient and flexible material. For example, the ring member 110 can be made of silicone, such as a medical grade and/or biocompatible silicone, a thermoplastic elastomer, such as a medical grade and/or biocompatible thermoplastic elastomer, and/or any biocompatible material and/or polymer that is resilient and flexible. In some implementations, ring member 110 comprises silicone rubber. A resilient and flexible ring member 110 can advantageously position the emitter housing 130 and the detector housing 132 close to, against, and or adjacent to a portion of the subject's body, such as the nail bed and/or the tissue of the subject's finger, for optimal function of the pulse oximetry system 100. For example, by having flexibility to conform to the subject's finger 2, the ring member 110 can optimally position the emitter package 134 against, adjacent, and/or near to the subject's finger 2 such that optical radiation emitted from the emitter package 134 is directed to/through the subject's finger 2. By way of another example, by the ring member 110 having the flexibility to conform to the subject's finger 2, ambient and/or stray optical radiation and/or optical radiation not produced/emitted by the emitter package 134 can be reduced, eliminated, and/or prevented from being received by the detector package 136. Furthermore, a resilient and flexible ring member 110 can advantageously improve comfort for the subject 1 when the ring member 110 is secured to and/or worn by the subject 1. In some implementations, the ring member 110 comprises a rigid material. In some implementations, ring member 110 comprises a first material and a second material that is more rigid than the first material.

The body 140 of the ring member 110 can have a variable thickness. For example, as shown in FIGS. 6G-6H, sides 148 of the ring member 110 (positioned adjacent opening 141) can have a reduced thickness compared to portions of the ring member 110 configured to position the emitter housing 130 and the detector housing 132. Such a configuration can increase subject comfort when the ring member 110 is secured around the subject's finger 2 given the ring member 110 can interact with adjacent fingers of the subject (e.g., with a reduced thickness at sides 148 of the ring member 110, the subject may not "feel" as much of a foreign body sensation between their fingers when wearing the ring member 110). As shown in FIGS. 6I-6J, the body 140 of the ring member 110 can have a variable side profile. For example, the sides 148 of the ring member 110 can have a width that is less than the portions of the ring member 110 configured to position the emitter housing 130 and the detector housing 132. As shown, the side profile of the body 140 of the ring member 110 can be generally "I" shaped. Such a configuration can increase subject comfort when the ring member 110 is secured around the subject's finger 2. Furthermore, such a configuration can increase the pliability and/or conformability of the ring member 110 and aid in optimally operably positioning the emitter package 134 and the detector package 136 when the ring member 110 is secured around the subject's finger 2. In some cases, the ring member 110 can be provided in various and/or different sizes to accommodate various finger sizes.

In some implementations, the ring member 110 has a generally ring-like shape, however the ring member 110 can be of other shapes and/or configurations. For example, the ring member 110 can be configured as an incomplete ring, such that opening 141 is not fully enclosed by the body 140. In some implementations, the ring member 110 can be configured in any shape for operably securing the emitter package 134 and the detector package 136 at opposite sides of the subject's finger 2. In some implementations, the ring member 110 can be configured to inhibit, prevent, and/or reduce an amount of ambient light, stray light, and/or any optical radiation not emitted from the emitter package 134 from reaching the detector package 136. Additionally, or alternatively, the ring member 110 can be configured to inhibit, prevent, and/or reduce an amount of optical radiation emitted by the emitter package 134 that has not been attenuated by, reflected by, and/or passed through tissue of the subject from being received by the detector package 136. In some cases, the ring member 110 can be opaque and/or generally light blocking and/or have a light blocking coating. In some implementations, ring member 110 can be semi-transparent or transparent. In some implementations, the ring member 110 can include portions that are opaque and/or light blocking and portions that are semi-transparent and/or transparent.

Figure 7A:
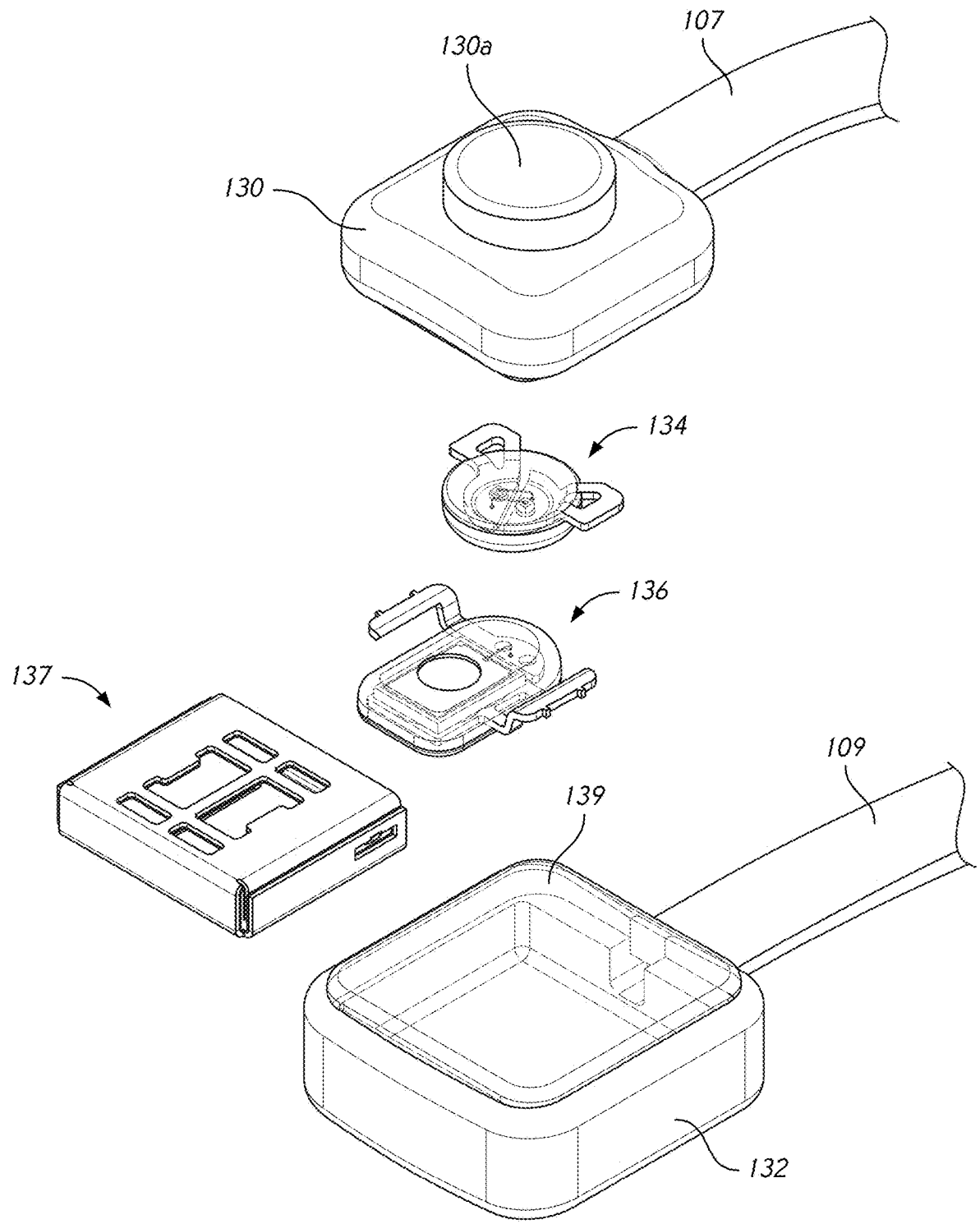
FIGS. 7A-7B illustrate exploded perspective views of portions of the sensor dock assembly of FIG. 3 in accordance with aspects of this disclosure.
Figure 7B:
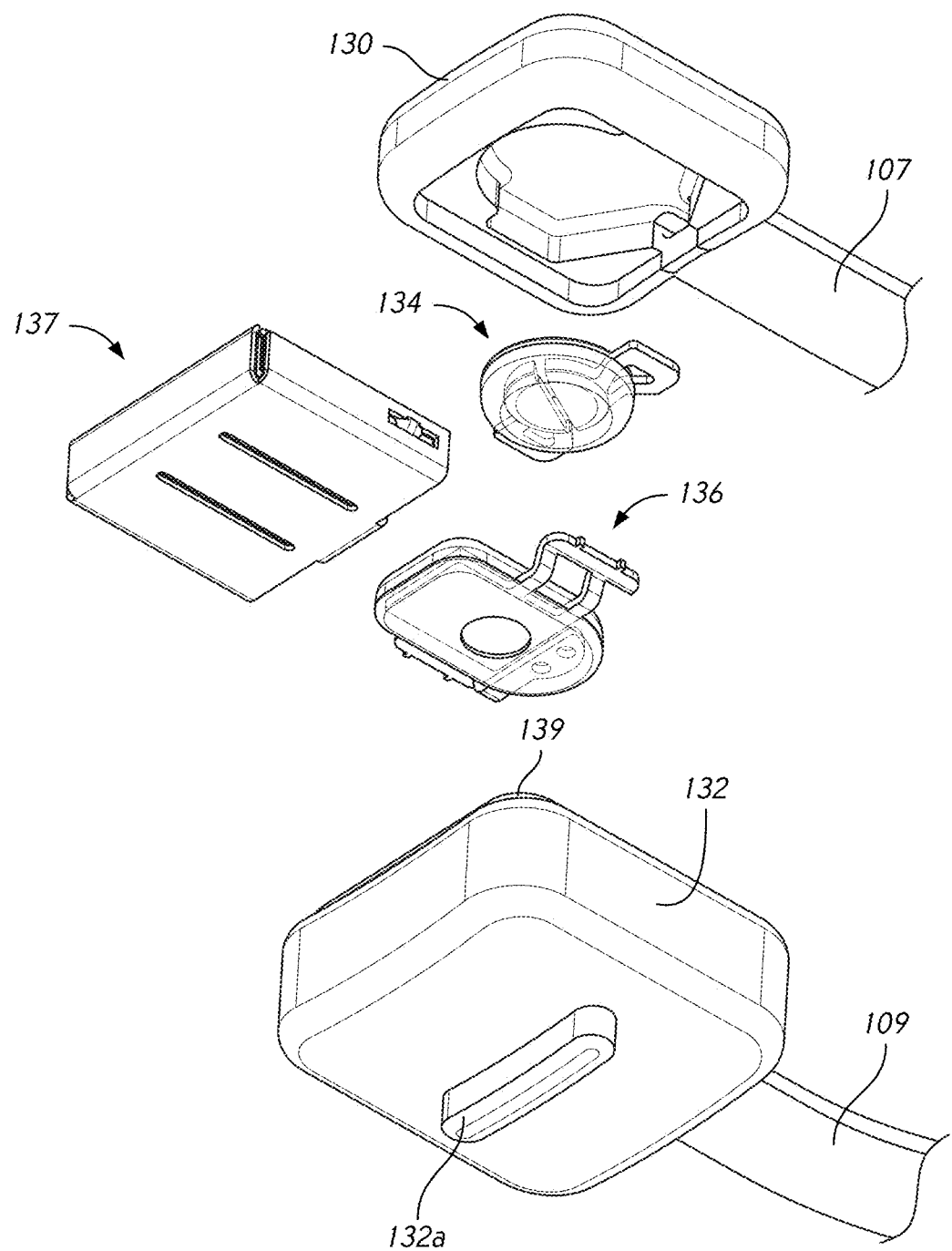

FIGS. 7A-7B illustrate perspective exploded views of aspects of emitter(s) and detector(s) of the pulse oximetry system 100. As discussed relative to FIGS. 5C-5D, the emitter housing 130 can be configured to contain the emitter package 134 comprising the one or more emitters 112, and the detector housing 132 can be configured to contain the detector package 136 comprising the one or more detectors 114. The emitter package 134 is shown removed from the emitter housing 130 and the detector package 136 is shown removed from the detector housing 132. Also shown is a detector shield 137, which can be included with the detector package 136 in the detector housing 132. The detector shield 137 can at least partially enclose and/or surround the detector package 136 comprising the one or more detectors 114. The detector shield 137 can be configured to inhibit, prevent, and/or reduce ambient light, stray light, and/or light emitted from the emitter package 134 that does not pass through tissue from being received by the detector package 136, which can advantageously improve the integrity of physiological parameter determination. Additionally, or alternatively, detector shield 137 can shield the detector package 136 against and/or with respect to electromagnetic noise. For example, in some implementations, the detector shield 137 can act as a Faraday cage or a shield to block electromagnetic fields. Also shown are other features and/or aspects that can be included in and/or comprise part of the emitter housing 130 and/or the detector housing 132. For example and as shown in FIG. 7A, the detector housing 132 can include optical transmission material 139. In some implementations, the optical transmission material 139 can be configured to direct optical radiation toward the detector package 136 after passing through and/or being reflected by tissue of the subject's finger 2. In some cases, the optical transmission material 139 can include a lens. In some cases, the optical transmission material 139 can include a diffuser configured to diffuse, spread out, disseminate, and/or scatter optical radiation attenuated by and/or reflected from tissue prior to being received by the detector package 136. The optical transmission material 139 can form a part of the detector housing 132. Further, the optical transmission material 139 can be configured to be positioned between the detector package 136 and tissue of the subject 1 when the pulse oximetry system 100 is secured to the subject 1. By way of another example and as shown in FIG. 7B, the emitter housing 130 can include optical transmission material 131. In some implementations, the optical transmission material 131 can be configured to focus or diffuse optical radiation emitted from the emitter package 134. In some cases, the optical transmission material 131 can include a lens. In some cases, the optical transmission material 131 can include a diffuser configured to diffuse, spread out, disseminate, and/or scatter optical radiation emitted from the emitter package 134 prior to such optical radiation entering the subject's tissue. In some cases, this can permit optical radiation emitted from the emitter package 134 to pass through a greater amount of tissue and can facilitate more accurate determination of physiological parameters (such as any of those discussed herein). The optical transmission material 131 can form a part of the emitter housing 130. Further, the optical transmission material 131 can be configured to be positioned between the emitter package 134 and tissue and/or at least a portion of a nail (e.g., the nail bed) of the subject 1 when the pulse oximetry system 100 is secured to the subject 1.

Figure 8A:
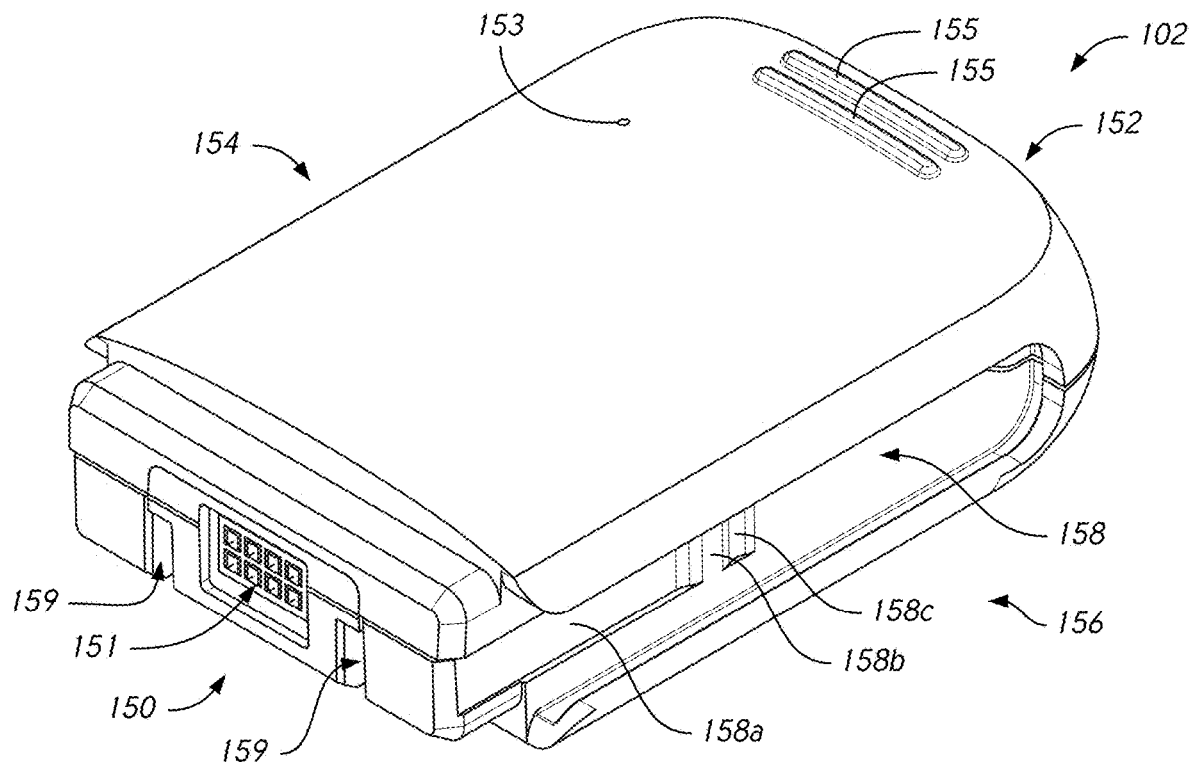
FIGS. 8A-8B illustrate perspective views of the sensor hub of the pulse oximetry system of FIG. 1A in accordance with aspects of this disclosure.
Figure 8B:
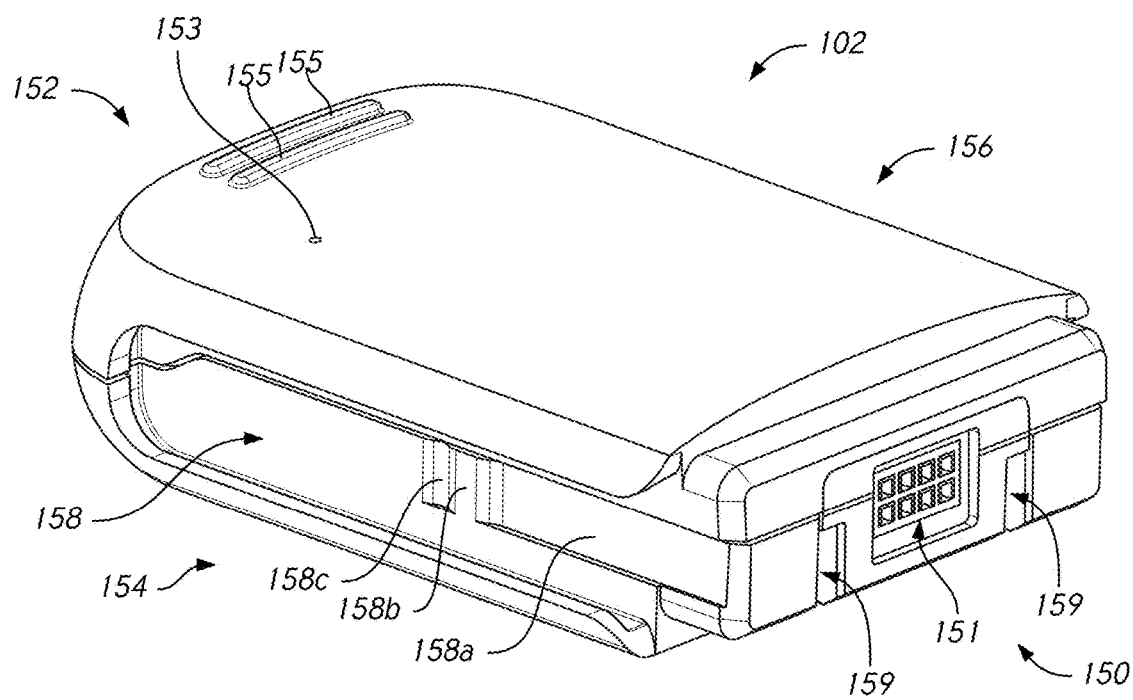
Figure 8C:
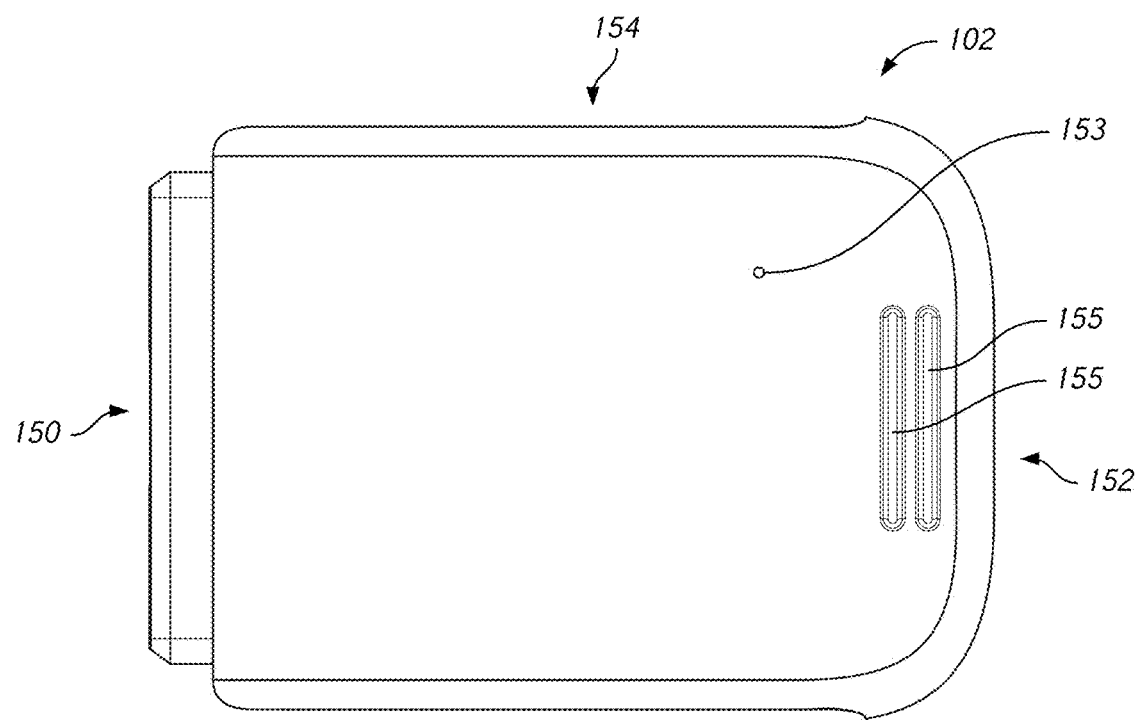
FIGS. 8C-8H illustrate top, bottom, side, front, and back views, respectively, of the sensor hub of FIGS. 8A-8B in accordance with aspects of this disclosure.
Figure 8D:
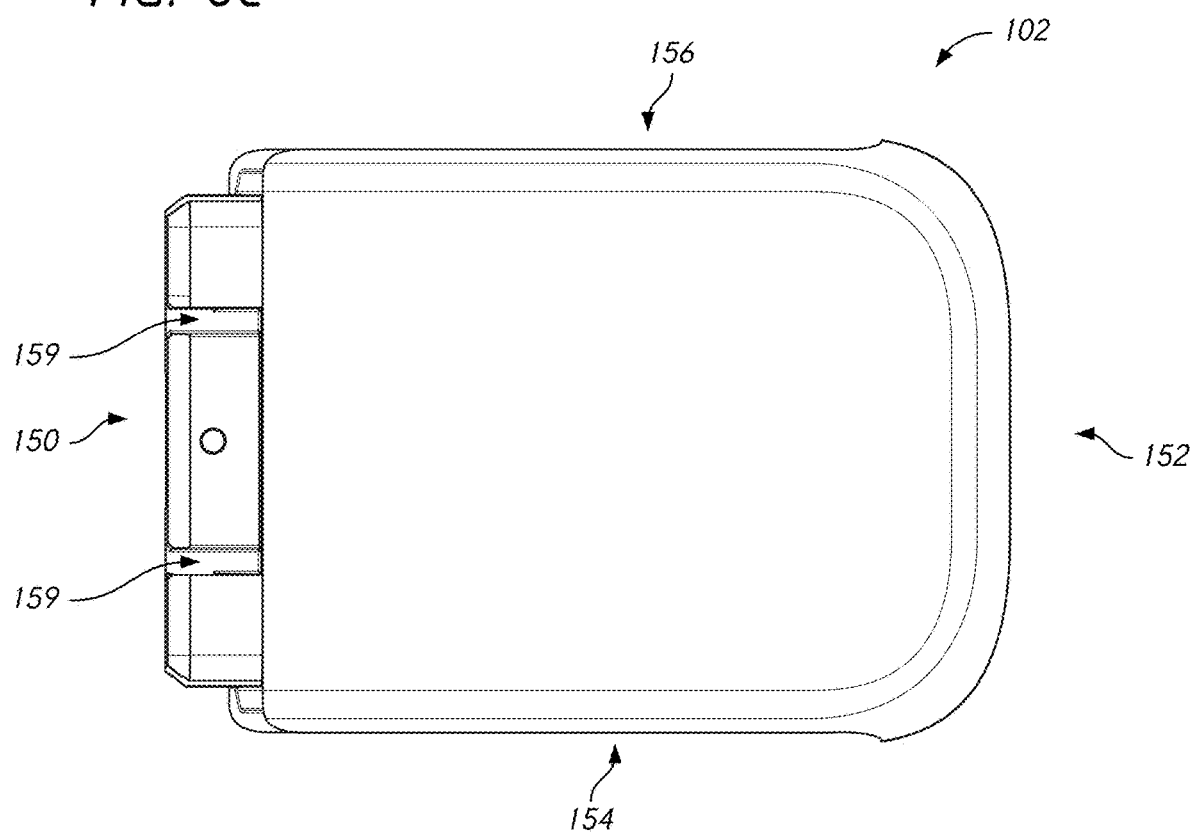
Figure 8E:
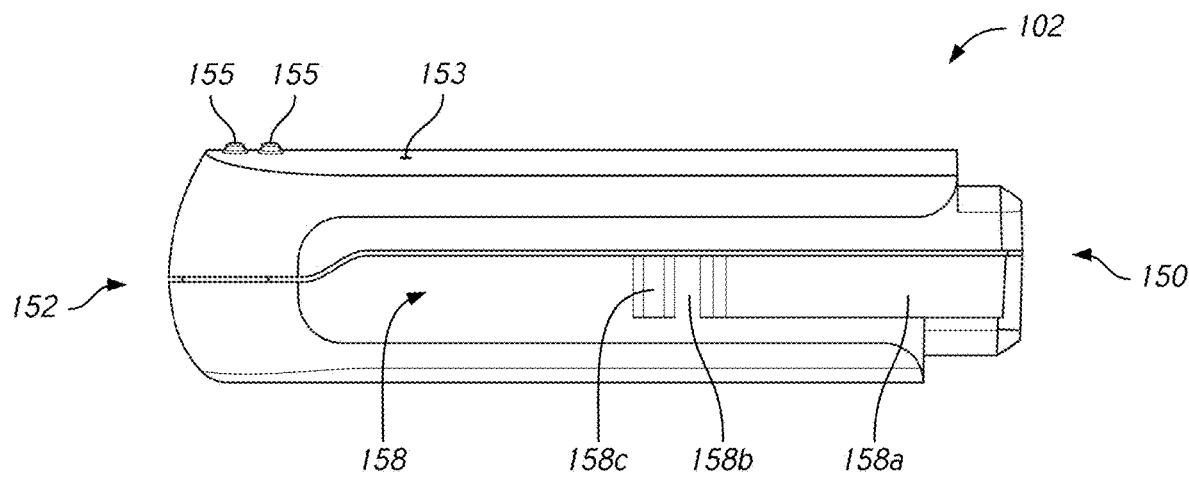
Figure 8F:
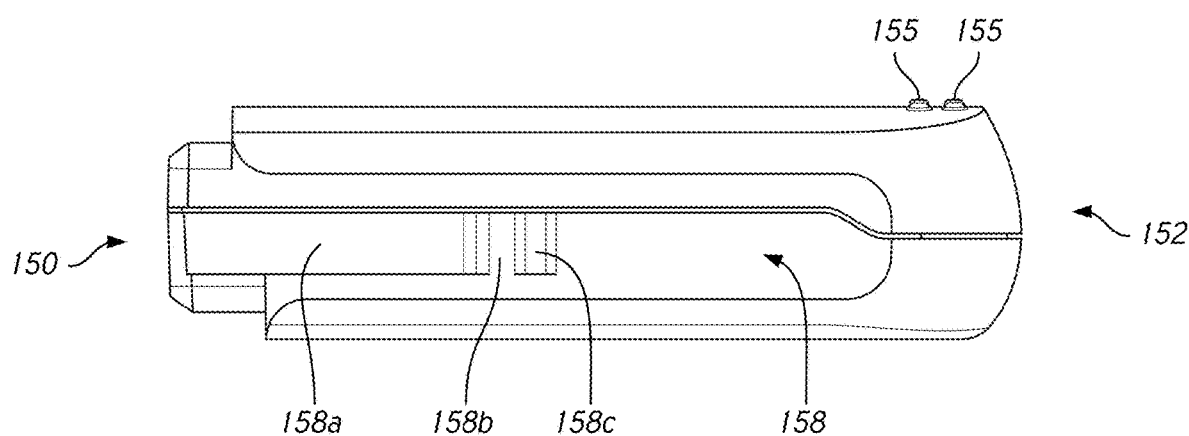
Figure 8G:
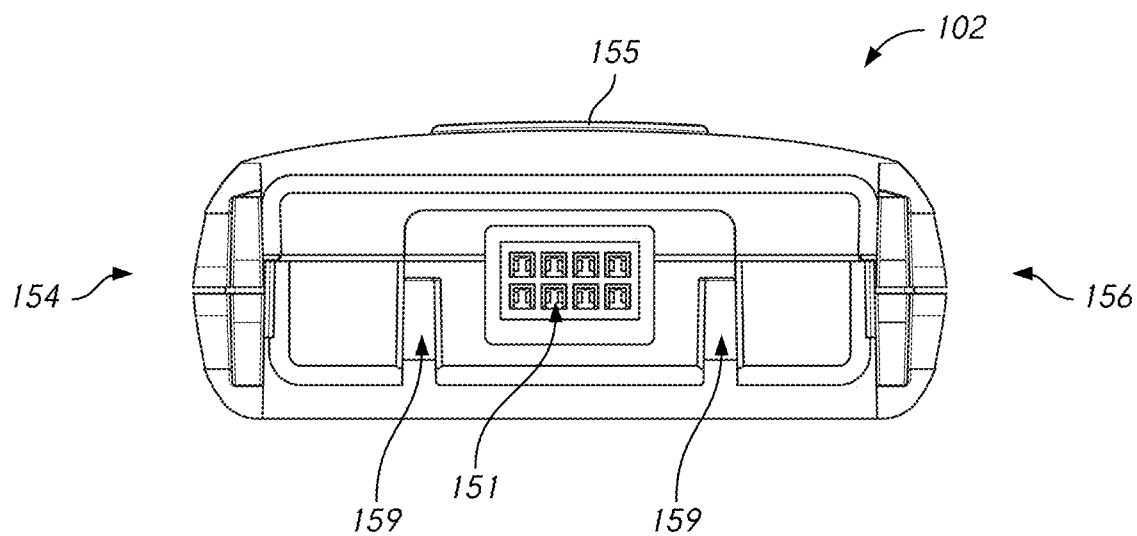
Figure 8H:
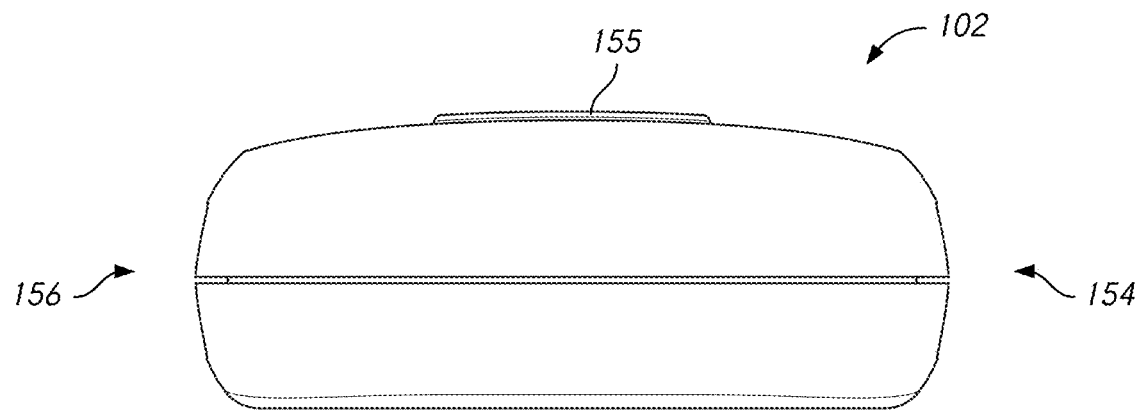
Figure 81:
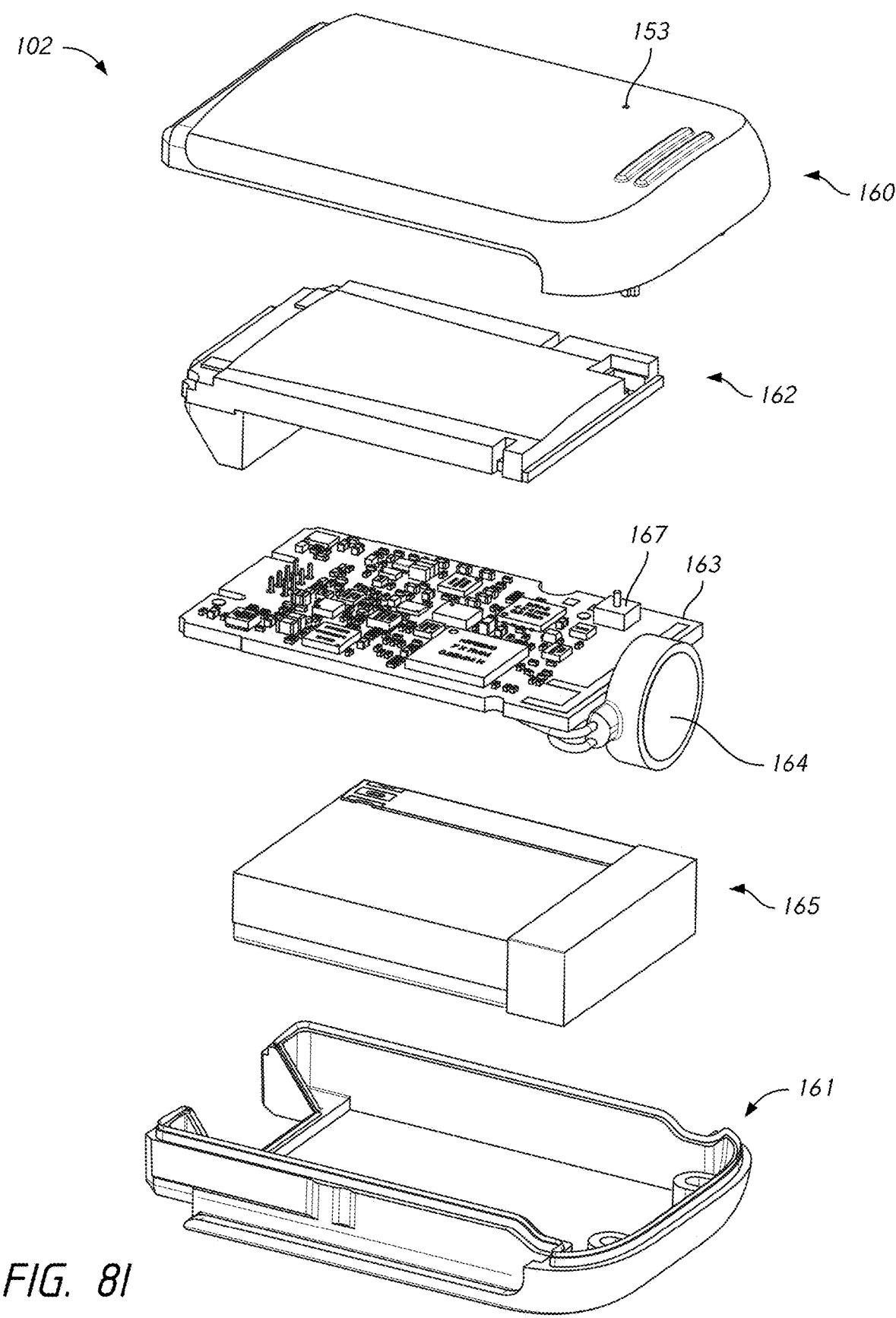
Figure 8J:
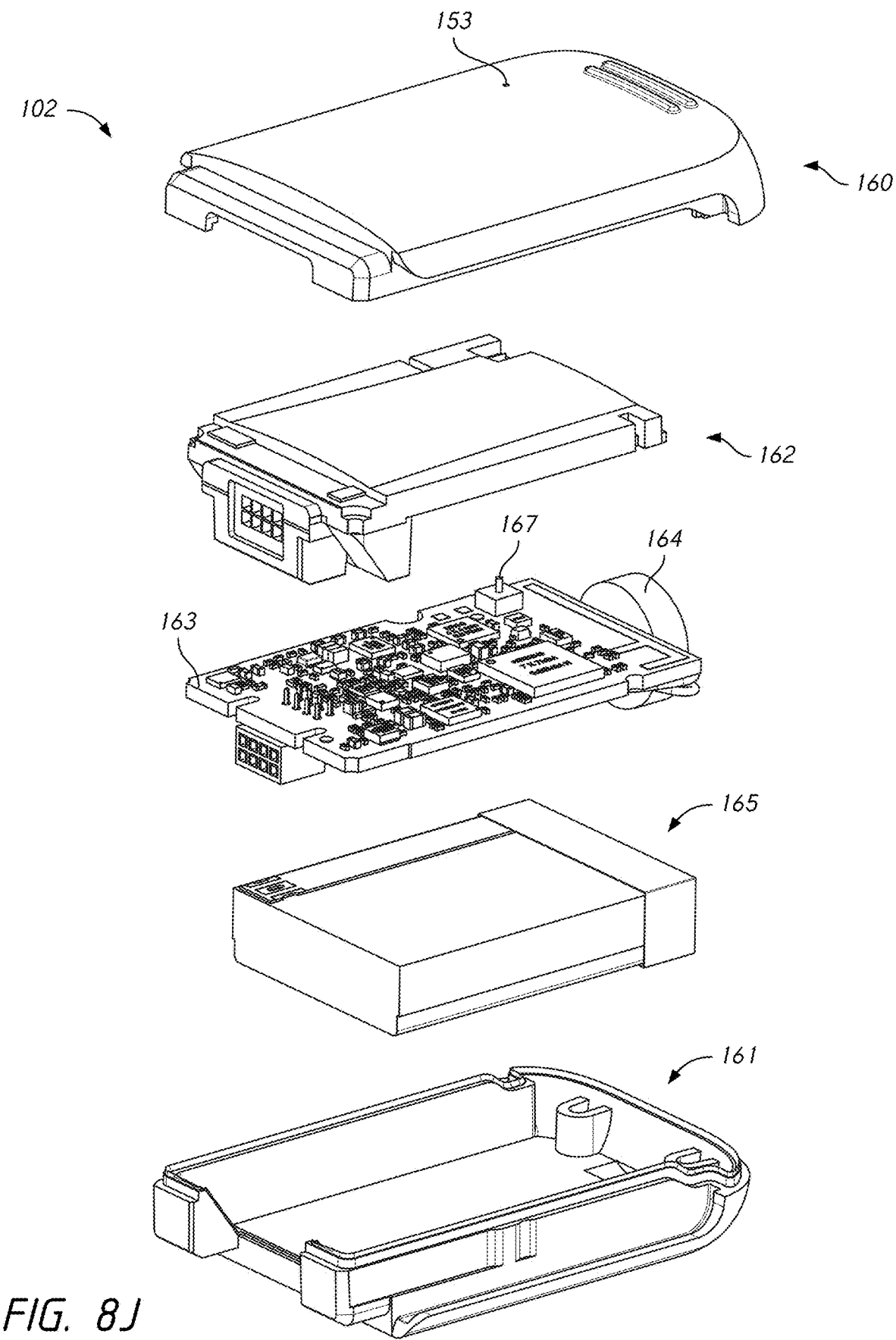

FIGS. 8A-8B illustrate perspective views, FIG. 8C illustrates a top view, FIG. 8D illustrates a bottom view, FIGS. 8E-8F illustrate side views, and FIGS. 8G-8H illustrate front and back views, respectively, of the sensor hub 102. FIGS. 8I-8J illustrate perspective exploded views of the sensor hub 102.

As shown in FIGS. 8A-8J, the sensor hub 102 can include a first end 150, a second end 152 opposite the first end 150, a first side 154, and a second side 156 opposite the first side 154. Sensor hub 102 can comprise a length along sides 154, 156 and/or a width along ends 150, 152 greater than a height of the sensor hub 102. As discussed above with respect to FIG. 2C, the sensor hub 102 can include one or more processors 102a, one or more storage devices 102b, a communication module 102c, a battery 102d, an information element 102e, a vibration motor 102f, one or more status indicators 102g, and/or one or more other sensors 102h. Further as discussed above, the sensor hub 102 can be configured to releasably mechanically and electrically connect with the dock 106 of the sensor dock assembly 104 of the pulse oximetry system 100. For this, the sensor hub 102 can be sized and/or shaped and/or include one or more features (for example, recesses) for releasably electrically and mechanically connecting to the dock 106. In some cases, the sensor hub 102 includes one or more features for engaging with one or more retaining features of the dock 106. For example, in some implementations the sensor hub 102 includes recessed portion(s) 158 disposed along at least a portion of the sides 154, 156 configured to slidably and releasably mechanically connect with the arm(s) 122 of the dock 106. The recessed portion(s) 158 can extend from end 150 along sides 154, 156 towards end 152, and in some cases can terminate adjacent to and/or near the end 152. In addition to recessed portion(s) 158, the sensor hub 102 can include one or more features for releasably mechanically connecting to the dock 106. For example, the sensor hub 102 can include recess(es) 158a, non-recessed portion(s) 158b, and recess(es) 158c, which can as shown be disposed along recessed portion(s) 158. In some implementations, the recess(es) 158a and the recess(es) 158c can be configured to slidably receive the protrusion(s) 123 of the dock 106 when the recessed portion(s) 158 of the sensor hub 102 slidably engage with the arm(s) 122 of the dock 106. For example, the sensor hub 102 can be mechanically connected to the dock 106 by aligning recessed portion(s) 158 with arm(s) 122 of the dock 106 while the sensor hub 102 is positioned away from the dock 106 but generally in the same plane as the dock 106 and with end 150 of the sensor hub 102 facing the dock 106, sliding the sensor hub 102 towards the dock 106 such that the arm(s) 122 engage with the recessed portion(s) 158, continuing to slide the sensor hub 102 towards the dock 106 such that the recess(es) 158a receive the protrusion(s) 123, continuing to slide the sensor hub 102 towards the dock 106 such that the non-recessed portion(s) 158b engage and/or interact with the protrusion(s) 123, and continuing to slide the sensor hub 102 towards the dock 106 until the recess(es) 158c receive the protrusion(s) 123. In the example above, the interaction between the non-recessed portion(s) 158b of the sensor hub 102 and the protrusion(s) 123 of the dock can provide tactile feedback to the subject, such as the feel of a "snap" when the non-recessed portion(s) 158b are slid past the protrusion(s) 123. In the case of connecting the sensor hub 102 to the dock 106, such a "snap" feel can indicate to the subject that the sensor hub 102 is fully connected to the dock 106 once the protrusion(s) 123 have slid past the non-recessed portion(s) 158b and the recess(es) 158c have received the protrusion(s) 123.

With continued reference to FIGS. 8A-8J and as discussed above, the sensor hub 102 can include an electrical connector 151 configured to electrically and mechanically connect with the corresponding electrical connector 124 of the dock 106. The sensor hub 102 and its components, such as processor(s) 102a and battery 102d, can be operably connected to the one or more emitters 112 and the one or more detectors 114 of the pulse oximetry system 100 when the electrical connector 151 of the sensor hub 102 is connected to the electrical connector 124 of the dock. In some implementations, the electrical connector 151 of the sensor hub 102 can be electrically and mechanically connected to the electrical connector 124 of the dock 106 when the sensor hub 102 is mechanically connected to the dock 106, such as by the connection between the arm(s) 122 of the dock and the recessed portion(s) 158 of the sensor hub 102 as described above. The electrical connector 151 of the sensor hub 102 can include one or more openings configured to receive one or more pins of the corresponding electrical connector 124 of the dock 106. For example and as shown in FIGS. 8A-8B, the electrical connector 151 of the sensor hub 102 can include 8 openings, the openings configured to electrically and mechanically connect with corresponding pins of the electrical connector 124 of the dock 106. In some implementations, the electrical connector 151 can include any number of openings. In some implementations, the electrical connector 151 can include one or more of pins configured to electrically and mechanically connect with one or more corresponding openings in the electrical connector 124 of the dock 106. As shown in FIGS. 8A-8B, the electrical connector 151 can be disposed at end 150 of the sensor hub 102, for example, such that it faces towards the electrical connector 124 of the dock 106 when the sensor hub 102 is connected to the dock 106. In some implementations, the sensor hub 102 can include one or more features to aid in aligning the electrical connector 151 to the corresponding electrical connector 124 of the dock 106. For example, the sensor hub 102 can include slot(s) 159 adjacent the electrical connector 151, the slot(s) 159 configured to releasably receive the walls 126 of the dock 106 and aid in releasably connecting the electrical connector 151 with the corresponding electrical connector 124.

As shown in FIGS. 8A-8C, 8E-8H, the sensor hub 102 can include one or more features for aiding in gripping, holding, moving, and/or sliding the sensor hub 102, such as for sliding the sensor hub 102 when connecting and/or disconnecting the sensor hub 102 to the dock 106. For example, the sensor hub 102 can include one or more ribs 155 disposed on a portion of the sensor hub 102, the ribs 155 configured to aid in gripping, holding, moving, and/or sliding the sensor hub 102. As shown, the ribs 155 can include generally linear protrusions that protrude out from a surface of the sensor hub 102 and extend at least partially from side 154 towards side 156 along a portion of the sensor hub 102 near end 152 (e.g., the ribs can be disposed along an "upper" portion of the sensor hub 102). Alternatively, or in addition, in some implementations the sensor hub 102 can include other features configured to aid in gripping, holding, moving, and/or sliding the sensor hub 102, such as bumps, a roughened surface texture, etc.

With continued reference to FIGS. 8A-8J and as discussed above, the sensor hub 102 can include one or more status indicators 102g. The one or more status indicators 102g can be configured, for example, to emit optical radiation out of and/or through a hole and/or opening in the sensor hub 102, such as through the hole/opening 153 in a top shell 160 of the sensor hub 102. As shown in FIGS. 8I-8J, the one or more status indicators 102g can include status indicator 167, which can be an emitter (e.g., an LED) configured to emit optical radiation. The status indicator 167 can be operably coupled to a circuit board (also referred to herein as a "PCB") 163 and the processor(s) 102a of the sensor hub 102. The hole/opening 153 can allow the optical radiation emitted by the status indicator 167 to be visible from a location external to the sensor hub 102, such as by the subject 1 when wearing/using the pulse oximetry system 100. In some implementations, hole/opening 153 can be at least partially aligned with status indicator 167 to allow optical radiation emitted from the status indicator 167 to more easily pass through the top shell 160. Additionally, or alternatively, the top shell 160 and/or a bottom shell 161 of the sensor hub 102 can comprise a transparent or semi-transparent material that allows optical radiation emitted from the status indicator 167 to be seen from a location external to the sensor hub 102.

In some implementations, the sensor hub 102 can include an RFID reader and the dock 106 of the sensor dock assembly 104 can include an RFID tag. The RFID tag of the dock 106 can be configured to communicate with the RFID reader of the sensor hub 102. In some implementations, the sensor hub 102 can include an RFID tag and the dock 106 of the sensor dock assembly 104 can include an RFID reader. The RFID tag of the sensor hub 102 can be configured to communicate with the RFID reader of the dock 106.

Referring to the perspective exploded views of FIGS. 8I-8J, shown are components of the sensor hub 102 in accordance with some implementations. As shown, the sensor hub 102 can include the bottom shell 161, a battery 165, the PCB 163, and the top shell 160. In some implementations, the sensor hub 102 can also include a vibration motor 164, the status indicator 167 described above, and/or a PCB overmolding 162. The vibration motor 164 can be an example implementation of vibration motor 102f discussed herein, and can be configured to provide haptic feedback, vibration, alerts, notifications, alarms, etc. to the subject 1 when the pulse oximetry system 100 is secured to the subject. The battery 165 can correspond to battery 102d discussed herein, and can be configured to provide power to the pulse oximetry system 100. The PCB 163 can include and/or be operably coupled with the processor(s) 102a, the storage device(s) 102b, the communication module 102c, the information element 102e, the status indicator(s) 102g and status indicator 167, and/or the vibration motor 102f and vibration motor 164 discussed previously. The PCB overmolding 162 can be configured to seal the PCB 163, at least a portion of the PCB 163, and/or at least some of the PCB's components, such as against water, other liquids, air, dust, contaminants, etc. The PCB overmolding 162 can also be configured to provide shock and/or drop protection for the PCB 163 and/or its components. The battery 165 can be configured to operably connect to the PCB 163, components of the PCB 163, and/or the electrical connector 151 of the sensor hub 102. The bottom shell 161 and the top shell 160 can be configured to contain components of the sensor hub 102 and can connect/join to each other (for example, by ultrasonic welding) to create a housing/shell of the sensor hub 102. As such, the top shell 160 and/or the bottom shell 161 can comprise the one or more features of the sensor hub 102 configured to releasably connect with the dock 106, such as recessed portion(s) 158, recess(es) 158a, non-recessed portion(s) 158b, and recess(es) 158c.

Returning back to FIGS. 1A-1B, the pulse oximetry system 100 can be configured to advantageously provide increased user comfort, increased user ergonomics, facilitate better sensor-skin contact and engagement in order to provide more accurate physiological parameter determination, and/or provide better stability in securement than existing sensors. One aspect in particular that can provide at least some of the advantages listed above includes management/placement/guidance of the cable 108 that connects the dock 106 to the emitter package 134 comprising the one or more emitters 112 and the detector package 136 comprising the one or more detectors 114 operably positioned by the ring member 110. In some implementations and as shown, the pulse oximetry system 100 can include one or more cable retainers configured to secure to one or more portions of the cable 108 to retain the cable 108 in position when the pulse oximetry system 100 is used by the subject 1. For example, the pulse oximetry system 100 can include a cable retainer 103 and/or a cable retainer 105, each of which will be described further below.

The cable retainer 103 can include one or more prongs configured to secure a portion of the cable 108 (for example, as shown in FIGS. 1A-1B). The cable retainer 103 can be configured to releasably connect/secure the portion of the cable 108. In some cases, the cable retainer 103 can be configured to slidably secure the portion of the cable 108, allowing for the cable 108 to slide back and/or forth relative to the cable retainer 103. The cable retainer 103 can be attached to, adhered to, integrated with, and/or a part of the strap 101. In some implementations (not shown in FIGS. 1A-1B), the cable retainer 103 can be attached to, adhered to, integrated with, and/or a part of the dock 106.

The cable retainer 105 can comprise a ring configured to secure around a portion of the subject's finger 2 and can include one or more prongs configured to secure a portion of the cable 108 (e.g., a portion other than the portion that can be secured by cable retainer 103). The cable retainer 105 can be configured to releasably connect/secure the portion of the cable 108. In some cases, the cable retainer 105 can be configured to slidably secure the portion of the cable 108, allowing for the cable 108 to slide back and/or forth relative to the cable retainer 105. In some implementations and as shown in FIGS. 1A-1B, the cable retainer 105 can be secured around a subject's finger 2 between the ring member 110 and the subject's palm 4 and include one or more prongs configured to secure a portion of the cable 108. For example, the cable retainer 105 can be secured around a subject's finger 2 at a base of the finger where it meets the subject's palm 4 (e.g., between the palm and a first joint of the finger). In some implementations, the cable retainer 105 can be configured to slide along the finger 2 of the subject. In some implementations (not shown), the cable retainer 105 can comprise a feature other than a ring for securing to/around the subject's finger 2, such as a clip, a partial ring, a C-shaped member, etc. The part(s) of the cable retainer 105 that secure to/around the subject's finger 2 can be flexible, soft, and/or have aspects that can enhance comfort to the subject when worn. In some implementations, at least a portion of the cable retainer 105 can be made of silicone, such as a medical grade and/or biocompatible silicone, a thermoplastic elastomer, such as a medical grade and/or biocompatible thermoplastic elastomer, and/or any biocompatible material and/or polymer that is resilient and/or flexible. In some implementations, the cable retainer 105 comprises silicone rubber. In some implementations, the cable retainer 105 comprises a rigid material. In some implementations, cable retainer 105 comprises a first material and a second material that is more rigid than the first material.

FIGS. 1A-1B show an exemplary positioning of pulse oximetry system 100 on the subject 1 including a preferred positioning of the cable 108 by the cable retainers 103 and 105. As shown, the dock 106 can be secured to the subject's wrist 3 by the strap 101 such that the cable 108 extends from the dock 106 in a direction generally away from the palm 4 and/or a hand of the subject 1. For example, the pulse oximetry system 100 can be configured such that the cable 108 does not extend from a side of the dock 106 that faces towards the hand of the subject 1 when the dock 106 is secured to the subject's wrist 3. Further to this example, the pulse oximetry system 100 can be configured such that the cable 108 extends from a corner of the dock 106 that faces away from the hand of the subject 1 when the dock 106 is secured to the subject's wrist 3. The cable retainer 103 can be disposed on the strap 101 as shown (e.g., on the strap such that the cable retainer 103 is positioned at a side, such as an outside, of the subject's wrist 3 when the pulse oximetry system 100 is secured to the subject 1) and can secure a portion of the cable 108 between where the cable 108 connects to the dock 106 and where the cable connects to the emitter package 134 comprising the one or more emitters 112 and to the detector package 136 comprising the one or more detectors 114 positioned by the ring member 110. By securing to the cable retainer 103, a bend can be formed in the cable 108 as shown (e.g., the cable 108 is bent towards the subject's palm 4/hand). Such positioning of the cable 108 by the cable retainer 103 can advantageously keep the cable 108 close to the wrist and/or the hand of the subject so as to prevent snagging and/or catching of the cable 108 on external items when the pulse oximetry system 100 is worn by the subject 1. Such positioning of the cable 108 by the cable retainer 103 can also advantageously allow for the length of the cable 108 to be adjusted depending on the length of the hand/palm and finger of the subject (e.g., for a subject with a long hand/palm and pinky finger, the bend formed in the cable may create a loop in the cable that is smaller than a loop created when adjusted for a subject with a relatively shorter hand/palm and pinky finger). In some implementations, the cable 108 can be slidably secured to the cable retainer 103, and as such the bend formed in the cable 108 when secured to the cable retainer 103 can advantageously allow a length of the cable to translate back and/or forth within the cable retainer 103 during motion/movement of the subject's hand about their wrist 3 and/or during movement of the subject's finger 2. The cable retainer 105 can be secured around the subject's finger 2, as shown the subject's pinky finger, between where the ring member 110 is secured to the subject's pinky finger and the subject's palm 4 (more specifically as shown, the cable retainer 105 can be secured around the subject's pinky finger near where the pinky finger connects to the subject's hand, such as around the proximal phalanx). Furthermore, the cable retainer 105 can secure to another portion of the cable 108 between where the cable 108 connects to the dock 106 and where the cable connects to the emitter package 134 comprising the one or more emitters 112 and to the detector package 136 comprising the one or more detectors 114 positioned by the ring member 110. By securing to the cable retainer 105 and the cable retainer 103, the cable 108 can be positioned along an outside edge of the palm 4 of the subject 1 and along at least a portion of an outside edge of the subject's pinky finger. Positioning of the cable 108 along the outside edge of the subject's pinky finger by at least the cable retainer 105 can advantageously allow the subject to freely move, flex, contract, close, etc. their pinky finger without the cable being pulled, bound up, and/or stretched as it would if it were to be located along a top or a bottom of the pinky finger during such movements of the finger. In other words, positioning of the cable 108 along at least a portion of the outside edge of the subject's pinky finger can allow for freedom of movement of the subject's pinky finger without or with little binding and/or pulling of the cable 108 when the pulse oximetry system is worn by the subject. In some implementations, the cable 108 can be slidably secured to the cable retainer 105. As discussed herein, the cable 108 can split into the first portion 107 and the second portion 109 at its end opposite of where the cable 108 connects to the dock 106. As shown and in some implementations, the cable 108 can split into the first portion 107 and the second portion 109 near the ring member 110. In implementations wherein the cable retainer 105 is utilized and secures to both the subject's finger and the cable 108 as discussed herein, the cable 108 can split into the first portion 107 and the second portion 109 between where it is secured to the cable retainer 105 and where it connects, via the first and second portions 107 and 109, to the emitter package 134 comprising the one or more emitters 112 and to the detector package 136 comprising the one or more detectors 114 positioned by the ring member 110, respectively. When the ring member 110 is secured around the subject's pinky finger, the first portion 107 of the cable 108 can extend around the outside edge and along a portion of a top of the subject's pinky finger. Further, when the ring member 110 is secured around the subject's pinky finger, the second portion 109 of the cable 108 can extend around the outside edge and along a portion of a bottom of the subject's pinky finger. In some implementations, cable 108 can be configured such that the split in the cable 108 is positioned adjacent the first joint of the subject's pinky finger when in use, with the first portion 107 extending around the outside edge and along a portion of a top of the intermediate phalanx and with the second portion 109 extending around the outside edge and along a portion of a bottom of the intermediate phalanx. In some implementations, cable 108 can be configured such that the split in the cable 108 is positioned adjacent the second joint of the subject's pinky finger when in use, with the first portion 107 extending around the outside edge and along a portion of a top of the distal phalanx and with the second portion 109 extending around the outside edge and along a portion of a bottom of the distal phalanx. The positioning of the first and second portions 107 and 109 of the cable 108 along portions of the top and bottom of the subject's pinky finger, respectively, can aid in operably positioning the emitter housing 130 and detector housing 132. Further, the ring member 110 can be secured around the subject's pinky finger over the nail bed of the pinky finger. In some implementations, the ring member 110 can be secured near the end of the pinky finger, such as around the distal phalanx or intermediate phalanx.

In some implementations, only one cable retainer, such as the cable retainer 103 or the cable retainer 105, is utilized to position the cable 108 when the pulse oximetry system 100 is worn by and/or secured to the subject 1. In some implementations, no cable retainers are utilized to position the cable 108 when the pulse oximetry system 100 is worn by and/or secured to the subject 1. In some cases, more than two cable retainers can be utilized to position the cable 108 when the pulse oximetry system 100 is worn by and/or secured to the subject 1. Alternatively, or in addition, tape, straps, and/or adhesives can be utilized to position the cable 108 when the pulse oximetry system 100 is worn by and/or secured to the subject 1. The cable 108 (and any portions thereof), can be flexible, semi-flexible, semi-rigid, and/or rigid, and/or a have a mix of flexible, semi-flexible, semi-rigid, and/or rigid portions. In some implementations the cable 108 can have shape memory. The cable 108 can be soft to the touch and/or smooth, which can increase subject comfort when wearing the pulse oximetry system 100.

In some implementations and as shown in FIGS. 1A-1C, 2A-2B, 3, 4A-4D, 5A-5D, 6A-6J, and 8A-8J, the pulse oximetry system 100 and components thereof can include features for enhancing comfort to the subject 1 when the pulse oximetry system 100 is worn by and/or secured to the subject 1. For example, the dock 106 and the sensor hub 102 can have smooth and/or rounded contours where they can contact tissue of the subject. By way of another example and as discussed herein, the ring member 110 and/or the cable retainer 105 can comprise a resilient and/or flexible material.

Figure 9A:
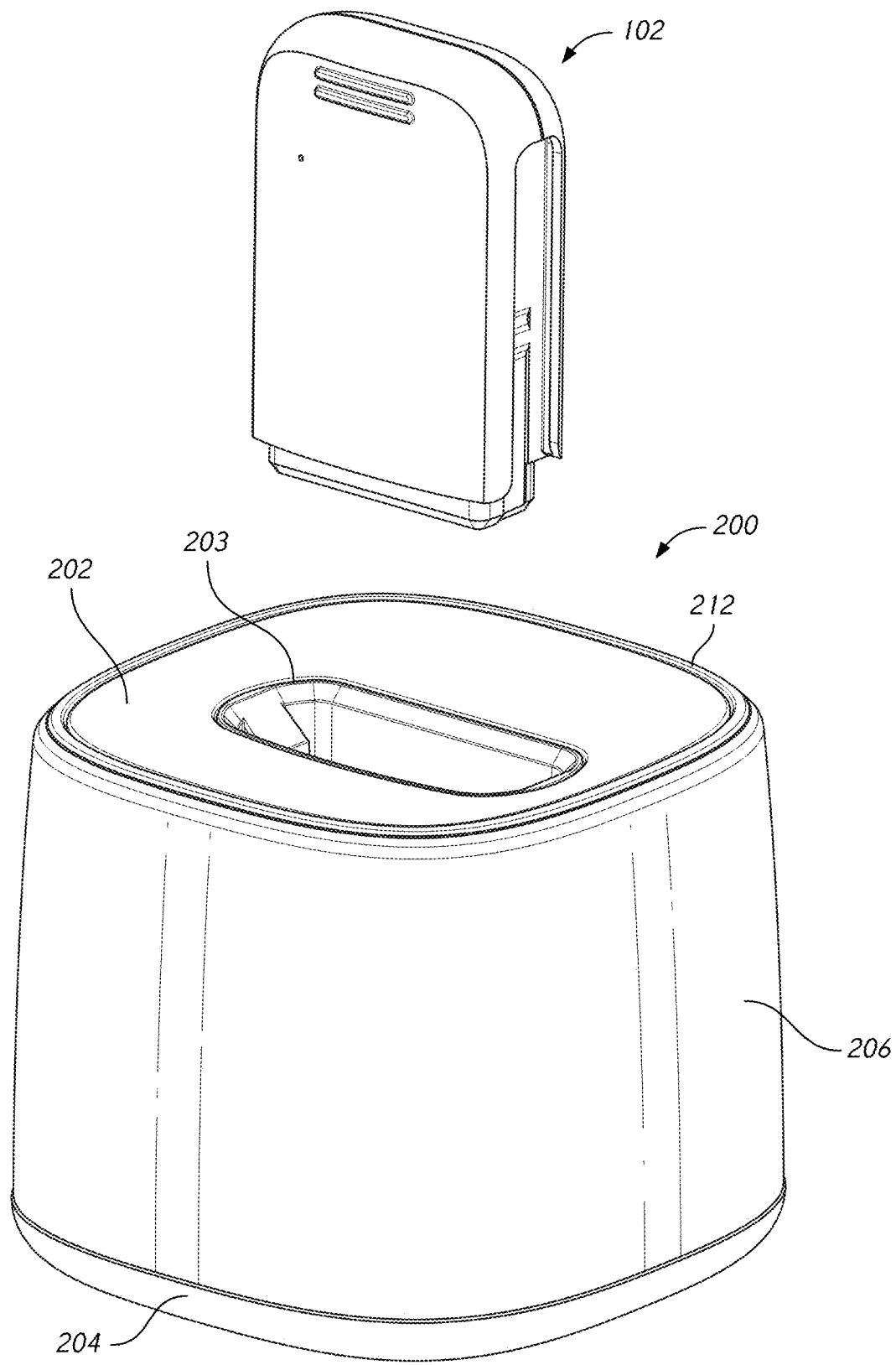
FIGS. 9A-9B illustrate perspective views of a charging station in accordance with aspects of this disclosure.
Figure 9B:
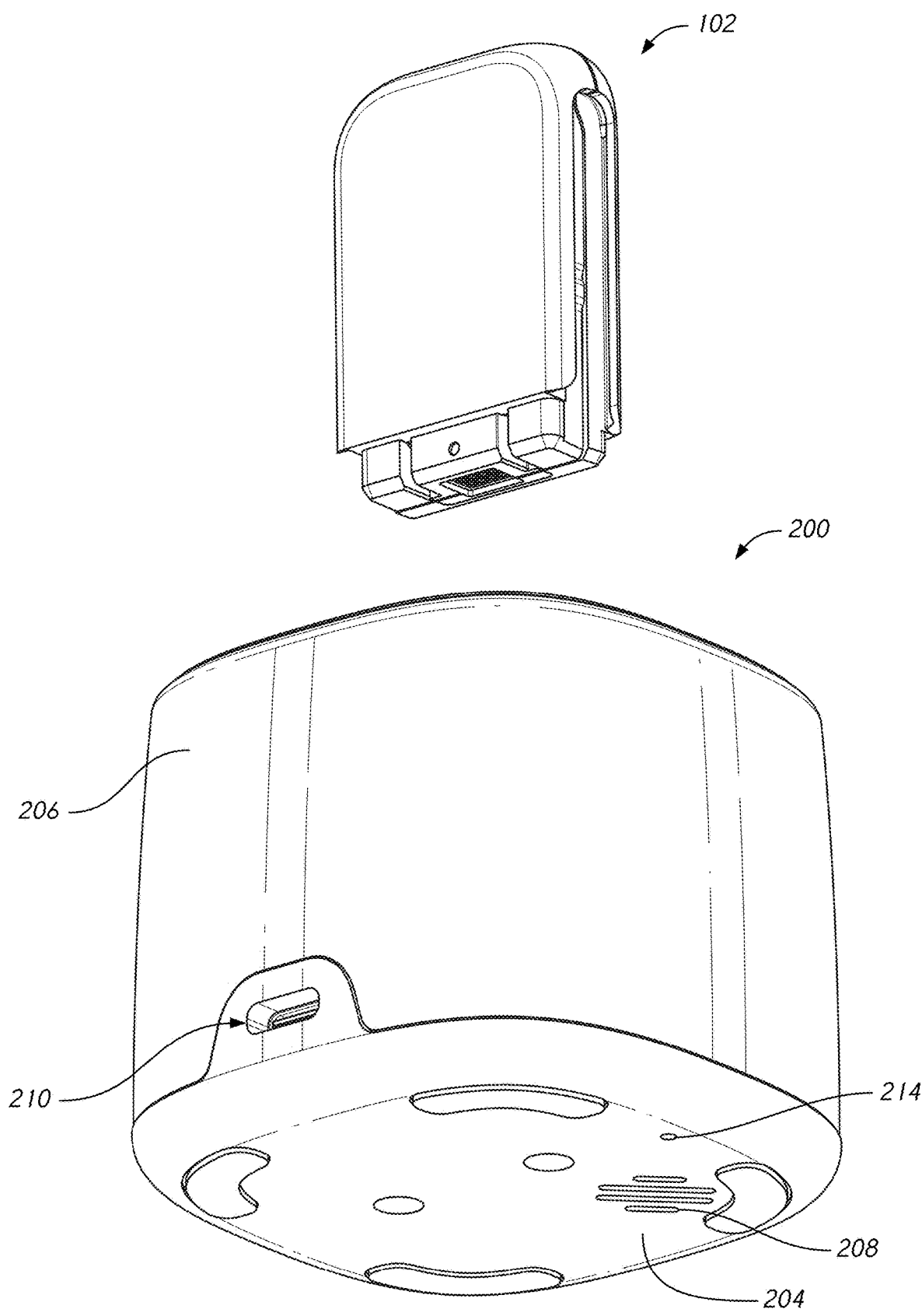
Figure 9C:
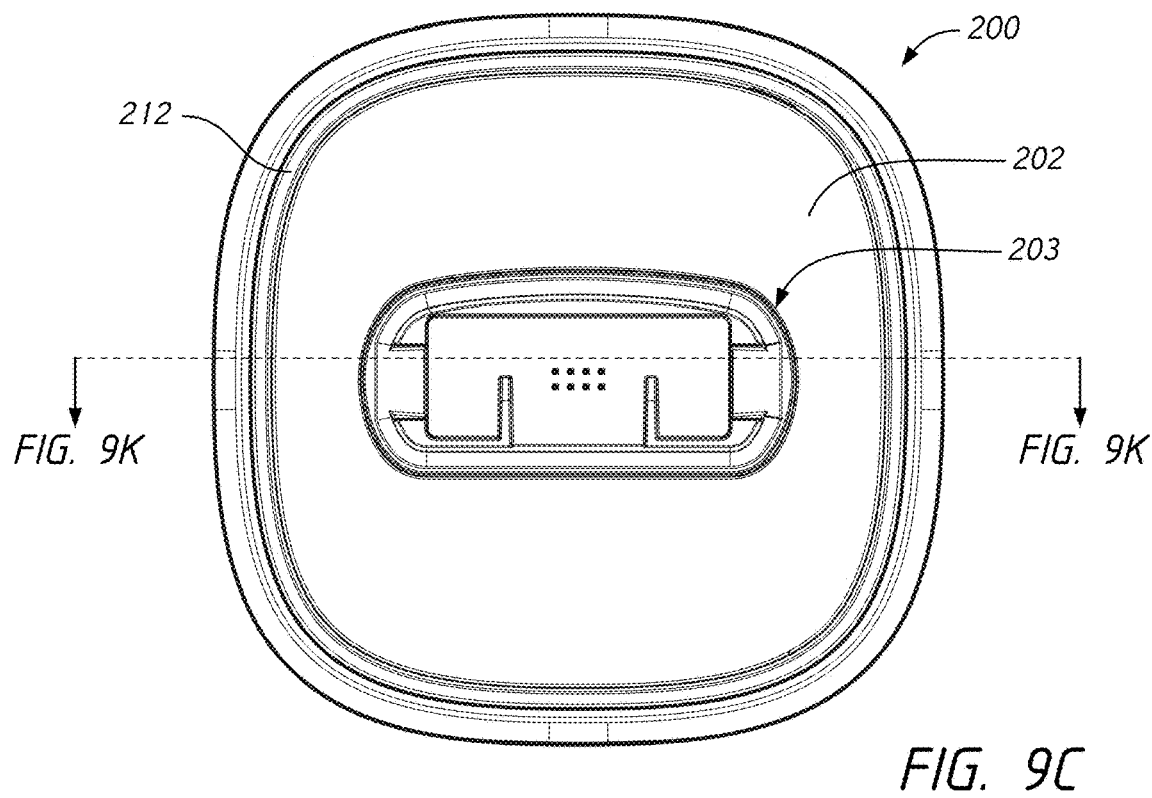
FIGS. 9C-9H illustrate top, bottom, front, back, and side views, respectively, of the charging station of FIGS. 9A-9B in accordance with aspects of this disclosure.
Figure 9D:
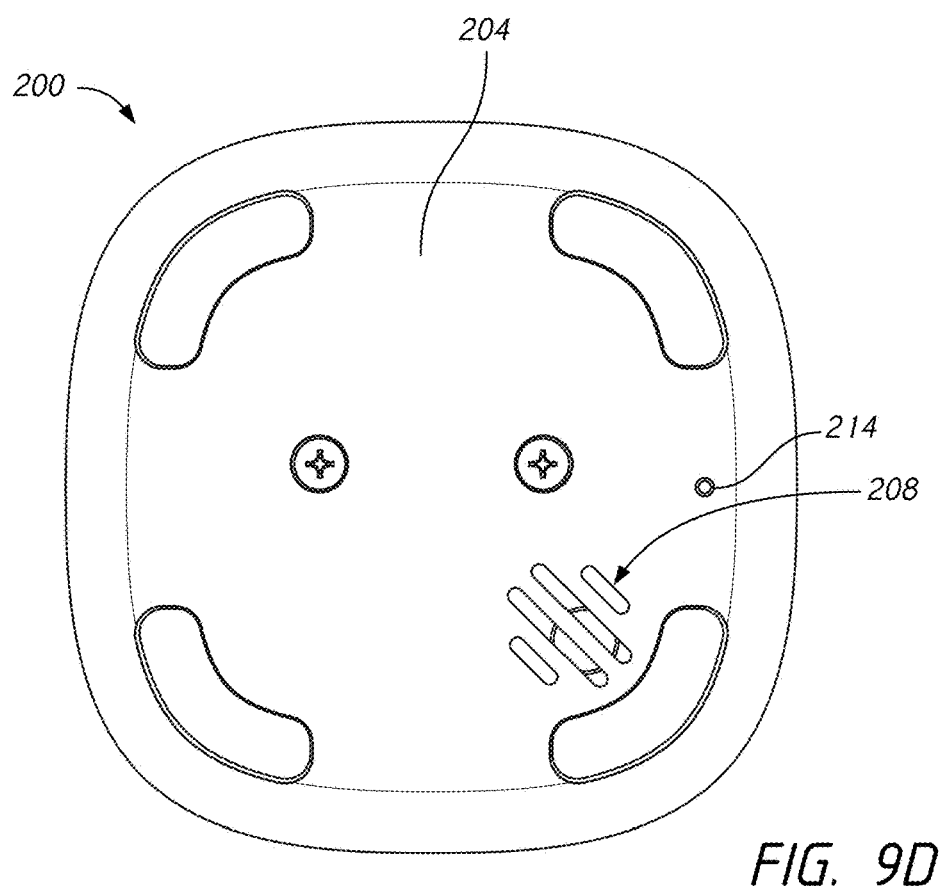
Figure 9E:
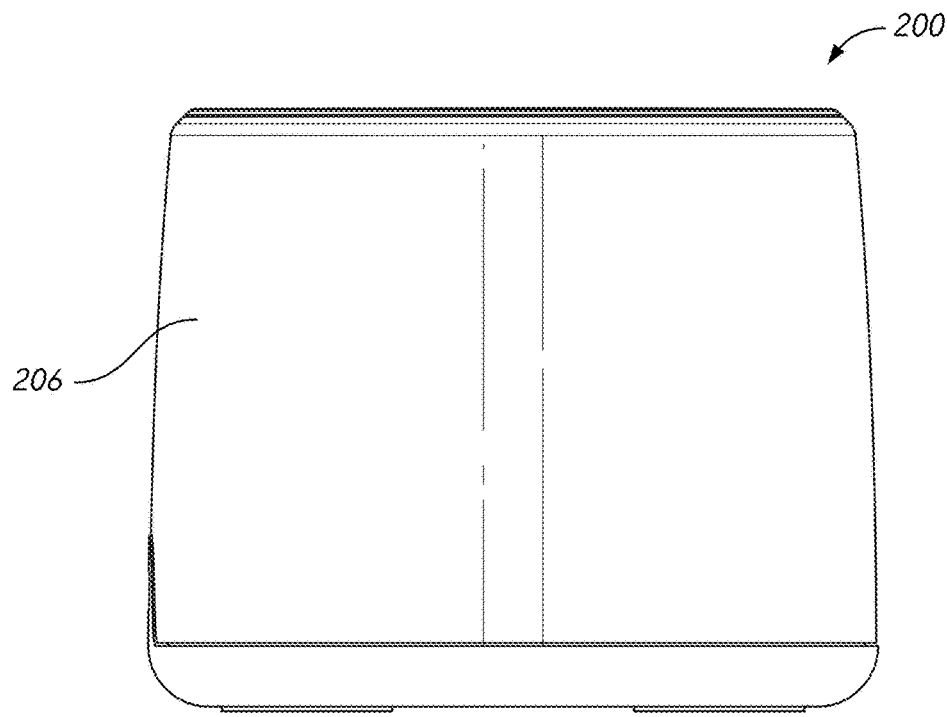
Figure 9F:
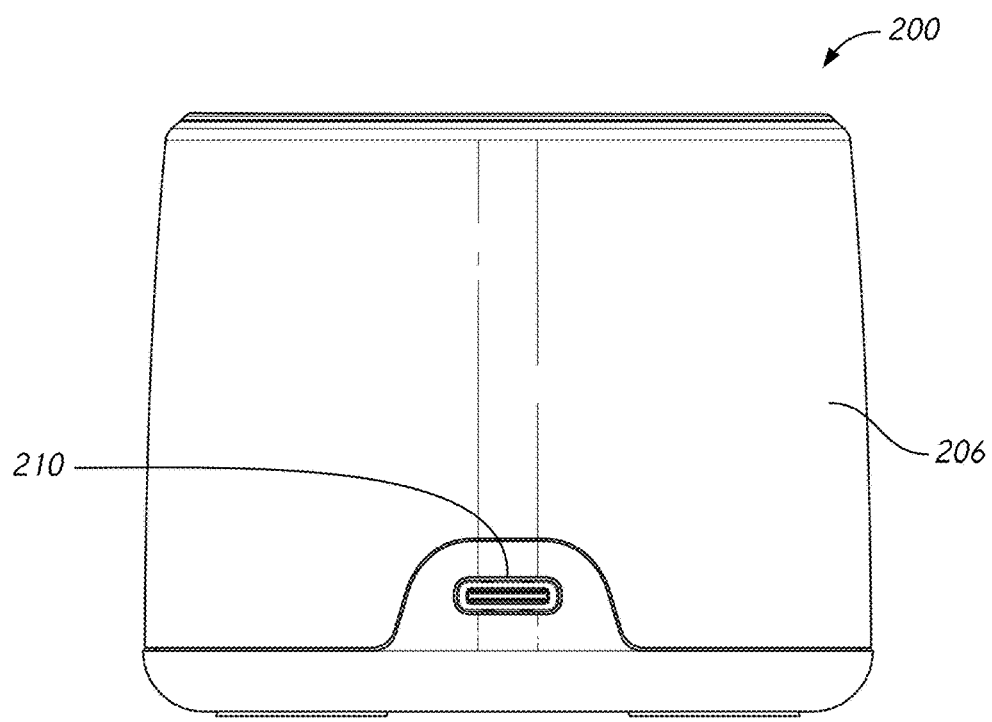
Figure 9G:
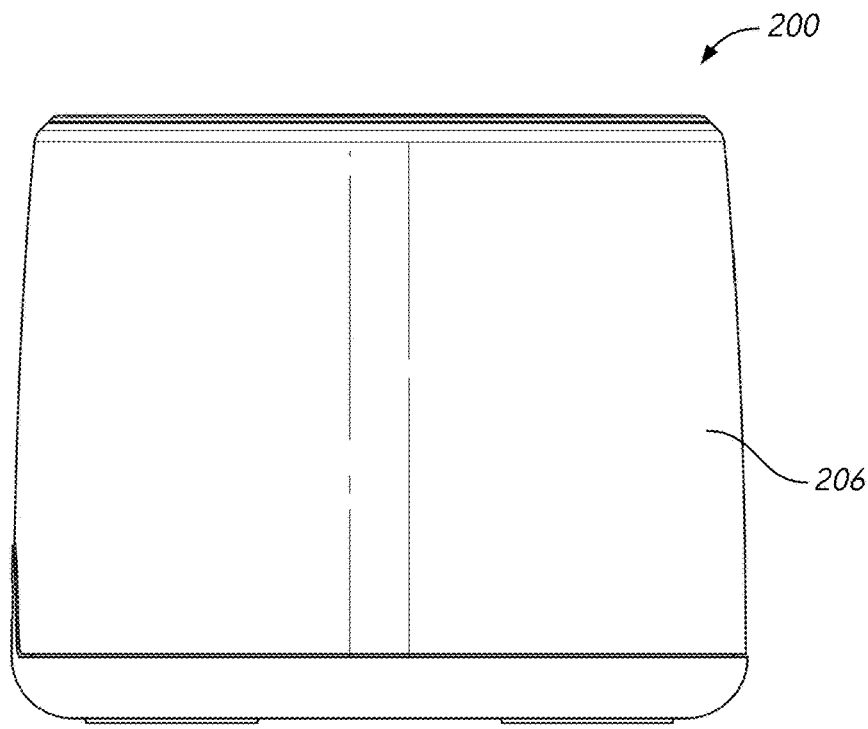
Figure 9H:
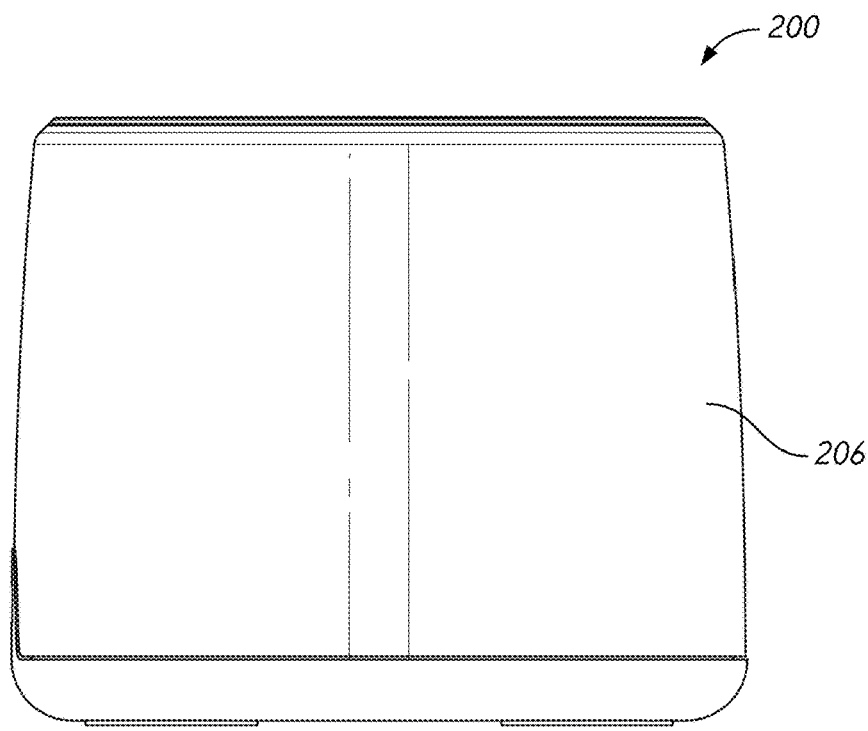
Figure 9I:
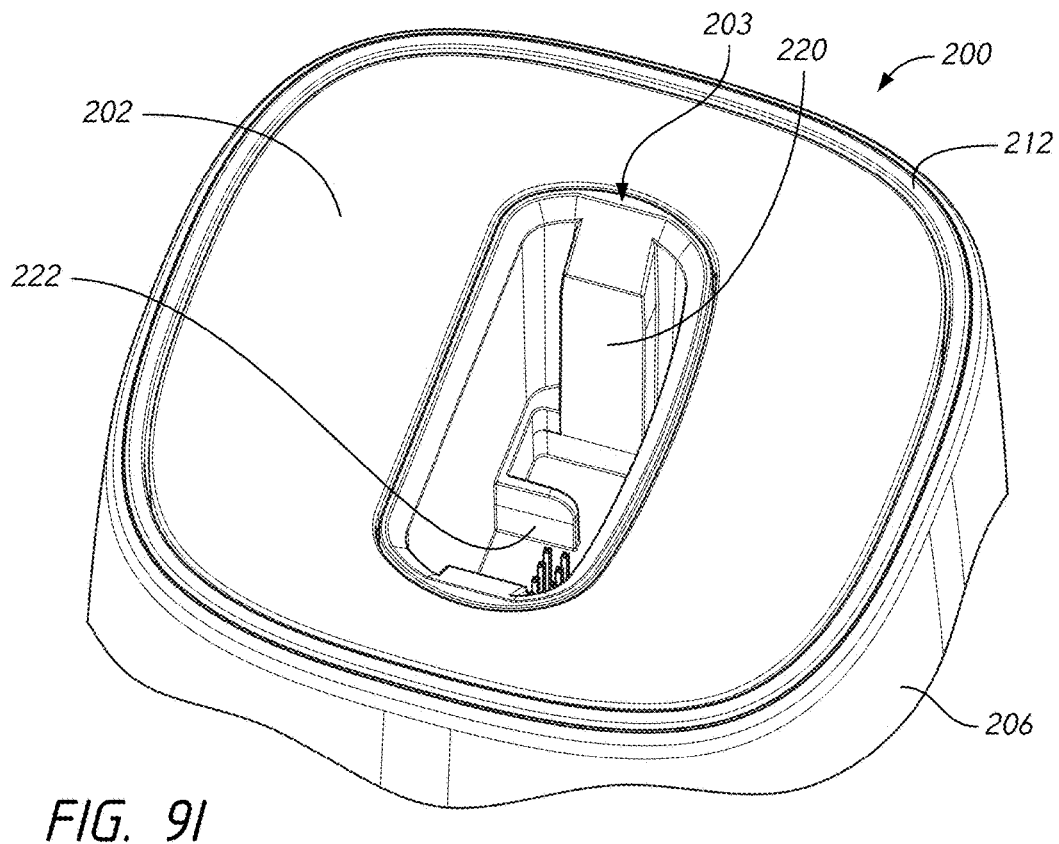
FIGS. 9I-9J illustrate top perspective views of the charging station of FIGS. 9A-9B in accordance with aspects of this disclosure.
Figure 9J:
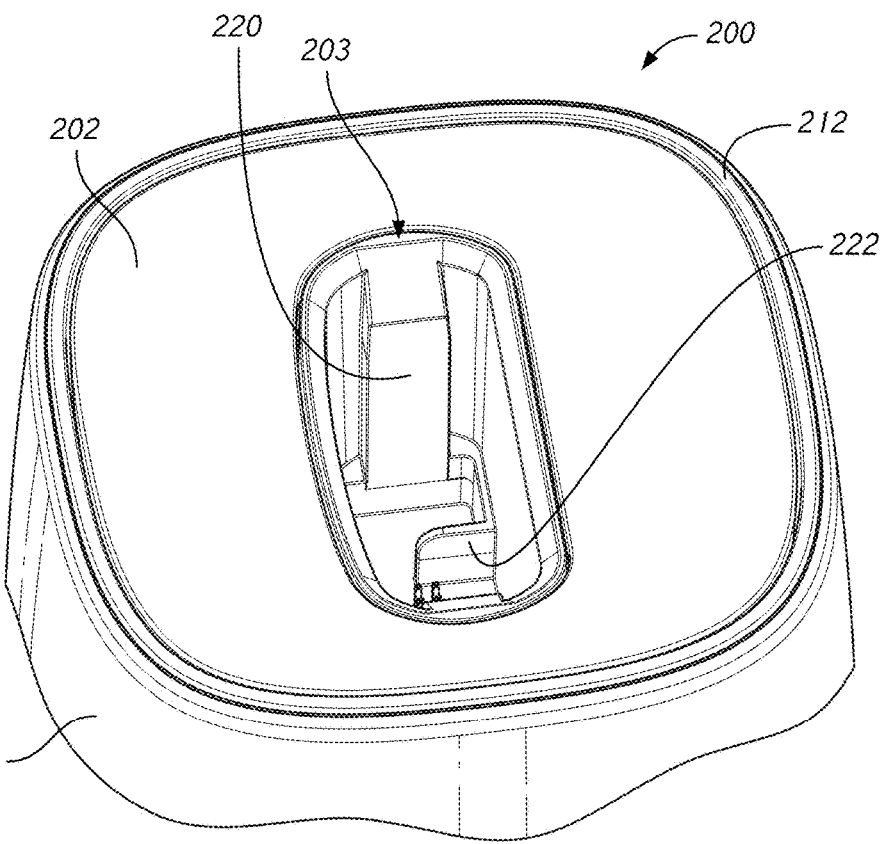
Figure 9K:
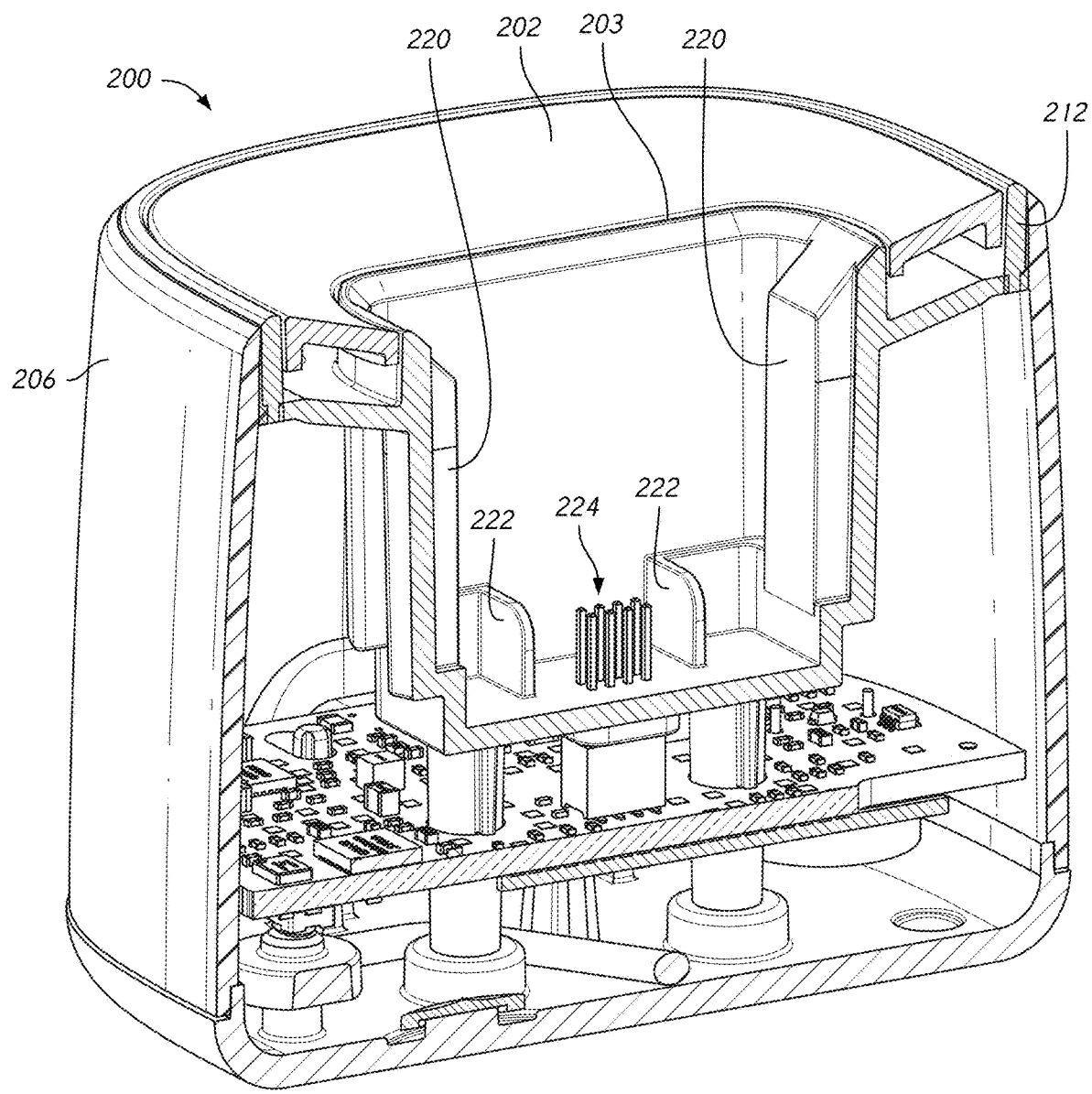
FIG. 9K illustrates a perspective cross-sectional view taken through the charging station of FIGS. 9A-9B in accordance with aspects of this disclosure.

FIGS. 9A-9K illustrate various views of a charging station 200. FIGS. 9A-9B illustrate perspective views of the charging station 200 with the sensor hub 102 described herein removed from the charging station 200, FIG. 9C illustrates a top view of the charging station 200 of FIG. 9A, FIG. 9D illustrates a bottom view of the charging station 200 of FIG. 9A, FIGS. 9E-9F illustrate front and back views, respectively, of the charging station 200 of FIG. 9A, FIGS. 9G-9H illustrate side views of the charging station 200 of FIG. 9A, FIGS. 9I-9J illustrate perspective views of the charging station 200 of FIG. 9A, and FIG. 9K illustrates a perspective cross sectional view through the charging station 200 of FIG. 9A as indicated in FIG. 9C.

The charging station 200 can be configured to releasably mechanically and electrically connect to (e.g., receive) the sensor hub 102. The charging station 200 can, when electrically connected to the sensor hub 102, charge and/or recharge the battery 165 of the sensor hub 102. As shown in FIGS. 9A-9K, the charging station 200 (which can also be referred to herein as a "charging base" and/or "base station") can comprise a generally cube like body 206 with a bottom plate 204 (which can also be referred to herein as a "bottom surface"), a top plate 202 (which can also be referred to herein as a "top surface"), a cavity 203, and an electrical connector 210. The body 206 of the charging station 200 can have a rounded square like cross section, seen most clearly in the top and bottom views of FIGS. 9C-9D. The charging station 200 can include an indicator 212, opening(s) 208, one or more speakers, a reset button 214, and other features as described further below. Furthermore, the charging station 200 can include any one or more of the features described with respect to the schematic diagram of FIG. 2C, including one or more processor(s) 102a, one or more storage device(s) 102b, a communication module 102c, a battery 102d, an information element 102e, a vibration motor 102f, one or more other sensor(s) 120h, and one or more status indicator(s) 102g.

As shown in FIGS. 9A-9K, the bottom plate 204 can connect to the body 206 and form the bottom portion of the charging station 200. The opening(s) 208 can be disposed on the bottom plate 204 and can, for example, facilitate communication and/or sound from one or more speakers and/or other indicators disposed within the charging station 200 from being transmitted to outside of the charging station 200 (e.g., for a subject to hear and/or be notified). The charging station 200 can be configured to rest on a surface, such as a table top, and as such the bottom plate 204 can include one or more pads, non-slip features, etc. and/or be otherwise configured to provide a stable base for the charging station 200. The bottom plate 204 can also include the electrical connector 210, which can be disposed along a side of the bottom plate 204 such that it is accessible when the charging station 200 rests on/against a surface. As shown, the electrical connector 210 can be disposed along the side of the bottom plate 204 at an end of the charging station 200 that is the back of the charging station 200. In some implementations the electrical connector 210 can instead be disposed on a portion of the body 206, for example the side of the body 206 that is the back end of the charging station 200. The electrical connector 210 can be a connector and/or charging port, such as a USB-C connector/port, that can be configured to provide power to the charging station 200 when operably connected to a power source. In some implementations, the charging station 200 can include a reset button 214 disposed on the bottom plate 204 configured to reset the charging station 200 if pressed and/or pressed and held by the subject.

Further as shown, the top plate 202 can connect to the body 206 and form the top portion of the charging station 200. The top plate 202 can be configured as a push-button, such that the subject can push down on a surface (e.g., the top facing surface) of the top plate 202 to interact with the charging station 200. In some implementations, the surface of the top plate 202 slopes downward towards its center, creating a generally concave surface of the top plate 202. The indicator 212 can be disposed at and/or between the peripheral connection between the top plate 202 and the body 206. For example, the indicator 212 can at least partially circumferentially surround the top plate 202 (as shown, the indicator 212 fully circumferentially surrounds the top plate 202). The indicator 212 can be configured to emit optical radiation and/or allow emission of optical radiation. As an example, the indicator 212 can include one or more emitters configured to emit optical radiation from the charging station 200. As another example, the indicator 212 can be made of a transparent, a semi-transparent, a light transmissible, and/or a partially light transmissible material that can allow optical radiation from one or more emitters located inside the charging station 200 to pass and/or partially pass through. The indicator 212 can be configured to indicate a status of the charging station 200 and/or to indicate a status of the sensor hub 102 when the sensor hub 102 is connected to the charging station 200 (e.g., to indicate a charge state of the battery 165 of the sensor hub 102, such as low charge, medium charge, and/or fully charged).

With continued reference to FIGS. 9A-9K, the cavity 203 of the charging station 200 can be configured to releasably mechanically receive the sensor hub 102. As such, the cavity 203 can be shaped and sized to receive the sensor hub 102. The cavity 203 can be disposed within and/or be defined by an opening in the top plate 202, such that the cavity 203 extends down from the top surface of the charging station 200 towards the bottom of the charging station 200. The cavity 203 can include one or more features for releasably mechanically connecting to the sensor hub 102. For example, the cavity 203 can include stem(s) 220 configured to releasably mechanically connect with the sensor hub 102. The stem(s) 220 can releasably mechanically connect with the sensor hub 102 similar to how the arm(s) 122 of the dock 106 can connect with the sensor hub 102. For example, the stem(s) 220 can be disposed and extend along opposite sides of the cavity 203 and can slidably fit the recessed portion(s) 158 of the sensor hub 102 when the sensor hub 102 is slid into the cavity 203. In some implementations and as shown (e.g., in particular in the top view of FIG. 9C), the cavity 203 can have a variable contour and/or a contour on one side that is different from a contour of an opposite side (e.g., sides that do not have the stem(s) 220) to ensure and/or aid in proper alignment and placement of the sensor hub 102 with the charging station 200.

The cavity 203 can include one or more additional and/or alternative features for releasably electrically and mechanically connecting the sensor hub 102 with the charging station 200. With continued reference to FIGS. 9A-9K, the cavity 203 can include an electrical connector 224 configured to electrically and mechanically connect with the corresponding electrical connector 151 of the sensor hub 102. The sensor hub 102 and its components, such as processor(s) 102a and battery 102d/165, can be operably connected to the charging station 200 and components thereof, including electrical connector 210 for receiving electrical power, when the electrical connector 151 of the sensor hub 102 is connected to the electrical connector 224 of the charging station 200. In some implementations, the electrical connector 151 of the sensor hub 102 can be electrically and mechanically connected to the electrical connector 224 of the charging station 200 when the sensor hub 102 is mechanically connected to the charging station 200, such as by the connection between the stem(s) 220 of the charging station and the recessed portion(s) 158 of the sensor hub 102 as described above. In some cases, the sensor hub 102 can be electrically and mechanically connected to the charging station 200 when it is placed inside the cavity 203. The electrical connector 224 of the charging station 200 can include one or more pins, for example 8 pins as shown in FIGS. 9C and 9K. In some implementations, the electrical connector 224 can include any number of pins. In some implementations, the electrical connector 224 can include one or more openings configured to receive one or more pins of the corresponding electrical connector of the sensor hub 102. As shown in FIGS. 9C and 9K, the electrical connector 224 can be disposed within the cavity 203, for example at the bottom of the cavity 203, such that it faces the sensor hub 102 when the sensor hub 102 is connected to the charging station 200. In some implementations, the charging station 200 can include one or more features to aid in aligning the electrical connector 224 to the corresponding electrical connector of the sensor hub 102. For example, the cavity 203 can include walls 222 adjacent the electrical connector 224, the walls 222 configured to aid in releasably connecting the electrical connector 224 with the corresponding electrical connector 151 of the sensor hub 102.

In some implementations, the charging station 200 includes a communication module that comprises an NFC antenna (for example, within a front side of the body 206) for recognizing and/or communicating with other electronic device(s) and/or sensor(s). In some implementations, the sensor hub 102 can automatically pair with and/or begin electrical communication with the charging station 200 when the sensor hub 102 is mechanically and electrically coupled to the charging station 200, such as by when the sensor hub 102 is seated within cavity 203 of the charging station 200 and the electrical connector 151 of the sensor hub 102 is operably connected with the electrical connector 224 of the charging station 200 (e.g., when the sensor hub 102 is docked with the charging station 200). The charging station 200 can charge the battery 165 of the sensor hub 102 when the sensor hub 102 is docked with the charging station 200. Further, and in some implementations, the sensor hub 102 can download data, such as physiological data from the subject 1, to the charging station 200 and/or to a server, another electronic device, the cloud, and/or a wireless or wired network via the charging station 200. In some implementations, the charging station 200 can update software of the sensor hub 102 when the sensor hub 102 is docked with the charging station 200.

In some implementations (not shown), the charging station 200 can be configured as an array such that it can releasably electrically and mechanically connect to more than one sensor hub 102 at a time. For example, the charging station 200 can be configured to have more than one cavity 203 configured to releasably electrically and mechanically connect to more than one sensor hub 102. In some implementations, the charging station 200 can be configured as a linear array of cavities 203 (e.g., an array of two, three, four, or more cavities). In some cases, the charging station 200 can be configured as an array of cavities 203 with one or more "rows" and one or more "columns." In some implementations, the charging station 200 can be configured to slidably receive the sensor hub 102 in a vertical orientation, such as shown in FIG. 9A. In some implementations, the charging station 200 can be configured to slidably receive the sensor hub 102 in an orientation other than vertical, such as at an angle to the vertical, sideways, horizontally, etc.

In some implementations, the charging station 200 can include a battery 102*d* configured as a backup battery for providing power/charge to a sensor hub 102 even if the power source that provides power to the charging station 200 is unavailable. Such a backup battery can be sized/rated and/or have a capacity to provide a partial charge, a full charge, two full charges, more than two full charges or any amount of a partial or a full charge to the sensor hub 102 in the case of a power outage.

Figure 10:
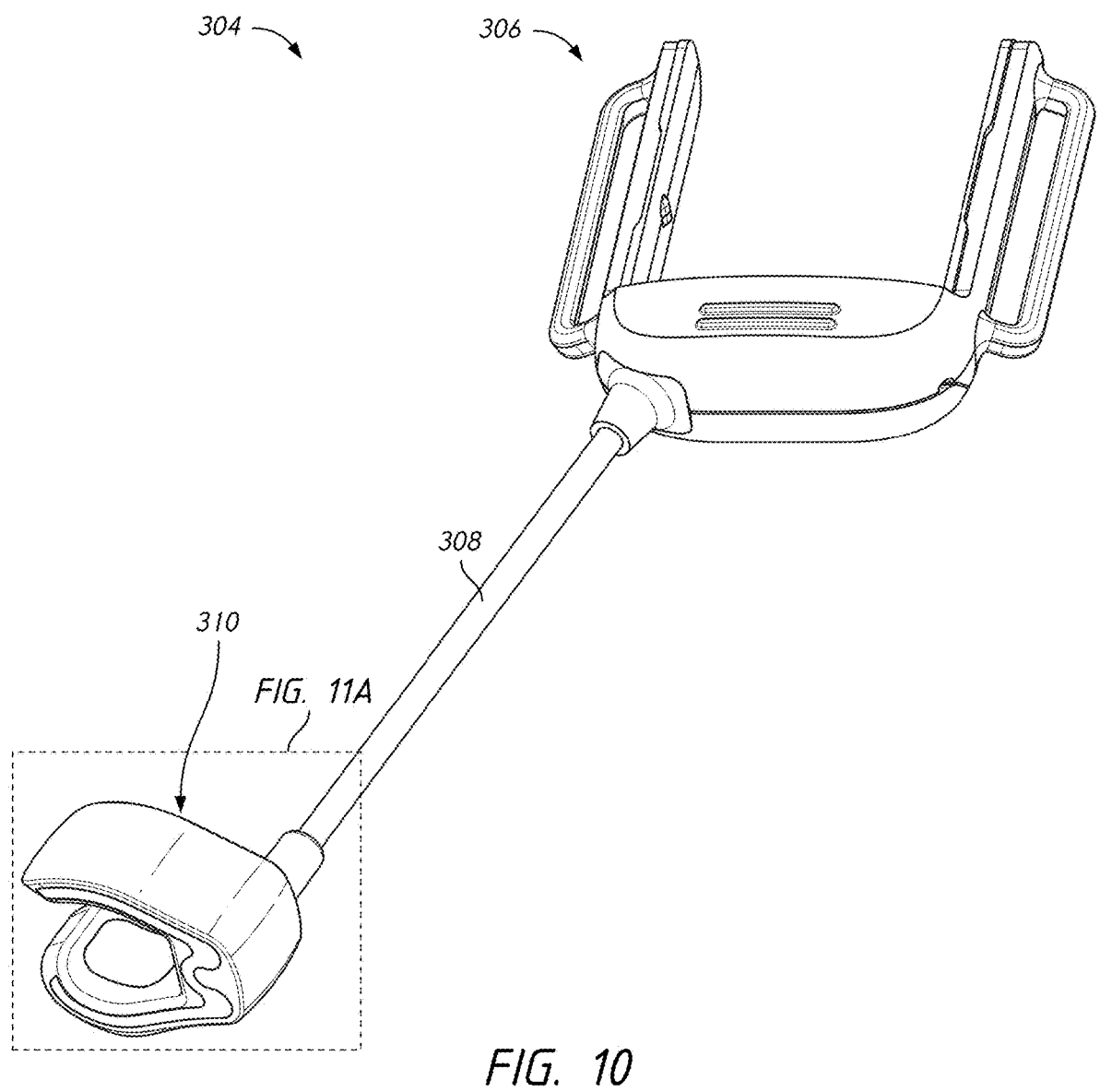
FIG. 10 illustrates a perspective view of another implementation of a sensor dock assembly in accordance with aspects of this disclosure.

FIG. 10 illustrates a perspective view of another implementation of a sensor dock assembly 304 that can be utilized with sensor hub 102 in a similar or identical manner as that described above with respect to sensor dock assembly 104. The sensor dock assembly 304 can be similar or identical to the sensor dock assembly 104 in some or many respects. For example, the sensor dock assembly 304 can have a sensor dock 306 that is similar or identical to the sensor dock 106 of the sensor dock assembly 104. The sensor dock assembly 304, in particular the dock 306, can thus releasably electrically and mechanically connect with the sensor hub 102 similar and/or the same as how the sensor hub 102 releasably electrically and mechanically connects to the sensor dock assembly 104 via the dock 106. The sensor dock assembly 304 can also be configured to be secured to the wrist 3 of the subject 1 similar and/or the same as how the sensor dock assembly 104 can be secured to the wrist 3 of the subject 1. Further, the sensor dock assembly 304 can have a cable 308 configured similar and/or the same as the cable 108 of the sensor dock assembly 104. The cable 308 can operably connect the dock 306 with one or more emitters of an emitter package 334 and one or more detectors of a detector package 336. The emitter package 334 and the detector package 336 can be the same and/or similar to emitter package 134 and detector package 336 described herein. While not shown, the cable 308 can be secured to and/or positioned along the subject 1 similar and/or the same as how the cable 108 can be secured to and/or positioned along the subject 1 when the sensor dock assembly 304 is secured to the subject 1, including in some implementations the use of one or more cable retainers which can be the same and/or similar to cable retainers 103, 105 described herein. For example, the dock 306 can be secured to the subject's wrist 3 by a strap (not shown) such that the cable 308 extends from the dock 306 in a direction generally away from the palm 4 and/or the hand of the subject 1, the cable 308 can be secured by one or more cable retainers (e.g., the same or similar to cable retainer 103 described herein) to cause the cable 308 to bend towards the palm 4 and/or the hand of the subject 1 and extend along the outside edge of the subject's palm 4 towards the subject's pinky finger, the cable 308 can be secured by one or more cable retainers (e.g., the same or similar to cable retainer 105 described herein) to aid in causing the cable 308 to extend along the outside edge of the palm 4 and to cause the cable 308 to extend along at least a portion of the outside edge of the subject's pinky finger until the cable 308 connects with the emitter package 334 and the detector package 336 operably positioned by a clip member 310. The sensor dock assembly 304 can differ from the sensor dock assembly 104 in that instead of having the ring member 110, the sensor dock assembly 304 can have the clip member 310 for operably positioning the emitter package 334 and the detector package 336. In some implementations and as shown, the cable 308 can differ from the cable 108 in that it does not split into a first portion and a second portion but instead remains as a singular cable that connects with the clip member 310. Other aspects of the sensor dock assembly 304 will be described further below with respect to FIGS. 11A-11H and FIGS. 12A-12B.

Figure 11A:
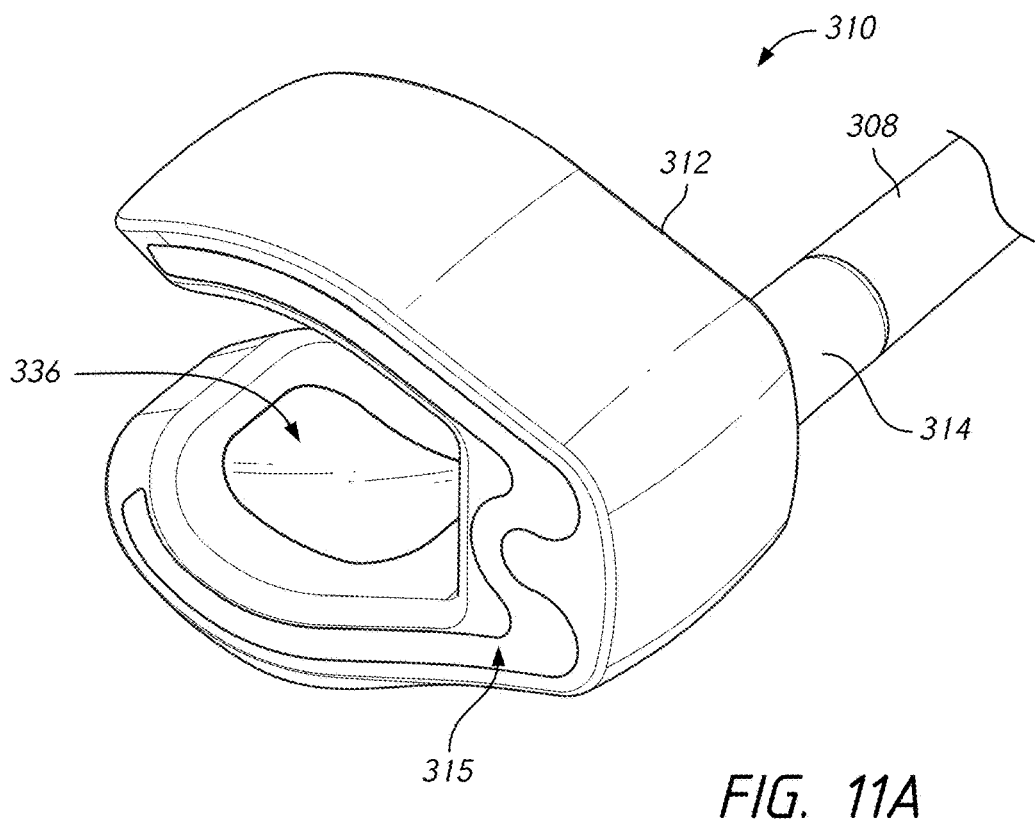
FIGS. 11A-11B illustrate perspective views of a clip member and a portion of a cable of the sensor dock assembly of FIG. 10 in accordance with aspects of this disclosure.
Figure 11B:
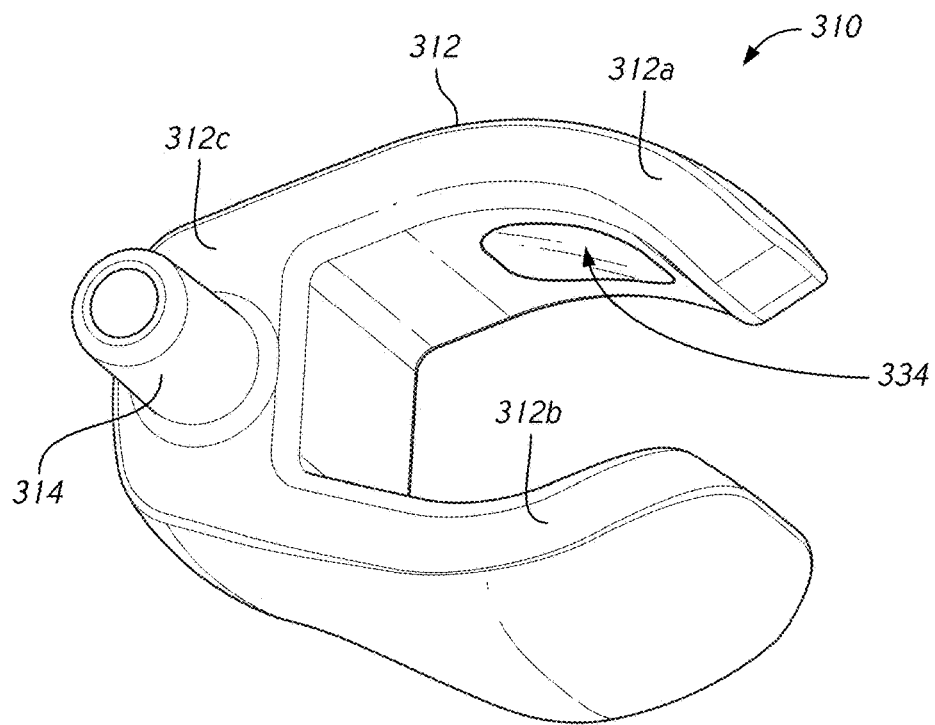
Figure 11C:
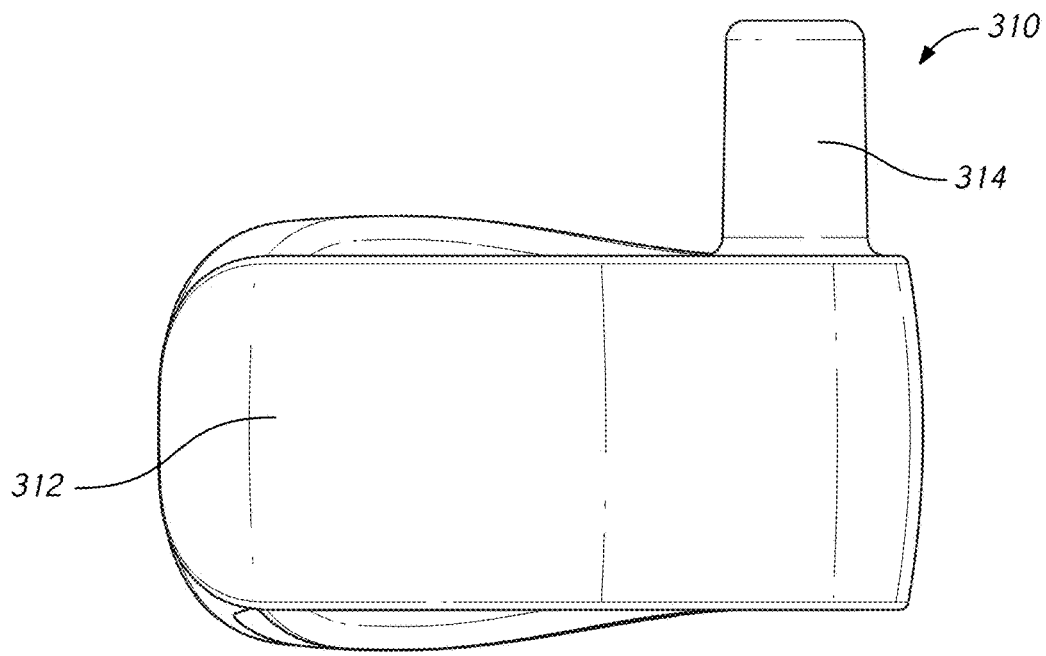
FIGS. 11C-11H illustrate top, bottom, front, back, and side views, respectively, of the clip member of FIGS. 11A-11B in accordance with aspects of this disclosure.
Figure 11D:
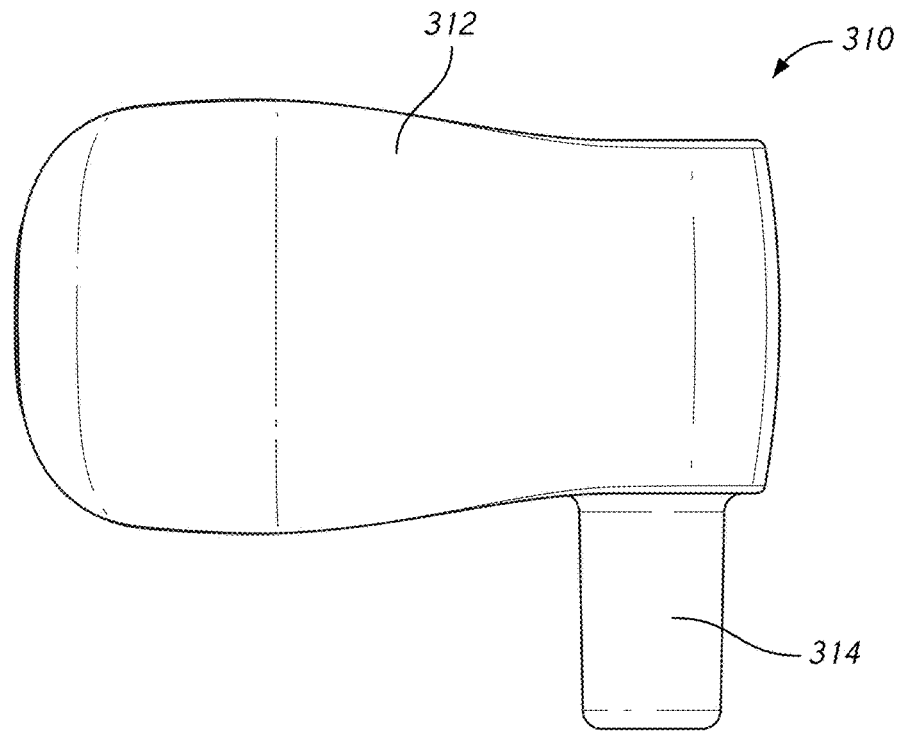
Figure 11E:
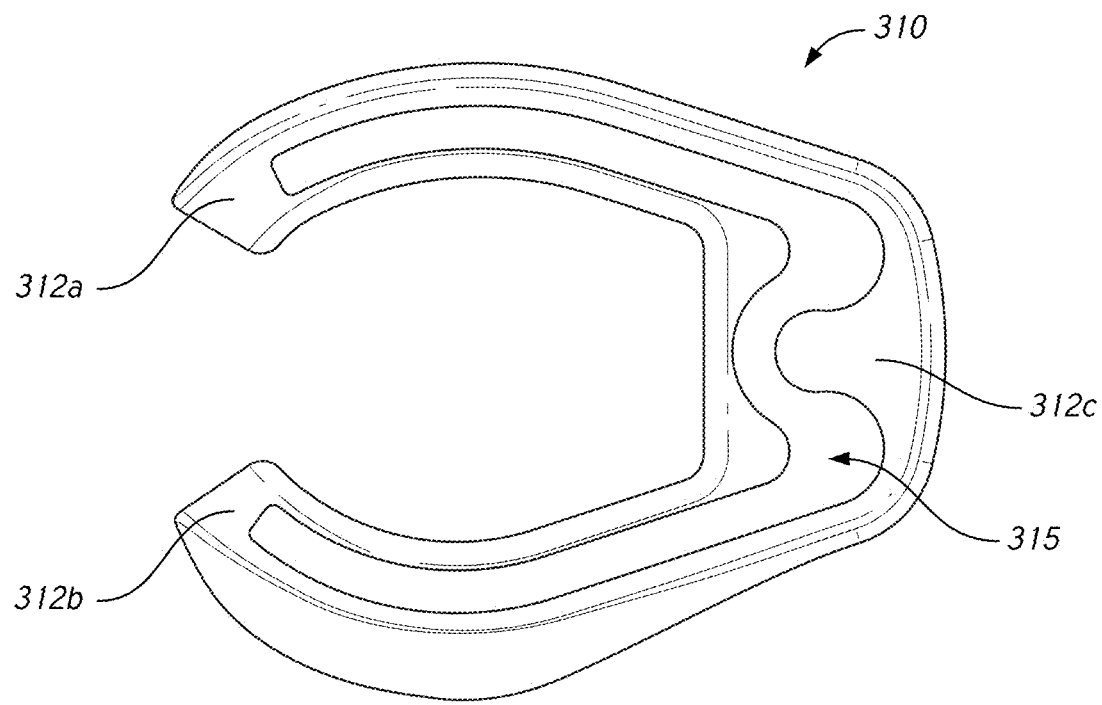
Figure 11F:
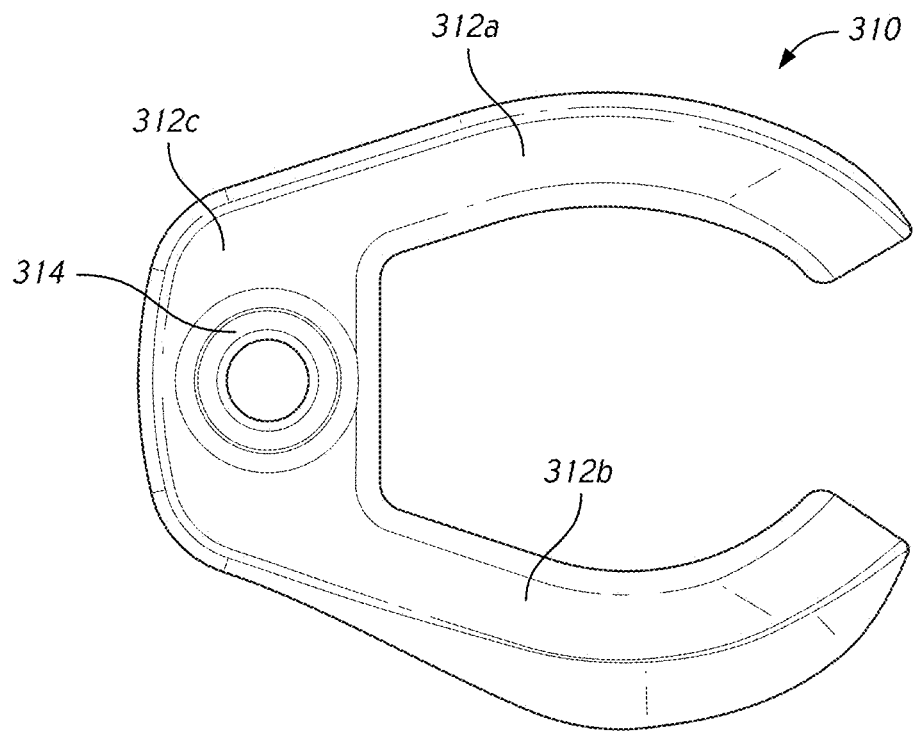
Figure 11G:
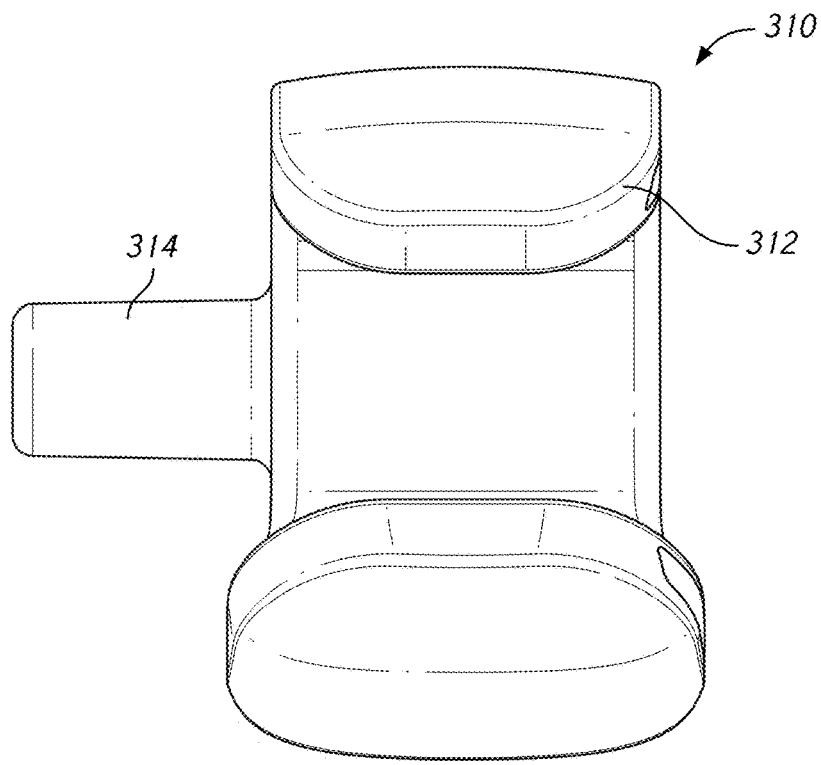
Figure 11H:
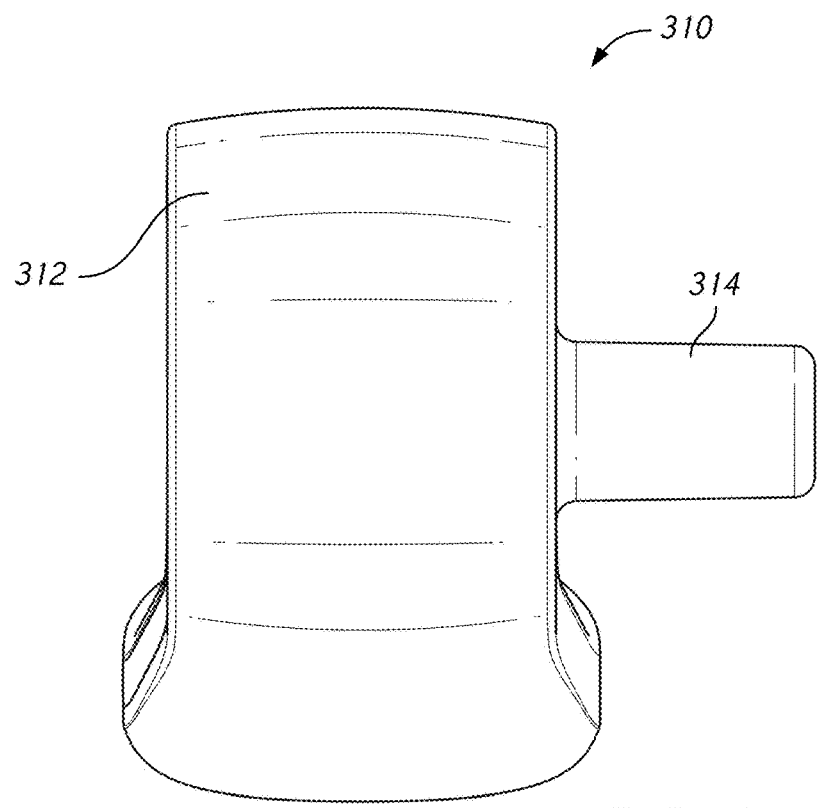
Figure 12A:
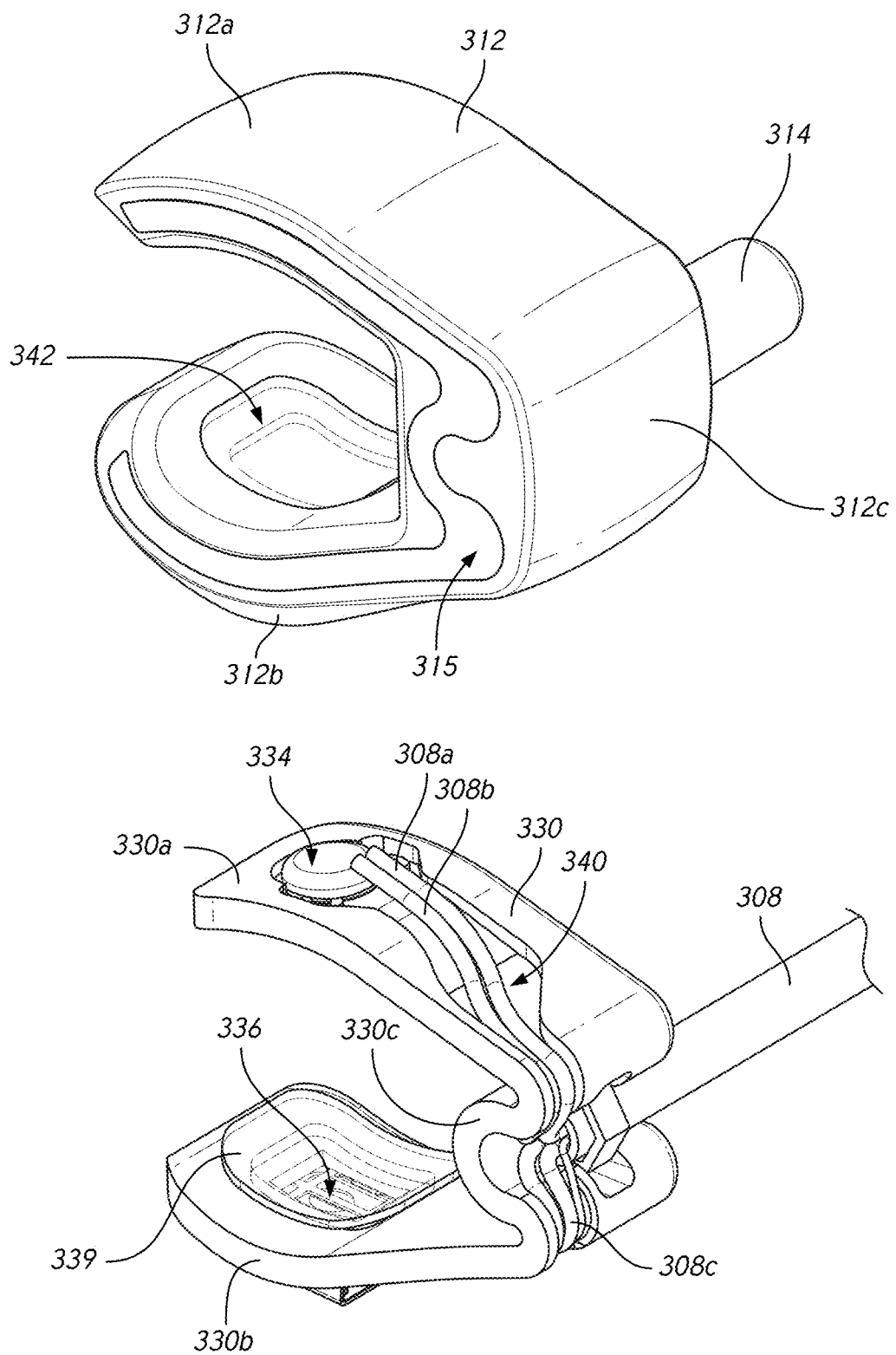
FIGS. 12A-12B illustrate perspective views of the clip member of the sensor dock assembly of FIGS. 11A-11B with a housing of the clip member separated from a biasing member of the clip member in accordance with aspects of this disclosure.
Figure 12B:
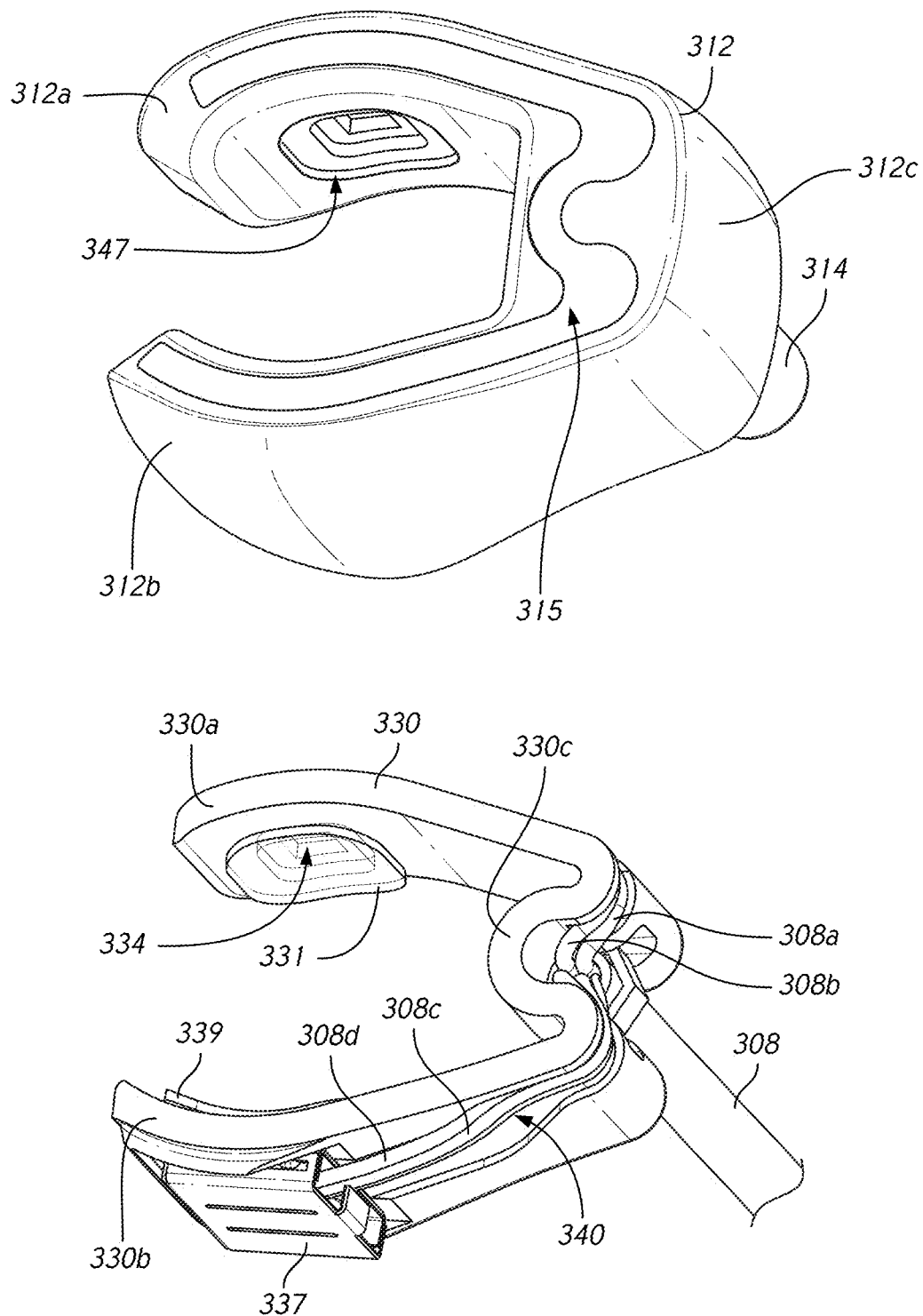

FIGS. 11A-11B illustrate perspective views of the clip member 310 and a portion of the cable 308 connecting to the clip member 310. Also shown are positions of the emitter package 334 and the detector package 336 with respect to the clip member 310. FIG. 11C illustrates a top view, FIG. 11D illustrates a bottom view, FIGS. 11E-11F illustrate front and back views, respectively, and FIGS. 11G-11H illustrate side views of the clip member 310. FIGS. 12A-12B illustrate perspective views of the clip member 310 with a housing 312 of the clip member 310 separated from a biasing member 330 of the clip member 310, the emitter package 334, and the detector package 336.

The clip member 310 can be configured to be secured around the finger 2 of the subject 1. In some implementations, the clip member 310 can be secured around the finger 2 of the subject 1 similar and/or the same as how the ring member 110 is secured around the finger 2 of the subject 1 (e.g., over a nail bed of the subject's pinky finger). For this, the housing 312 of the clip member 310 can be in a generally C shaped and/or a partial ring configuration with one or more prongs configured to secure around at least a portion of the subject's finger 2. For example, the housing 312 of the clip member 310 can include a prong 312*a* and a prong 312*b* configured to secure around opposite sides of the subject's finger 2. Prongs 312*a*, 312*b* can be coupled to one another, such as is shown. Prongs 312*a*, 312*b* can be configured to flex toward and/or away from one another, for example, during securement to the subject's finger 2. Prongs 312*a*, 312*b* can be configured to move (for example, flex) between various positions with respect to one another. For example, prongs 312*a*, 312*b* can be configured to flex from and/or between a first position and/to a second position. Such first position can be a neutral and/or unstressed position and/or state of the prongs 312*a*, 312*b*. Such first position can be a position and/or state where the prongs 312*a*, 312*b* are not secured to a subject's finger 2. Such a second position can be a stressed position and/or state of the prongs 312*a*, 312*b* where the prongs 312*a*, 312*b* are at least partially flexed (for example, flexed open). For example, such second position can be a position or state when the clip member 310 is secured to the subject's finger 2. Prongs 312*a*, 312*b* or portions thereof (for example, free ends thereof) can be positioned closer to one another when in such first position than when in such second position.

With reference to at least FIGS. 11E-11F, clip member 210 can include a coupling portion 312*c*. Coupling portion 312*c* can connect prongs 312*a*, 312*b* (for example, ends of prongs 312*a*, 312*b*) and/or can be positioned between prongs 312*a*, 312*b* (for example, between ends of prongs 312*a*, 312*b*). As shown, coupling portion 106 can be generally straight, however it can be curved, straight, or a combination thereof. Coupling portion 312*c* can be sized and/or shaped to conform to a size and/or shape of the outside edge of the subject's finger 2. In some implementations, coupling portion 312*c* can be integral and/or contiguous with one or both of prongs 312*a*, 312*b*. For example, the housing 312 of the clip member 310 can at least partially define and/or form the coupling portion 312*c* and prongs 312*a*, 312*b*. In some implementations, the entire portions of the housing 312 of the clip member 310 that contacts and/or is placed proximate or adjacent the subject's finger 2 when in use can be contiguous, which can greatly increase comfort to the subject. In some implementations, entire exterior portions of the prongs 312a, 312b and the coupling portion 312c can be defined by a single contiguous housing 312. In some implementations, such housing 312 can comprise a resilient and flexible material (e.g., a silicone material). In some cases, the housing 312 of the clip member 310 can be made of a material similar to and/or the same as the ring member 110.

With continued reference to FIG. 10, FIGS. 11A-11H, and FIGS. 12A-12B, the clip member 310 can include a bend relief 314 where coupled to the cable 308. The bend relief 314 can be integral with and/or contiguous with one or both of prongs 312a, 312b and/or coupling portion 312c. As such, the bend relief 314 can be integrated with the housing 312. The bend relief 314 can extend outward from the clip member 310 in a direction along the outside edge of the finger of the subject 1 when the clip member 310 and the rest of the sensor dock assembly 304 is secured to the subject. Additionally, the bend relief 314 can be configured to extend toward the wrist 3 of the subject 1 when the clip member 310 is secured around the subject's finger 2 (e.g., the subject's pinky finger). As shown, the bend relief 314 can extend in a direction different than the prongs 312a, 312b (e.g., in a direction orthogonal to the prongs 312a, 312b). The bend relief 314 can be configured to receive the cable 308. For example, the bend relief 314 can include an opening sized and/or shaped to receive and/or secure the cable 308.

In some implementations and as shown in FIGS. 11E-11F, prongs 312a, 312b can each have a generally arcuate shape for securing around opposite sides of the subject's finger 2 (e.g., the prongs 312a, 312b can each comprise a bend and/or a curve for conforming to the top and bottom of the subject's finger, respectively). Further as shown, the prongs 312a, 312b can be generally of the same or similar length. The width of the prongs 312a, 312b can be different as shown in FIGS. 11G-11H, however in some implementations the width of the prongs 312a, 312b can be generally similar or the same. Such configuration can ensure that the clip member 310 comfortably contacts a portion of the subject's finger 2 in a manner which provides a robust skin-sensor interface, which advantageously provides for more accurate measurement of physiological parameters via the emitters package 334 and the detector package 336.

As discussed above, the clip member 310 can include a housing 312 that can at least partially define and/or form the coupling portion 312c, prongs 312a, 312b, and/or bend relief 314. With reference to FIGS. 12A-12B, the housing 312 can include an opening 315, which can be located in and extend at least part way through and across the prongs 312a, 312b and the coupling portion 312c. As shown, the opening 315 opens into an end of the housing 312 (e.g., the front) opposite an end where the bend relief 314 extends from (e.g., the back). The housing 312 can also include a cavity 342 located in prong 312b and/or a cavity 347 located in prong 312a. The cavities 342 and 347 can join and/or connect with the opening 315. The cavities 342 and 347 can extend through the prongs 312b and 312a, respectively, such that they open through the housing 312 in directions where they generally face each other. Together, opening 315 and cavities 342, 347 can be sized and shaped to receive the biasing member 330, the emitter package 334, optical transmission material 331 (which can be the same or similar to optical transmission material 131 described herein), the detector package 336, optical transmission material 339 (which can be the same or similar to optical transmission material 139 described herein), detector shield 337 (which can be the same or similar to detector shield 137 described herein), wires 308a and 308b that extend from the cable 308 and operably connect to the one or more emitters within the emitter package 334, and/or wires 308c and 308d that extend from the cable 308 and operably connect to the one or more detectors within the detector package 336. Specifically, opening 315 and cavity 342 can be sized and shaped to receive the biasing member 330, the detector package 336, optical transmission material 339, detector shield 337, and wires 308c, 308d, and opening 315 and cavity 347 can be sized and shaped to receive the biasing member 330, the emitter package 334, optical transmission material 331, and wires 308a, 308b.

In some implementations and as shown, the biasing member 330 can include a recess 340 configured to receive wires 308a, 308b, 308c, 308d, the emitter package 334 or a portion thereof, the detector package 336 or a portion thereof, and/or the detector shield 337 or a portion thereof. The recess 340 can allow for components or portions thereof of the clip member 310 (such as those just described) to fit recessed below an outer surface of the biasing member 330, which can facilitate assembly of the housing 312 over the biasing member 330 and other components shown. In some cases, the clip member 310 can be assembled by inserting the biasing member 330, the wires 308a, 308b, 308c, 308d, the emitter package 334, the detector package 336, optical transmission material 331, optical transmission material 339, and/or detector shield 337 into the openings 315 and cavities 342, 347 of housing 312, and subsequent to such placement, enclosing the opening 315. For example, the opening 315 can be sealed or filled in with a material (such as silicone or another material that forms part of the housing 312). In some implementations, the opening 315 can be sealed (for example, during manufacturing of sensor dock assembly 304) with a sealant (such as a liquid sealant) which can cover the biasing member 330. Such a sealant and/or filler can be exposed and/or form at least a portion of an exterior of the clip member 310, for example, along with the housing 312. In some cases, such a sealant can cover the opening 315 and the housing 312 to form the entire exterior of the clip member 310 that is visible.

As discussed above, the clip member 310 can include the biasing member 330. With reference to FIGS. 12A-12B, the biasing member 330 can include an arm 330a and an arm 330b spaced apart from one another and extending out in a similar direction from a coupling portion 330c. In some implementations and as shown, the biasing member 330 can have a generally W shaped cross section (although in other implementations, the coupling portion can be configured differently and the biasing member 330 can have a generally C shaped cross section or any other cross sectional shape). As shown, the arms 330a, 330b and coupling portion 330c of the biasing member 330 can comprise a combination of straight and/or curved portions and can be configured to aid in the clip member 310 being secured around a portion of the subject's finger 2 when the housing 312 is assembled over the biasing member 330. When the clip member 310 is assembled, the arm 330a of the biasing member 330 can be enclosed by the prong 312a of the housing 312, the arm 330b of the biasing member 330 can be enclosed by the prong 312b of the housing 312, and the coupling portion 330c of the biasing member 330 can enclosed by the coupling portion 312c of the housing 312. The biasing member 330 can be flexible and/or resilient. The biasing member 330 can comprise plastic, among other materials. The biasing member 330 can comprise a harder and/or more rigid material than housing 312. The biasing member 330 can be configured to have a greater stiffness than housing 312. The biasing member 330 can be configured to allow the clip member 310 to move (for example, flex) between a variety of different positions, such as the first and second positions discussed above, to facilitate positioning and/or securement of the clip member 310 to a portion of the subject's body (for example, the subject's pinky finger). The arms 330a, 330b of the biasing member 330 can be configured to flex and move away from and/or toward each other. Biasing member 330 can "bias" the clip member 310 to the first position (for example, neutral and/or unstressed position as discussed above). Further, the biasing member 330 can provide the clip member 310 with a biasing and/or spring-like force to allow the clip member 310 to secure to the finger 2 of the subject 1 (for example, when in the second position). In some implementations, the coupling portion 330c can advantageously define a flex point or region of the biasing member 330. For example, biasing member 330 can be configured to flex about and/or with respect to the coupling portion 330c. In some cases, such configuration can allow the arms 330a, 330b to flex more easily, which can advantageously allow for better positioning and placement of the emitter package 334 and the detector package 336 of the sensor dock assembly 304 with respect to the subject's finger 2. In some cases, the coupling portion 330c can provide mechanical support for the wires 308a, 308b, 308c, 308d, for example, portions of such wires 308a, 308b, 308c, 308d that are bent and/or otherwise oriented at an angle. In some implementations, the coupling portion 330c can advantageously add stiffness and/or rigidity to the biasing member 330. In some configurations, the biasing member 330 can provide stiffness, rigidity, and/or structure to the clip member 310.

When the clip member 310 is assembled, biasing member 330 can be positioned proximate and/or can operably position the one or more emitters in emitter package 334, the one or more detectors in detector package 336, the optical transmission material 331, the optical transmission material 339, and/or the detector shield 337. Biasing member 120 can advantageously include one or more openings configured to allow optical radiation emitted from the emitter package 334 to pass therethrough and allow at least a portion of the optical radiation attenuated by the subject's tissue to pass to the detector package 336. For example, as shown in FIGS. 12A-12B, the biasing member 330 can include an opening extending through a portion of arm 330a and an opening extending through a portion of arm 330b, both of which can be positioned at or near an end of the arms 330a, 330b (for example, free ends of arms 330a, 330b). The openings can be at least partially aligned with one another and/or can at least partially face one another. When the biasing member 330 and/or the clip member 310 is in the first position (discussed elsewhere herein), the openings can be at least partially aligned with one another and/or can at least partially face one another. Additionally or alternatively, when the biasing member 330 and/or the clip member 310 is in the second position (discussed elsewhere herein), the openings can be at least partially aligned with one another and/or can at least partially face one another.

In some implementations, the housing 312 and/or the biasing member 330 can be configured to inhibit, prevent, and/or reduce an amount of ambient light, stray light, and/or any optical radiation not emitted from the emitter package 334 from reaching the detector package 336. Additionally, or alternatively, the housing 312 and/or the biasing member 330 can be configured to inhibit, prevent, and/or reduce an amount of optical radiation emitted by the emitter package 334 that has not been attenuated by, reflected by, and/or passed through tissue of the subject from being received by the detector package 336. In some cases, the housing 312 and/or the biasing member 330 can be opaque and/or generally light blocking and/or have a light blocking coating. In some implementations, the housing 312 and/or the biasing member 330 can be semi-transparent or transparent. In some implementations, the housing 312 and/or the biasing member 330 can include portions that are opaque and/or light blocking and portions that are semi-transparent and/or transparent.

Figure 13A:
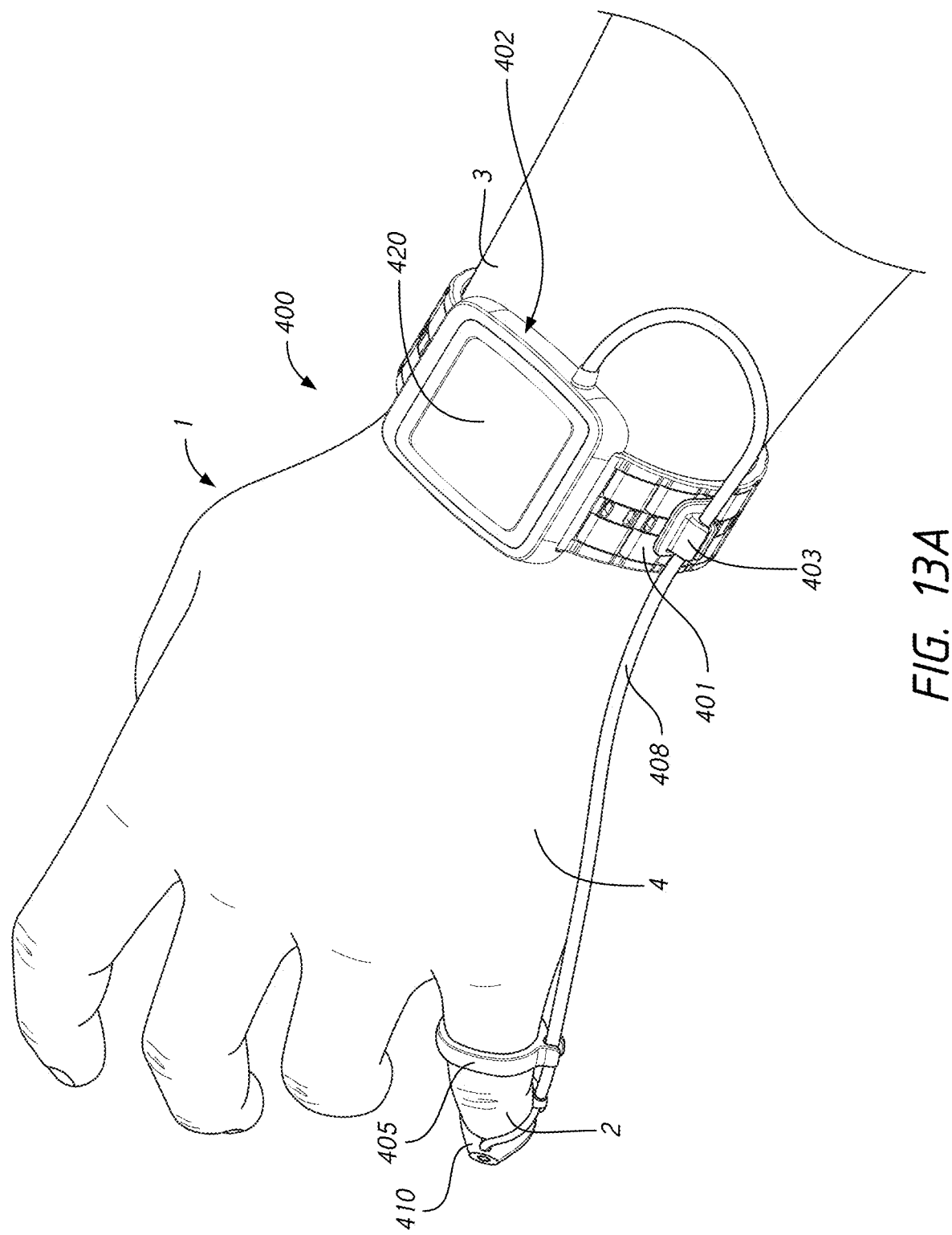
FIGS. 13A-13B illustrate perspective views of another implementation of a pulse oximetry system in the form of a watch secured to a subject's wrist and finger in accordance with aspects of this disclosure.
Figure 13B:
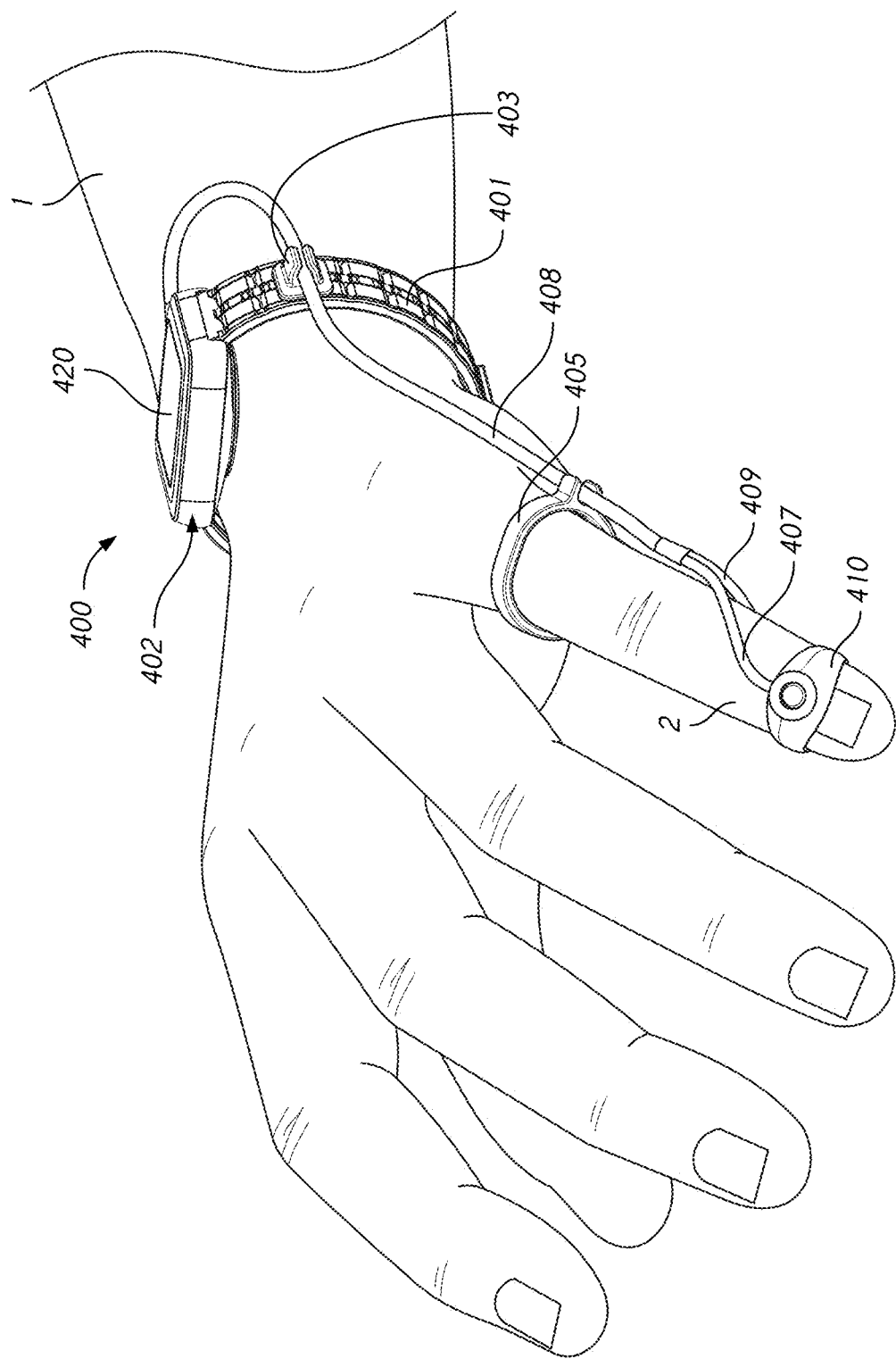

FIGS. 13A-13B illustrate perspective views of another implementation of a pulse oximetry system 400 in the form of a watch secured to a subject's wrist 3 and finger 2 in accordance with some aspects of this disclosure. The pulse oximetry system 400 can have similar and/or the same features, aspects, and/or components as the pulse oximetry system 100 described herein. For example, the pulse oximetry system 400 can have a watch 402 configured similar to the sensor dock 106 and the sensor hub 102 (e.g., the watch 402 can include and/or combine any or all aspects of the sensor dock 106 and the sensor hub 102). The watch 402 can be configured to be secured to the wrist 3 of the subject 1 similar and/or the same as how the sensor dock 106 can be secured to the wrist 3 of the subject 1, for example, by a strap 401 similar and/or the same as the strap 101. Further, the watch 402 can have a cable 408 configured similar and/or the same as the cable 108 of the sensor dock assembly 104, including a split into a first portion 407 and a second portion 409 similar and/or the same as the first portion 107 and the second portion 109, respectively. The cable 408 can operably connect the watch 402 with an emitter package comprising one or more emitters (similar and/or identical to the those described herein, such as emitter package 134 comprising one or more emitters 112) and a detector package comprising one or more detectors (similar and/or identical to the those described herein, such as detector package 136 comprising one or more detectors 114) of the pulse oximetry system 400. In some implementations, the cable 408 can be detachable from the watch 402. For example, in some implementations, the cable 408 can be removably connectable to a connector port on a portion of watch 402. The cable 408 can be secured to and/or positioned along the subject 1 similar and/or the same as how the cable 108 can be secured to and/or positioned along the subject 1 when the pulse oximetry system 400 is secured to the subject 1, including in some implementations the use of one or more cable retainers 403 and/or 405 which can be the same and/or similar to the cable retainers 103 and 105 described herein. For example, the watch 402 can be secured to the subject's wrist 3 by the strap 401 such that the cable 408 extends from the watch 402 in a direction generally away from the palm 4 and/or the hand of the subject 1, the cable 408 can be secured by the cable retainer 403 (e.g., the same or similar to cable retainer 103 described herein, which can be adhered to the strap 401 as shown) to cause the cable 408 to bend towards the palm 4 and/or the hand of the subject 1 and extend along the outside edge of the subject's palm 4 towards the subject's pinky finger, the cable 408 can be secured by the cable retainer 405 (e.g., the same or similar to cable retainer 105 described herein) to aid in causing the cable 408 to extend along the outside edge of the palm 4 and to cause the cable 408 to extend along at least a portion of the outside edge of the subject's pinky finger until the cable 408 splits into the portion 407 and the portion 409 to connect with the emitter package and the detector package operably positioned by a ring member 410, respectively. The ring member 410 can be the same and/or similar to the ring member 110 described herein. Cable retainer 403 can be permanently or removably attached to one of straps 401. For example, in some implementations, cable retainer 403 is configured to removably attach to a portion of one or both of straps 401 via a snap-fit securement. As another example, in some implementations, cable retainer 403 is configured to removably attach to a portion of one or both of straps 401 via an adhesive securement.

The watch 402 (including the strap 401) of the pulse oximetry system 400 can be similar or identical to and/or incorporate any of the features described with respect to any of the devices, assemblies, and/or systems described and/or illustrated in U.S. Pat. Pub. No. US2021/0290120, filed Jan. 13, 2021, titled "WEARABLE DEVICE WITH PHYSIOLOGICAL PARAMETERS MONITORING," which is hereby incorporated by reference in its entirety and for all purposes. For example, the watch 402 can include a display 420 similar or identical to the display of the wearable sensor described in U.S. Pat. Pub. No. US2021/0290120 incorporated by reference herein, which can be configured to display a plurality of physiological parameters monitored and/or determined by the pulse oximetry system 400 and/or other information (e.g., such as time, date, etc.). Further, the display 420 can be configured to receive input from the subject, such as touch input, for interacting with the pulse oximetry system 400. For example, the display 420 can be a capacitive or resistive touch screen for receiving user input.

In some implementations, the watch 402 can be powered by a battery. The battery can be rechargeable. The battery can be recharged by connecting the watch 402 to a source of electrical power (e.g., via a cable), by wirelessly charging (e.g., via a wireless charging pad), by solar energy (e.g., via a solar collector if incorporated in the watch 402), and/or by kinetic motion (e.g., via an internal mechanism if incorporated that can convert kinetic motion into electrical power). In some cases, the battery can be removed, or the battery can be integrated within and/or a permanent part of the watch 402. In some implementations, the watch 402 includes a connector port for connecting to a charging cable. Such a connector port can additionally be used to connect to cable 408 in some implementations.

Figures 14A, 14B:
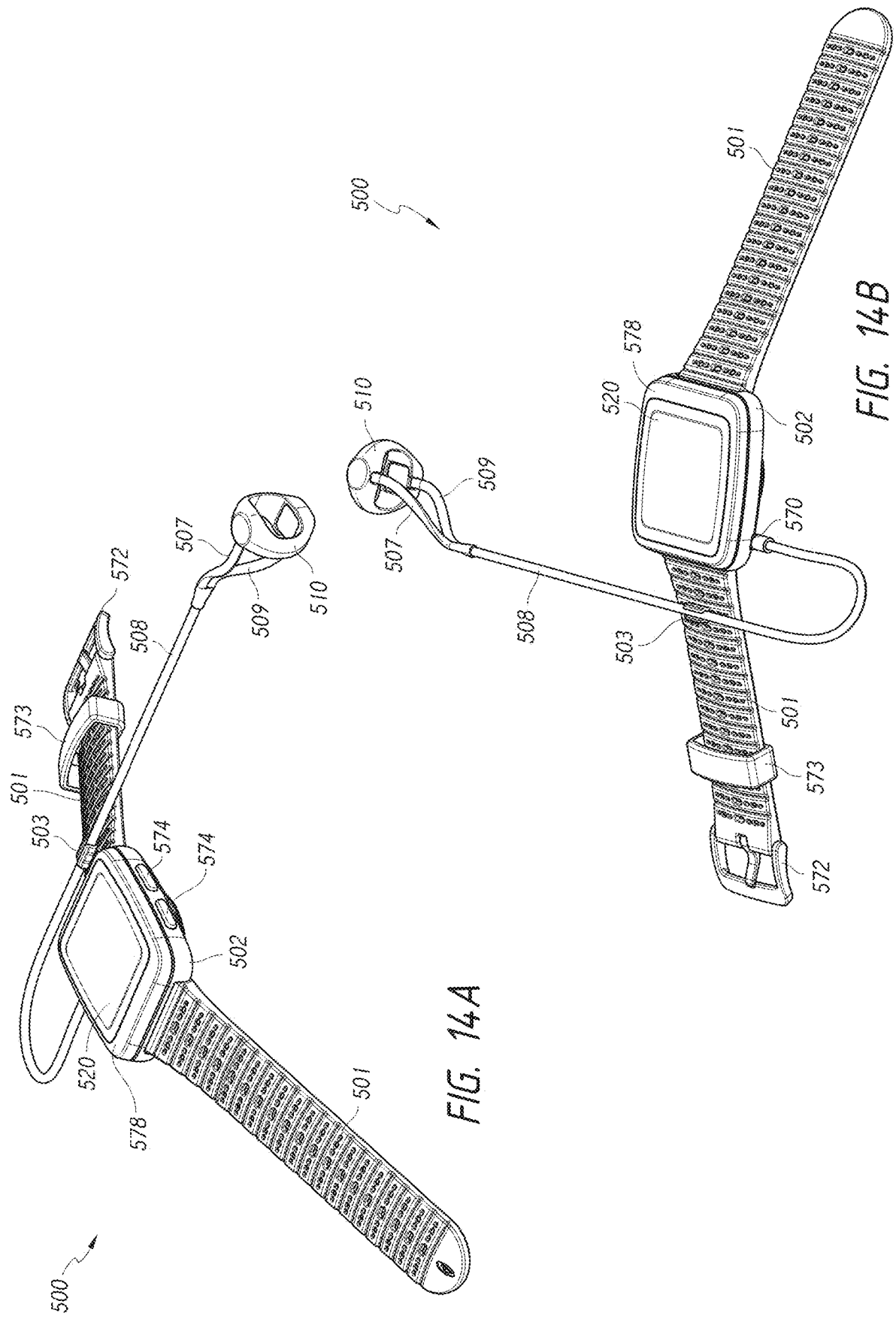
FIGS. 14A-14F illustrate another implementation of a pulse oximetry system in accordance with aspects of this disclosure.
Figure 14C:
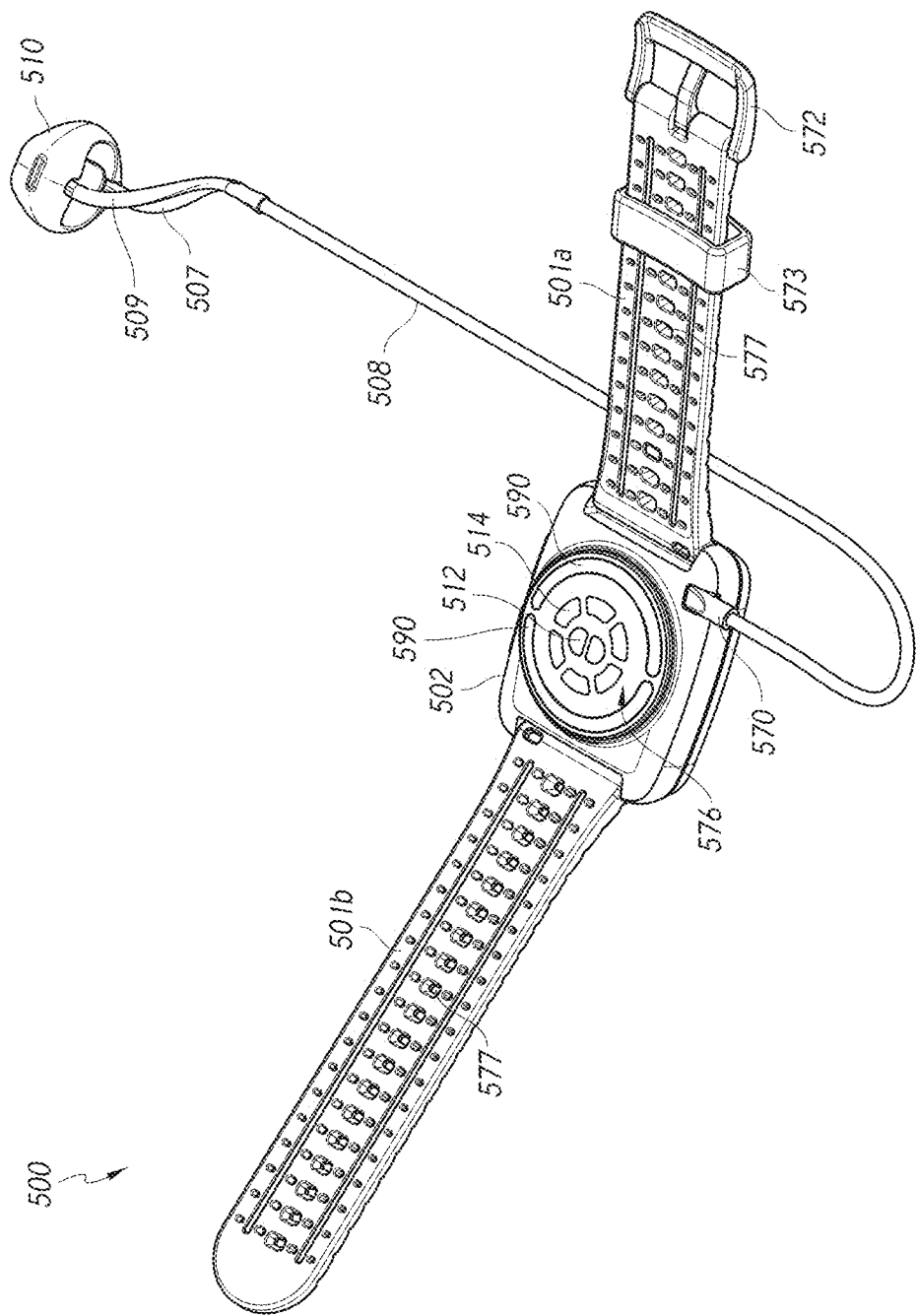
Figure 14D:
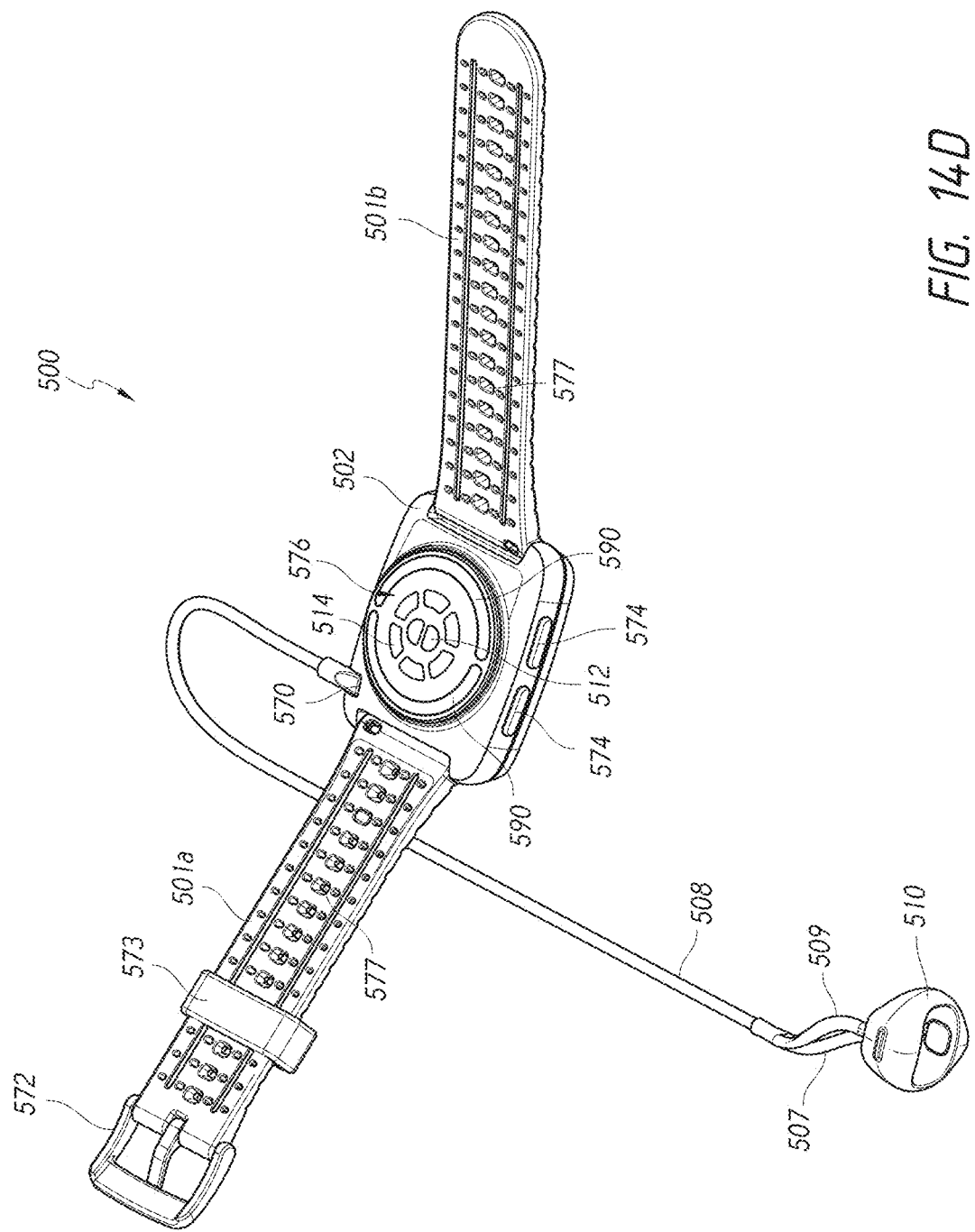

FIGS. 14A-14B illustrate top perspective views and FIGS. 14C-14D illustrate bottom perspective views of another implementation of a pulse oximetry system 500. Pulse oximetry system 500 includes a watch 502 configured to be secured to a subject's wrist via straps 501. Pulse oximetry system 500 also includes a cable 508 coupled to a ring member 510. Cable 508 can be similar or identical to cable 108 discussed above. Ring member 510 can be similar or identical to any of the ring members described herein, such as ring member 110. In some implementations, cable 508 splits into a first portion 507 and a second portion 509 in a manner similar or identical to that discussed above with respect to cable 108, portion 107, and portion 109. Similar to that discussed with respect to cable 108, cable 508 can operably connect watch 502 with an emitter housing and/or emitter package comprising one or more emitters (similar and/or identical to the those described herein, such as emitter package 134 comprising one or more emitters 112) and a detector housing and/or a detector package comprising one or more detectors (similar and/or identical to the those described herein, such as detector package 136 comprising one or more detectors 114). In some implementations, cable 508 can be detachable from the watch 502, for example, removably connectable to a connector port 570 of watch 502 (see FIG. 14B-14D). Alternatively, in some implementations, cable 508 is permanently attached to watch 502. The cable 508 can be secured to and/or positioned along a subject similar or identical to that discussed with respect to cable 108 in pulse oximetry system 100, for example, with the utilization of one or more cable retainers (such as cable retainers 103, 105) and/or similar to that discussed above with respect to pulse oximetry system 100. In some implementations, pulse oximetry system 500 includes a cable retainer 503 that can be similar or identical to any of the cable retainers discussed herein, such as cable retainer 403. Cable retainer 503 can be permanently or removably attached to one of straps 501. A buckle 572 (for example, having a buckle tongue) can be coupled to one of the straps 501 to allow the straps 501 to be secured to one another (for example, around a subject's wrist), although the straps 501 can be secured to one another in other ways (e.g., via magnets, via the straps having a shape memory, or the like). In some implementations, the watch 502 can receive and/or process one or more signals outputted by one or more detectors operably positioned by ring member 510 and determine one or more physiological parameters based on the received or processed signals. In some implementations, watch 502 can instruct one or more emitters operably positioned by ring member 510 to emit light of one or more wavelengths, for example, in tissue of a finger to which ring member 510 is secured during use.

In some implementations, the watch 502 can be powered by a battery. The battery can be rechargeable. The battery can be recharged by connecting the watch 502 to a source of electrical power (e.g., via a cable that can connect to connector port 570), by wirelessly charging (e.g., via a wireless charging pad), by solar energy (e.g., via a solar collector if incorporated in the watch 502), and/or by kinetic motion (e.g., via an internal mechanism if incorporated that can convert kinetic energy into electrical power). In some cases, the battery can be removed, or the battery can be integrated within and/or be a permanent part of the watch 502. In some implementations, the watch 502 includes a connector port for connecting to a charging cable. Such a connector port can additionally be used to connect to cable 508 in some implementations.

The watch 502 (including the strap(s) 501) can be similar or identical to and/or incorporate any of the features described with respect to any of the devices, assemblies, and/or systems described and/or illustrated in U.S. Pat. Pub. No. US2021/0290120 incorporated by reference herein. For example, the watch 502 can include a display 520 similar or identical to the display of the wearable sensor described in U.S. Pat. Pub. No. US2021/0290120 incorporated by reference herein, which can be configured to display a plurality of physiological parameters monitored and/or determined by the pulse oximetry system 500 and/or other information (e.g., such as the time, date, etc.). Further, the display 520 can be configured to receive input from the subject, such as touch input, for interacting with the pulse oximetry system 500. The watch 502 can also include one or more user interfaces 574 similar or identical to the user interfaces 13 (e.g., user interface 13a and/or user interface 13b) of the wearable sensor described in U.S. Pat. Pub. No. US2021/0290120 incorporated by reference herein, which can be configured as button(s). As shown in at least FIG. 14A, such user interfaces 574 can be disposed along a side of the watch 502. As another example and with reference to FIGS. 14C-14D, in some implementations, watch 502 includes a physiological parameter measurement sensor or module 576 that can be similar or identical to any of the physiological parameter measurement sensors or modules described in U.S. Pat. Pub. No. US2021/0290120 incorporated by reference herein. In such implementations, the watch 502 can instruct one or more emitters 512 of the physiological parameter measurement sensor or module 576 to emit light of one or more wavelengths, for example, in tissue of a wrist to which the watch 502 is secured during use. Furthermore, the watch 502 can receive and/or process one or more signals outputted by one or more detectors 514 of the physiological parameter measurement sensor or module 576 and determine one or more physiological parameters based on the received or processed signals.

In implementations of watch 502 that include the physiological parameter measurement sensor or module 576 as shown in FIGS. 14C-14D, such module 576 can work in combination with the one or more emitters and one or more detectors operably positioned by ring member 510. For example, signals and/or data outputted by the module 576 can augment any or all signals and/or data outputted by the one or more detectors operably positioned by ring member 510, such as if signals and/or data outputted by the one or more detectors is interrupted or lost. As another example, the signals and/or data outputted by module 576 can validate any or all signals and/or data outputted by the one or more detectors operably positioned by ring member 510. In a further example, the module 576 can be used as a primary source of signals and/or data for determining one or more physiological parameters of a subject if the cable 508 (and thus the one or more emitters and one or more detectors operably positioned by the ring member 510) is detached from the watch 502. In some implementations, the module 576 can measure physiological parameters of interest separate of and/or distinct from the one or more emitters and one or more detectors operably positioned by ring member 510. In some implementations, the module 576 can be automatically turned off and/or not used when the cable 508 (and thus the one or more emitters and one or more detectors operably positioned by the ring member 510) is connected to the watch 502 (e.g., such as connected at connector port 570). For example, during the day and/or when out in public, a subject can wear the pulse oximetry system 500 without the cable 508 connected. During such use, the module 576 can be used to measure physiological parameters of the subject. Such use can advantageously allow the subject to wear and use the pulse oximetry system in a concealed manner. During the night (e.g., when sleeping) and/or when not in public, a subject can wear the pulse oximetry system 500 with the cable 508 connected. During such use, the one or more emitters and one or more detectors operably positioned by the ring member 510 can be used to measure physiological parameters of the subject. Furthermore, during such use, the module 576 can be automatically turned off, not used, used to measure different physiological parameters than the emitters/detectors operably positioned by the ring member 510, or used to augment measurements of the emitters/detectors operably positioned by the ring member 510. For example, a processor of the watch 502 can determine whether cable 508 is connected to the watch 502 (e.g., via port 570) and disable operation of module 576 when cable 508 is connected, and enable/instruct operation of module 576 when cable 508 is not connected. Further to this example, a processor of the watch 502 can determine whether cable 508 is connected to the watch 502 and modify operation of module 576 when cable 508 is connected, such as to measure different physiological parameters than the emitters/detectors operably positioned by the ring member 510, or to augment measurements of the emitters/detectors operably positioned by the ring member 510.

In some implementations and as shown in FIGS. 14A-14D, the watch 502 includes an ECG sensor that can be utilized (for example, by a processor of the watch 502) to measure an ECG of the subject. The ECG sensor can include a reference electrode, a negative electrode, and a positive electrode, each of which can be electrically isolated from one another and in electrical communication with a processor of the watch 502. As shown in FIGS. 14C-14D, the module 576 can include ECG electrodes 590, one of which can be the reference electrode, the other one of which can be the negative electrode or the positive electrode. As shown in FIGS. 14A-14B, a portion of the watch 502 separated from the module 576 (for example, a portion of an upper surface of the watch 502) can include ECG electrode 578, which can be the positive electrode (if the module 576 includes the negative electrode) or the negative electrode (if the module 576 includes the positive electrode). The ECG electrodes 590 can be located on the module 576 and be configured to contact the subject's skin when the watch 502 is secured around the subject's wrist. Each of the ECG electrodes 590 can be substantially semi-annular/semi-circular and extend along a circumference of the module 576 such that they partially surround the one or more emitters 512 and the one or more detectors 514 of the module 576. When the subject wants to make a measurement using the ECG sensor that includes the ECG electrodes 578, 590, the subject can press on or touch the ECG electrode 578 using a finger or another part of their body such that the subject's skin makes contact with the ECG electrode 578. A processor of the watch 502 can determine when the subject touches the ECG electrode 578 and utilize the ECG electrode 578 and ECG electrodes 590 to measure (for example, automatically measure) the ECG of the subject. In some implementations, the watch 502 further includes an ECG amplifier configured to receive analog signals from the ECG electrodes 578, 590, which can output amplified analog signals to an analog-digital converter that can also be included in the watch 502. The amplified analog signals can include an ECG differential between the positive and negative electrodes. The analog-digital converter can output a digital signal based on the analog signals from the ECG electrodes 578, 590 to the processor of the watch 502 for determination of the subject's ECG. In some implementations, the ECG sensor can optionally make physiological measurements based on the obtained ECG, for example, a heart rate, a respiratory rate, and/or otherwise of the subject. The subject's ECG waveform and/or the other physiological measurements made from the ECG sensor can be displayed on the display 520 and/or transmitted to a separate device in communication with the watch 502 for display.

Figure 14E:
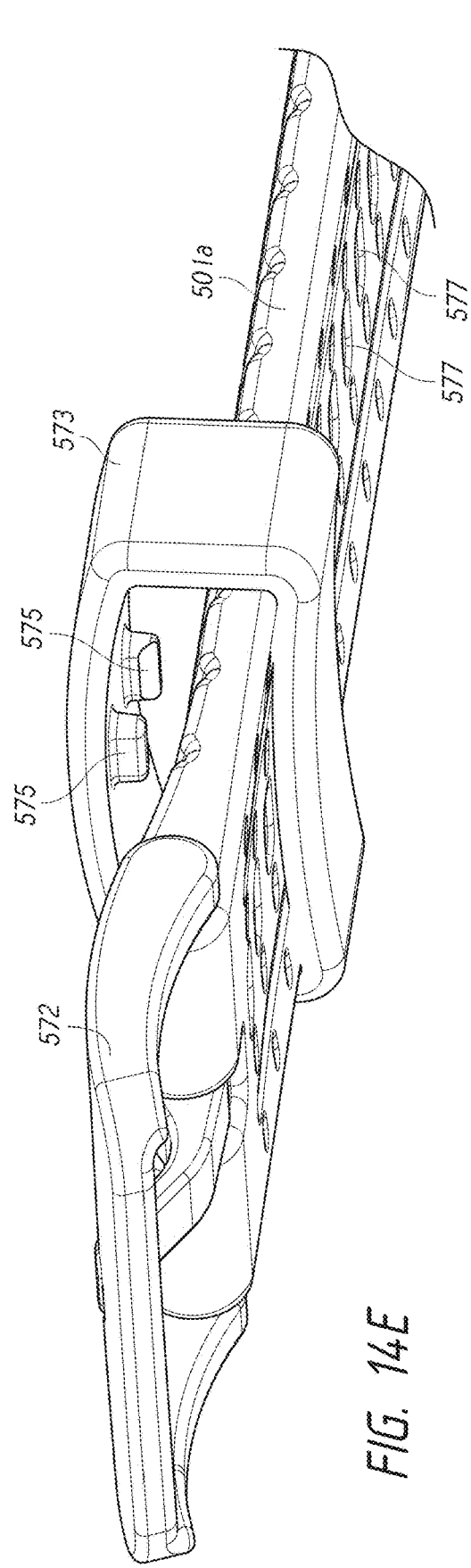
Figure 14F:
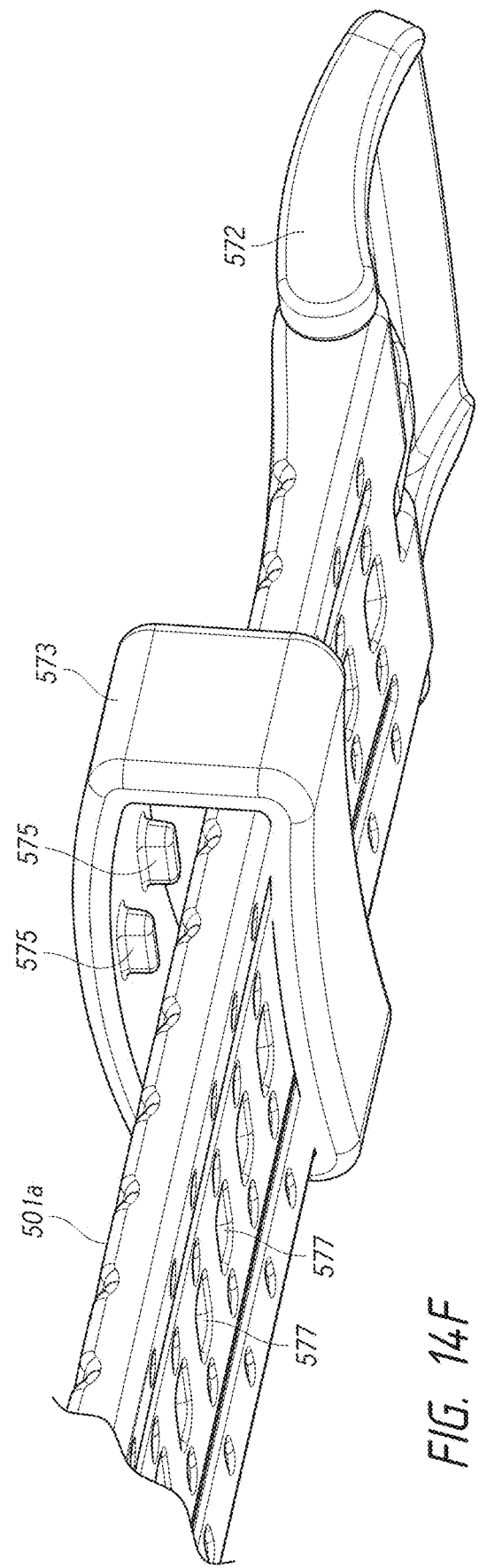

FIGS. 14E-14F illustrate an implementation of securement features of the strap s 501. As discussed herein and as shown, a buckle 572 (for example, having a buckle tongue) can be coupled to a first one of the straps 501 (labeled 501*a* in FIGS. 14C-14F). A strap loop 573 can be coupled to such strap 501*a* as shown. The buckle 572 and the strap loop 573 can receive a free end of a second one of the straps 501 (labeled 501*b* in FIGS. 14C-14D) that is secured by the buckle 572. As shown in at least FIGS. 14C-14D, the straps 501*a*, 501*b* can have one or more strap holes 577 disposed along at least a portion of their length. As further shown in FIGS. 14E-14F, the strap loop 573 can have one or more strap loop protrusions 575 configured to secure to one or more strap holes 577 in strap 501*b*, for example, when strap 501*b* is received by the strap loop 573. The strap loop 573 can thus be used to secure the free end of the strap 501b. In an alternative implementation (not shown), the strap 501b that is secured by the buckle 572 can have one or more protrusions (for example, adjacent its free end) configured to interact with one or more holes of strap loop 573 to secure the free end of the strap 501b. In some implementations, the strap loop 573 secures the free end of the strap 501b that is secured by the buckle 572 without protrusions or holes. Any of the implementations of a pulse oximetry system described herein can include a strap the same or similar to the strap 501 and/or include any of the features of the strap 501, such as one or more strap holes 577 and/or a strap loop 573.

Figure 14G:
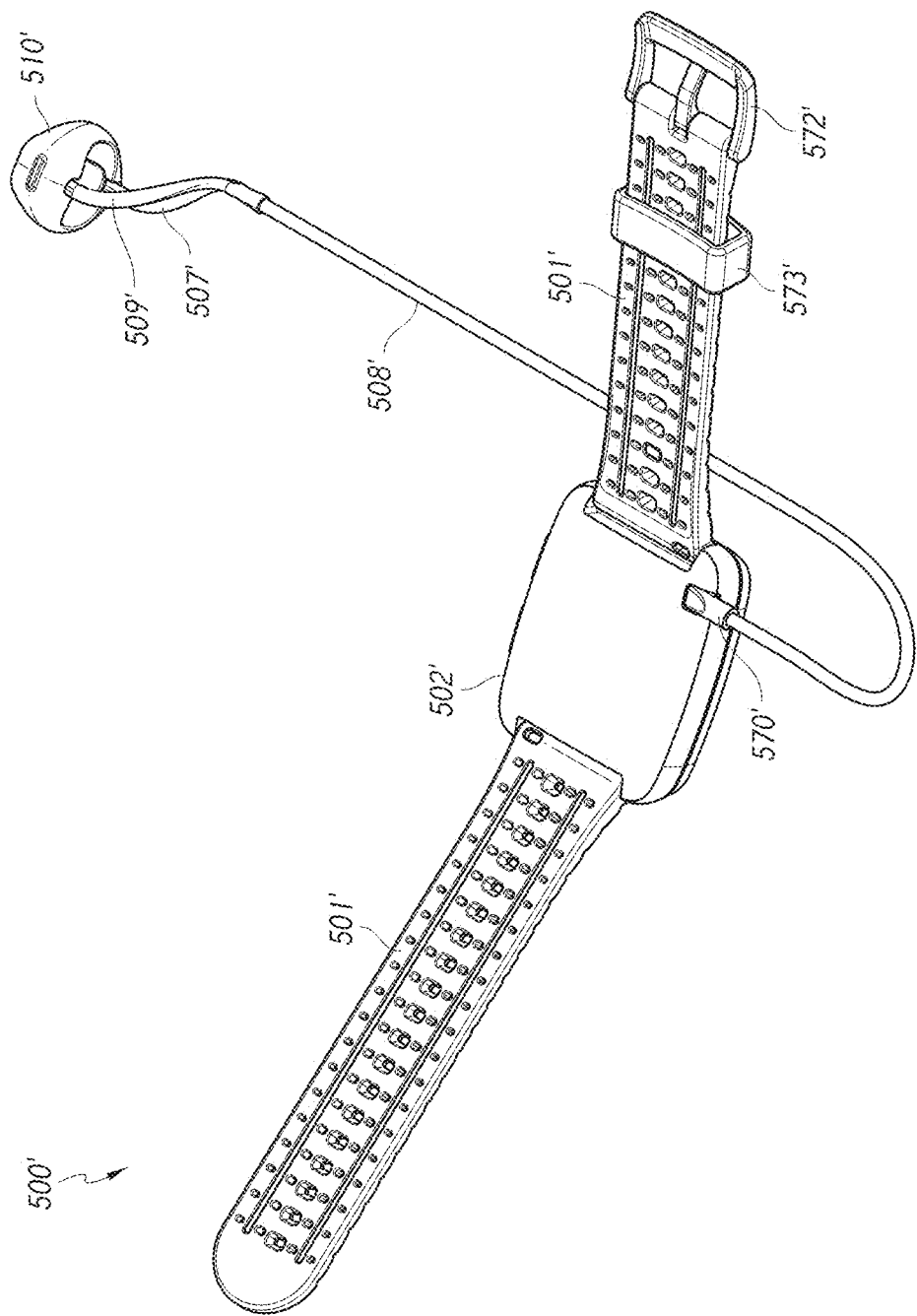
FIGS. 14G-14H illustrate a pulse oximetry system that is a variant of the pulse oximetry system of FIGS. 14A-14F in accordance with aspects of this disclosure.
Figure 14H:
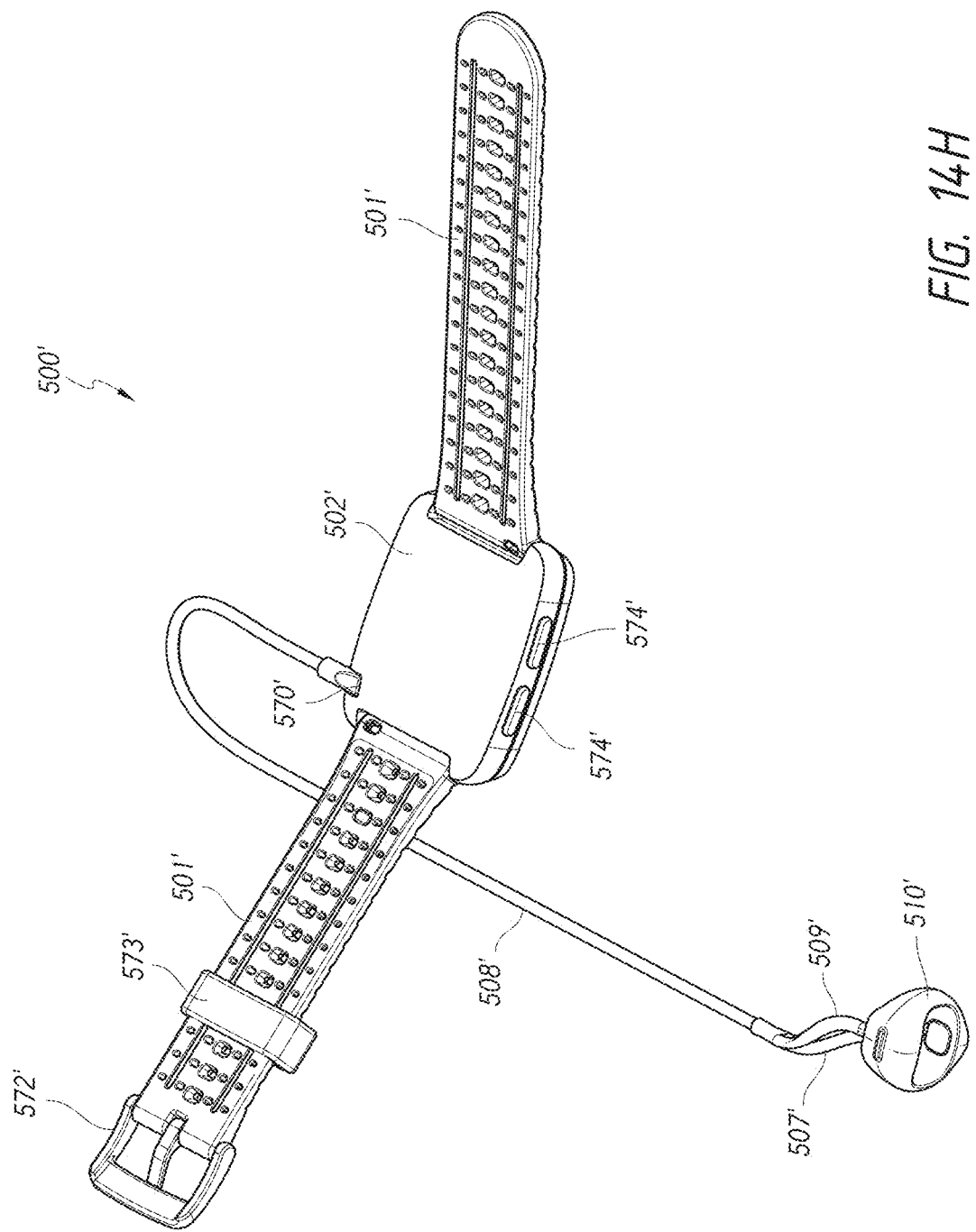

FIGS. 14G-14H illustrate a pulse oximetry system 500' that is a variant of the pulse oximetry system 500 described and illustrated with respect to FIGS. 14A-14D. FIGS. 14G-14H illustrate bottom perspective views of the pulse oximetry system 500'. The pulse oximetry system 500' is identical to the pulse oximetry system 500 and includes all features and/or functionality of the pulse oximetry system 500 except that it does not include the physiological parameter measurement sensor or module 576. For example, the pulse oximetry system 500' can include straps 501', buckle 572', strap loop 573', cable 508' with first portion 507' and second portion 509', ring member 510', wrist portion 502', connector port 570', and user interface(s) 574' which can be similar or identical to straps 501, buckle 572, strap loop 573, cable 508 with first portion 507 and second portion 509, ring member 510, wrist portion 502, connector port 570, and user interface(s) 574 (respectively) described above with respect to the pulse oximetry system 500. In some implementations, the cable 508' (and the one or more emitters and one or more detectors operably positioned by the ring member 510') is permanently connected to the watch 502'.

Figures 15A, 15B:
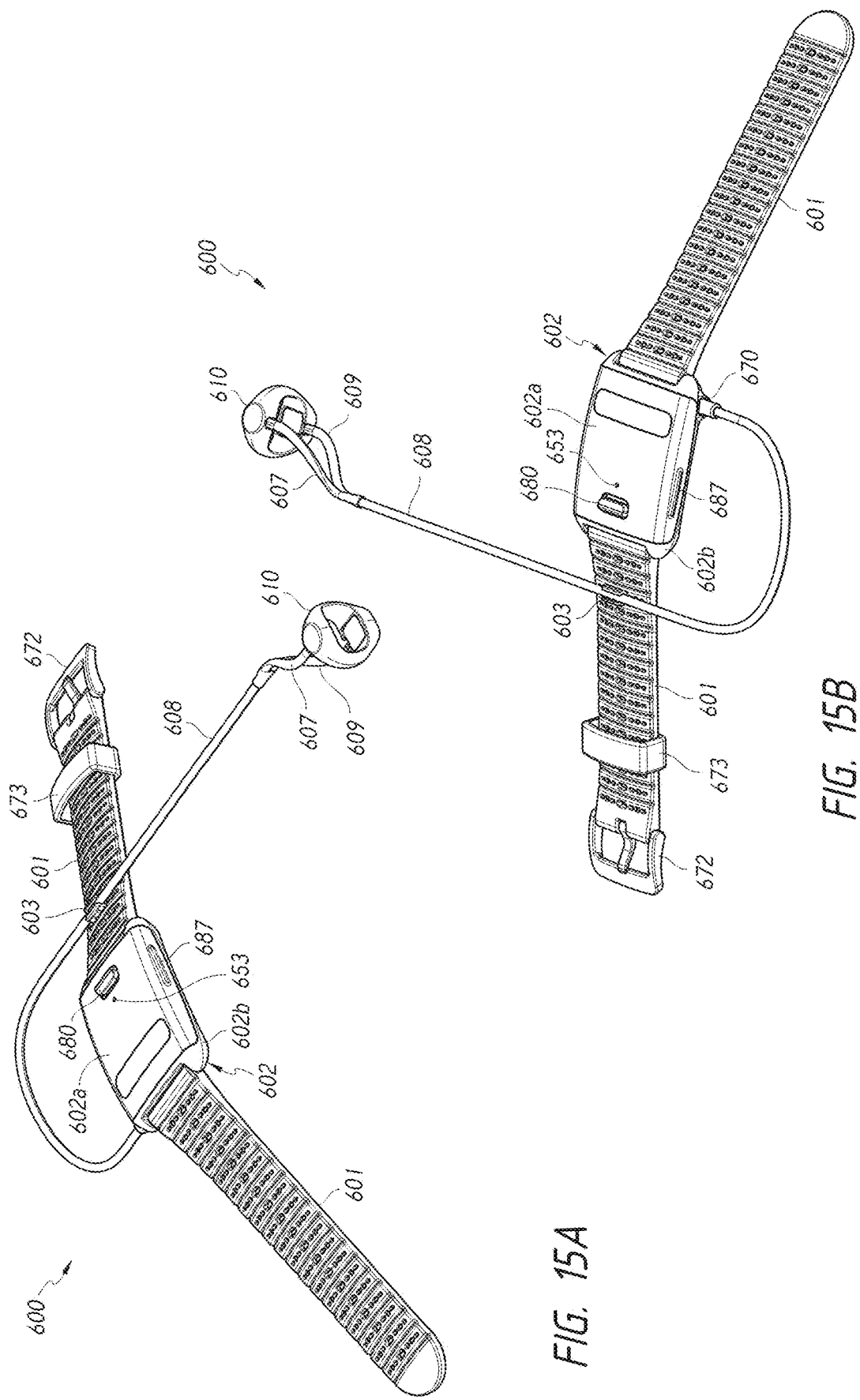
Figures 15C, 15D:
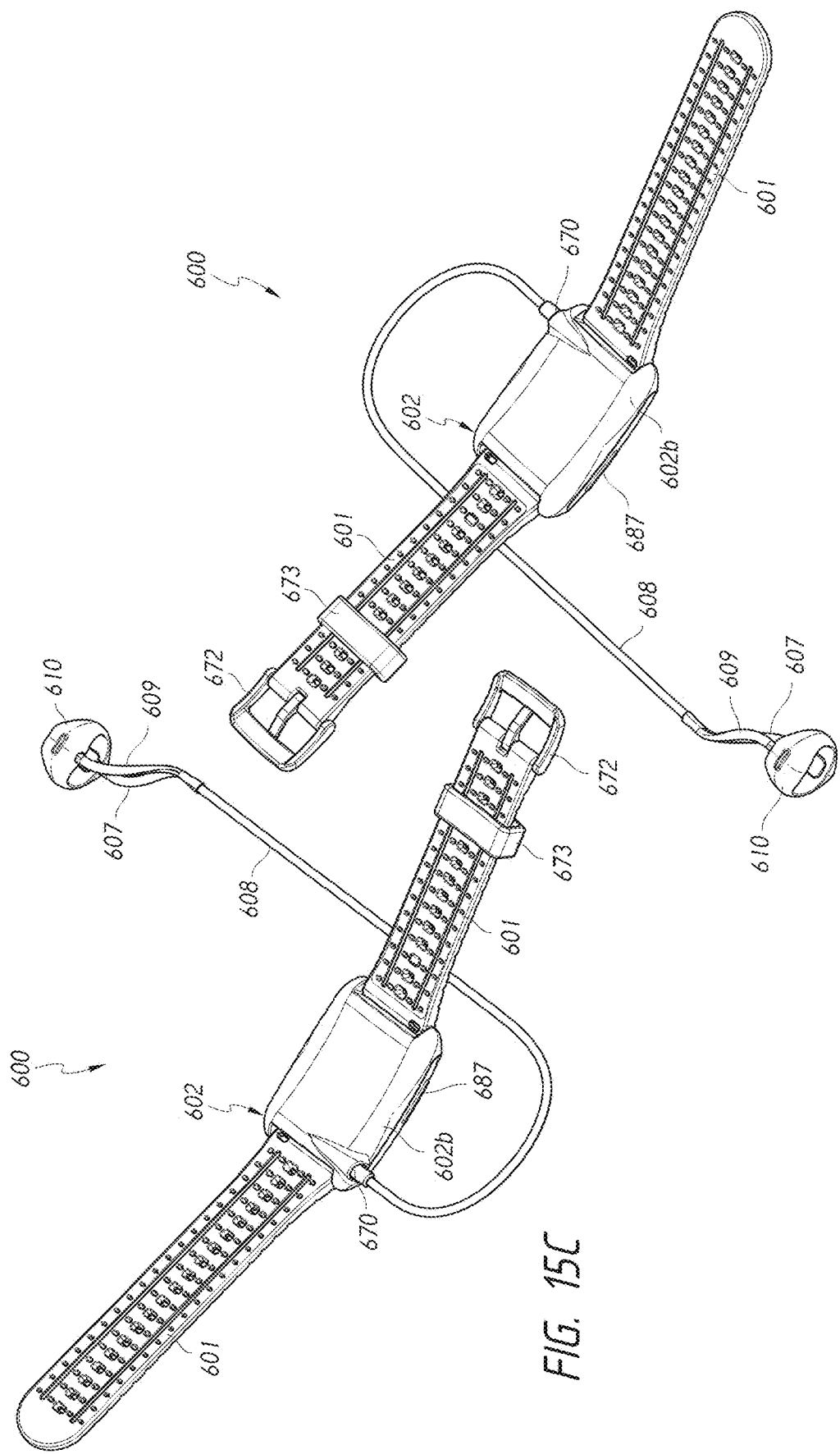
Figure 15E:
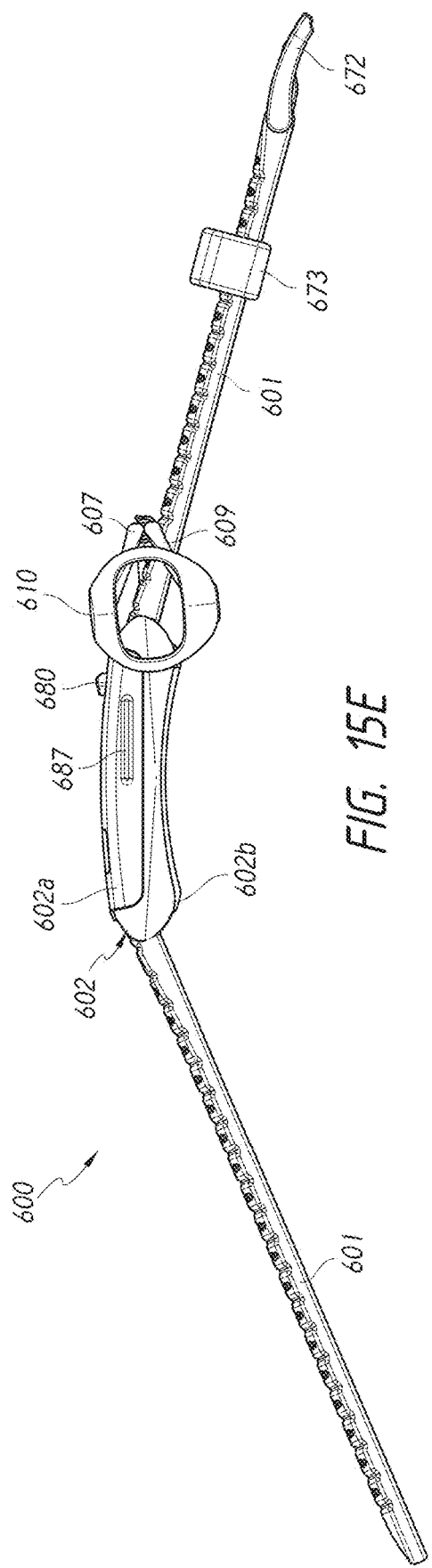
Figure 15F:
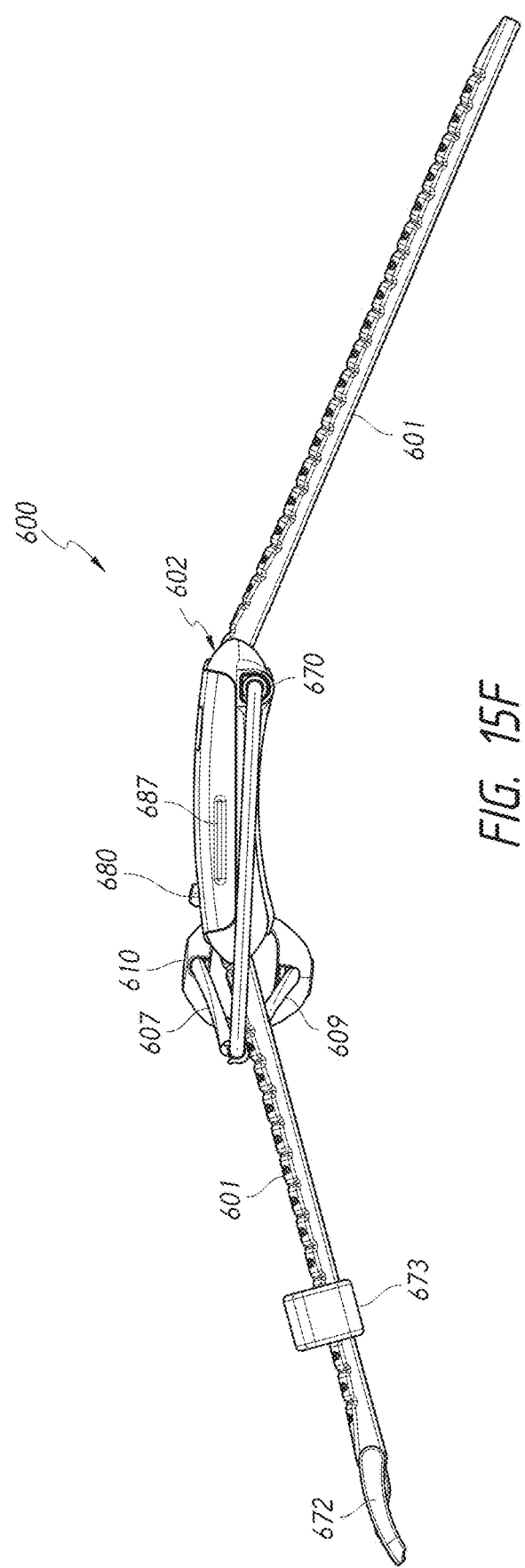

FIGS. 15A-15B illustrate top perspective views, FIGS. 15C-15D illustrate bottom perspective views, and FIGS. 15E-15F illustrate side views of another implementation of a pulse oximetry system 600. Pulse oximetry system 600 includes a wrist portion 602, straps 601 coupled to wrist portion 602, a cable 608, and a ring member 610. Straps 601 can be similar or identical to straps 501 discussed above. Cable 608 can be similar or identical to any of cables 108, 408, and/or 508 discussed above. Cable 608 can split into first and second portions 607, 609 similar or identical to cables 108, 408, and 508 discussed elsewhere herein. Similar to that discussed with respect to cables 108, 408, and 508, cable 608 can operably connect wrist portion 602 with an emitter housing and/or emitter package comprising one or more emitters (similar and/or identical to the those described herein, such as emitter package 134 comprising one or more emitters 112) and a detector housing and/or a detector package comprising one or more detectors (similar and/or identical to the those described herein, such as detector package 136 comprising one or more detectors 114). Ring member 610, which can operably position such emitter housing and/or emitter package and detector housing and/or detector package, can be similar or identical to any of the ring members discussed elsewhere herein, such as ring member 110, 410, and/or 510. In some implementations, the wrist portion 602 can include one or more status indicators similar or identical to status indicator 102g described herein, which can include status indicator 167 described herein. The one or more status indicators 102g/167 can be configured, for example, to emit optical radiation out of and/or through a hole and/or opening in the wrist portion 602, such as through the hole/opening 653 in a top of the wrist portion 602.

In some implementations and as shown in FIGS. 15G-15H, wrist portion 602 comprises a first component 602a (which may also be referred to as a "sensor hub" or "hub") and a second component 602b (which may also be referred to as a "dock"). Hub 602a can be configured to removably secure to dock 602b, and vice versa, for example, via a latch mechanism 680. Movement of the latch mechanism 680, for example, by a user's finger, can disconnect hub 602a and dock 602b from one another. In some implementations and as shown in FIGS. 15G-15H and magnified views thereof in FIGS. 15I-15J, the latch mechanism 680 includes a protrusion 682 that, in a resting state of the latch mechanism 680, extends outward from the hub 602a (for example, through an opening of hub 602a) that can engage with a cavity 683 of the dock 602b to connect the hub 602a and the dock 602b to one another. In some implementations, latch mechanism 680 is biased toward such resting state, which may be referred to as an extended position. When the latch mechanism 680 is moved, for example, inward towards the center of the hub 602a (which may be referred to as a retracted position of latch mechanism 680), the protrusion 682 can correspondingly move inward towards the center of the hub 602a and effectively pull away from the cavity 683 to release the hub 602a and the dock 602b from one another. In addition to the latch mechanism 680, the hub 602a can include one or more protrusions 684 at an end opposite of the latch mechanism 680 for engaging with one or more corresponding cavities 685 of the dock 602b. Thus in some implementations, to connect the hub 602a and dock 602b to one another, the one or more protrusions 684 can be inserted into the one or more cavities 685, and the hub 602a and the dock 602b can be brought together (e.g., such as by pushing the hub 602a downward into the dock 602b) causing the protrusion 682 of the latch mechanism 680 to engage with the cavity 683 of the dock 602b. In some implementations, the protrusion 682 has a ramp-like lower surface that inclines in a direction away from the hub 602a as shown that, when the hub 602a and the dock 602b are brought together, causes the protrusion 682 and the latch mechanism 680 to move inwards towards the center of the hub 602a. Upon the hub 602a and the dock 602b coming together fully, the protrusion 682 can extend outward and engage with the cavity 683, securely connecting the hub 602a and the dock 602b to one another. Thus, in some implementations, the hub 602a can snap into engagement with dock 602b. To facilitate such engagement, the latch mechanism 680 can be spring-loaded or otherwise biased to its resting state (e.g., wherein the protrusion 682 extends outward from the hub 602a). In some variants, hub 602a and dock 602b are configured to connect and disconnect to one another without a latch mechanism (for example, without latch mechanism 680). For example, hub 602a and dock 602b can include protrusions that provide for a snap-fit engagement/disengagement, without a movable latch mechanism.

In some implementations and as shown in FIGS. 15G-15J, the hub 602a can include one or more electrical connectors 686 and the dock 602b can include one or more electrical connectors 689 configured to electrically connect with one another when the hub 602a and the dock 602b are connected to one another. As shown, the electrical connector(s) 686 of the hub 602a can be disposed at an underside/bottom of the hub 602a and the electrical connector(s) 689 of the dock 602b can be disposed at a topside/top of the dock 602b. The electrical connector(s) 686 can be configured to have a spring force or bias that pushes ends of the electrical connector(s) 686 away from the hub 602a. Such a spring force/bias can aid in making electrical connections between the electrical connector(s) of the hub 602a with the corresponding electrical connector(s) 689 of the dock 602b. In some implementations, the electrical connector(s) 686 can be configured as pogo-like spring electrical connectors as shown. Also as shown, the electrical connector(s) 689 of the dock 602b can be configured as recesses configured to receive the electrical connector(s) 686 of the hub 602a. The hub 602a can include 6 electrical connectors 686 and the dock 602b can include 6 electrical connectors 689 as shown, although in some implementations the hub and dock can include less than 6 electrical connectors each or more than 6 electrical connectors each. Such electrical connectors when connected (e.g., when the hub 602a and the dock 602b are secured to one another) can facilitate communication between components of the hub 602a and components of the dock 602b and/or any components connected to either the hub 602a and the dock 602b.

Dock 602b can be coupled (for example, permanently coupled) to straps 601. In some implementations, hub 602a can include a rechargeable battery, and hub 602a can be removed from dock 602b, for example, in order to facilitate charging of hub 602a. In some implementations, dock 602b does not include a battery. Hub 602a can include any or all of the components discussed with respect to sensor hub 102 and FIG. 2C, for example, processor(s) 102a, storage device(s) 102b, communication module 102c, battery 102d, vibration motor 102f, information element 102e, and/or other sensor(s) 102h (such as an accelerometer, gyroscope, temperature sensor, among others).

With reference to FIGS. 15A-15J, in some implementations, hub 602a includes a rib 687 extending along a surface of hub 602a on one or both sides of hub 602a that allow a user to grip hub 602a to aid removal from dock 602b. In some implementations, with reference to FIGS. 15E-15F, a bottom of wrist portion 602 (for example, a bottom of dock 602b) is curved, for example, curved between portions of dock 602b that are coupled to ends of straps 601, which can help wrist portion 602 to better conform to a subject's wrist. In some implementations, wrist portion 602 (for example, hub 602a) can receive and/or process one or more signals outputted by one or more detectors operably positioned by ring member 610 and determine one of more physiological parameters based on the received or processed signals. In some implementations, wrist portion 602 (for example, hub 602a) can instruct one or more emitters operably positioned by ring member 610 to emit light of one or more wavelengths, for example, in tissue of a finger to which ring member 610 is secured during use.

In some implementations, cable 608 is detachable from the wrist portion 602, for example, removably connectable to a connector port 670 of wrist portion 602 (see FIG. 15B-15D). Such connector port 670 can be part of dock 602b, or alternatively, hub 602a. In some implementations, cable 608 is permanently attached to wrist portion 602 (for example, permanently fixed to dock 602b or hub 602a). The cable 608 can be secured to and/or positioned along a subject similar or identical to that discussed with respect to cable 108 in pulse oximetry system 100, for example, with the utilization of one or more cable retainers (such as cable retainers 103, 105) and/or similar to that discussed above with respect to pulse oximetry system 100. In some implementations, pulse oximetry system 600 includes a cable retainer 603 that can be similar or identical to any of the cable retainers discussed herein, such as cable retainer 403 and/or 503. Cable retainer 603 can be permanently or removably attached to one of straps 601. A buckle 672 (for example, having a buckle tongue) can be coupled to one of the straps 601 to allow the straps 601 to be secured to one another (for example, around a subject's wrist), although the straps 601 can be secured to one another in other ways (e.g., via magnets, via the straps having a shape memory, or the like). The straps 601 can also include any of the features as described with respect to the straps 501, such as a strap loop 673 the same or similar to the strap loop 573, and strap holes the same or similar to the strap holes 577.

Figure 15K:
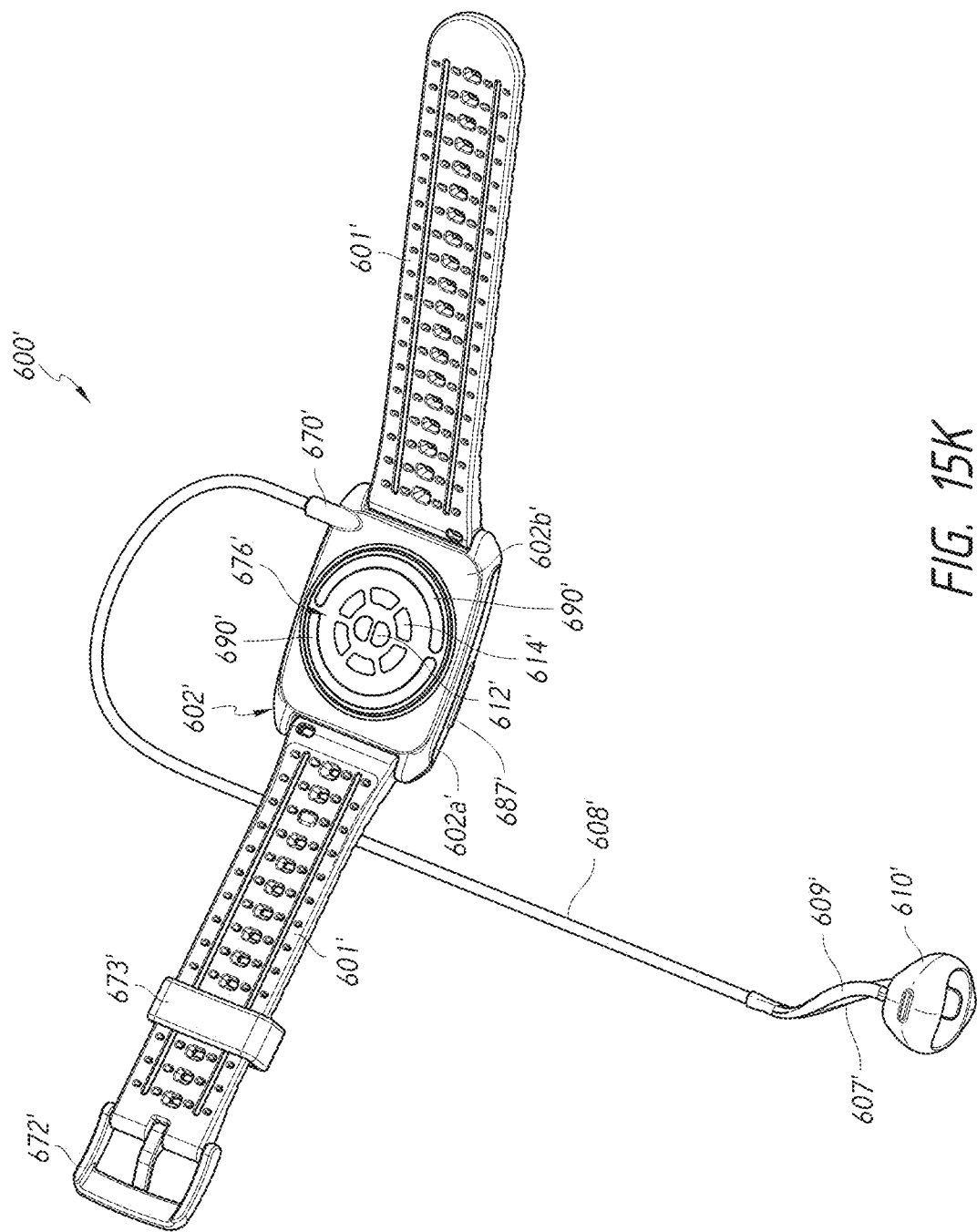
FIG. 15K illustrates a pulse oximetry system that is a variant of the pulse oximetry system of FIGS. 15A-15J in accordance with aspects of this disclosure.

FIG. 15K illustrates a pulse oximetry system 600' that is a variant of the pulse oximetry system 600 described and illustrated with respect to FIGS. 15A-15J. FIG. 15K illustrates a bottom perspective view of the pulse oximetry system 600'. The pulse oximetry system 600' can be the same or similar to the pulse oximetry system 600 and can include any or all features and/or functionality of the pulse oximetry system 600. For example, the pulse oximetry system 600' can include straps 601', buckle 672', strap loop 673', cable 608' with first portion 607' and second portion 609', ring member 610', wrist portion 602' with hub 602a' and dock 602b', connector port 670', and rib(s) 687' which can be similar or identical to straps 601, buckle 672, strap loop 673, cable 608 with first portion 607 and second portion 609, ring member 610, wrist portion 602 with hub 602a and dock 602b, connector port 670, and rib(s) 687 (respectively) described above with respect to the pulse oximetry system 600. The pulse oximetry system 600' differs from the pulse oximetry system 600 in that it includes a physiological parameter measurement sensor or module 676' (for example, operably positioned at a bottom of a dock 602b' of system 600') and an ECG sensor that can be similar or identical to any of the physiological parameter measurement sensors or modules and ECG sensors described in U.S. Pat. Pub. No. US2021/0290120 incorporated by reference herein and/or with respect to pulse oximetry system 500. For example, the module 676' can include one or more emitters 612', one or more detectors 614', and/or ECG electrodes 690' that are the same or similar to and can include any or all features and/or functionality of the one or more emitters 512, the one or more detectors 514, and/or the ECG electrodes 590 of module 576. Furthermore, the pulse oximetry system 600' can include an ECG electrode 678 (not shown) that can be similar or identical to the ECG electrode 578 described above with respect to pulse oximetry system 500 or to the ECG electrode 678" described below with respect to pulse oximetry system 600". Pulse oximetry system 600' can be referred to as a "wearable device" and can include, for example, a watch configured to wrap around a subject's wrist. In some implementations, module 676' is part of dock 602b' of wrist portion 602', or alternatively, is part of hub 602a' that removably secures to dock 602b'.

The module 676' can work in combination with the one or more emitters and one or more detectors operably positioned by ring member 610'. For example, signals and/or data outputted by the module 676' can augment any or all signals and/or data outputted by the one or more detectors operably positioned by ring member 610', such as if signals and/or data outputted by the one or more detectors is interrupted or lost. As another example, the signals and/or data outputted by module 676' can validate any or all signals and/or data outputted by the one or more detectors operably positioned by ring member 610. In a further example, the module 676' can be used as a primary source of signals and/or data for determining one or more physiological parameters of a subject if the cable 608' (and thus the one or more emitters and one or more detectors operably positioned by the ring member 610') is detached from the pulse oximetry system 600'. In some implementations, the module 676' can measure physiological parameters of interest separate of and/or distinct from the one or more emitters and one or more detectors operably positioned by ring member 610'. In some implementations, the module 676' can be automatically turned off and/or not used when the cable 608' (and thus the one or more emitters and one or more detectors operably positioned by the ring member 610') is connected to wrist portion 602' of the pulse oximetry system 600' (e.g., such as connected at connector port 670'). For example, during the day and/or when out in public, a subject can wear the pulse oximetry system 600' without the cable 608' connected. During such use, the module 676' can be used to measure physiological parameters of the subject. Such use can advantageously allow the subject to wear and use the pulse oximetry system in a concealed manner. During the night (e.g., when sleeping) and/or when not in public, a subject can wear the pulse oximetry system 600' with the cable 608' connected. During such use, the one or more emitters and one or more detectors operably positioned by the ring member 610' can be used to measure physiological parameters of the subject. Furthermore, during such use, the module 676' can be automatically turned off, not used, used to measure different physiological parameters than the emitters/detectors operably positioned by the ring member 610', or used to augment measurements of the emitters/detectors operably positioned by the ring member 610'. For example, a processor of the wrist portion 602' can determine whether cable 608' is connected to the wrist portion 602' (e.g., via port 670') and disable operation of module 676' when cable 608' is connected, and enable/instruct operation of module 676' when cable 608' is not connected. Further to this example, a processor of the wrist portion 602' can determine whether cable 608' is connected to the wrist portion 602' and modify operation of module 676' when cable 608' is connected, such as to measure different physiological parameters than the emitters/detectors operably positioned by the ring member 610', or to augment measurements of the emitters/detectors operably positioned by the ring member 610'.

Figure 16A:
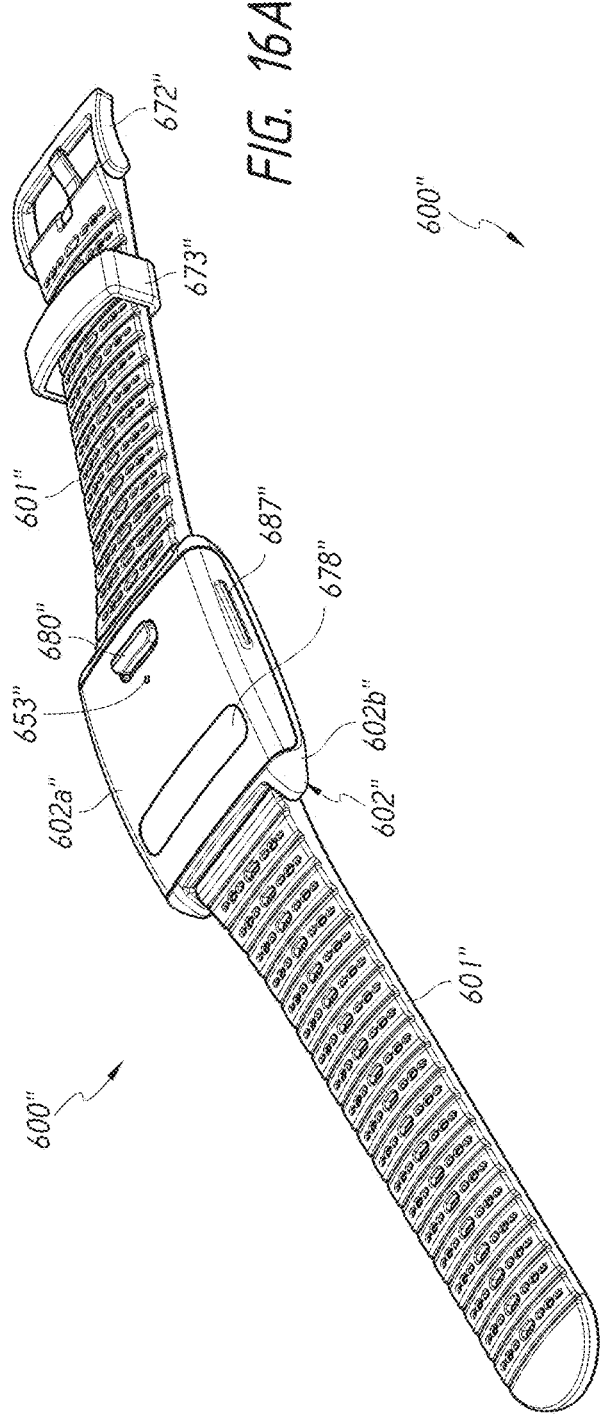
Figure 16B:
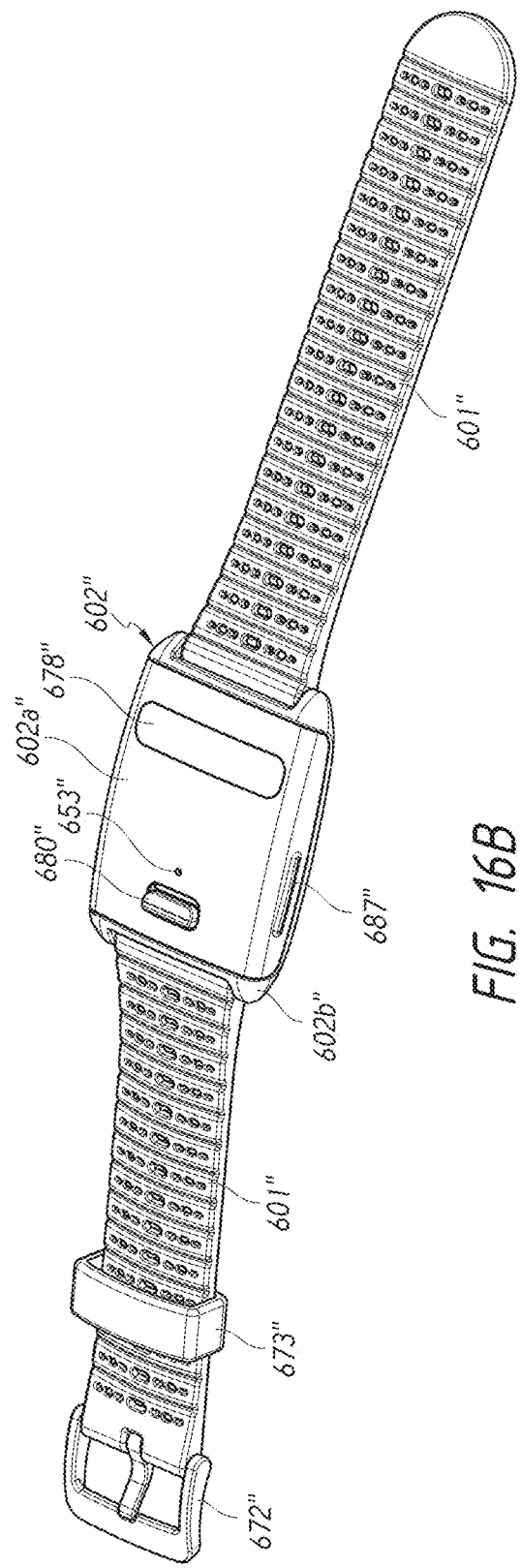
Figure 16E:
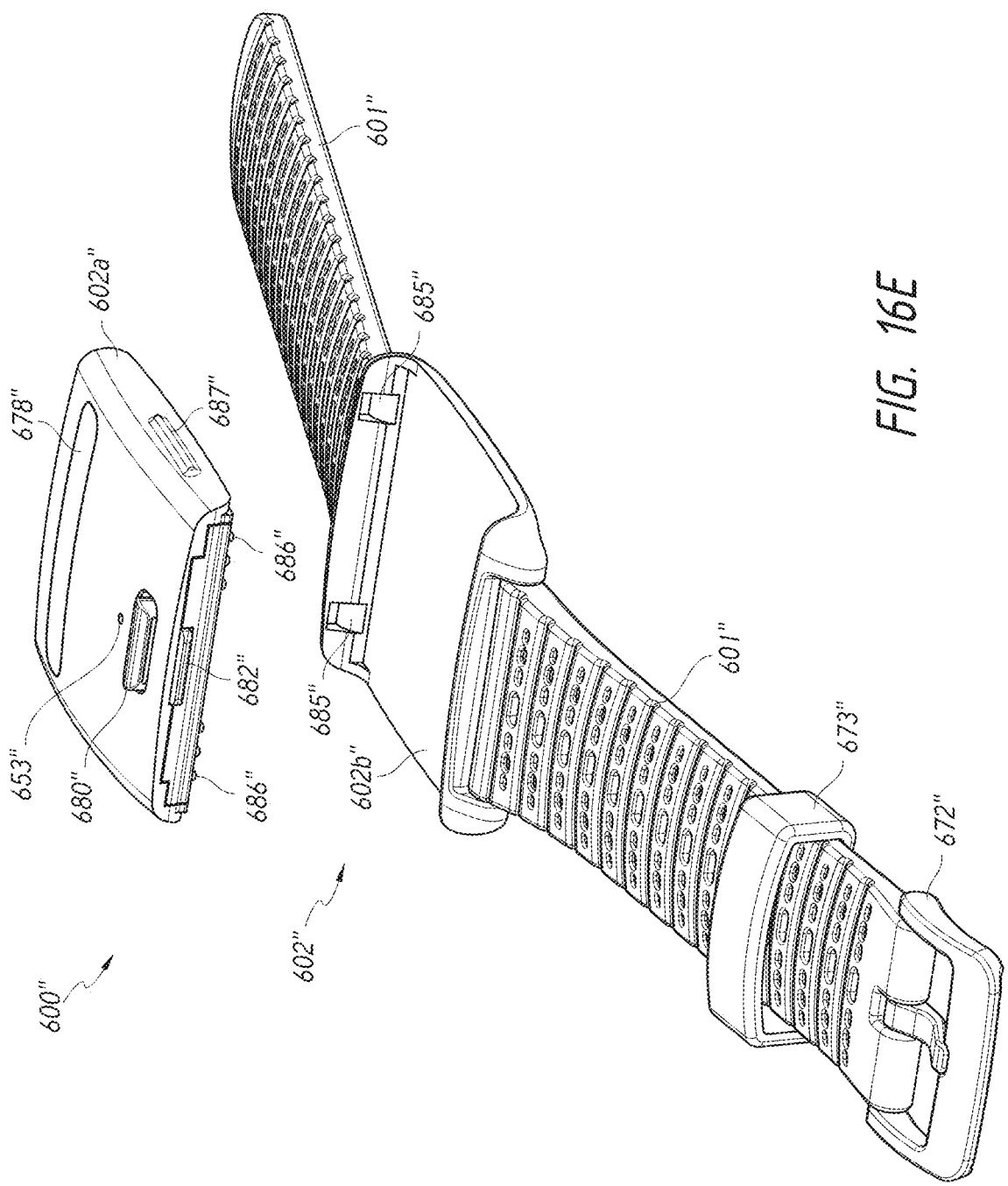

FIGS. 16A-16F illustrate a pulse oximetry system 600" that is a variant of the pulse oximetry system 600 described and illustrated with respect to FIGS. 15A-15J. FIGS. 16A-16B illustrate top perspective views of the pulse oximetry system 600", FIGS. 16C-16D illustrate bottom perspective views of the pulse oximetry system 600", and FIGS. 16E-16F show top perspective views of the pulse oximetry system 600" with a hub portion 602a" separated from a dock portion 602b". The pulse oximetry system 600" can be the same or similar to the pulse oximetry system 600 and can include any or all features and/or functionality of the pulse oximetry system 600. For example, the pulse oximetry system 600" can include straps 601", buckle 672", strap loop 673", wrist portion 602" with hub 602a" and dock 602b", rib(s) 687", hole/opening 653", and latch mechanism 680" which can be similar or identical to straps 601, buckle 672, strap loop 673, wrist portion 602 with hub 602a and dock 602b, rib(s) 687, hole/opening 653, and latch mechanism 680 (respectively) described above with respect to the pulse oximetry system 600. The pulse oximetry system 600" differs from the pulse oximetry system 600 in that, instead of having the port 670, the cable 608 with first and second portions 607 and 609, and the ring member 610, it can include a physiological parameter measurement sensor or module 676" (for example, operably positioned at a bottom of dock 602b" of system 600") and an ECG sensor that can be similar or identical to any of the physiological parameter measurement sensors or modules and ECG sensors described in U.S. Pat. Pub. No. US2021/0290120 incorporated by reference herein and/or with respect to pulse oximetry systems 500 and/or 600'. For example, the module 676" can include one or more emitters 612", one or more detectors 614", and/or ECG electrodes 690" that are the same or similar to and can include any or all features and/or functionality of the one or more emitters 512, 612', the one or more detectors 514, 614', and/or the ECG electrodes 590, 690', of modules 576, 676'. Furthermore, the pulse oximetry system 600" can include an ECG electrode 678" that can be similar or identical to the ECG electrode 578 described above with respect to pulse oximetry system 500. As shown in at least FIGS. 16A-16B, a portion of the wrist portion 602" separated from the module 676" (for example, a portion of an upper surface of the hub 602a") can include the ECG electrode 678". Pulse oximetry system 600" can be referred to as a "wearable device" and can include, for example, a watch configured to wrap around a subject's wrist. In some implementations, module 676" is part of dock 602b" of wrist portion 602", or alternatively, is part of hub 602a" that removably secures to dock 602b".

FIGS. 17A-17G illustrate a pulse oximetry system 600''' that is a variant of the pulse oximetry systems 600' and 600" described with respect to FIG. 15K and FIGS. 16A-16F, respectively. FIGS. 17A-17B illustrate top perspective views, FIGS. 17C-17D illustrate bottom perspective views, and FIGS. 17E-17G illustrate a top, bottom, and side view, respectively, of the pulse oximetry system 600'. The pulse oximetry system 600' can be the same or similar to the pulse oximetry systems 600' and/or 600" and can include any or all features and/or functionality of the pulse oximetry systems 600' and/or 600". For example, the pulse oximetry system 600' can include straps 601''', buckle 672', strap loop 673", and hole/opening 653''' which can be similar or identical to straps 601", buckle 672", strap loop 673", and hole/opening 653" (respectively) described above with respect to the pulse oximetry system 600". Furthermore, the pulse oximetry system 600''' can include a physiological parameter measurement sensor or module 676" and ECG sensor that can be similar or identical to the physiological parameter measurement sensor or module 676' and/or 676" and ECG sensor of pulse oximetry systems 600' and/or 600" and/or any of the physiological parameter measurement sensors or modules and ECG sensors described in U.S. Pat. Pub. No. US2021/0290120 incorporated by reference herein. For example, the pulse oximetry system 600' can include an ECG sensor including ECG electrodes 690', 678' that can be similar or identical to the ECG sensor including ECG electrodes 690", 678" described with respect to the pulse oximetry system 600". The pulse oximetry system 600' differs from the pulse oximetry systems 600' and 600" in that wrist portion 602''' has a unitary structure instead of separate/separable components, in contrast to wrist portion 602'/602" that can include a separable hub 602a'/602a" and a dock 602b'/602b". However, wrist portion 602''' can include any or all features and/or functionality described with respect to any of the hubs and/or docks described elsewhere herein (for example, with respect to hub 602a'/602a" and dock 602b'/602b"). In some variations (not shown), the pulse oximetry system 600' can include a cable, a ring member, and emitters/detectors operably positioned by the ring member similar or identical to the cable 608, ring member 610, and emitters/detectors operably positioned by the ring member 610 described and illustrated with respect to FIGS. 15A-15J and/or FIG. 15K.

Figure 18G:
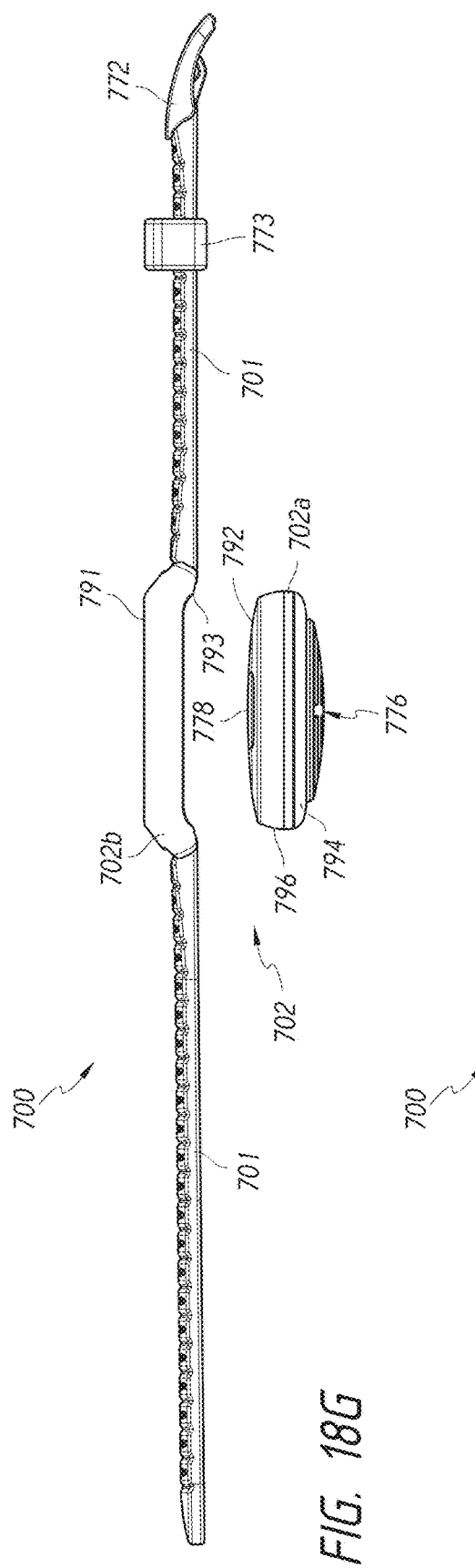

FIGS. 18A-18M illustrate various views of another implementation of a pulse oximetry system 700 configured to be secured to a subject's wrist 3. FIGS. 18A-18B illustrate top perspective views and FIGS. 18C-18D illustrate bottom perspective views of the pulse oximetry system 700. The pulse oximetry system 700 can have similar and/or the same features, aspects, and/or components as any of the pulse oximetry systems described herein, such as pulse oximetry systems 100, 400, 500, 600 and variants thereof. For example, the pulse oximetry system 700 can have a wrist portion 702 configured similar to the sensor dock 106 and the sensor hub 102 (e.g., the wrist portion 702 can combine any and/or all aspects of the sensor dock 106 and the sensor hub 102). The wrist portion 702 can be configured to be secured to the wrist 3 of the subject 1 similar and/or the same as how the sensor dock 106 can be secured to the wrist 3 of the subject 1, for example, by a strap 701 similar and/or the same as the strap 101 and/or any of the straps 401, 501, 601 described herein. Furthermore, the pulse oximetry system 700 can be similar or identical to and/or incorporate any of the features described and/or illustrated in U.S. Pat. Pub. No. US2021/0290120 incorporated by reference herein. For example, the pulse oximetry system 700 can include a physiological parameter measurement sensor or module 776 that can be similar or identical to any of the physiological parameter measurement sensors or modules described in U.S. Pat. Pub. No. US2021/0290120 incorporated by reference herein and/or with respect to modules 576, 676', 676", and/or 676'''. Furthermore, the pulse oximetry system 700 can include an ECG sensor that can be similar or identical to any of the ECG sensors of the pulse oximetry systems described herein, such as pulse oximetry systems 500, 600', 600", and/or 600'''. For example, the module 776 can include one or more emitters 712, one or more detectors 714, and ECG electrodes 790 that are the same or similar to and can include any or all features and/or functionality of the one or more emitters 512, 612', 612", 612''' the one or more detectors 514, 614', 614", 614''', and/or the ECG electrodes 590, 690', 690", 690''', of modules 576, 676', 676", 676". Furthermore, the pulse oximetry system 700 can include an ECG electrode 778 that can be similar or identical to the ECG electrode 678" described above with respect to pulse oximetry system 600". As shown in at least FIGS. 18A-18B, a portion of the wrist portion 702 separated from the module 776 (for example, a portion of an upper surface of the hub 702a) can include the ECG electrode 778. The wrist portion 702 can instruct the one or more emitters 712 of the physiological parameter measurement sensor or module 776 to emit light of one or more wavelengths, for example, in tissue of a wrist to which the wrist portion 702 is secured during use. Furthermore, the wrist portion 702 can receive and/or process one or more signals outputted by the one or more detectors 714 of the physiological parameter measurement sensor or module 776 and determine one or more physiological parameters based on the received or processed signals.

Figure 18H:
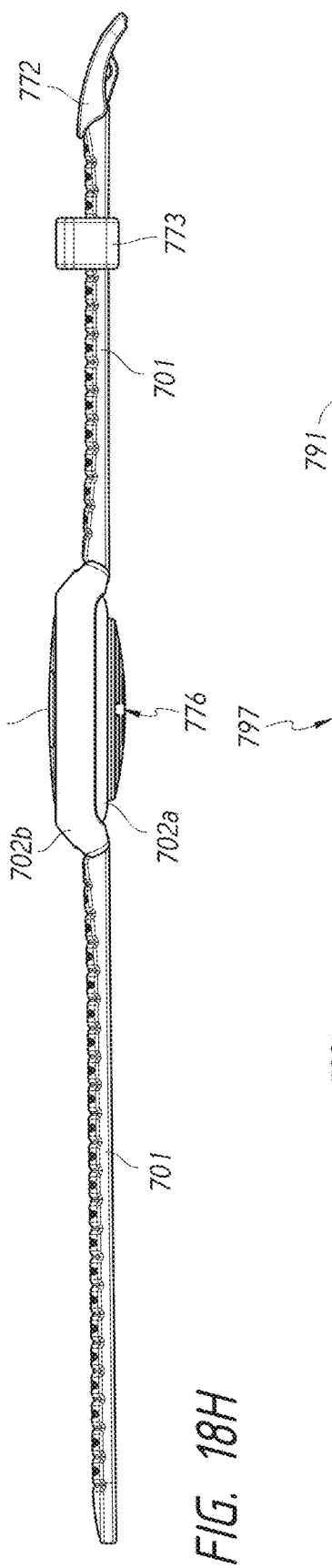
Figure 18I:
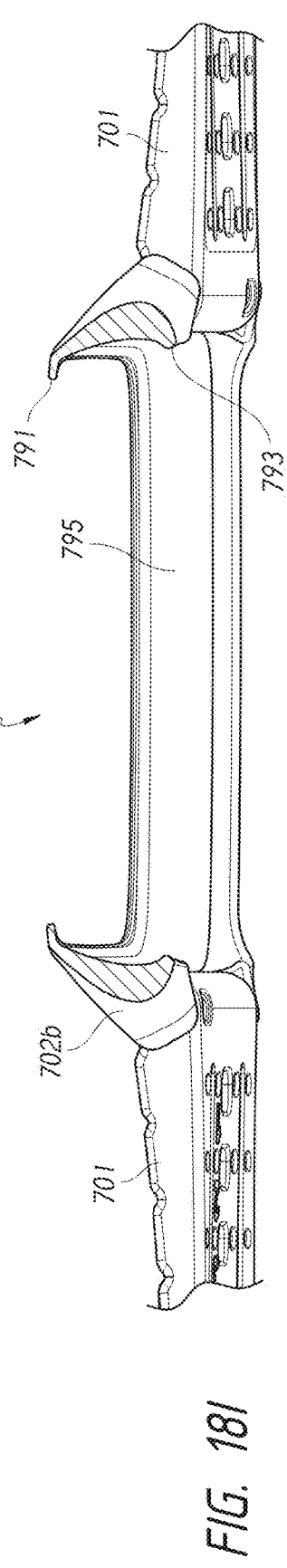

In some implementations and as shown in the perspective views of FIGS. 18E-18F and side views of FIGS. 18G-18H, wrist portion 702 comprises a first component 702a (which may also be referred to as a "sensor hub" or "hub") and a second component 702b (which may also be referred to as a "dock"). Hub 702a can be configured to removably secure to dock 702b, and vice versa, such as by a snap fit. For example, the hub 702a can secure to the dock 702b via a snap fit by being pushed into the dock 702b from below, and be removed from the dock 702b by being pushed down from above relative to the dock 702b. For this releasably connection, the dock 702b can have an opening 797 configured to removably receive the hub 702a, the opening 797 defined by an upper ridge 791, a lower ridge 793, and an inner portion 795 spanning between the upper ridge 791 and the lower ridge 793 as shown in FIG. 18I. The upper ridge 791 can be a continuous ridge along a top portion of the dock 702b that prevents/limits further upward movement of the hub 702a within the dock 702b when the hub 702a and dock 702b are secured to one another. For example, a portion of a top 792 of the hub 702a can seat against the upper ridge 791 of the dock 702b when the hub 702a and dock 702b are secured to one another. The inner portion 795 of the dock 702b can be configured to receive a side 796 of the hub 702a when the hub 702a and dock 702b are secured to one another. As such, the inner portion 795 of the dock 702b can mirror the side 796 of the hub 702a. The lower ridge 793 of the dock 702b can be configured as a discontinuous ridge along a bottom portion of the dock 702b that allows the hub 702a to be removably received by the dock 702b and secures the hub 702a within the dock 702b when the hub 702a and dock 702b are secured to one another. For example, a portion of a bottom 794 of the hub 702a can seat against the lower ridge 793 of the dock 702b when the hub 702a and dock 702b are secured to one another. For the releasable snap fit between the hub 702a and the dock 702b, the dock 702b can be formed of a resilient material that allows some flexion/deformation of the dock 702b when securing or removing the hub 702a and the dock 702b to/from one another.

Additionally, and as shown in the top perspective, top, and bottom views of the hub 702a in FIGS. 18J-18L, respectively, when viewed from above the hub 702a can have a generally rounded rectangular shape. Such a rounded rectangular shape can allow the hub 702a to fit into the dock 702b in two orientations (each 180 degrees from each other), which can advantageously allow for the hub 702a to be positioned in the dock 702b as desired on either a left wrist or a right wrist of a subject. When viewed from the side, such as shown in FIG. 18M, the hub 702a can have a rounded side 796 with rounded transitions between the side 796 and the top 792 and the side 796 and the bottom 794. Additionally, the side 796 of the hub 702a can taper inwards towards the center of the hub 702a from near the bottom 794 to the top 792, which can facilitate securement and removal of the hub 702a with the dock 702b. In some implementations and as shown in at least FIG. 18J-18K, the hub 702a can include one or more holes 779 configured to allow optical radiation emitted by one or more status indicators of the hub 702a to be visible from a location external to the hub 702a, such as by the subject 1 when wearing/using the pulse oximetry system 700. In some implementations, holes/openings 779 can be at least partially aligned with such status indicator(s) to allow optical radiation emitted from the status indicator(s) to more easily pass through the holes/openings 779. Such status indicator(s) can be LEDs, for example.

The dock 702b can be coupled (for example, permanently coupled) to straps 701. In some implementations, hub 702a can include a rechargeable battery, and hub 702a can be removed from dock 702b, for example, in order to facilitate charging of hub 702a. In some implementations, dock 702b does not include a battery, hardware processor(s), and/or sensors. Hub 702a can include any or all of the components discussed with respect to sensor hub 102 and FIG. 2C, for example, processor(s) 102a, storage device(s) 102b, communication module 102c, battery 102d, vibration motor 102f, information element 102e, and/or other sensor(s) 102h. In some implementations, dock 702b does not include any electronic components (for example, does not include any electrical circuitry).

The pulse oximetry system 700 can be powered by a battery. In some implementations, the hub 702a can be powered by a battery. The battery can be rechargeable. The battery can be recharged by connecting the hub 702a to a source of electrical power (e.g., via a cable), by wirelessly charging (e.g., via a wireless charging pad), by solar energy (e.g., via a solar collector if incorporated in the hub 702a), and/or by kinetic motion (e.g., via an internal mechanism if incorporated that can convert kinetic motion into electrical power). In some cases, the battery can be removed, or the battery can be integrated within and/or a permanent part of the hub 702a.

FIGS. 19A-19B illustrate a pulse oximetry system 700' that is a variant of the pulse oximetry system 700 described and illustrated with respect to FIGS. 18A-18M. FIGS. 19A-19B illustrate top perspective views of the pulse oximetry system 700'. The pulse oximetry system 700' can be similar to the pulse oximetry system 700 in some or many respects. The pulse oximetry system 700' differs from the pulse oximetry system 700 in that its wrist portion 702' can include a display 720' similar or identical to the display of the wearable sensor described in U.S. Pat. Pub. No. US2021/0290120 incorporated by reference herein, which can be configured to display a plurality of physiological parameters monitored and/or determined by the pulse oximetry system 700' and/or other information (e.g., such as the time, date, etc.). Further, the display 720' can be configured to receive input from the subject, such as touch input, for interacting with the pulse oximetry system 700'. Such display 720' can be disposed on a top of the wrist portion 702' such that it can be accessible when the pulse oximetry system 700' is worn by a subject. The pulse oximetry system 700' also differs from the pulse oximetry system 700 in that its ECG electrode 778' can be disposed along a side of the wrist portion 702' such as shown in FIG. 19A. The pulse oximetry system 700' can also differ from the pulse oximetry system 700 by including one or more user interfaces 774' similar or identical to the user interfaces 13 (e.g., user interface 13a and/or user interface 13b) of the wearable sensor described in U.S. Pat. Pub. No. US2021/0290120 incorporated by reference herein, which can be configured as button(s). As shown in FIG. 19B, such user interfaces 774' can be disposed along a side of the wrist portion 702'.

In some implementations, the wrist portion 702' comprises a first component 702a' (which may also be referred to as a "sensor hub" or "hub") and a second component 702b' (which may also be referred to as a "dock"), which can be similar to and removably secure to one another like the hub 702a and dock 702b of pulse oximetry system 700. In such implementations, the hub 702a' can include the display 720', the ECG electrode 778', and the user interfaces 774'. Furthermore, in such implementations, the dock 702b' can be configured to allow a subject to access the ECG electrode 778' and user interfaces 774' when the hub 702a' and the dock 702b' are secured to one another. For example, the dock 702b' can include windows/through holes at/adjacent the locations of the ECG electrode 778' and user interfaces 774' to allow a subject access to such features (e.g., the dock 702b' can have windows/through holes along its sides).

Figure 20A:
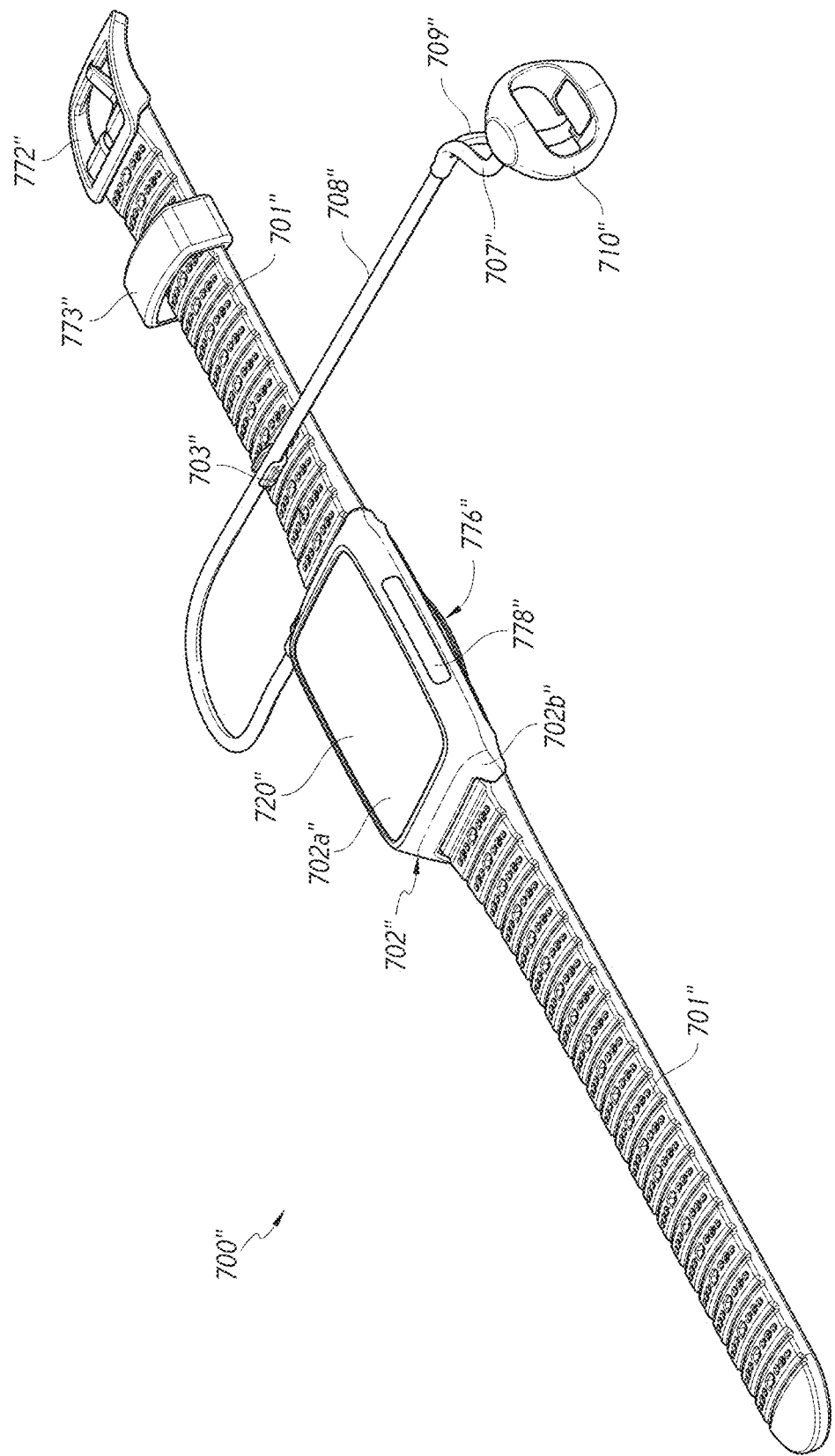

FIGS. 20A-20B illustrate a pulse oximetry system 700'' that is a variant of the pulse oximetry system 700' described and illustrated with respect to FIGS. 19A-19B. FIGS. 20A-20B illustrate top perspective views of the pulse oximetry system 700''. The pulse oximetry system 700'' can be similar to the pulse oximetry system 700' in some or many respects. The pulse oximetry system 700'' differs from the pulse oximetry system 700' in that it includes a cable 708'' and a ring member 710''. Cable 708'' can be similar or identical to any of cables 108, 408, 508, and/or 608 discussed herein. Cable 708'' can split into first and second portions 707'', 709'' similar or identical to cables 108, 408, 508, and/or 608 discussed elsewhere herein. Similar to that discussed with respect to cables 108, 408, 508, and/or 608, cable 708'' can operably connect wrist portion 702'' (e.g., the hub 702a'' of the wrist portion 702'') with an emitter housing and/or emitter package comprising one or more emitters (similar and/or identical to the those described herein, such as emitter package 134 comprising one or more emitters 112) and a detector housing and/or a detector package comprising one or more detectors (similar and/or identical to the those described herein, such as detector package 136 comprising one or more detectors 114). Ring member 710'', which can operably position such emitter housing and/or emitter package and detector housing and/or detector package, can be similar or identical to any of the ring members discussed elsewhere herein, such as ring member 110, 410, 510, and/or 610.

In some implementations, the cable 708'' (and thus the one or more emitters and one or more detectors operably positioned by the ring member 710'') is detachable from the wrist portion 702'', for example, removably connectable to a connector port 770'' of the wrist portion 702'' (e.g., detachable from hub 702a'' at connector port 770''). In some implementations, cable 708'' is permanently attached to the wrist portion 702'' (e.g., permanently attached to hub 702a''). The connector port 770'' can be disposed at or adjacent a corner of a side of the wrist portion 702'' as shown in FIGS. 20A-20B, or it can be disposed along a side of the wrist portion 702'' (not shown). In some implementations, the wrist portion 770'' can include more than one connector port 770'' (for example, one on each side of the wrist portion 770''). The cable 708'' can be secured to and/or positioned along a subject similar or identical to that discussed with respect to cable 108 in pulse oximetry system 100, for example, with the utilization of one or more cable retainers (such as cable retainers 103, 105) and/or similar to that discussed above with respect to pulse oximetry system 100. In some implementations, pulse oximetry system 700'' includes a cable retainer 703'' that can be similar or identical to any of the cable retainers discussed herein, such as cable retainer 403, 503, and/or 603. Cable retainer 703'' can be permanently or removably attached to one of straps 701''.

In some implementations, physiological parameter measurement sensor or module 776'' can work in combination with the one or more emitters and one or more detectors operably positioned by ring member 710''. For example, signals and/or data outputted by the module 776'' can augment any or all signals and/or data outputted by the one or more detectors operably positioned by ring member 710'', such as if signals and/or data outputted by the one or more detectors is interrupted or lost. As another example, the signals and/or data outputted by module 776'' can validate any or all signals and/or data outputted by the one or more detectors operably positioned by ring member 710''. In a further example, the module 776'' can be used as a primary source of signals and/or data for determining one or more physiological parameters of a subject if the cable 708'' (and thus the one or more emitters and one or more detectors operably positioned by the ring member 710'') is detached from the wrist portion 702''. In some implementations, the module 776'' can measure physiological parameters of interest separate of and/or distinct from the one or more emitters and one or more detectors operably positioned by ring member 710''. In some implementations, the module 776'' can be automatically turned off and/or not used when the cable 708'' (and thus the one or more emitters and one or more detectors operably positioned by the ring member 710") is connected to the wrist portion 702" (e.g., such as connected at connector port 770"). For example, during the day and/or when out in public, a subject can wear the pulse oximetry system 700" without the cable 708" connected. During such use, the module 776" can be used to measure physiological parameters of the subject. Such use can advantageously allow the subject to wear and use the pulse oximetry system in a concealed manner. During the night (e.g., when sleeping) and/or when not in public, a subject can wear the pulse oximetry system 700" with the cable 708" connected. During such use, the one or more emitters and one or more detectors operably positioned by the ring member 710" can be used to measure physiological parameters of the subject. Furthermore, during such use, the module 776" can be automatically turned off, not used, used to measure different physiological parameters than the emitters/detectors operably positioned by the ring member 710", or used to augment measurements of the emitters/detectors operably positioned by the ring member 710". For example, a processor of the wrist portion 702" can determine whether cable 708" is connected to the wrist portion 702" (e.g., via port 770") and disable operation of module 776" when cable 708" is connected, and enable/instruct operation of module 776" when cable 708" is not connected. Further to this example, a processor of the wrist portion 702" can determine whether cable 708" is connected to the wrist portion 702" and modify operation of module 776" when cable 708" is connected, such as to measure different physiological parameters than the emitters/detectors operably positioned by the ring member 710", or to augment measurements of the emitters/detectors operably positioned by the ring member 710".

Although examples and certain orientations and configurations of various aspects of the pulse oximetry systems described in this disclosure (e.g., pulse oximetry systems 100, 400, 500, 500', 600, 600', 600", 600''', 700, 700', 700") have been provided, alternative orientations and configurations for such aspects are to be considered included as a part of this disclosure. For example, although certain orientations and configurations for the orientation/direction in which the docks described herein (e.g., docks 106 and 306) can be secured to a subject's wrist 3 have been provided, the docks described herein can be secured to a subject's wrist 3 in any orientation/direction. For example, the docks described herein (e.g., docks 106 and 306) can be secured to a subject's wrist with their arm(s) (e.g., arms(s) 122) directed in any direction, such as towards the palm 4, away from the palm 4, and/or any direction in between including perpendicular to the palm 4. With different orientations/directions in which the docks described herein can be secured to a subject's wrist, the orientation of the sensor hubs (e.g., sensor hub 102) with respect to the docks as well as the direction in which the sensor hubs may need to be slid/directed/pushed towards the docks (e.g., to connect the sensor hubs with the sensor docks) and/or away from the docks (e.g., to disconnect the sensor hubs from the sensor docks) may need to be changed as well, however the releasable mechanical and electrical connection between the docks and hubs can remain. As another example, although certain orientations and configurations for the orientation, direction, and/or routing of the cables 108, 308, 408, 508, 608, 708" and any variations thereof and any of their portions if included (e.g., first portions 107, 407, 507, 607, and 707" and variations thereof and second portions 109, 409, 509, 609, and 709" and variations thereof) have been described, the cables 108, 308, 408, 508, 608, and 708" and variations thereof and any of their portions can be oriented, directed, and/or routed in any other ways. For example, the cables 108, 308, 408, 508, 608, and 708" and any variations thereof can be directed towards the palm 4, away from the palm 4, and/or any direction in between including perpendicular to the palm 4 when extending from their respective pulse oximetry systems or portions thereof, such as when extending from their respective bend reliefs (e.g., bend relief 120a) that connect the cables to their respective pulse oximetry system when included. As another example, although certain orientations and configurations for the orientation and position of connector ports, such as connector ports 570, 570', 670, 670', and 770", and cables connected thereto have been described, the connector ports can be oriented, directed, and/or positioned in any other ways. For example, connector ports, where included, can be disposed at or adjacent a corner of a side of their associated system or disposed along a side of their associated system (e.g., of a wrist portion, a hub, and/or a dock of their associated system). In some implementations, the systems described herein can include more than one connector port, such as one on each side (including at or adjacent a corner or along the side) of a wrist portion, a hub, and/or a dock thereof.

The pulse oximetry systems described herein, such as the pulse oximetry systems 100, 400, 500, 600, 700 and any variations thereof and/or any of their components can be configured to be waterproof, water resistant, drip proof, shock proof, dust proof, and/or dust resistant. While the pulse oximetry systems have been described as having a rechargeable battery, the battery can be nonrechargeable or single use. In some implementations, a battery of the pulse oximetry system (such as battery 102d and/or the implementation of such a battery 165) can be rechargeable but non-removable from the system. In such a case, the pulse oximetry system can include a charge port configured to receive a power cable for charging. Further in such a case, the pulse oximetry system can be used by the subject while charging (e.g., the pulse oximetry system can be in an operational mode while charging). In some variants, a sensor hub of any of the pulse oximetry systems described herein (such as sensor hub 102) can be permanently connected to a dock of any of the pulse oximetry systems described herein (such as dock 106). In such configurations, the combined dock/sensor hub can have a charge port for charging.

In some implementations, any or all of the components of the pulse oximetry sensors as described herein can be configured to be reusable (which may also be referred to herein as "durable"). For example, in reference to the pulse oximetry system 100, the sensor hub 102 and the sensor dock assembly 104 including the dock 106, the cable 108, the emitter package 134 in emitter housing 130, the detector package 136 in detector housing 132, and the ring member 110 can all be configured to be reusable (e.g., for days, weeks, months, or more). In such a case, all components can be sanitized between uses and/or between subjects. In some implementations, all components of the pulse oximetry systems as described herein can be configured to be reusable except for the ring members as described herein, such as ring members 110 and 410. In some cases, all components of the pulse oximetry systems as described herein can be configured to be reusable between subjects except for the ring members as described herein, such as ring members 110 and 410 (e.g., subjects do not share use of a ring member). In some implementations, the sensor hubs as described herein, such as sensor hub 102, last longer than all other components of the pulse oximetry system and can be reused if desired between subjects. In some implementations, one or more components of the pulse oximetry systems as described herein, such as a ring member (e.g., ring members 110 and 410), a clip member (e.g., clip member 310), a cable (e.g., cables 108, 308, and 408) and any portions thereof, a dock (e.g., docks 104 and 304) and any portions thereof, and sensor components (e.g., emitter packages 134 and 334 and detector packages 136 and 336) and any portions thereof, can be configured as single use (which may be referred to herein as "disposable"). In such a configuration, the sensor hubs as described herein can be integrated, a part of, and/or otherwise combined with the docks as described herein to provide for a single and fully integrated component that can be secured to the subject's wrist 3. Furthermore, in such a configuration, the pulse oximetry systems can include a single use battery and/or non-rechargeable battery (e.g., a zinc-air battery). In some implementations, all components of the pulse oximetry systems as described herein can be configured to be single use except for the sensor hubs (e.g., sensor hub 102).

Additional Considerations and Terminology

Certain categories of persons, such as caregivers, clinicians, doctors, nurses, and friends and family of a subject, may be used interchangeably to describe a person providing care to the subject. Furthermore, subjects, patients, or users used herein interchangeably refer to a person who is wearing a sensor or is connected to a sensor or whose measurements are used to determine a physiological parameter or a condition. Parameters may be, be associated with, and/or be represented by, measured values, display icons, alphanumeric characters, graphs, gauges, power bars, trends, or combinations. Real time data may correspond to active monitoring of a subject, however, such real time data may not be synchronous to an actual physiological state at a particular moment. Measurement value(s) of a parameter such as any of those discussed herein, unless specifically stated otherwise, or otherwise understood with the context as used is generally intended to convey a measurement or determination that is responsive to and/or indicative of the physiological parameter.

Conditional language used herein, such as, among others, "can," "could," "might," "may," "e.g.," and the like, unless specifically stated otherwise, or otherwise understood within the context as used, is generally intended to convey that certain features, elements, and/or steps are optional. Thus, such conditional language is not generally intended to imply that features, elements, and/or steps are in any way required or that one or more implementations necessarily include logic for deciding, with or without other input or prompting, whether these features, elements, and/or steps are included or are to be always performed. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 10 degrees, 5 degrees, 3 degrees, or 1 degree. As another example, in certain implementations, the terms "generally perpendicular" and "substantially perpendicular" refer to a value, amount, or characteristic that departs from exactly perpendicular by less than or equal to 10 degrees, 5 degrees, 3 degrees, or 1 degree.

Although certain implementations and examples have been described herein, it will be understood by those skilled in the art that many aspects of the systems and devices shown and described in the present disclosure may be differently combined and/or modified to form still further implementations or acceptable examples. All such modifications and variations are intended to be included herein within the scope of this disclosure. A wide variety of designs and approaches are possible. No feature, structure, or step disclosed herein is essential or indispensable.

Any methods disclosed herein need not be performed in the order recited. The methods disclosed herein may include certain actions taken by a practitioner; however, they can also include any third-party instruction of those actions, either expressly or by implication.

The methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. The computer system may be a cloud-based computing system whose processing resources are shared by multiple distinct business entities or other users.

Depending on the implementation, certain acts, events, or functions of any of the processes or algorithms described herein can be performed in a different sequence, can be added, merged, or left out altogether (for example, not all described operations or events are necessary for the practice of the algorithm). Moreover, in certain implementations, operations or events can be performed concurrently, e.g., through multi-threaded processing, interrupt processing, or multiple processors or processor cores or on other parallel architectures, rather than sequentially.

Various illustrative logical blocks, modules, routines, and algorithm steps that may be described in connection with the disclosure herein can be implemented as electronic hardware (e.g., ASICs or FPGA devices), computer software that runs on general purpose computer hardware, or combinations of both. Various illustrative components, blocks, and steps may be described herein generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, various illustrative logical blocks and modules that may be described in connection with the disclosure herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. A processor can include an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of any method, process, routine, or algorithm described in connection with the disclosure herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain implementations disclosed herein is indicated by the appended claims rather than by the foregoing description. All changes which come within the meaning and range of equivalency of the claims are to be embraced within their scope.

What is claimed is:

1. A pulse oximetry system configured to secure to a wrist and measure a blood oxygen saturation at a tissue site on a pinky finger of a subject, the pulse oximetry system comprising:
    a sensor dock assembly comprising:
        a dock and a strap configured to secure the dock to the subject's wrist;
        a ring member configured to secure around a first portion of the subject's pinky finger;
        one or more emitters operably positioned by a first portion of the ring member, the one or more emitters configured to emit optical radiation into tissue of the subject's pinky finger;
        one or more detectors operably positioned by a second portion of the ring member that is opposite the first portion of the ring member, the one or more detectors configured to detect at least a portion of the optical radiation emitted from the one or more emitters after passing through said tissue and output at least one signal responsive to the detected optical radiation;
        a cable connected to and extending from the dock and in electrical communication with the one or more emitters and the one or more detectors, the cable configured to transmit said at least one signal outputted by the one or more detectors to the dock;
    a first cable retainer disposed on the strap or the dock, the first cable retainer comprising a prong configured to secure a first portion of the cable;
    a second cable retainer configured to secure around a second portion of the subject's pinky finger between the ring member and the subject's palm, the second cable retainer comprising a prong configured to secure a second portion of the cable;
    wherein the first and second cable retainers are configured to allow the cable to be positioned along an outside edge of a palm of the subject and along at least a portion of an outside edge of the subject's pinky finger when the ring member is secured to the first portion of the subject's pinky finger and the dock is secured to the subject's wrist; and
    a sensor hub configured to releasably connect to the dock, the sensor hub comprising one or more hardware processors and a battery;
    wherein, when the sensor hub is connected to the dock of the sensor dock assembly:
        the sensor dock assembly is configured to receive power from the battery of the sensor hub; and
        the one or more hardware processors of the sensor hub are configured to receive and process said at least one signal outputted by the one or more detectors of the sensor dock assembly to determine at least one physiological parameter of the subject.

2. The pulse oximetry system of claim 1, wherein the ring member is configured to secure around a nail bed of the subject's pinky finger.

3. The pulse oximetry system of claim 1, wherein the ring member comprises a resilient and flexible material.

4. The pulse oximetry system of claim 1, wherein:
the dock comprises a base and two arms extending from the base and separated from one another by a gap sized to receive the sensor hub, said arms configured to releasably connect to sides of the sensor hub;
said cable is connected to and extends from said base; and
the dock comprises an electrical connector in electrical communication with the cable that engages an electrical connector of the sensor hub when the sensor hub is connected to the dock.

5. The pulse oximetry system of claim 4, wherein the arms of the dock each comprise one or more strap loops configured to be coupled with the strap.

6. The pulse oximetry system of claim 1, wherein, when the sensor dock assembly is secured to the subject's wrist and the ring member is secured to said pinky finger, the cable extends from the dock in a direction away from a hand of the subject and is bent towards the subject's pinky finger to connect to the one or more emitters and the one or more detectors.

7. The pulse oximetry system of claim 1, wherein:
the cable comprises a first end connected to the dock and a second end opposite the first end; and
the cable is split into a first portion and a second portion at the second end, said first portion connected to the one or more emitters and said second portion connected to the one or more detectors.

8. The pulse oximetry system of claim 7, wherein, when the ring member is secured to the subject's pinky finger:
the first portion of the cable extends around said outside edge and along a portion of a top of the subject's pinky finger; and
the second portion of the cable extends around said outside edge and along a portion of a bottom of the subject's pinky finger.

9. The pulse oximetry system of claim 1, wherein the one or more emitters are disposed within an emitter housing and the one or more detectors are disposed within a detector housing, and wherein the ring member comprises a body comprising:
an opening configured to receive a portion of the subject's pinky finger therethrough;
a first cavity sized and shaped to receive the emitter housing; and
a second cavity sized and shaped to receive the detector housing.

10. The pulse oximetry system of claim 1, wherein the sensor dock assembly does not comprise a battery or a processor.

11. The pulse oximetry system of claim 1, wherein said second cable retainer comprises a ring configured to secure around the second portion of the subject's pinky finger between the ring member and the subject's palm.

12. A pulse oximetry system configured to secure to a wrist and measure a blood oxygen saturation at a tissue site on a finger of a subject, the pulse oximetry system comprising:
a sensor dock assembly comprising:
a dock configured to be secured to the subject's wrist;
a ring member configured to secure around the subject's finger;
one or more emitters operably positioned by a first portion of the ring member, the one or more emitters configured to emit optical radiation into tissue of the subject's finger;
one or more detectors operably positioned by a second portion of the ring member, the one or more detectors configured to detect at least a portion of the optical radiation emitted from the one or more emitters after passing through said tissue and output at least one signal responsive to the detected optical radiation;
a cable connected to and extending from the dock and in electrical communication with the one or more emitters and the one or more detectors, the cable configured to transmit said at least one signal outputted by the one or more detectors to the dock; and
a sensor hub configured to releasably connect to the dock, the sensor hub comprising one or more hardware processors and a battery;
wherein, when the sensor hub is connected to the dock of the sensor dock assembly:
the sensor dock assembly is configured to receive power from the battery of the sensor hub; and
the one or more hardware processors of the sensor hub are configured to receive and process said at least one signal outputted by the one or more detectors of the sensor dock assembly to determine at least one physiological parameter of the subject.

13. The pulse oximetry system of claim 12, wherein the ring member comprises a resilient and flexible material.

14. The pulse oximetry system of claim 12, wherein the second portion of the ring member is opposite the first portion of the ring member.

15. The pulse oximetry system of claim 12, wherein:
the cable comprises a first end connected to the dock and a second end opposite the first end;
the cable is split into a first portion and a second portion at the second end, said first portion connected to the one or more emitters and said second portion connected to the one or more detectors; and
when the ring member is secured to the subject's finger:
the first portion of the cable extends along a portion of a top of the subject's finger; and
the second portion of the cable extends along a portion of a bottom of the subject's finger.

16. The pulse oximetry system of claim 12, wherein:
the one or more emitters are disposed within an emitter housing and the one or more detectors are disposed within a detector housing; and
the ring member comprises a body comprising:
an opening configured to receive a portion of the subject's finger therethrough;
a first cavity sized and shaped to receive the emitter housing; and
a second cavity sized and shaped to receive the detector housing.

17. The pulse oximetry system of claim 16, wherein the body of the ring member comprises a first notch configured to receive a portion of the cable in electrical communication with the one or more emitters and a second notch configured to receive a portion of the cable in electrical communication with the one or more detectors, wherein said first notch is positioned adjacent the first cavity and said second notch is positioned adjacent the second cavity.

18. The pulse oximetry system of claim 17, wherein:
the body of the ring member comprises:
a first cavity opening extending through a portion of the body into the first cavity, said first cavity opening sized and shaped to correspond with a size and a shape of a first protrusion that extends from the emitter housing; and a second cavity opening extending through a portion of the body into the second cavity, said second cavity opening sized and shaped to correspond with a size and a shape of a second protrusion that extends from the detector housing;

when the emitter housing is disposed within the first cavity of the ring member, the first protrusion of the emitter housing is positioned within the first cavity opening; and when the detector housing is disposed within the second cavity of the ring member, the second protrusion of the detector housing is positioned within the second cavity opening.

19. The pulse oximetry system of claim 18, wherein said first protrusion is at least one of shaped and sized different than said second protrusion.

20. The pulse oximetry system of claim 12, wherein the sensor dock assembly is configured to transition from a non-operational mode when the sensor hub is disconnected from the dock to an operational mode when sensor hub is connected to the dock, and wherein, in the operational mode, the pulse oximetry system is configured to determine at least one physiological parameter of the subject.

* * * * *